(12) United States Patent
Nelsen

(10) Patent No.: US 11,741,491 B2
(45) Date of Patent: *Aug. 29, 2023

(54) DISTRIBUTION OF FRACTIONAL EQUITY REWARDS BASED ON PURCHASE BEHAVIOR

(71) Applicant: Apex Fintech Solutions Inc., New York, NY (US)

(72) Inventor: David A. Nelsen, Lake Oswego, OR (US)

(73) Assignee: Apex Fintech Solutions Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/444,048

(22) Filed: Jul. 29, 2021

(65) Prior Publication Data

US 2021/0398163 A1    Dec. 23, 2021

Related U.S. Application Data

(63) Continuation-in-part of application No. 16/537,470, filed on Aug. 9, 2019, now abandoned, and a
(Continued)

(51) Int. Cl.
*G06Q 30/00* (2023.01)
*G06Q 30/0226* (2023.01)
(Continued)

(52) U.S. Cl.
CPC .......... *G06Q 30/0228* (2013.01); *G06N 3/02* (2013.01); *G06Q 30/0229* (2013.01); *G06Q 30/0239* (2013.01); *G06Q 40/06* (2013.01)

(58) Field of Classification Search
CPC .......... G06Q 30/0228; G06Q 30/0229; G06Q 30/0239; G06Q 40/06; G06N 3/02; G06N 3/08

See application file for complete search history.

(56) References Cited

U.S. PATENT DOCUMENTS 5,233,514 A    8/1993   Ayyoubi et al.
5,819,238 A *  10/1998  Fernholz ................ G06Q 40/02
                                                  705/36 R
(Continued)

FOREIGN PATENT DOCUMENTS

CA    2826625 A1    8/2012
CN    103620633 A   3/2014
(Continued)

OTHER PUBLICATIONS

Approaches To Machine Learning. 1984. Carnegie-Mellon University. (Year: 1984).*
(Continued)

*Primary Examiner* — Maria V Vanderhorst
(74) *Attorney, Agent, or Firm* — McCoy Russell LLP

(57) ABSTRACT

Herein disclosed are systems and methods for distributing fractional equity rewards to users of a loyalty platform based on tracked user loyalty purchases. The disclosed systems and methods may reduce time between a user loyalty purchase and distribution of a fractional equity reward determined based on the user loyalty purchase. In one example, by maintaining a pre-purchased supply of shares within an inventory account of the loyalty platform, and by distributing fractional equity rewards to user accounts on the loyalty platform from the pre-purchased supply, a reduction in reward distribution time may be enabled. Further, by maintaining the pre-purchased supply of shares of stock within the inventory based on a running average rate of fractional equity reward distribution, and predicted events, the amount of stock in the inventory may be intelligently controlled to reduce excess inventory, while reducing a probability of reward distribution delay.

20 Claims, 82 Drawing Sheets

Related U.S. Application Data continuation-in-part of application No. 16/537,472, filed on Aug. 9, 2019, now abandoned, and a continuation-in-part of application No. 16/537,476, filed on Aug. 9, 2019, now Pat. No. 11,113,709, and a continuation-in-part of application No. 16/537,452, filed on Aug. 9, 2019, now abandoned, which is a continuation-in-part of application No. 16/101,363, filed on Aug. 10, 2018, now abandoned, and a continuation-in-part of application No. 16/101,304, filed on Aug. 10, 2018, now abandoned.

(60) Provisional application No. 62/717,741, filed on Aug. 10, 2018, provisional application No. 62/717,736, filed on Aug. 10, 2018, provisional application No. 62/717,638, filed on Aug. 10, 2018, provisional application No. 62/717,743, filed on Aug. 10, 2018, provisional application No. 62/697,284, filed on Jul. 12, 2018, provisional application No. 62/543,884, filed on Aug. 10, 2017.

(51) Int. Cl.
   G06N 3/02 (2006.01)
   G06Q 30/0207 (2023.01)
   G06Q 40/06 (2012.01)
   G05B 19/418 (2006.01)

(56) References Cited

U.S. PATENT DOCUMENTS

| | | |
|---|---|---|
| 6,345,261 B1 | 2/2002 | Feidelson et al. |
| 6,895,386 B1 | 5/2005 | Bachman et al. |
| 8,468,129 B2 | 6/2013 | Ho et al. |
| 8,533,804 B2 | 9/2013 | Ho et al. |
| 8,660,893 B2 | 2/2014 | Fordyce, III |
| 9,251,528 B1 | 2/2016 | McGhie et al. |
| 2001/0047295 A1 | 11/2001 | Tenembaum |
| 2002/0042742 A1 | 4/2002 | Glover et al. |
| 2002/0052818 A1* | 5/2002 | Loveland ............... G06Q 40/04 705/36 R |
| 2003/0004803 A1 | 1/2003 | Glover et al. |
| 2004/0210505 A1 | 10/2004 | Pourhamid |
| 2004/0254873 A1 | 12/2004 | Loveland |
| 2005/0209916 A1 | 9/2005 | Longman et al. |
| 2007/0005416 A1 | 1/2007 | Jackson et al. |
| 2007/0130000 A1 | 6/2007 | Assanassios |
| 2007/0265950 A1* | 11/2007 | Reuss ................... G06Q 40/00 705/36 R |
| 2009/0271257 A1* | 10/2009 | Flake ................ G06Q 30/0207 705/14.1 |
| 2010/0106578 A1 | 4/2010 | Allio et al. |
| 2012/0166270 A1* | 6/2012 | Coppinger ......... G06Q 30/0239 705/14.36 |
| 2012/0203608 A1 | 8/2012 | Lele et al. |
| 2012/0203681 A1 | 8/2012 | Lele et al. |
| 2013/0110612 A1 | 5/2013 | Boyd |
| 2014/0222540 A1 | 8/2014 | Shepard |
| 2015/0262301 A1 | 9/2015 | Lele et al. |
| 2016/0335722 A1 | 11/2016 | Bous |
| 2017/0140411 A1* | 5/2017 | Lele ...................... G06Q 40/04 |

FOREIGN PATENT DOCUMENTS

| | | |
|---|---|---|
| WO | 0106438 A1 | 1/2001 |
| WO | 2012109178 A1 | 8/2012 |
| WO | 2012138413 A2 | 10/2012 |

OTHER PUBLICATIONS

"Driving and creating brand value through brand equity valuation". IEEE. 2013 (Year: 2013).*
"Optimizing marketing planning and budgeting using Markov decision Processes". IEEE. 2007. (Year: 2007).*
ISA Korean Intellectual Property Office, International Search Report and Written Opinion Issued in Application No. PCT/US2018/046373, dated Dec. 3, 2018, WIPO, 11 pages.
ISA Korean Intellectual Property Office, International Search Report and Written Opinion Issued in Application No. PCT/US2018/046347, dated Dec. 7, 2018, WIPO, 13 pages.
"The best bank accounts for switching bonuses," LoveMoney, Available Online https://www.lovemoney.com/bestbuy/50660/the-best-bank-accounts-for-switching-bonuses, at Mar. 25, 2021, 5 pages.

* cited by examiner

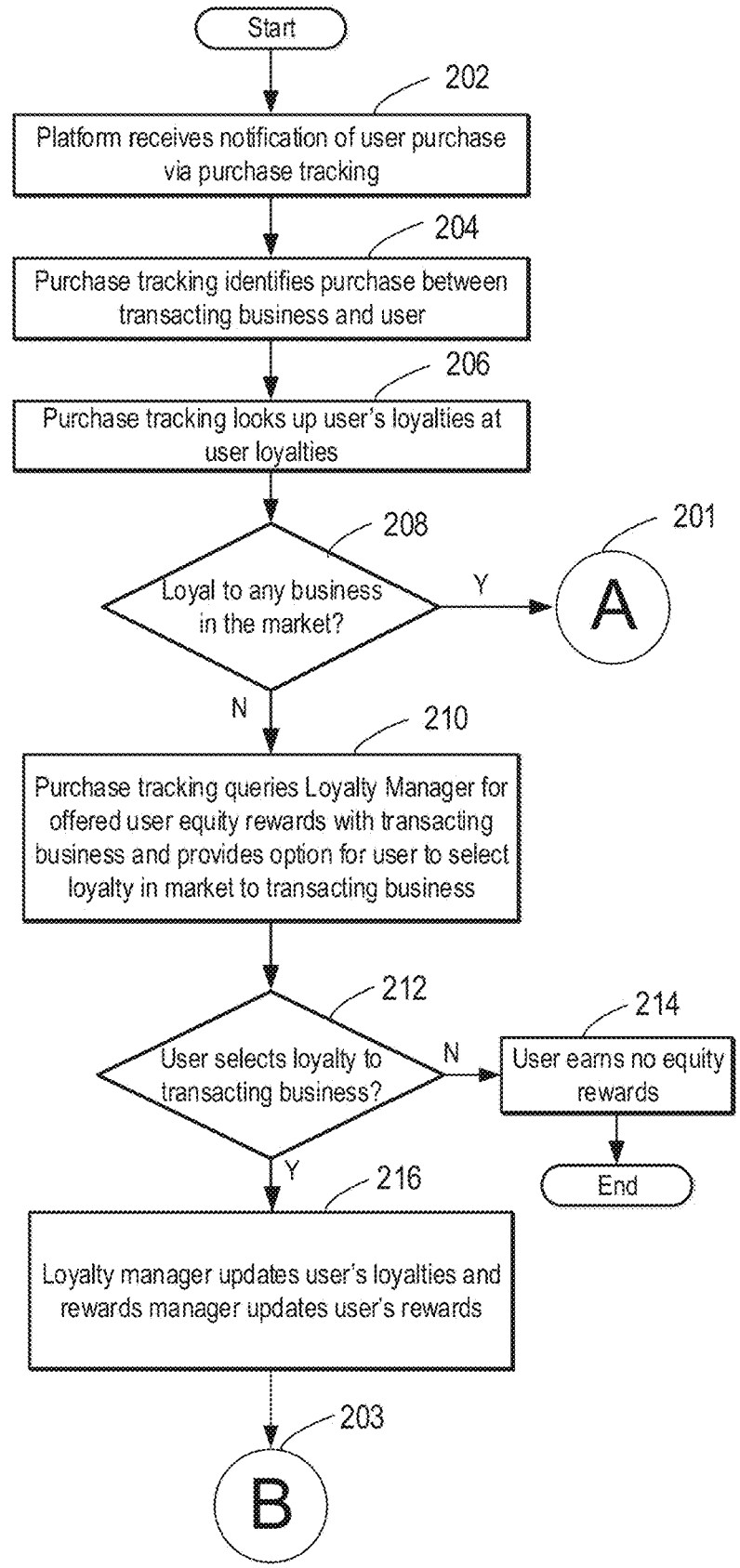

Transactions

6:35 PM

Dec 21, 2016

| +$0.15 | $7.50 Starbucks 606 | SBUX |
| --- | --- | --- |
| | 2% Reward 610 | |

Dec 20, 2016

| +$0.17 | $17.97 Chipotle | CMG |
| --- | --- | --- |
| | 1% Reward | |

Dec 20, 2016

| -$0.22 | -$22.98 Target 616 | TGT |
| --- | --- | --- |
| | 1% Return 620 | |

Dec 19, 2016

| ~~+$0.42~~ | $42.15 Walmart 636 | WMT |
| --- | --- | --- |
| | 1% Offered (Loyal to TGT) 640 | |

Dec 19, 2016

| +$0.02 | Kroger 626 | KR |
| --- | --- | --- |
| | Dividend 630 | |

Dec 17, 2016

| +$1.21 | $121.92 Target | TGT |
| --- | --- | --- |
| | 1% Reward | |

FIG. 6

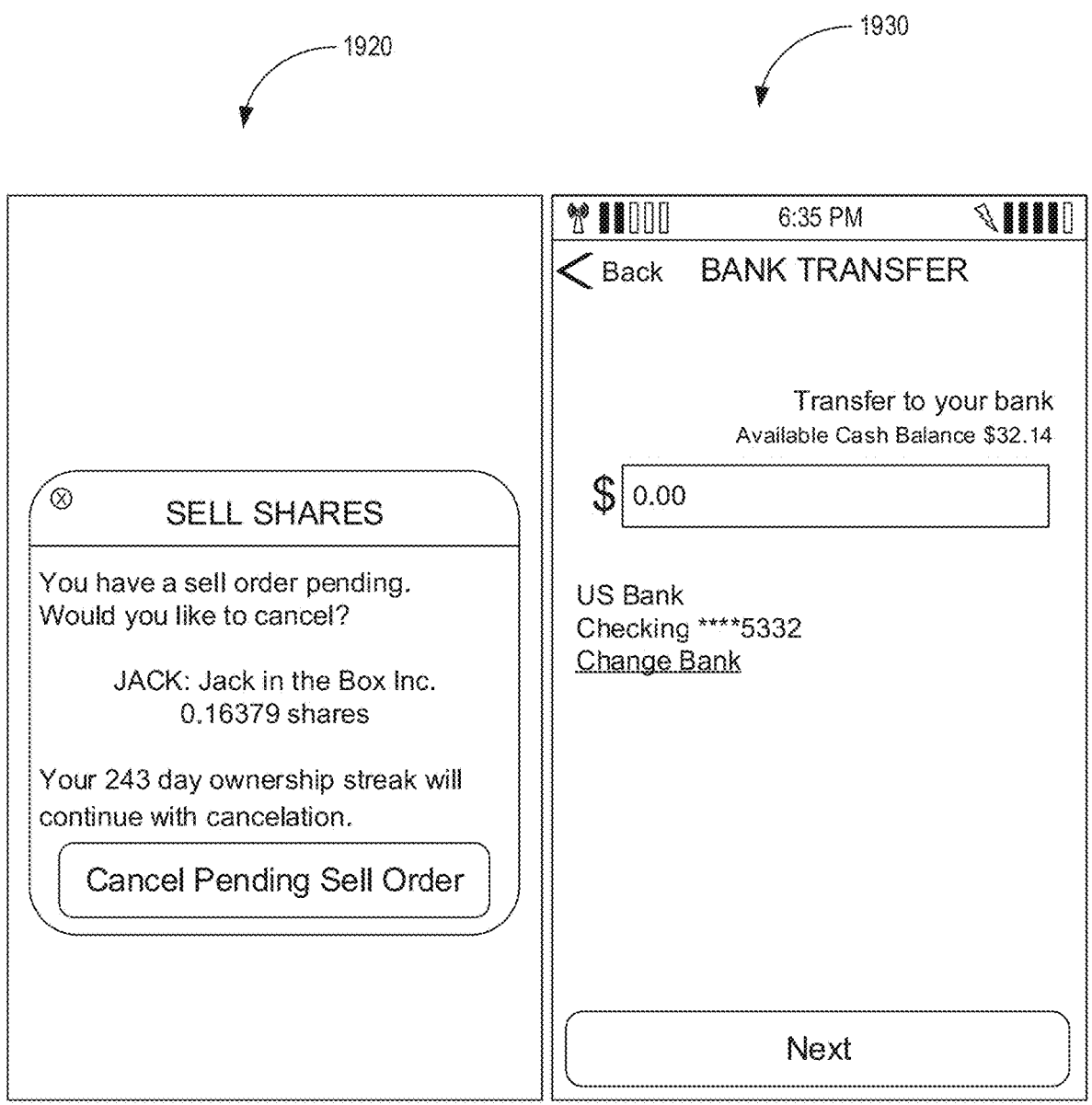

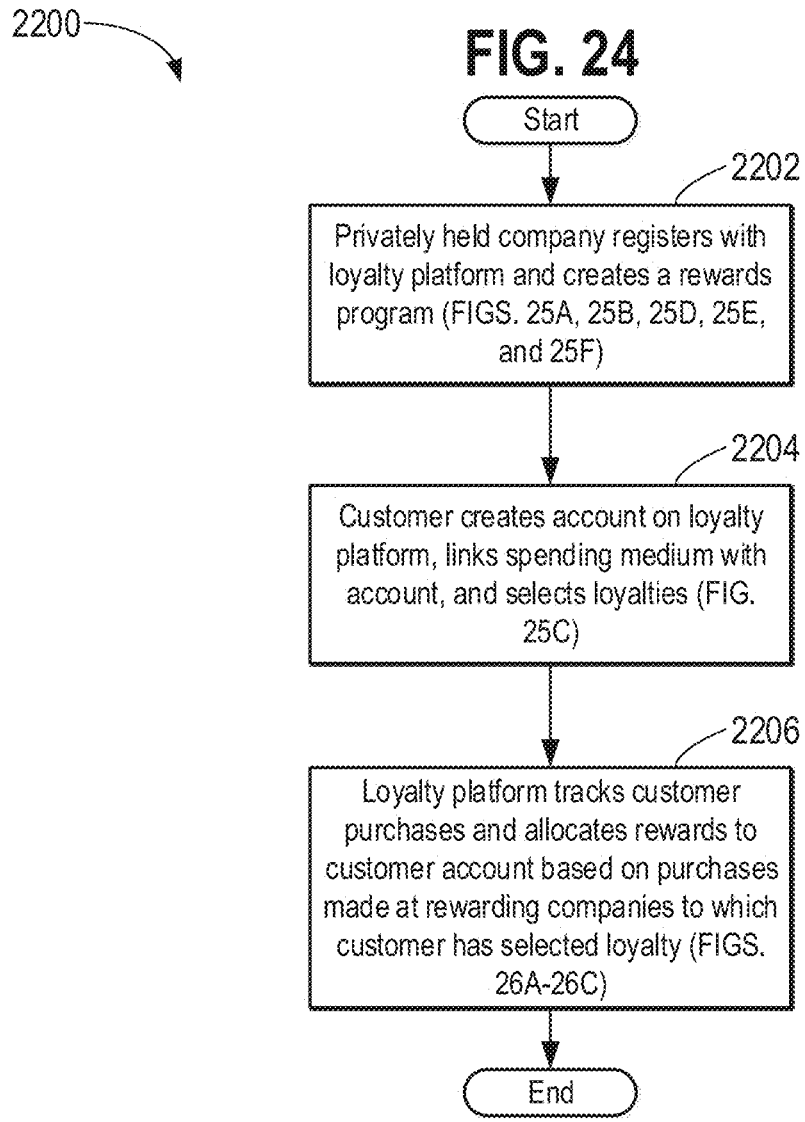

FIG. 26A

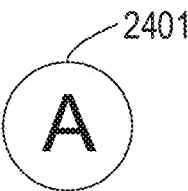

2400A

- Start
- 2402A: Receive notification of transaction via purchase tracking
- 2404A: Identify transaction between transacting merchant and user
- 2406A: Look up user's loyalties at user loyalties
- 2408A: Loyal to any merchant in the market?
  - Y → 2401 (A)
  - N ↓
- 2410A: Query Loyalty Manager for offered user rewards with transacting merchant and provide option for user to select loyalty in market to transaction business
- 2412A: User selects loyalty to transacting merchant?
  - N → 2414A: User earns no rewards → End
  - Y ↓
- 2416A: Update user's loyalties and rewards
- 2403 (B)

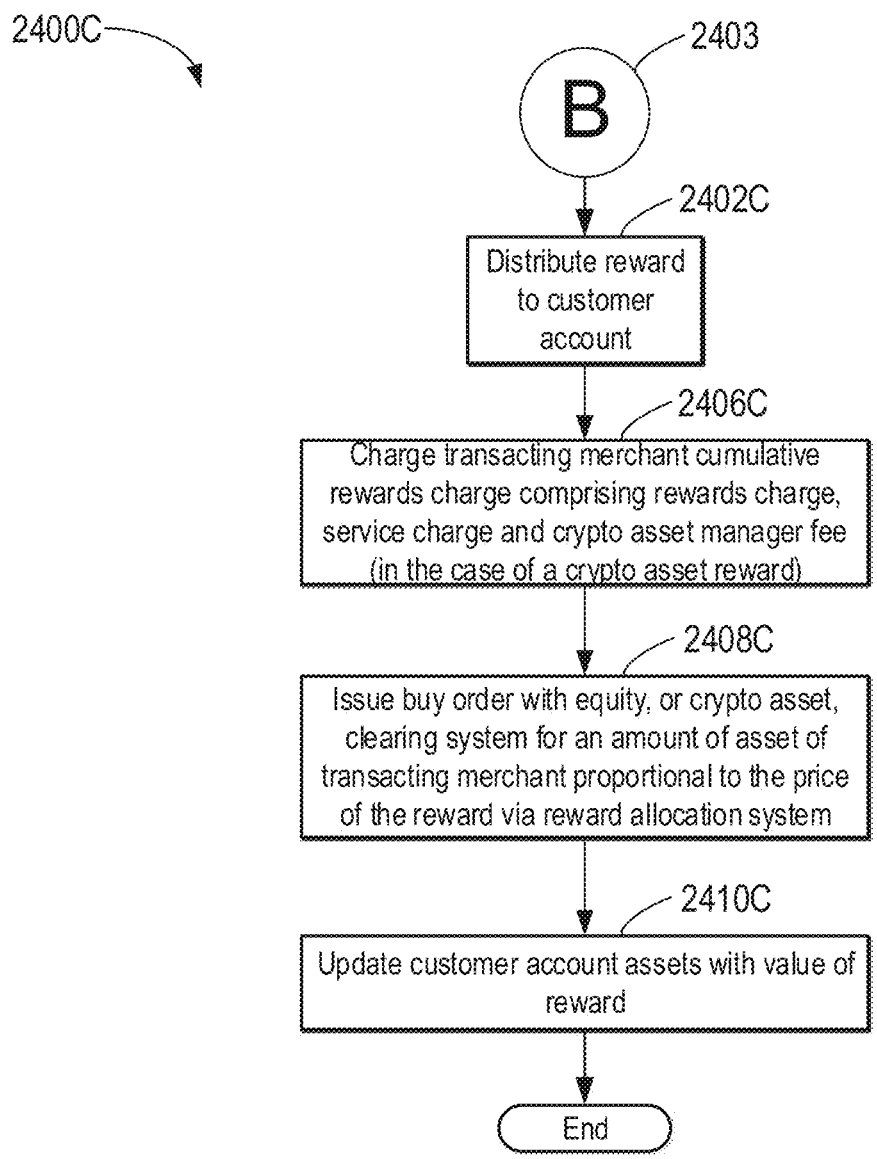

MERCHANT HEADQUARTERS DETAIL

Merchant Name

HQ Street

City                State         Zip

Phone

STORE LOCATION DETAIL

Number of Locations

2017 Revenue

Merchant Category

Merchant Category

Identify Each Location    + Add a location

LOAD VALUE TO ACCOUNT

Loyalty platform will monitor all transaction on the network. When a transaction occurs at one of yoru approved store locations, we will reweard the customer. The rewards platform requires a positive account blance for reward issuance.

| | |
|---|---|
| Account Balance | $0.00 |
| Funding Source | ◯ Debit      ◯ Credit |
| Account Number | [                                    ] |
| Card Name | [                                    ] |
| Expiration | [          ] |

MANAGE REWARDS

Loyalty platform will reward consumers of your locations in the way you direct. Next steps include telling us how much you wish to reward a customer and in what asset.

Reward Type?    ◯ U.S. Securities    ⦿ Crypto Currency

Select your Reward    [ LocalCoin                          ▽ ]

About LocalCoin: This is a coin that can only be rewarded by businesses with 10 or less locations and under $10M in gross revenue. It is a coin that represents local business who take pride in the community that they focus within.
Click here to learn more.

% Reward    [ 4%  ▽ ]

Loyalty platform Fee    .25%
LocalCoin Fee           .25%

What are fees used for?

Loyalty platform fees go to the loyalty platform and/or crypto asset manager to run the rewards program and maintain the crypto asset network and deflation mechanism. LocalCoin fee will be used in its entirety to purchase NYSE:GLD (Gold) as an underlying asset to the LocalCoin Cryptocurrency.

Loyalty platform monitors transactions from customers to automate the process of reward. Typically our systems will be able to identify your locations. However, running a credit or debit transaction at each location and then identifying that transaction on your own credit or debit card will help ensure that rewards are properly granted for all of your locations Payment Card          Visa ...6306

+ Add new card

Location              505 Main St, Fenton, MO 63026

Identify Transaction  $7.07 @ Sisters THG on 08/12/17

Locations             Verified: Bread & Tea Co. – 1384 SW Morrison..

Not Verified: Sisters Tea House – 505 Main St..

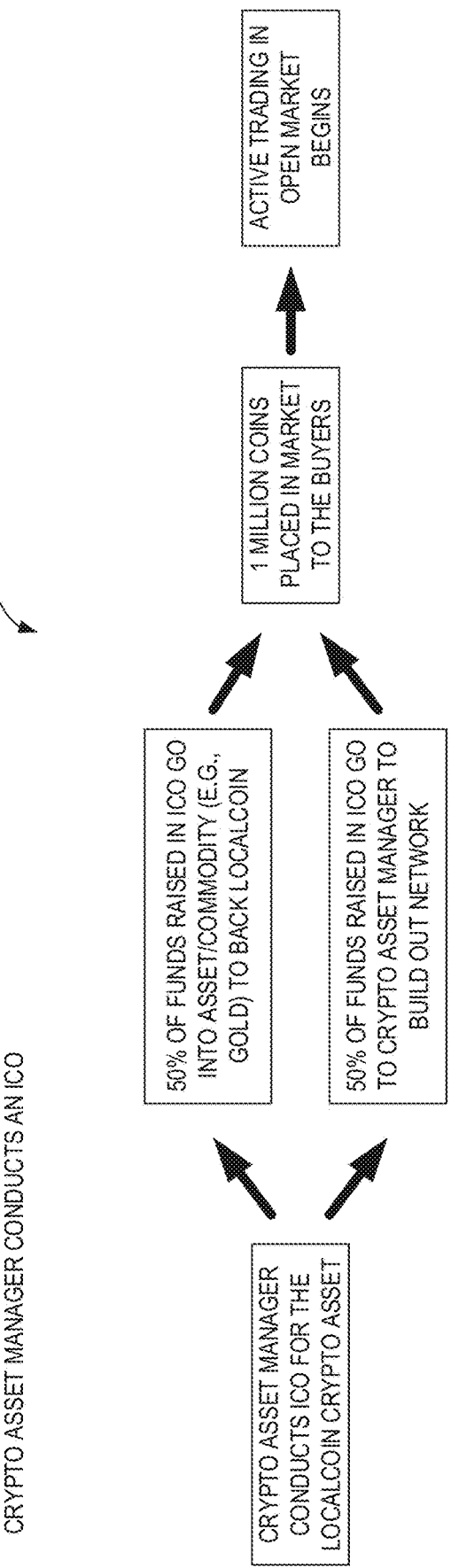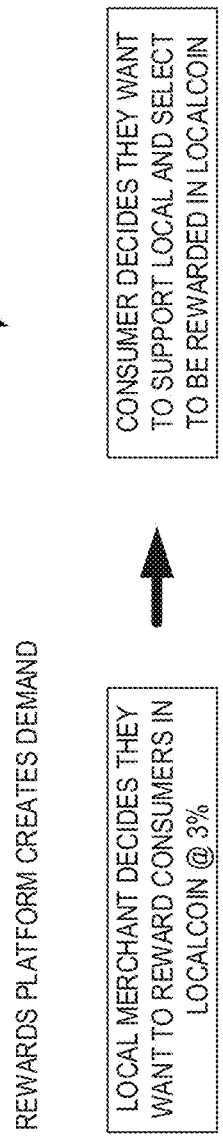
FIG. 31
CRYPTO ASSET MANAGER CONDUCTS AN ICO
FIG. 32
REWARDS PLATFORM CREATES DEMAND

3700

3710

3720

3730

3740

3750

3760

3780

3790

3800

3810

3820

3830

3840

3850

3860

3870

FIG. 58
FIG. 59
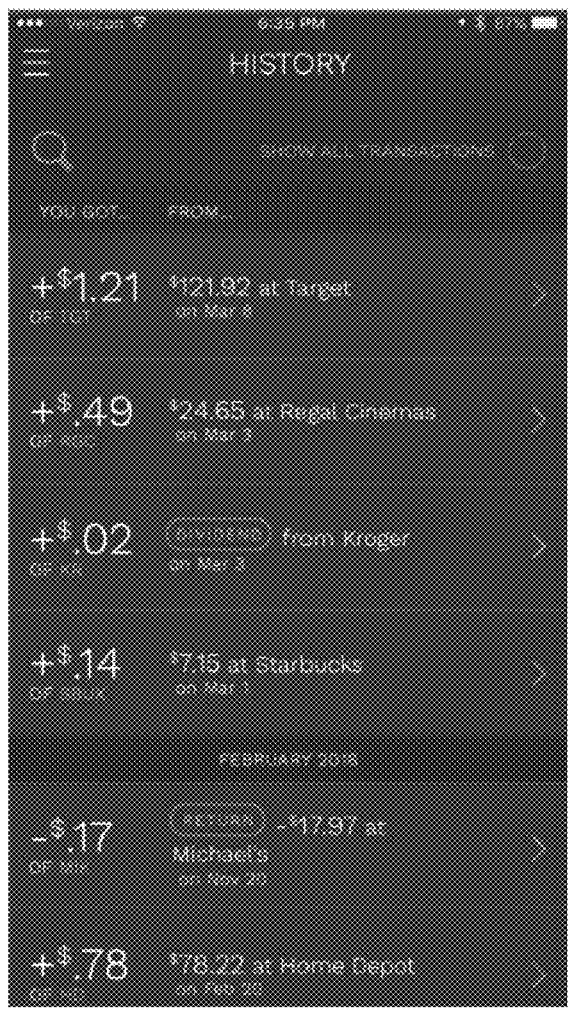
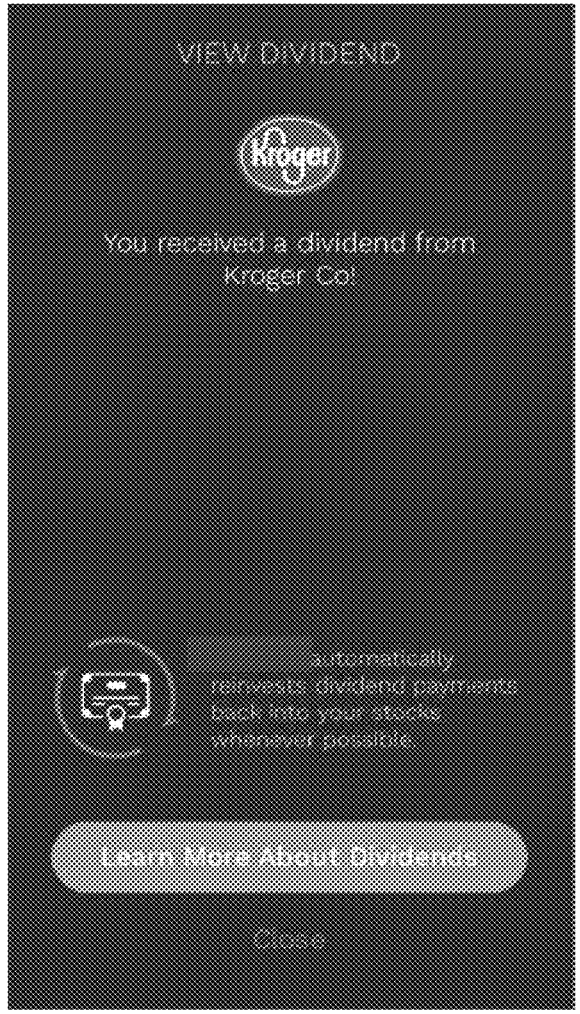
3880
3890

3900

3910

3920

3930

4700

4800

4900

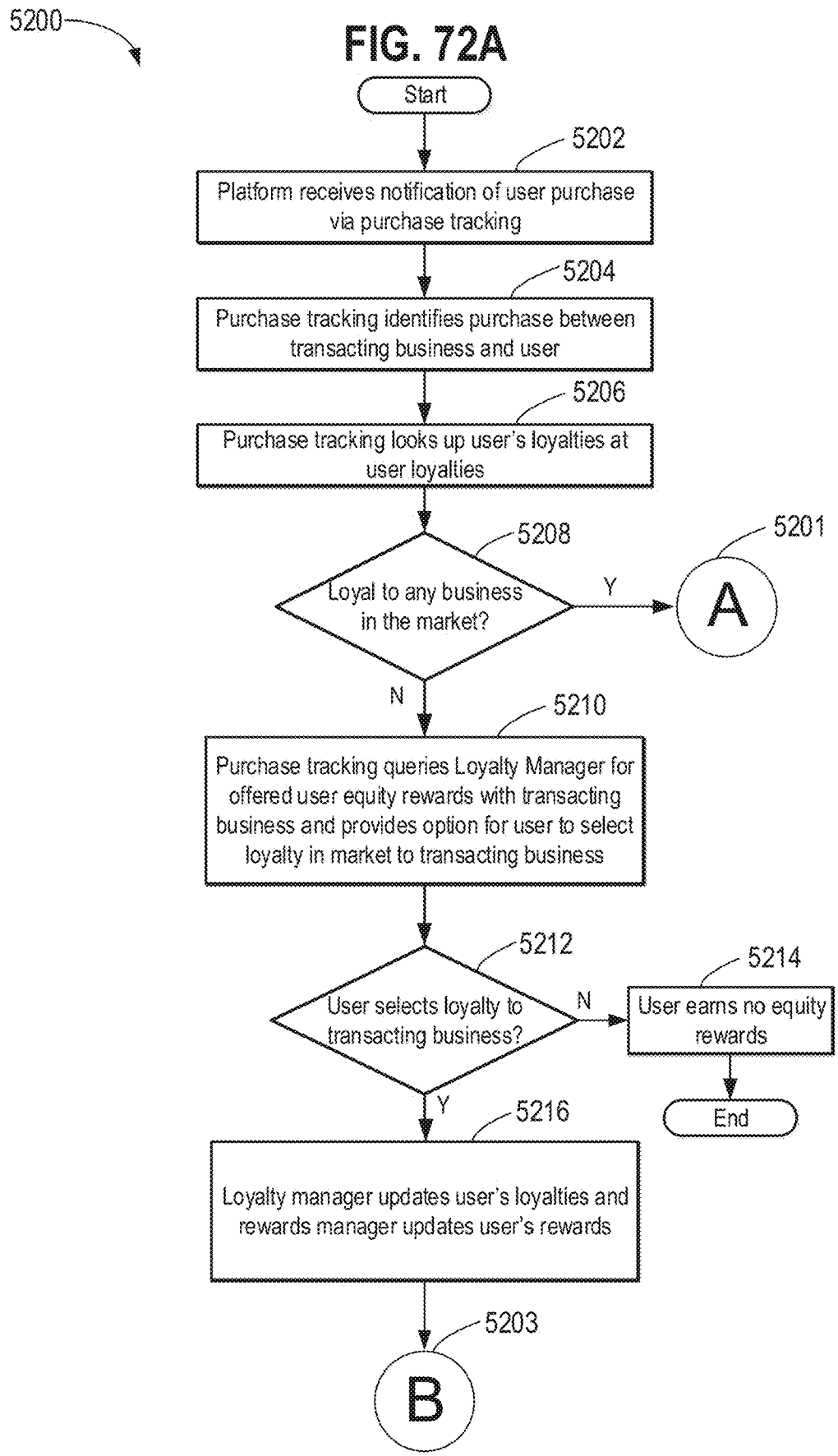

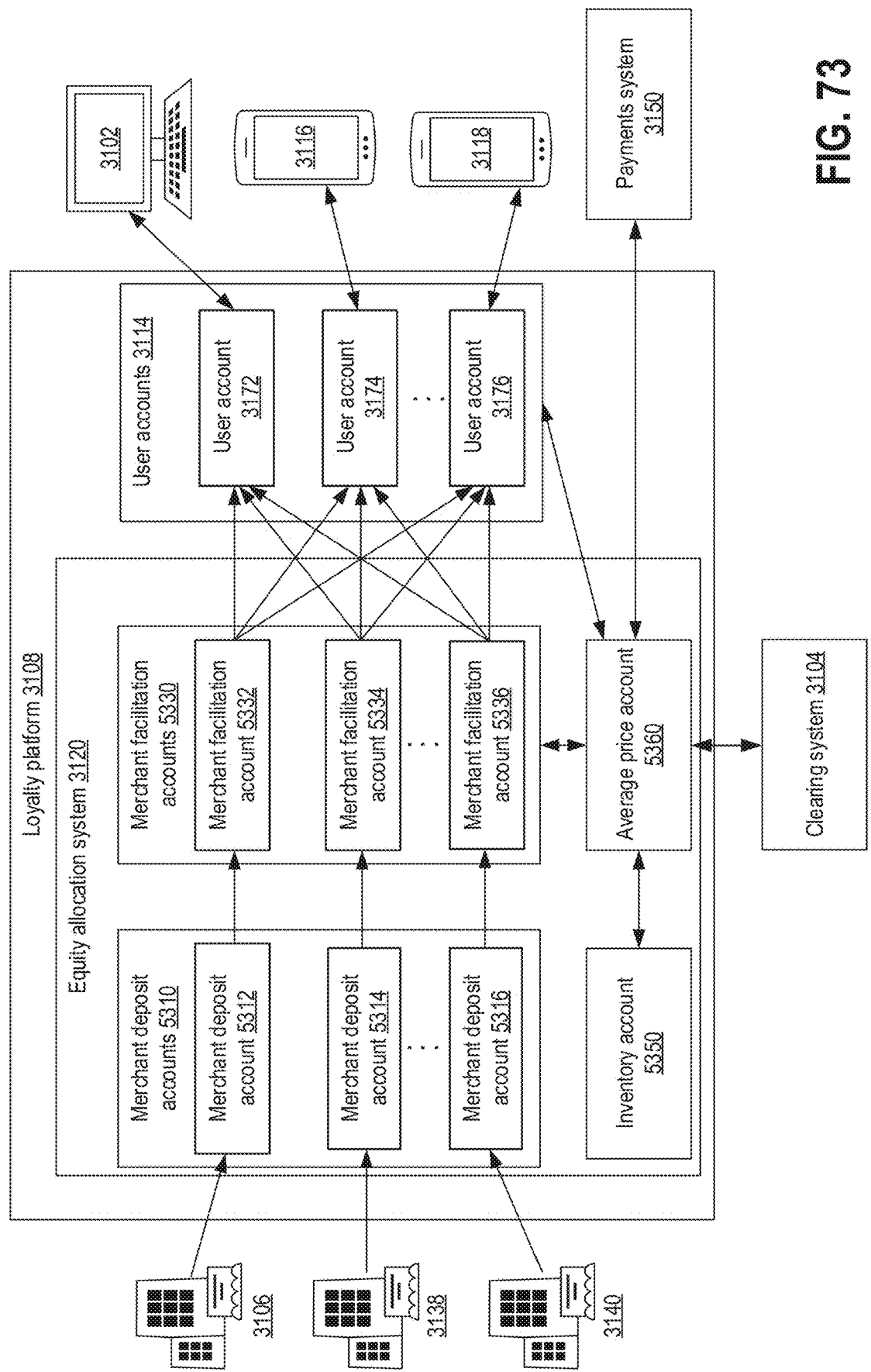

5500a

5500b

DISTRIBUTION OF FRACTIONAL EQUITY REWARDS BASED ON PURCHASE BEHAVIOR

CROSS REFERENCE TO RELATED APPLICATIONS

The present application is a continuation-in-part of U.S. patent application Ser. No. 16/537,476, entitled "DISTRIBUTION OF FRACTIONAL EQUITY REWARDS BASED ON PURCHASE BEHAVIOR," and filed Aug. 9, 2019. U.S. patent application Ser. No. 16/537,476 claims priority to U.S. Provisional Patent Application No. 62/717,736 titled "DISTRIBUTION OF FRACTIONAL EQUITY REWARDS BASED ON PURCHASE BEHAVIOR," and filed on Aug. 10, 2018. The present application is also a continuation-in-part of U.S. patent application Ser. No. 16/101,304, entitled "DETERMINING EQUITY REWARDS BASED UPON PURCHASE BEHAVIOR," and filed Aug. 10, 2018. U.S. patent application Ser. No. 16/101,304 claims priority to U.S. Provisional Patent Application No. 62/543,884, entitled "DETERMINING EQUITY REWARDS BASED UPON PURCHASE BEHAVIOR," and filed on Aug. 10, 2017. The present application is also a continuation-in-part of U.S. patent application Ser. No. 16/101,363, entitled "DISTRIBUTING SUCCESS-LINKED REWARDS TO CUSTOMERS OF PRIVATELY HELD COMPANIES," and filed Aug. 10, 2018. U.S. patent application Ser. No. 16/101,363 claims priority to U.S. Provisional Patent Application No. 62/697,284, entitled "DISTRIBUTING SUCCESS-LINKED REWARDS TO CUSTOMERS OF PRIVATELY HELD COMPANIES," filed on Jul. 12, 2018, and U.S. Provisional Patent Application No. 62/543,884, entitled "DETERMINING EQUITY REWARDS BASED UPON PURCHASE BEHAVIOR", filed on Aug. 10, 2017. The present application is also a continuation-in-part of U.S. patent application Ser. No. 16/537,452, entitled "DISTRIBUTION OF FRACTIONAL EQUITY REWARDS BASED ON PURCHASE BEHAVIOR," and filed Aug. 9, 2019. U.S. patent application Ser. No. 16/537,452, claims priority to U.S. Provisional Patent Application No. 62/717,638, entitled "DISTRIBUTION OF FRACTIONAL EQUITY REWARDS BASED ON PURCHASE BEHAVIOR," filed on Aug. 10, 2018. The present application is also a continuation-in-part of U.S. patent application Ser. No. 16/537,472, entitled "DETERMINING PRE-SELECTIONS FOR ENROLLING IN EQUITY REWARDS BASED ON PURCHASE BEHAVIOR," and filed Aug. 9, 2019. U.S. patent application Ser. No. 16/537,472 claims priority to U.S. Provisional Patent Application No. 62/717,741, entitled "DETERMINING PRE-SELECTIONS FOR ENROLLING IN EQUITY REWARDS BASED ON PURCHASE BEHAVIOR," filed on Aug. 10, 2018. The present application is also a continuation-in-part of U.S. patent application Ser. No. 16/537,470, entitled "ONE TOUCH UPDATE TO EQUITY REWARDS," and filed Aug. 9, 2019. U.S. patent application Ser. No. 16/537,470 claims priority to U.S. Provisional Patent Application No. 62/717,743 titled "ONE TOUCH UPDATE TO EQUITY REWARDS," and filed on Aug. 10, 2018. The entire contents of each of the above-referenced applications are hereby incorporated by reference for all purposes.

FIELD

The present application relates to methods and systems for automatically identifying businesses in aggregated data and providing equity rewards to a user based upon the identified businesses.

BACKGROUND AND SUMMARY

Many different reward programs have been implemented over time in order to incentivize user loyalty to a particular brand or business. Simple programs such as a "buy 10, get one free" punch card at a local coffee shop or delicatessen are time-tested methods used to promote and reward user loyalty. Cash rewards, as well, have been used in the form of mail-in rebates, providing monetary incentives for users considering the purchase of larger, more expensive items such as appliances or motor vehicles. More recently, gift certificates and cash rewards are known conventional reward programs offered to promote loyalty to a particular credit card. Furthermore, mileage programs have long been a reward program offered to instill loyalty to particular airlines, or alternatively, a credit card promoted by an airline Conventional reward programs, such as those described above, suffer because they fail to build user loyalty with a particular company in the long term. One reason for this failure is that one-time rewards, like a rebate, or a physical prize awarded after redeeming a certain number of accumulated points, do little to align the interests of the user with the interests of the rewarding company beyond a certain limited time frame. Another factor limiting the success of conventional reward programs to generate user loyalty is the effort required on the part of the user to record and/or submit proof of purchases which may be eligible for a reward, such as when a user is required to enter a code or other proof of purchase into an online account in order to receive credit/points for the purchase, or when a proof of purchase must be mailed-in in order to receive a rebate. Additionally, in points based rewards programs, points accrued often come with an expiration date or date when the points must be redeemed by, thereby placing an additional burden on the user to hurriedly redeem their points, further exacerbating the inability of such programs to maintain user loyalty over the long term. Points frequently have no real value outside the scope of a rewards program, and as such, mean little to customers in the grand scheme of their financial picture. Furthermore, rewards programs often have unrealistic goals requiring many dollars spent and points earned in order to earn a small reward.

As further issues, conventional rewards programs are administered by individual businesses, which each have their own policies and mechanisms for rewarding customers. Such siloed approaches result in confusion among customers, do not foster business loyalty, and are wasteful and expensive to administer since each individual business must monitor transactions, store customer accounts, and the like.

The inventors herein have developed systems and methods to at least partially address the above issues associated with reward programs. In one example, a method includes aggregating, with an equity allocation system of a loyalty platform comprising one or more computing systems, a plurality of dollar reward amounts, wherein the plurality of dollar reward amounts are based on a plurality of tracked user loyalty purchases tracked automatically by the loyalty platform, and wherein the equity allocation system comprises instructions executable by one or more processors to direct an inventory account to aggregate the plurality of dollar reward amounts; displaying, via the loyalty platform, an equity reward status to one or more user computing devices associated with one or more of the plurality of tracked user loyalty purchases; executing, with the equity allocation system, a whole share purchase based on the aggregated dollar reward amounts exceeding a pending reward threshold, wherein the equity allocation system directs an average price account to perform the whole share purchase from a clearing house; automatically adding, with the equity allocation system, a number of whole shares purchased in the whole share purchase to the inventory account to form a pre purchased supply of shares of stock, wherein the equity allocation system directs the average price account to transfer to the number of whole shares to the inventory account; determining, with the equity allocation system, a plurality of fractional share amounts based on an execution price of the whole share purchase and the plurality of dollar reward amounts; automatically distributing, with the equity allocation system, the plurality of fractional share amounts to a plurality of user accounts from the pre-purchased supply of shares of stock in the inventory account, wherein the equity allocation system directs the inventory account to transfer each fractional share amount of the plurality of fractional share amounts to a corresponding user account of the plurality of user accounts; responsive to distributing the plurality of fractional share amounts, automatically displaying, via the loyalty platform, an updated equity reward status via the one or more user computing devices; and dynamically adjusting, automatically with the equity allocation system and in real time, the pre-purchased supply of shares of stock to maintain the pre-purchased supply between an upper supply threshold and a lower supply threshold that are each dynamically adjusted based at least on a running average rate of fractional equity reward distribution, where the plurality of tracked user loyalty purchases are tracked automatically by the loyalty platform based on output from a transaction model.

In another example, a computing system, includes a processor and a memory storing instructions executable by the processor to: receive, from a third-party aggregator, a transaction history for one or more financial accounts associated with a user; automatically determine a set of businesses associated with transactions in the transaction history; generate an equity rewards list including at least a first business selected from the set of businesses, the first business included in a first market of a rewarding-business index stored in the memory; display, via a display operably coupled to the computing system, the equity rewards list; responsive to receiving an indication the user has confirmed the equity rewards list, update a profile of the user stored in the memory to enroll the user in a first rewards program for the first business; automatically award the user with an equity reward in response to identifying that a subsequent first user purchase at the first business has occurred; automatically determine that a second user purchase at a second business has occurred, the second business included in the first market, and in response displaying, via the display, a loyalty-switch offer including an option for the user to switch loyalty from the first business to the second business; responsive to the user accepting the loyalty-switch offer, update the profile of the user to remove the user from the first rewards program and enroll the user in a second rewards program for the second business; present an interface element via a user interface on the display, the interface element being selectable to request a rebalancing of equity in a loyalty rewards platform account of the user; and responsive to receiving user input selecting the interface element, automatically perform the rebalancing of equity to move equity in the first business to the second business.

In this way, by providing equity rewards associated with a business to which the user has chosen loyalty, based on purchases made by the user at the business, wherein the equity rewards associated with the business may increase in value over time based on performance of the business, user loyalty to the business may be generated to a greater extent, and maintained over longer durations, than in conventional reward programs. Further, the systems and methods herein disclosed may enable reduced effort on the part of the user to participate in, and benefit from, loyalty reward programs offered by preferred brands/businesses. In one example, by automatically monitoring financial transactions of the user conducted with payment media linked to an account of the user on the loyalty platform, details of the financial transaction being compared to a rewarding-business index (a list of all business actively participating in the equity loyalty platform including information associated with each business), the user may receive equity rewards for financial transactions without the need for the user to determine if each financial transaction is eligible for a reward, mail in a receipt or otherwise prove the purchase, or create a new account for each rewarding company.

Further, the examples disclosed herein may allow for a single platform (referred to as a loyalty platform) to administer rewards on behalf of multiple businesses in an efficient manner by automatically generating equity rewards lists for users to efficiently select businesses to enroll in their loyalty/rewards programs, automatically identifying qualifying transactions between enrolled users and selected businesses (e.g., from bulk transaction data provided by third-party aggregators), awarding users when qualifying transactions are identified, providing loyalty-switch offers when a transaction between a user and a non-selected business is identified, and automatically rebalancing equity when a loyalty-switch offer is accepted.

The above summary is provided to introduce a selection of concepts in a simplified form that are further described below in the Detailed Description. This summary is not intended to identify key features or essential features of the subject matter, nor is it intended to be used to limit the scope of the subject matter. Furthermore, the subject matter is not limited to implementations that solve any or all of the disadvantages noted above or in any part of this disclosure.

BRIEF DESCRIPTION OF THE DRAWINGS

FIGS. 2A, 2B, and 2C show a flowchart representing an example transaction process.

FIGS. 5-10 show example graphical user interfaces of the loyalty platform.

FIGS. 17-21 show an example equity sell process of a loyalty platform.

FIG. 22 shows an example graphical user interface for requesting a bank transfer of electronic funds.

FIG. 24 shows a flowchart of an example method for fostering increased user loyalty by enabling a privately held company to partner with a loyalty platform to reward users with an asset tied to the value of the privately held company.

FIGS. 26A, 26B, and 26C show flowcharts of example methods for tracking and rewarding purchases made by users registered with a loyalty platform.

FIGS. 27-30 show example graphical user interfaces of the loyalty platform.

FIGS. 31-33 show diagrams illustrating an example process for increasing user demand and loyalty by creating a crypto asset for use in a rewards program.

FIGS. 58-63 show example graphical user interfaces for displaying a user's transaction history.

FIGS. 72A, 72B, and 72C show a flowchart representing an example transaction process.

FIG. 73 shows an example equity allocation system of the loyalty platform.

DETAILED DESCRIPTION

Figure 1A:
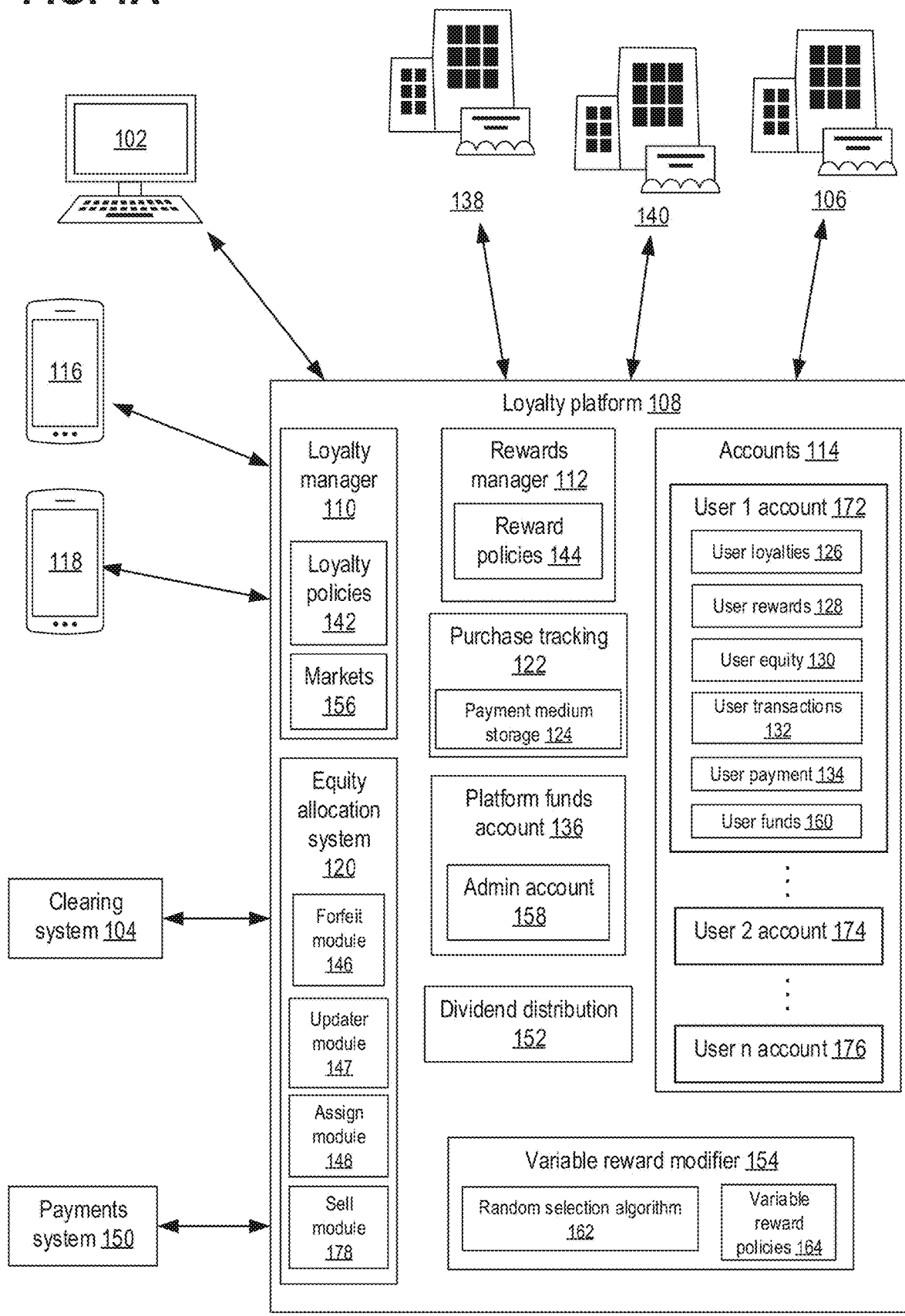
FIG. 1A shows an example of a loyalty platform.

The following description relates to systems and methods for a user loyalty and rewards platform providing rewards of equity to users based on purchasing habits.

The proposed system herein is a new kind of shopping experience where traditional factors that drive purchasing decisions such as price, quality, and trust, further include equity or stock participation in a business which may be given to a user who has selected an exclusionary loyalty policy with the business and thus receives rewards from the selected business for purchases made in a market, and may not receive rewards from competing businesses in the same market. By the same token, the business may also be able to develop a more detailed understanding about the relationship that the business has with its users.

The embodiments disclosed herein may greatly benefit companies in generating user loyalty. The system described herein provides a platform where users select loyalties in a given market, and based upon the user's selected loyalty to a brand or merchant within a given market, the platform allocates to the customer a reward which may comprise equity of the selected brand when the user executes purchases or transactions with that brand. As an example, a user may register a payment medium (in one example, a credit card) with the platform of the present application and when a purchase is made using that payment medium, the platform receives information pertaining to that purchase (via tracking of the payment medium), associates the purchase with a user account on the loyalty platform, and compares a description of the transacting business included in the purchase information with a digital record of businesses registered with the platform (the rewarding-business index), to match the transacting business with a business registered with the loyalty platform. If the transacting business matches with a business registered with the loyalty platform, and that business is actively providing rewards to loyalty customers through the loyalty platform, the platform then looks up a user's loyalty selections to check if the user has selected loyalty to the transacting business. The user may select loyalty to only one business within a market. If the user has selected loyalty to the transacting business within a market, the platform charges the business a cumulative percentage of the transaction amount comprising at least an equity percentage and a service percentage, and then purchases equity of the transacting business of an amount equal to the value of the equity percentage and distributes this to an account of the user on the loyalty platform.

In one example, the loyalty platform described herein may include a loyalty platform configured to communicate with user computing devices (in some examples, smart phones, laptops, desktop computers via which users may enter information that is sent to the loyalty platform), business devices (in one example, point of sales devices), an equity clearing system, and a payments system. The loyalty platform may establish loyalty policies with various businesses across multiple markets. The loyalty policies may include an indication of the types of rewards offered for user purchases. The loyalty platform may store user accounts that include user loyalty selections, payment medium information, and other information associated with each user. The loyalty platform may track user purchases made at various businesses stored in a rewarding-business index (in one example, by tracking credit or debit card purchases and/or by receiving purchase details from business point of sale devices), and via the user account information, determine if user purchases have occurred with a business to which the user has made a loyalty selection. If a user purchase has been made at a business to which the user has selected loyalty, the platform may determine, via the loyalty policy for that business (herein also referred to as business loyalty policies), a reward for the user for the purchase. In some examples, the reward may include stock or other equity in the business. If the reward is an equity reward, the platform may communicate with an equity clearing system to purchase stock in the business and then assign the amount of stock (which may be a fractional share) to the user. Via the payments system, the platform may collect a payment equal to or greater in value than the reward from the business, and the payment may be used to purchase the equity reward for the user.

In one example, the loyalty platform negotiates a reward discount with a given business, such as a coffee company, for all sales stemming from the loyalty platform. For example, the reward discount may be 1% of the transaction amount. The loyalty platform may charge the business a surcharge of the reward discount, such as 0.25%. Via the loyalty platform in communication with a user computing device, the platform may offer the reward discount to the user. If the user makes a purchase at the business, the loyalty platform may be informed of the transaction through a payments system that tracks transactions (in some examples, via debit or credit card, virtual wallets, etc.), directly from the business, or from the user conducting the transaction via the loyalty platform. The loyalty platform may then charge the business 1.25% of the transaction amount, via the payments system. The loyalty platform then purchases equity in the coffee company via the equity clearing system at a value of 1% of the transaction amount and assigns a fractional share to an account of the user on the loyalty platform (keeping the 0.25% of the charge for the loyalty platform).

In one example, to encourage business loyalty, a user may only be allowed to make a loyalty selection to one business or brand in given market (wherein, in one example, a market is a grouping of businesses or brands as defined by the loyalty platform providing similar products/services, and as such, businesses in a market as defined herein may compete for user loyalty). Then, if the user makes a transaction with another business or brand in the same market, the user is not offered a reward for that transaction and/or may be penalized by being given reduced rewards in the future for the business to which the user has made a loyalty selection. In one example, the user may be prompted to make a loyalty selection to a business, based on a position of the user being within a threshold distance of the business, wherein the threshold distance may be a pre-determined threshold, such as 1 mile, or wherein the threshold may be based on an estimated travel time of the user to the business, such as 5 minutes. In some examples, the user may be presented offers to switch loyalties from one business to another, herein referred to as loyalty-switch offers. Further, rewards offered to the user may change over time to encourage loyalty selection and/or encourage long-term loyalty to a business.

In an example illustrating one way loyalty selections and markets may function, a user may make a loyalty selection to a first business or brand included in a first market of the loyalty platform and not included in a second market of the loyalty platform, where the loyalty selection to the first business excludes the user from receiving equity rewards from a second business included in the first market of the loyalty platform, and wherein the loyalty selection does not exclude the user from receiving equity rewards from a third business, wherein the third business is included in the second market of the loyalty platform and not included in the first market of the loyalty platform. As the previous example illustrates, loyalty selections may be exclusionary, and may, in some cases, preclude the user from receiving equity rewards via the loyalty platform from businesses/brands competing with a business/brand to which the user has an active loyalty selection, however, this may not preclude the user from making an additional loyalty selection to a non-competing business (that is, a business/brand that is not included in the same market as defined by the loyalty platform). In another example, in cases where a single brand/business is listed in multiple markets of the loyalty platform, loyalty selections may be made to that business/brand in each of the markets in which it is listed, or alternatively, the user may make a loyalty selection to the business/brand in a first market in which the business/brand is included, but may make a loyalty selection to a competing business/brand in a second market in which the business/brand is listed. As a more specific example, a business such a Walmart may be listed in multiple markets of the loyalty platform, such as in both a "Groceries" market, as well as in an "Apparel" market, and as such a user may make a first loyalty selection to Walmart in the "Groceries" market and a second loyalty selection to Walmart in the "Apparel" market, or alternatively, the user may make a loyalty selection to Walmart in one of the two markets but not the second, or in neither of the two markets.

Businesses such as apparel retail companies may reward a user for a transaction, wherein an item was purchased, only to have the user return the item for a refund at a later date.

In one example, to avoid the business granting rewards for transactions that are ultimately voided, the platform may be configured to be notified of the return and the platform may then sell or otherwise remove the reward from the user's account (reverse journal the stock transaction rewarded). In such examples, the user may still be entitled to any gains in value made to the reward since the original transaction. Conversely, the user may then be subject to losses if the reward were to lose value since the original transaction.

The fractional shares assigned to the account of the user, loyalty selections made by the user, special offers, loyalty switches, and any other account information may be presented to the user to allow the user to control loyalty selections, loyalty switches, and other actions. The user may be allowed to sell his or her fractional shares, or transfer earned rewards from one business to another if loyalty policies allow. Such an arrangement may encourage long term participation in the loyalty platform by giving the user flexibility in the loyalty process should the user move, change purchasing needs (in one example, after having a child, a user may choose to shop at different businesses than before having a child), or otherwise desire to switch business loyalty.

FIG. 1A schematically shows an example loyalty platform 108. Loyalty platform 108 may be implemented by one or more computing systems. In one example, loyalty platform 108 may be implemented by a server. In another example, loyalty platform 108 may be implemented by a plurality of computing systems working in concert, such as through a network connection, wherein each of the plurality of computing systems may implement part of the loyalty platform 108. Loyalty platform 108 may be configured to electronically communicate with external computing systems, such as user computing systems 102, 116, and 118, businesses 106, 138, and 140, clearing system 104, and payments system 150.

User computing devices 102, 116, 118, which may interface with loyalty platform 108 via a network connection, may each be associated with at least one user, and further associated with at least one user account stored in non-transitory memory of one or more a computing systems implementing loyalty platform 108. As an example, use of the term "user" or "prospective user" or may refer to any legal entity, whether individual or corporate. Each user computing device may be associated with a user, and thus enable the user to communicate with loyalty platform 108. In one example, user computing devices 102, 116, 118, may be associated with user accounts 172, 174, 176 and may be any associated corporation or associated individual. Users associated with user computing devices 102, 116, and 118 may register with loyalty platform 108 and make user purchases at a plurality of businesses 138, 140, 106. Based upon user loyalty selections (selecting one business of the plurality of businesses 138, 140, 106 in a given market) the user may be entitled to a reward upon executing a user purchase with the selected business. In one example, upon allocation of the reward to a user account on the loyalty platform, the loyalty platform may transmit data via network connection to the user computing device to display the amount of the equity reward to the user by rendering the amount of the equity reward in a user interface of a user computing device.

User computing devices 102, 116, 118, may each include a processor, memory, communication interface, display, user input devices, GPS/position sensors and/or other components. In one example, a location of user computing device 116 may be ascertained via a GPS system associated therewith. In one example, information from loyalty platform 108 may be transmitted to user computing device 118 via a network connection (such as the Internet) between user computing device 118 and loyalty platform 108, for rendering within an interface or display implemented at user computing device 116. The display may be used to present a visual representation of the loyalty platform 108. This visual representation may take the form of a graphical user interface (GUI). The communication interface may be configured to communicatively couple the loyalty platform 108 with one or more other computing devices, such as the payments system 150, clearing system 104, user computing devices, and/or business computing devices. The communication interface may include wired and/or wireless communication devices compatible with one or more different communication protocols. As non-limiting examples, the communication interface may be configured for communication via a wireless telephone network, or a wired or wireless local- or wide-area network. User input device(s) may comprise one or more user-input devices such as a keyboard, mouse, touch screen, or game controller.

Clearing system 104 may comprise one or more computing devices each including a processor, memory, communication interface, and/or other components. The memory of the computing device(s) of clearing system 104 includes instructions or rules for managing a clearing house for assignment of public shares. As a further example, clearing system 104 may comprise a clearing house for assignment of non-public shares. Clearing system 104 may communicate with equity allocation system 120 of loyalty platform 108 in order to execute transactions such as the buying or selling of shares via the assign module 148 of the equity allocation system 120.

Payments system 150 may comprise one or more computing devices each including a processor, memory, communication interface, and/or other components. The memory of the computing device(s) of payments system 150 includes including instructions or rules for disbursing and/or receiving payments via one or more banks, bank accounts, credit card accounts, checking accounts, online payments systems, or virtual wallets. In some examples, payments system 150 may include discrete accounts, each of which may be associated with a user account 172, 174, 176 of accounts 114 on the loyalty platform 108.

Businesses 138, 140, 106 may be any merchant, business place, brand, or entrepreneur or entrepreneurial entity associated with loyalty platform 108. As an example, use of the term "business" or "merchant" or "brand" may contemplate any stock corporation, whether private or public. Each business may communicate with loyalty platform 108, for example, via a business computing device. Each user computing device may include a processor, memory storing instructions executable by the processor, display, user input devices, and a communication interface.

Figure 1B:
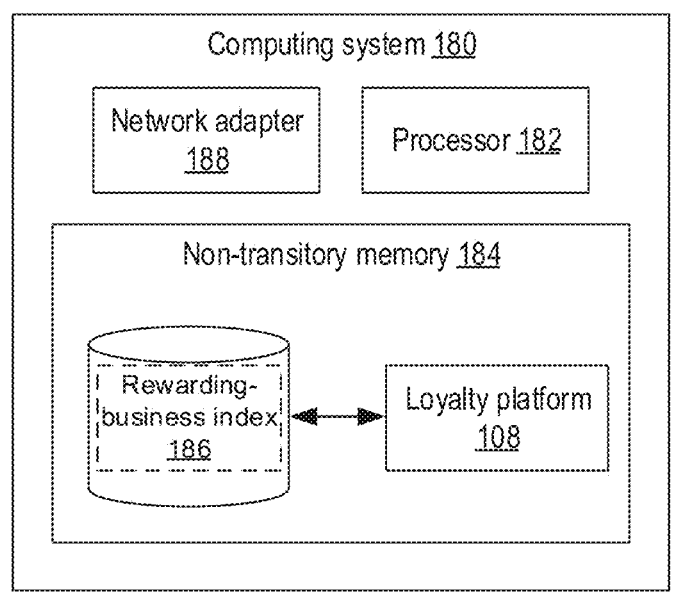
FIG. 1B shows an example of a computing system implementing the loyalty platform.

Any of the computing devices, modules, or elements described herein with reference to FIG. 1A and FIG. 1B may communicate with each other via a network. For example, loyalty platform 108 may communicate with clearing system 104 and payments system 150 via a network Loyalty platform 108 may include a plurality of modules including a loyalty manager 110, rewards manager 112, accounts 114, equity allocation system 120, purchase tracking 122, platform account 136, dividend distribution 152, and variable reward modifier 154. As illustrated in exemplary FIG. 1A, the various modules of the loyalty platform 108 may include instructions stored in non-transitory memory 184 that are executable by processor 182 of computing system 180. In other examples, the modules may be stored on multiple memories and/or executed by multiple processors distributed across multiple computing devices.

Loyalty manager 110 administers loyalty policies 142 and updates user loyalties 126 of accounts 114 with updated loyalty policies relating to businesses to which a user may select loyalty. Loyalty manager 110 includes loyalty policies 142 and markets 156. Markets 156 may be a database or module which may further represent suitable information regarding categorization of businesses affiliated with loyalty platform 108 into discrete markets or business segments wherein the businesses segmented into different markets compete in some way or offer similar products and/or services. Loyalty manager 110 may represent suitable information regarding loyalty selections of the loyalty platform 108. As a non-limiting example, loyalty manager 110 may include market definitions for a market such as "Groceries (National)." In some examples, businesses not affiliated and/or businesses pending affiliation or partnership with the platform may be listed in the markets database. In an example, businesses listed in the markets database may have different statuses such as "non-partner" (if not partnered with the platform), "partner" (if partnered with the platform), and "pending partner" (if partnership with the platform is pending). Business statuses in the markets 156 may be useful as they may allow users to be made aware of businesses which may or may not become platform partners over time, which may factor into a user's decision to select loyalty to a particular business in a market. In one example, a "Groceries (National)" market might include large, nationwide grocery chains, not limited to, for example, COSTCO, ALBERTSON'S, DOLLAR GENERAL, KROGER. In an example, a market may have any number of businesses included in the market, and there may be any number of markets included in markets 156. In an example, market definitions may be defined by administrators of the platform account 136.

Additionally, loyalty manager 110 may include loyalty policies 142 which may further include instructions or information relating to managing loyalties across markets 156 of loyalty platform 108. Separating businesses into individual markets is not so simple, as many business and/or merchants exist not only in one market, but are diversified and compete in many different markets. For example, a massive big-box store, such as WALMART sells not only groceries, but also home goods such as electronics, prescription medications, and clothing. As such, loyalty manager 110 may further include loyalty policies 142 that limit the loyalty selections for a user across different markets, so that a user may only select loyalty to a particular business across different markets (of markets 156) a particular number of times. In an example, a user may be allowed to select loyalty to only one business for a single market. In another example, a user may be allowed to select a first loyalty to a business in a first market and to select a second loyalty to the business in a second market. In a further example, a user may be allowed to select loyalty to a business as many times as allowed by loyalty policies 142 across different markets, if the business is "multi-listed" or offered as a loyalty selection across different markets. In a further example, a user may be allowed to select loyalty to one or more businesses listed within a market.

Rewards manager 112 may be a module or database and may include reward policies 144 which may further include instructions or information comprising rules for providing equity rewards based upon a user's selected loyalty to a transacting business (business with which transaction occurs). Additionally, reward policies 144, in an example, may include specific rule sets regarding equity rewards for a user executing purchases at or with a particular business (herein referred to as business reward policies) to which the user has selected loyalty via the loyalty platform. As an example, and further illustrated in FIG. 3, a user's long-term loyalty may be rewarded with increased equity rewards. In some examples, shown further in FIG. 3, equity rewards may increase over time. In some examples, equity rewards may randomly and/or predictably vary over time. In some examples, variable, increasing, and/or long-term loyalty rewards may form stronger user-business relationships and user loyalty. Additionally, if a user switches loyalties from a first company in a first market to a second company in the first market, a promotional, "loyalty-switch offer" may be made available to the user. In an example, a "loyalty-switch offer" may comprise a period of increased equity rewards per transaction with the business. In an example, a "loyalty-switch offer" might also comprise any of a cash reward, discounted purchases, a set amount of equity, or any other loyalty-switch promotion desired by the administrators of the loyalty platform. As a further example, administrator account 158 or platform account 136 may modify reward policies 144 of rewards manager 112.

Accounts 114 may be a module or database including instructions, information, and/or rules relating to personal and loyalty platform information for each user 102, 116, 118 associated with the loyalty platform 108. As an example, users 102, 116, and 118 may register with loyalty platform 108 via a smartphone, computer, point-of-sale unit at businesses 106, 138, 140, or other network-enabled computing device in order to build and create user accounts 172, 174, 176 associated with (as an example) users 102, 116, and 118, respectively, the accounts being stored in accounts 114. As an example, accounts 114 may include user information for each user, including user loyalties 126, user rewards 128, equity assigned to user 130, user transactions 132, user payments 134 (including, in some examples, payment preferences, methods, or payment media), and user funds 160 each associated with a respective user, such as user 102. As an example, user loyalties 126 may include the businesses and/or brands which the user has selected via a loyalty selection for a single business in a defined market. User rewards 128 of a user's account may include the rewards for which the user is currently eligible for when making a transaction using payment media registered with purchase tracking 122 and when the transaction is between the user and a business or merchant who the user has selected via a loyalty selection. User equity 130 may include equity currently assigned to a user. User transactions 132 may include a history of transactions executed by a user tracked by loyalty platform 108 via purchase tracking 122. User payment 134 may include user preferences for payment or a virtual wallet held by the loyalty platform 108. User funds 160 may include electronic funds stored for a user which may be used for purchases made via the platform or, as an example, user funds 160 may include funds received via dividend payments from dividend distribution 152. As an example, accounts 114 may be updated continuously, via communication between rewards manager 112, loyalty manager 110, purchase tracking 122, equity allocation system 120, dividend distribution 152 and variable reward modifier 154, on a schedule, or in response to a trigger in order to keep user account information updated so that a user may be able to receive up-to-date information regarding their account. In an example, purchase tracking 122 may trigger a user account 172 update based upon receiving a notification of a tracked transaction between a user and a business, and purchase tracking may command rewards manager 112 and loyalty manager 110 to update the user account 172.

In this way, a user account (e.g., user account 172) may be established for each user of the loyalty platform, and each user account may include, among other user information, each user's selected loyalties. As will be explained in more detail below, users may select loyalty to a desired business in each of a plurality of different markets, and may switch loyalty from one business to another in a given market when desired. Thus, a given user may have loyalty selections for multiple businesses and/or may switch loyalties at any time. By storing and continuously updating this user account information (including current loyalty selections) in one location for each user (e.g., the associated user account on the loyalty platform), the amount of storage demanded by the loyalty platform may be reduced compared to other systems where a separate account or profile is needed for each business to which a given user is enrolled in a loyalty program. For example, traditional reward programs may dictate that a user has a separate profile/account for each business. By lowering the storage demand on the loyalty platform, the functionality of the loyalty platform may be improved. Further, the use of single, unified user accounts rather than separate accounts for each business for each user may reduce the processing required by the loyalty platform when determining each user's loyalty selections and administering rewards and may lower or entirely eliminate the need to communicate with businesses when determining and administering individual rewards. Further still, by storing each user's loyalty selections to one or more businesses in one location, the loyalty platform may utilize exclusionary rewards and offer loyalty switches (as explained in more detail below), which may promote brand loyalty while improving the functioning of the loyalty platform.

Equity allocation system 120 may manage assigning, selling, and forfeiting equity as well as updating current share prices. Equity allocation system 120 may additionally include forfeit module 146, updater module 147, assign module 148, and sell module 178 may be a module or database configured with rules and/or instructions in order to execute buy, sell, and/or forfeit orders of fractional or whole equity between loyalty platform 108 and clearing system 104 as well as, in some examples, between accounts 114 (including user accounts 172, 174, 176) and platform account 136.

Purchase tracking 122 may be a database or module configured to include instructions and rules configured to track virtual and real-world (e.g., in-store) purchases between users 102, 116, 118 and businesses 138, 140, 106. The purchase tracking system may further include payment medium storage database 124 in order to track purchases for user accounts 172, 174, 176 associated with users 102, 116, 118 who may execute transactions using payment media which have been registered and stored at payment medium storage 124. As an example, payment media stored within payment media storage 124 may include any applicable payment methods not limited to credit cards, debit cards, and online payment systems (for example, PAYPAL). In an example, payment medium storage 124 may include registration information relating to credit cards used for transactions between users and businesses. In another example, payment medium storage 124 may include registration information relating to only payments systems used for transaction between users and businesses. In another example, purchase tracking 122 may receive a notification or indication that a user has executed a transaction (for example, purchase or return). In some examples, the purchase tracking 122 may be notified by a point of sale (POS) system that a purchase has been made and calculate and apply a reward in response to the notification. However, in other examples, additionally or alternatively, the purchase tracking 122 may communicate directly with the administrator(s) of each payment medium in order to receive transaction information to detect if a user purchase has been made, without requiring notifications from a POS system. In this way, purchase tracking 122 may be configured to detect purchases made by users 102, 116, 118 at virtually any business, including businesses listed in the rewarding-business index (described in more detail below) and businesses that are not listed in the rewarding-business index. When a purchase made by a given user (e.g., user 102) is detected, the loyalty platform 108 may determine if the user has made a loyalty selection to that business, and if so, administer a reward, as will be described in more detail. If the loyalty platform 108 determines that the user has not made a loyalty selection to that business, the user may be offered a loyalty switch offer. Further, in some examples, if the user does not switch loyalties, a reward may not be offered, if the business is in the same market as the business to which the user has made a loyalty selection. In all of these examples, by interfacing directly with the administrators of the payment media, all non-cash user purchases can be detected without requiring communication with a plurality of POS systems (e.g., at each business), which may reduce instances of missed transactions (e.g., due to POS operational errors) and lower network traffic and storage space demanded of the loyalty platform (and thereby improve the functioning of the loyalty platform).

The loyalty platform 108 may additionally include platform account 136 which may comprise an equity account tied to the loyalty platform 108, and as an example, in some cases the loyalty platform 108 may accumulate shares and/or funds based upon a user's transaction with a merchant where the transaction is tracked through the platform. In some instances, when a user forfeits shares the loyalty platform 108 may retain the forfeited shares at platform account 136. Furthermore, platform account 136 may additionally comprise an administrator account 158 which may provide platform administrators with rights to make any modifications to the loyalty platform—for example, adding or removing businesses to the loyalty selections available through loyalty manager 110, modifying rewards options available through rewards manager 112, modifying accounts 114, modifying equity allocation 120, modifying dividend distribution 152, and varying the rewards provided to users at variable reward modifier 154.

Loyalty platform 108 may also include dividend distribution 152 as a database or module comprising instructions or rules which may enable communication with clearing system 104 in order to distribute dividend payments whenever they are set to occur (such as quarterly). Clearing system 104 may, as an example, have information relating to when dividend payments are to be made and how much money per share may paid-out. Dividend payments handled by dividend distribution 152 may, in some examples, be sent to user funds 160 in user account 172. In another example, dividend payments handled by dividend distribution 152 may be sent directly to payments 150 via instructions included at user funds 160 to send payment to an account with payments 150 associated with user account 172.

Variable reward modifier 154 may be a module or database containing instructions configured to provide a reward modification to the normal reward, based upon random selection. As an example, the user may be entitled to a reward, or a normal reward, based upon the user's loyalty selection to a business, and, the normal reward may be modified based upon variable reward policies (discussed herein) to form a modified reward. As explained herein, when a user 102, 116, 118 executes a transaction, the purchase tracking 122 notifies variable reward modifier 154 of the transaction (which may have been made between a user and business wherein the user had made a loyalty selection to the business of the transaction) and further queries variable reward modifier 154 to see if the normal reward may receive a modified reward.

Turning now to FIG. 1B, example computing system 180 is shown. Computing system 180 may implement loyalty platform 108 alone, or in combination with other computing systems. In one example, computing system 180 is a server. Computing system 180 includes processor 182, network adapter 188, and non-transitory memory 184. Processor 182 may include one or more physical devices configured to execute instructions. For example, processor 182 may be configured to execute instructions that are part of one or more applications, services, programs, routines, libraries, objects, components, data structures, or other logical constructs included in loyalty platform 108. Network adapter 188 may comprises one or more physical device associated with computing system 180, enabling transmission and reception of data by computing system 180. In one example, network adapter 188 enables computing system 180 to connect to a computer network, such as the Internet, and exchange data therewith, such as data which may enable tracking of user purchases and matching between transacting businesses and businesses registered with the loyalty platform (and therefor in included in the rewarding-business index). Non-transitory 184 memory includes one or more physical devices configured to hold data, including instructions executable by the processor to implement the methods and processes described herein. When such methods and processes are implemented, the state of non-transitory memory 184 may be transformed—e.g., to hold different data. The terms "module" and "program" may be used to describe an aspect of the computing system implemented to perform a particular function. The terms "module" and "program" may encompass individual or groups of executable files, data files, libraries, drivers, scripts, database records, etc. Non-transitory memory 184 includes the various files/routines/methods of loyalty platform 108 that when executed by processor 182 perform one or more of the steps herein described with reference to one or more of the disclosed methods. Computing system 180 may optionally include display(s), user input device(s), communication interface(s), and/or other components.

As shown in FIG. 1B, non-transitory memory 184 includes rewarding-business index 186. Rewarding-business index 186 may be stored within non-transitory memory 184 of computing system 180, and may comprises a database or module with a list of businesses registered with loyalty platform 108 stored therein. The list of businesses registered with loyalty platform 108 may further include information pertaining to each of the businesses included within the list. In one example, rewarding-business index 186 may be used by computing system 180 in conjunction with purchase tracking 122 to quickly ascertain if a financial transaction executed at a business is eligible for an equity reward through the loyalty platform, by matching a description of the transacting business obtained by purchase tracking 122 with a description stored in rewarding-business index 186 associated with a business operating an active reward program (herein also referred to as a customer loyalty program) through loyalty platform 108. To facilitate accurate matching between a transacting business and its associated reward program/policies implemented by loyalty platform 108, rewarding-business index 186 may include various features, or pieces of data, relating to the businesses listed therein. In one example, rewarding-business index 186 comprises a database, with each entry therein corresponding to a unique business, said entry may comprise a name/description, a link to the reward/loyalty policies established by the business, the status of the reward program associated with that business (such as "active", "cancelled", "pending deposit of funds", etc.). In one example, a business interested in offering equity rewards via loyalty platform 108 to customers, to incentivize greater customer loyalty, may register their business with loyalty platform 108. The registration process for businesses may include inputting information relating to the business into loyalty platform 108, this information may be stored in non-transitory memory of computing systems implementing loyalty platform 108. In one example, business information may be stored in rewarding-business index 186 of one or more computing systems implementing the loyalty platform 108, such as computing system 180. As an example, the business information input into the rewarding-business index as part of the business registration process may include a description of the business, business payment information, business contact information, business locations/addresses, business hours of operation, markets in which the business operates (which may also be stored in markets 156), business reward policies/loyalty policies defining how an amount of equity reward is calculated based on a monetary value of a user purchase and user transaction history (which may also be stored in one or more additional locations of loyalty platform 108, such as in loyalty policies 142, and reward policies 144), and other information which may enable the loyalty platform 108 to uniquely identify the business and operate a customer loyalty program customized for that individual business. In one example, a link to rules/policies for an equity reward program of a first business, implemented by loyalty platform 108 via computing system 180 may be included in an entry in rewarding-business index 186 associated with the first business. In one example, the rules/policies defining an equation or algorithm for calculating an amount of an equity reward to be allotted to a user with a loyalty selection to the business based on a user purchase made at the rewarding business using a payment medium (such as a credit card, debit card, virtual wallet, or other payment/payment media) previously linked with loyalty platform 108. Rewarding-business index 186 may be stored in a location of non-transitory memory 184 of computing system 180, and information stored therein may be accessed by computing system 180 upon execution by processor 182 of one or more methods stored in loyalty platform 108, some examples of which are described herein. In one example, rewarding-business index 186 may be accessed by purchase tracking 122 of loyalty platform 108 to attempt to match a description of a business with which a user recently made a purchase (herein also referred to as a transacting business description) using a linked payment medium, to a description stored in rewarding-business index 186. If the transacting business description matches a description of a business stored in rewarding-business index 186, the user may be entitled to a reward for the user purchase, and one or more additional actions may be taken, such as look-up of the reward policies linked with the rewarding business. The link may be stored in rewarding business-index 186 in a location associated with the rewarding business description, the link may point to a location of non-transitory memory 184 associated with reward policies 144. Thus, rewarding-business index 186 enables computing system 180 to automatically determine if a user purchase, tracked via purchase tracking 122, is eligible to receive a reward, or may be eligible to receive a reward based upon the user selecting a loyalty-switch offer, without requiring action on the part of the user and without requiring communication with the individual business or a separate business-based rewards administer, which may lower processing demands and storage requirements of the loyalty platform. A business listed in rewarding-business index 186 may be removed, deleted, or overwritten, upon suspension or cancellation of the equity rewards program established for that business. In another example, upon cancellation or suspension of a customer loyalty program offered by a business, a flag may be set in the entry corresponding to that business in the rewarding-business index, thereby indicating that no equity rewards may be earned from user purchases at this business at this time, thus retaining business information within the rewarding-business index and bypassing the need to re-enter information relating to said business into the rewarding-business index in the event that the customer loyalty program associated with the business is resumed at a later time. In this way, rewarding-business index 186 enables rapid determination of which businesses provide equity rewards, which may influence user purchasing habits.

The following methods give examples of one or more methods which may be executed by a computing system, such as computing system 180, to implement a loyalty platform, such as loyalty platform 108, which may enable one or more improvements over conventional reward programs.

Figure 2B:
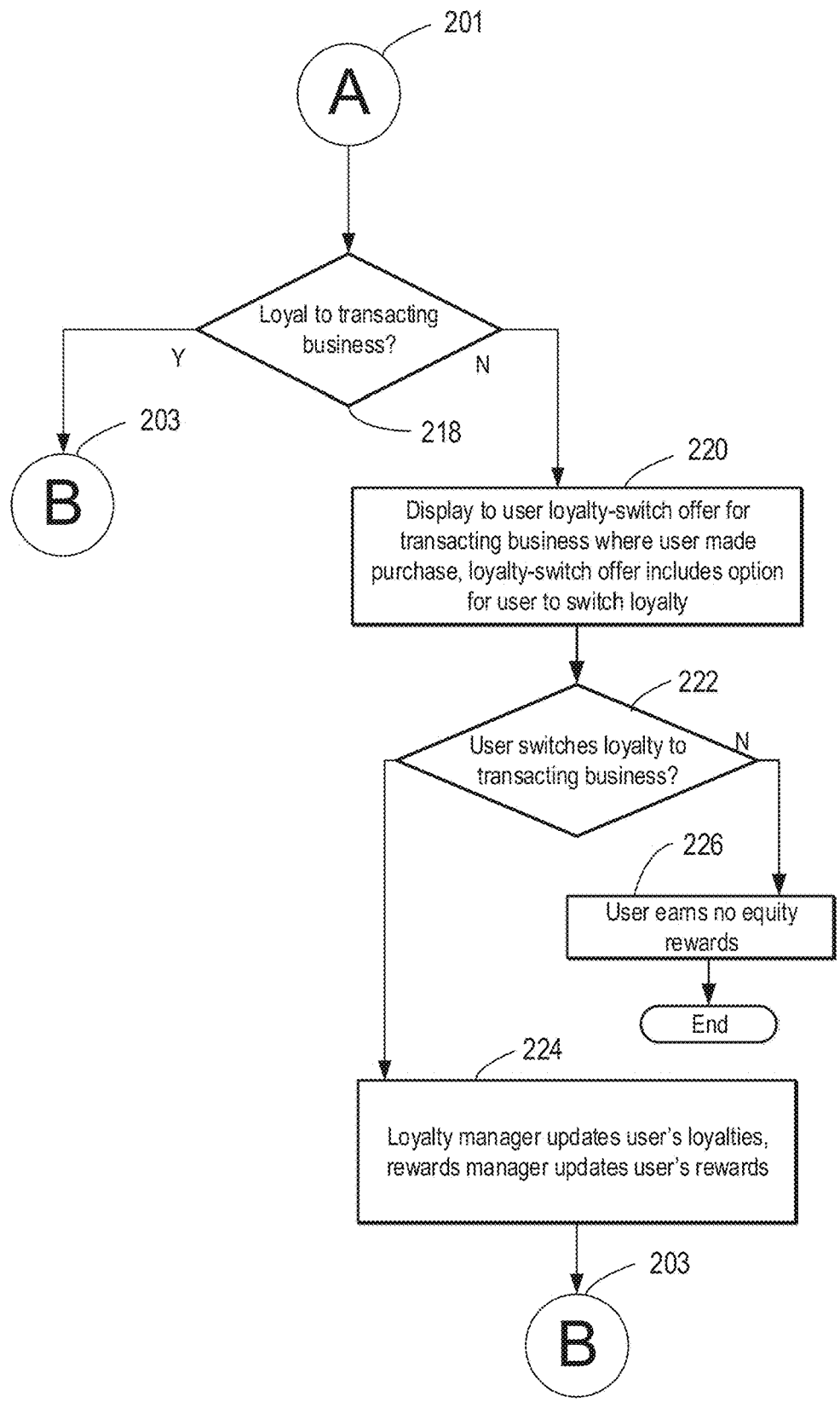
Figure 2C:
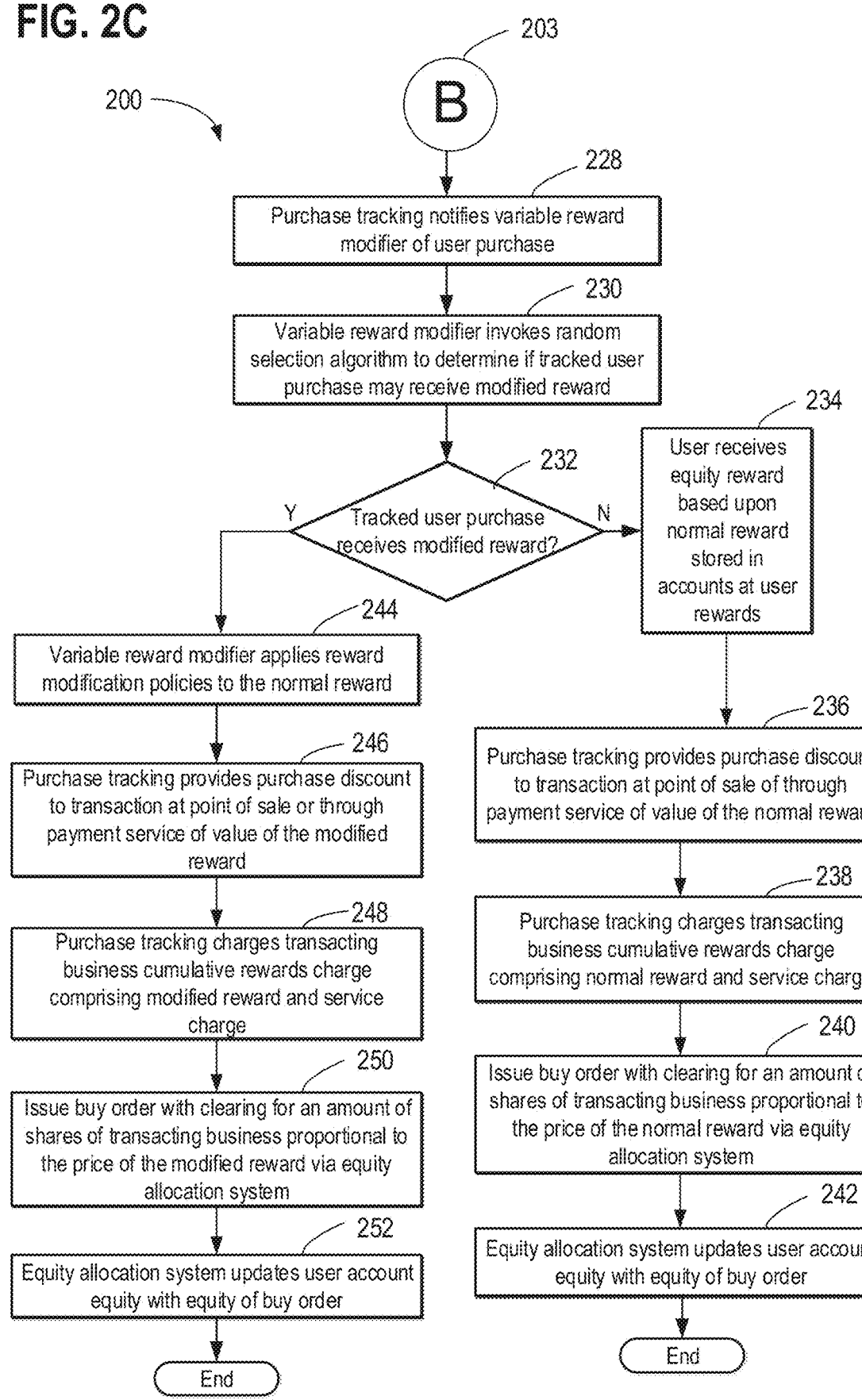

Turning now to FIGS. 2A, 2B, and 2C, a flowchart illustrating exemplary method 200 is shown. Method 200 is an example of a process illustrating how an online loyalty platform, such as loyalty platform 108, may track user purchases conducted with a payment medium registered/linked to a user account of the loyalty platform, and allocate equity rewards based on the monetary value of the user purchase, a user transaction history, user loyalty selections, business rewards policies/loyalty policies. In this and other examples, "loyalty" or "loyalty selection" may be a selection of a first business in a market made by a user entitling the user to certain privileges including, but not limited to, equity rewards, discounts, special offers, promotions, and others. Making a "loyalty" selection entitles the user to the receipt of privileges from the first business of the market to which the user has made their "loyalty selection" with, but may preclude, or exclude, the user from receiving privileges from a second business, or other businesses, in the market. In some examples, a user may be presented with a "loyalty-switch offer" which may be an offer for other privileges provided by a second business in the market, based upon a forfeit of loyalty and privileges to the first business and a selection of loyalty to the second business in the market.

Beginning with 202, purchase tracking 122 of loyalty platform may receive an indication, or notification, that a user (for example, user 102, 116, 118 of FIG. 1A) has made a purchase or executed a transaction, comprising a monetary value of the transaction, with a transacting business. Purchase tracking 122 may further receive one or more purchase details, including information regarding the transacting business (herein referred to as a transacting business description), and to which customer account the transaction medium is associated. In one example, the transacting business description may include a title/name of the transacting business, the address of the transacting business, a time and date of the transaction, information relating to a point of sale device used to conduct the transaction, or other data associated with conduction of the user purchase which may be used to uniquely identify a transacting business. Purchase details may further comprise information identifying which user account on the loyalty platform to associate with the user purchase. As described further, herein, purchase tracking 122 may be configured to link to credit cards, debit cards, or any other trackable payment medium, and when the link is completed, the purchase tracking 122 may receive all purchase notifications made with that trackable payment medium (e.g., once a user has registered a payment medium such as a bank account, that payment medium may be monitored by purchase tracking 122 for transactions that may quality for rewards). As an example relating to FIG. 2A, a user may make a purchase with the use of a credit card, tracked by purchase tracking 122, at a business. Additionally, a spend history/transaction history associated with each payment medium, and/or associated with each user account (in the case that a user account is associated with multiple linked payment media), may be generated for linked payment media and stored in non-transitory memory of the rewards platform. In one example, the reward policies of a business stored on the loyalty platform may take into account the transaction history of a user when determining the amount of the equity reward to allocate to the user. In one example, determining the amount of the equity reward to allocate to the user comprises increasing a percentage of a monetary value of a user purchase used to reward the user based on a cumulative monetary value of user purchases from the rewarding business increasing beyond a threshold, wherein the threshold may be defined in the reward policies of the business and the cumulative monetary value of user purchases may be calculated on a rolling basis over a predetermined duration of time. In another example, based upon a cumulative transaction amount for a user with a single rewarding business within a finite duration of time increasing beyond a predetermined threshold amount, the amount of the equity reward allocated to a user as a fraction of the total transaction amount may increase. As an example, the transacting business may be listed within markets 156 (further shown in FIG. 6).

At 204 the loyalty platform may employ a purchase tracking system or module to identify the business and the user involved in a user purchase. The payment medium used in the user purchase may be uniquely associated with an account of a user on the loyalty platform, such as one of accounts 114 stored in the non-transitory memory 184 of computing system 180. In another example, the business with which the user conducted the transaction may be identified by the computing system implementing the loyalty platform by matching/correlating a transacting business description associated with the user purchase with a description of a business stored in the rewarding-business index of the loyalty platform. In one example, a match between a transacting business description and a description of a business stored in a rewarding-business index of the non-transitory memory of the computing system implies that the transacting business is registered with the loyalty platform, and therefore, that the user may be eligible for an equity reward based on the user purchase (note that in some examples the rewarding-business index may include an indication that the reward program of the registered business is cancelled or suspended, such as may be indicated by a flag included with the listing of the business in the rewarding-business index as previously discussed). In another example, if the computing system implementing the loyalty platform is unable to match the transacting business description with a description for a business stored in the rewarding-business index, this implies that the transacting business is not registered with the loyalty platform, and thus the user may be ineligible to receive an equity reward for the user purchase. In this way, for a user purchase identified by a purchase tracking system or module of a loyalty platform, such as purchase tracking 122, both the user and the transacting business may be rapidly identified using the system and methods of the current application, so long as the transacting business is registered with the loyalty platform. Further, it may be quickly ascertained if the tracked user purchase is eligible for an equity reward. And in some examples, in the event that the user purchase is not eligible for an equity reward, the computing system implementing the loyalty platform may transmit a notification to a user computing device, for rendering on a display or communications interface of the user computing device, a notification to the user that their purchase was not eligible for a reward, the notification may further include an offer to the user to make a loyalty selection to one or more businesses stored a rewarding-business index of the non-transitory memory of the computing system which are actively offering equity rewards to loyalty selecting users.

Moving to 206, the computing system implementing the loyalty platform may then execute a user loyalty lookup, comprising looking up the user's active loyalties stored in the account associated with the user. In one example the user loyalties, such as may be stored at user loyalties 126 of loyalty platform 108, may comprise recorded loyalty selections made by a user associated with an account stored within accounts 114, said account further associated with the linked payment medium used to conduct the purchase. In another example, a computing system implementing the loyalty platform may receive a loyalty selection from a user computing device, the loyalty selection comprising a user selection of a business listed in a rewarding-business index stored on the non-transitory memory of the computing system, the business listed in a market, and based upon the user selection of the business, the user is eligible to receive an equity reward associated with the business and is excluded from receiving equity rewards associated with unselected businesses in the market. The computing system may then conduct the process of storing the loyalty selection in a location of the non-transitory memory of the computing device associated with an account of the user, which may subsequently be accessed in order to determine if a user is loyal to a transacting business. In one example, loyalty selections may only be made to companies providing equity rewards to users through the loyalty platform, and thus listed in the rewarding-business index, as loyalty selections to other businesses would not enable the user to receive an equity reward, and thus the user would obtain no benefit from such a loyalty selection.

Proceeding to 208, the method determines if the user is loyal to any business in the market. If the user loyalty lookup returns that the user is loyal to a business or merchant or brand in the market, then the method proceeds to 201 of FIG. 2B, which will be explained in more detail below. As a further example, the user loyalty lookup may be executed by the purchase tracking 122.

If the user loyalty lookup determines the user is not loyal to any business in the market, the method proceeds to 210, where the purchase tracking 122 requests, or queries, loyalty manager 110 for available or offered user equity rewards with the transacting business. Additionally, at 210, the loyalty manager 110 may provide an option for the user to select loyalty in the market to the transacting business. The option provided by loyalty manager 110 may include information regarding loyalty policies 142 relating to the transacting business. The option provided by loyalty manager 110 may, in an example, include notifications of the rewards available to the user if the user should select the option for the user to select loyalty in the market to the transacting business.

Proceeding to 212, method 200 determines if the user has switched loyalty to the transacting business. If the user does select the loyalty-switch offer, the method may proceed to 216, wherein the user may earn the loyalty-switch offer. Additionally, as an example, the loyalty manager 110 module may update the user's loyalties at user loyalties 126 of accounts 114, by overwriting the previous loyalty selection of the user in that market, and the rewards manager 112 may update the user's current rewards at user rewards 128 of accounts 114. Furthermore, if the user accepts the loyalty-switch offer, the method may proceed to 203 of FIG. 2C. If the user does not select the loyalty-switch offer, the method may proceed to 214 wherein the user earns no equity rewards, privileges, or any other rewards which may comprise selecting the loyalty-switch offer and selecting loyalty to the transacting business.

Continuing now with FIG. 2B, at 218 method 200 includes determining if the user has made a loyalty selection to the transacting business. Determining if the user made a loyalty selection to the transacting business may include looking up the user's loyalties stored in accounts 114 at user loyalties 126 via purchasing module 122 executing the user loyalty lookup. If the user loyalty lookup returns that the user is loyal to the transacting business, and should therefore receive a reward according to the loyalty policies set forth, the method may proceed to 203 of FIG. 2C, explained in more detail below. If the lookup at step 218 determines that the user is not loyal to the transacting business, method 200 may then proceed to 220 where the loyalty manager 110 may present the user with a loyalty-switch offer which may include an option for the user to select a loyalty to the transacting business and terminate their previously-selected loyalty to another business in the market. As an example, the terms and policies of a loyalty-switch offer may be stored within loyalty policies 142. In some examples, loyalty-switch offers may include whole or fractional amounts of equity. In some examples, loyalty-switch offers may include equity rewards offered on transactions and/or discounts on transactions. In an example, loyalty-switch offers may be temporary or permanent or may be based upon any user behavior as defined by the business responsible for the loyalty-switch offer and/or the platform. In an example, loyalty-switch offers may include temporarily higher or increased equity rewards for transactions executed with the transacting business.

Figure 9:
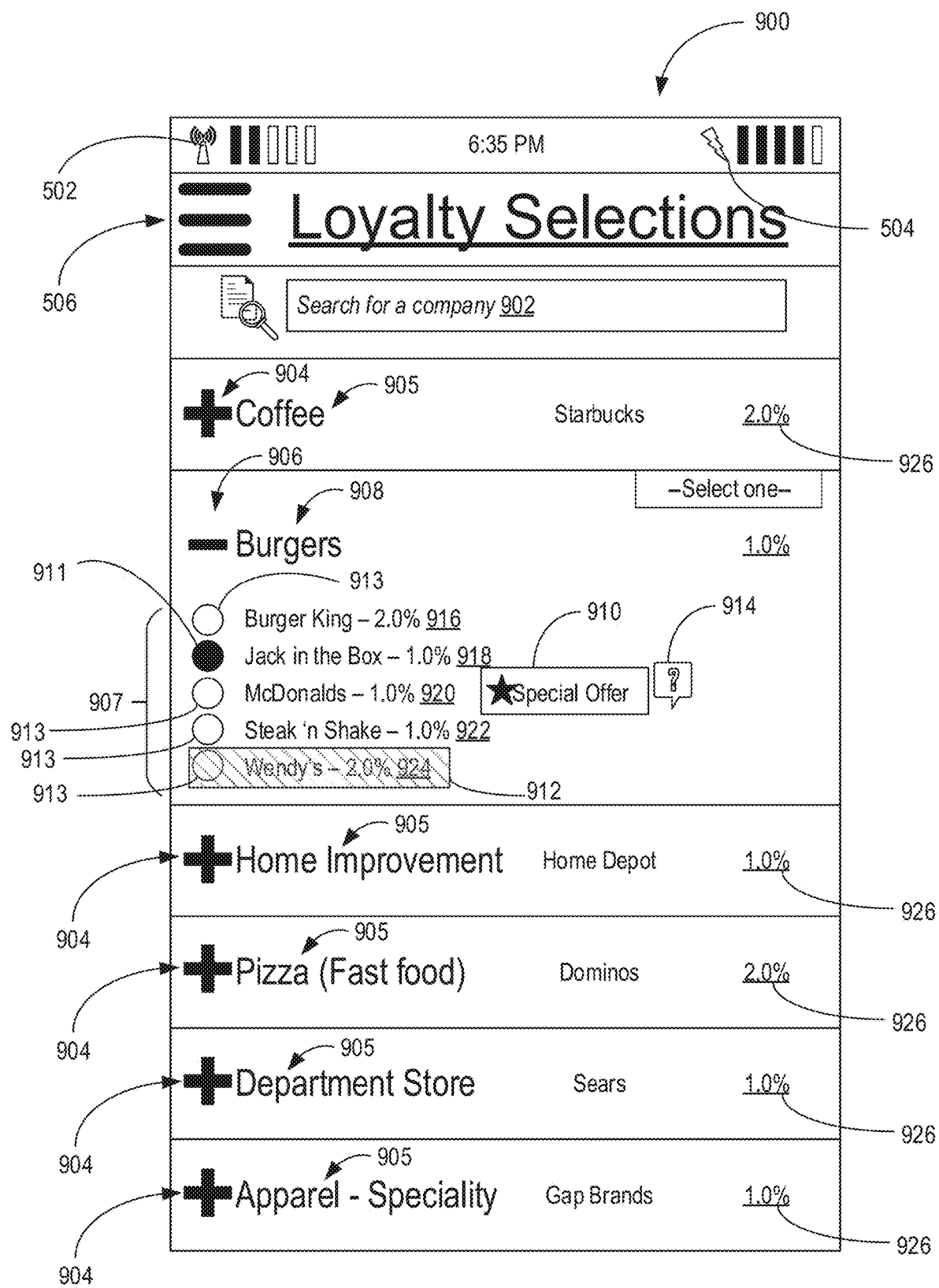

Additionally, loyalty-switch offers may be presented, offered, or made available to the user at any time, for example, when the user is browsing through available loyalty selections, further illustrated at FIG. 9, or as another example, at any desirable time when a user is interacting with the platform. In an example, a user who is conducting a transaction with a business, with which the user has not selected loyalty in a market, may receive a notification, for example via the purchase tracking 122 or loyalty manager 110. The purchase tracking or loyalty manager may inform the user that they are not receiving equity rewards at the business where they are conducting the transaction. In some cases if the user is merely present within, at, or near a business listed in the rewarding-business index to which the user does not have an active loyalty selection, the notification may further include a loyalty-switch offer so that the user may begin to earn rewards and/or privileges associated with the business. In one example, the user computing device may contain GPS capabilities, the computing system implementing the loyalty platform configured to receive the location of the device therefrom, and to correlate the location of the user computing device with predefined location information specified for one or more of the plurality of businesses in the rewarding-business index. Thus, the computing system implementing the loyalty platform may be enabled to ascertain when the user computing device is within a threshold distance of one or more businesses registered with the loyalty platform, and therefore listed in the rewarding-business index. In one example, based on the user computing device being less than a threshold distance from one of the plurality of businesses listed in the rewarding-business index, an offer for a loyalty selection to the said one or more businesses may be transmitted to the user computing device, for display via a display or communications interface of the user computing device. In a further example, based on a location of the user computing device, and a local time of the location of the user computing device, and the spend history of one or more payment media associated with the user, a customized loyalty-switch offer may be transmitted to the computing device of the user. In another example, the threshold distance may be a predetermined distance, such as 1 mile. In other examples, the threshold distance may be based on a rate of user travel, or an estimated travel path of the user as indicated by a derivative of the position signal being transmitted to the loyalty platform.

After presenting the loyalty-switch offer to the customer, at 222, the method 200 continues where the purchase tracking 122 queries loyalty manager 110 and/or user loyalties 126 to determine if the user has switched loyalty to the transacting business. If the user does not switch loyalty to the transacting business and declines the loyalty-switch offer, the method 200 may proceed to 226 where the user earns no equity rewards for the transaction. In this way, user that is registered with/has an account with the loyalty platform may make a loyalty selection to a first business in a first market listed in the rewarding-business index of the loyalty platform. The loyalty platform (e.g., purchase tracking 122) may detect that the user has made a purchase at a second business listed in the first market of the rewarding-business index of the loyalty platform. Because the user does not have a loyalty selection to the second business (e.g., the loyalty selection of the first business excludes rewards associated with the second business because the first and second businesses are in the same market), a loyalty-switch offer may be presented to the user. If the user does not accept the loyalty switch offer, no rewards may be administered for the purchase at the second business, even though the purchase was detected by the loyalty platform. Contrastingly, if the user does switch loyalty to the transacting business, the method 200 may proceed to 224 where the loyalty manager 110 may update the user's loyalties at user loyalties 126 of accounts 114. The method may further include the rewards manager 112 updating the user's rewards 128 of user account 172 to include the privileges and/or benefits of the loyalty-switch offer. After the user account (for example, user account 172) has been updated, the method 200 may then proceed to 203 of FIG. 2C. As an example, if a user has selected loyalty to a first business but then selects loyalty to a second business via a loyalty-switch offer, the purchase tracking may update user loyalties 126 to include information that the user has now canceled loyalty or loyalty selection to the first business and selected loyalty to the second business.

Turning now to FIG. 2C, the variable reward modifier 154 may also provide modified rewards to the user based upon random selection. At 228 of method 200, the purchase tracking 122 may have tracked a purchase between a user and a business with which the user has made a loyalty selection. The purchase tracking 122 may communicate with the variable reward modifier 154 per each transaction tracked by loyalty platform 108, and furthermore the variable reward modifier 154 may include a random selection algorithm 162 which may be invoked to randomly provide modified rewards to the user. As an example, the random selection algorithm 162 may be implemented within the variable reward modifier 154 and the variable reward modifier 154 may further include variable reward policies 164 which include rules and/or instructions for how to provide variable rewards.

At 230, the variable reward modifier 154, as an example, may invoke the random selection algorithm 162 to determine if a tracked transaction (made between a user and a transacting business wherein the user has selected loyalty to the transacting business) may or may not receive a modified reward, and the variable reward modifier may also modify the reward based upon variable reward policies 164.

At 232, if the tracked transaction is determined to receive a modified or variable reward, the method may proceed to 244 wherein, the variable reward modifier may apply variable reward policies 164 to the normal reward. At 244, the variable reward modifier may run a user loyalty lookup to determine the reward, or normal reward, associated with selected loyalty to the business based upon reward policies 144. At 232, if the tracked transaction is not determined to receive a modified or variable reward, the method may proceed to 234. Similarly, at 234 the variable reward modifier may run a user loyalty lookup to determine the reward, or normal reward, associated with selected loyalty to the business based upon reward policies 144.

The variable reward policies 164 may contain instructions and/or rule sets related to the modifications of the normal reward of any tracked transaction based upon the results of the random selection algorithm 162 having determined the tracked transaction may receive a modified reward. In an example, a variable reward policy may include a modification policy which may invoke the random selection algorithm 162 yet again to determine, by random selection, a degree of modification from a list of possible modifications. In an example, the variable reward policy may include the modification policy comprising a list of possible modifications comprising reward multipliers, for example, 2×, 3×, and 4×. By invoking the random selection algorithm 162 to choose, by random selection, from the list of possible reward modifications (for example, multipliers 2×, 3×, and 4×), the variable reward policy may randomly select a reward modification, and in such an example, if a 3× reward multiplier were chosen, then the reward amount, (for example, equity reward) which may be given to the user as a discount charged to the merchant, may be multiplied by 3. In an example, a user may execute a $100 tracked transaction with a business the user has selected loyalty to. With no reward modification, the user may normally receive a 1% discount via the loyalty platform 108. However, if the user may be determined to receive a variable reward including, for example, a 3× reward multiplier (in accordance with the variable reward policies 164), then the user would receive a 3% discount which would then be charged to the transacting business (along with the service charge, which may or may not also be modified by the reward modification). Furthermore, the user may be assigned $3 worth of fractional or whole shares of equity in the transacting business via the equity allocation system 120.

If, the variable reward modifier 154 applies reward modification policies to the normal reward at 244, next, the method 200 may then proceed to 246 and the variable reward modifier 154 may provide the modified and/or variable reward (the normal reward of 128 with variable reward policies 164 applied to it) to the user, in the form of a discount at the point of sale. In another example, the user may receive the variable reward not as a discount, but as a reimbursement of funds sent to user funds 160 or an account with payments system 150.

At 248, purchase tracking 122 may charge a transacting business a cumulative rewards charge wherein the cumulative rewards charge includes the value of the modified reward and a service charge. As an example, the service charge may be a fee charged by the equity allocation system 120 of loyalty platform 108 for brokering the equity reward. The service charge may be a percentage of the total transaction dollar amount or it may be a flat dollar fee.

At 250, the purchase tracking 122 may request the equity allocation system 120 to issue a buy order with clearing system 104 for equity of the transacting business proportional to the amount of the modified reward. Once clearing system 104 settles the transaction, at step 252, assign module 148 of equity allocation system 120 may update user equity 130 to include the assigned equity. In other words, at 252, the computing system implementing the loyalty platform may perform the step of allocating an amount of the equity reward to the account of the user via an equity allocation system based on the transacting business description matching a description of the business selected by the user in the loyalty selection, the amount of the equity reward further based upon one or more of the transaction amount, a transaction history of the user, and loyalty policies of the business selected by the user and further, transmitting the amount of the equity reward to the user computing device for rendering within a user interface implemented at the user computing device the amount of the equity reward and an updated cumulative balance of the equity reward allocated to the account of the user.

Returning to 232, if the invocation of the random selection algorithm determines that the tracked transaction may not receive a modified reward, then the user may receive a normal reward (without modification) based upon the user rewards 128 of the user account 172, and steps 234-242 are the same as 244-252, where only a normal reward is provided instead.

In an example, a reward which may be given in equity may be stored at user equity 130. In a further example, if a tracked transaction is determined to not receive a modified reward the user may receive the normal reward stored at user rewards 128. The example set forth above and herein may provide incentive for users to repeatedly shop (or increase number of transactions) and spend more money at businesses which they have selected loyalty to as they may unexpectedly receive modified (greater) rewards, in some cases equity rewards. In such an example, users may exhibit increased loyalty to stores where they are occasionally rewarded with greater rewards.

As an example, a reward may comprise at least a purchase discount on a transaction executed with a business the user has selected a loyalty to. As an example, the purchase discount may comprise a dollar amount or a percentage discount on purchases with the transacting business. In a further example, the reward may also include an equity reward. As an example, the reward may further comprise an equity reward which may comprise a percentage of the transaction dollar amount, or in some examples, a set, established dollar amount. In some examples, the equity reward may further comprise a variable percentage of the transaction dollar amount or a variable dollar amount. As an example, a service charge may be a fee charged by loyalty platform 108 for brokering the equity reward, and the service charge may be a percentage of the total transaction dollar amount or it may be a flat dollar fee.

In some examples, the method may include determining a reward based upon any one or any combination of: the loyalty selection, a transaction history of the user, and a variable reward modifier 154. As an example, if the user has not made a loyalty selection to the transacting business, then the user may not receive any reward. If the user has made a loyalty selection to the transacting business, then the user may receive a reward. Furthermore, based upon the loyalty policy (stored in loyalty policies 142) of the transacting business, the reward may be modified based upon a transaction history of the user 132 and/or the reward may be modified based upon a user payment method 134 and/or the reward may be modified based upon the variable reward modifier 154. For example, if a user meets certain criteria based upon past transaction history with the transacting business, then the user may receive a modified award. Furthermore, as an example if a user increases their spending, e.g., the frequency of transactions and/or amount of money spent per transaction, the user may receive a greater reward. Furthermore, as an example, if a user decreases his or her spending, the user may receive a lesser reward. In some examples, a modified reward may comprise a modified equity reward percentage wherein the percentage of the transaction monetary value put towards equity rewards is modified based upon transaction history and/or loyalty history. In some examples, a modified reward may comprise an equity reward percentage, as disclosed above, as well as a set amount of equity (either fractional or whole shares). As an example, rules and/or instructions for modifying rewards based upon transaction history or user behavior or user history, as mentioned above, may be included in variable reward policies, and these modifications may not depend upon the invocation of the random selection algorithm 162.

As a further example, if a user uses a particular credit card or particular payment method, which may be promoted or preferred with respect to the transacting business, then the user may receive a modified reward based upon a modification policy applying, wherein the modification policy applies a reward modifier to the reward based upon the payment method used for the transaction. Furthermore, at 308, the reward may be further modified by the variable reward modifier 154, then proceeding to 310, the reward may be provided to the user and added to one or more of user equity 130 and user funds 160.

Figure 3:
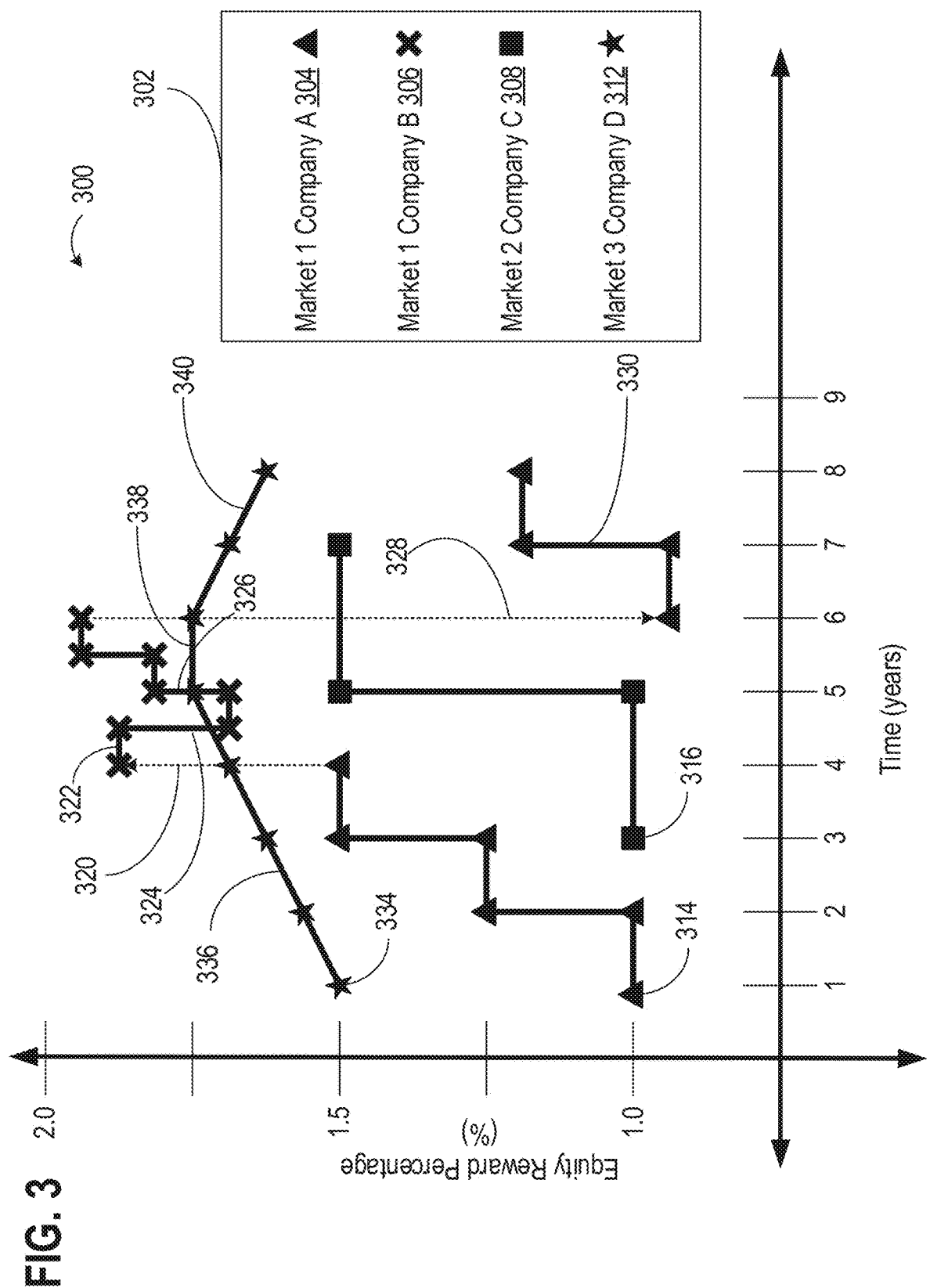
FIG. 3 shows example rewards over time for a single user.

FIG. 3 is a graph 300 which illustrates equity percentage over time for one exemplary user (e.g., user 102) for multiple businesses in multiple markets. Graph 300 illustrates, as further explained herein, changes in loyalty over time between businesses in different markets and provides some examples of how user history and behavior may effect rewards. As an example, the rewards illustrated in FIG. 3 are percentage equity rewards wherein the equity reward is provided as a number of shares (either fractional or whole)

equivalent in value to a percentage of a transaction value. Legend 302 provides graphical representations of percentage equity rewards of different companies 304, 306, 308, and 312 provided as examples in FIG. 3. As shown, Company A in Market 1 is designated by triangle-line 304, Company B in Market 1 is shown by X-line 306, Company C in Market 2 is shown by square-line 308, and Company D in Market 3 is shown by star-line 312.

As an example, the user may make a loyalty selection at year 1 to company A, as shown at 314. At 314, for example, the user may receive an introductory reward at 1.0%. As shown in the graph, the user may receive higher equity rewards over time. As an example, the user may receive increased equity rewards over the introductory reward, wherein as an example the user's equity rewards with Company A may increase by 0.25% every year up to year 4. As an example, a user may or may not receive the same rewards adjustment (either increase or decrease) at every time interval. The adjustments made over time to equity reward percentages may be administered in reward policies 144 of the rewards manager 112, and furthermore, rewards manager 112 may update user rewards 128 so the user may readily access their available rewards.

As a further example, at 316, the user may make a loyalty selection at year 3 to Company C in Market 2 308. As Company A and Company C are in different markets, the user may have loyalty to both companies simultaneously. As an example, Company C may provide a slightly adjusted equity rewards policy, as shown in the graph, such that the user may earn a 0.5% increase in equity reward percentage, but only after two years. In some examples, some rewards policies may have longer or shorter wait times before equity rewards are increased.

Looking to year 4 of graph 300, the user, whose loyalty in market 1 was to Company A, may then switch loyalties to Company B market 1 306. The user may select a loyalty-switch offer at 320 which includes a temporary increase in equity rewards, which may be for promotional means. Company B temporarily provides a significantly higher level of equity rewards at 1.875% (show at 322) for 0.5 years, which may be a temporary or promotional offer, which in some cases may be part of a loyalty-switch offer provided to the user 102. At 324, the temporary or promotional adjusted equity reward may be reduced, however, at 326 the equity rewards for 306 may again increase in agreement with reward policies set forth at 144. As a further example, at 328, the user may switch loyalties again in market 1 selecting loyalty again company A 304. However, as an example, the user may, in some cases like shown at 328, receive a lower equity reward than the introductory reward as described above as a punishment for repeatedly switching loyalty within a market. As shown at 328, the user may receive less than 1.0% equity rewards for 304 at year 6 when they may have received 1.0% equity rewards at year 1 when they first selected loyalty to company 304. As an example, at 330, the user may receive rewards adjustments as administered by reward policies 144.

Rewards adjustments as shown in FIG. 3, which may be stored at 144, relate to adjusting a user's rewards over time, however, in some cases, rewards adjustments may not be provided periodically, as with 304 and 306, but constantly. Turning to 334, at year 1 the user may select loyalty to company D in market 3 312 and the user may receive constantly increasing rewards along the line of 336, wherein in this particular example, the user may receive equity reward adjustments of 0.125% over 2 years. Such a constant increase in equity rewards may be more appealing to some users, while other users may prefer perhaps larger equity rewards adjustments given only periodically. In some cases, equity rewards adjustments like 336, may depend upon consumer spending. In some cases, any equity rewards adjustments, for example 336, may only occur if the user's meet certain transactional criteria (for example, spending) wherein the transactional criteria may be stored in reward policies 144. As an example, at 338 the constant increase in equity rewards for 312, which was observed at 336, has now ended. As an example, at 338 equity rewards adjustments per reward policies 144 may not allow for any equity rewards increases as the user may not be meeting a spending threshold or meeting any applicable spending criteria included in 144. As a further example, a user's equity rewards adjustments may further comprise 340 wherein a user's equity rewards may be reduced if the user's spending continues to fall below the spending threshold or perhaps falls below a baseline threshold, below which a user's equity rewards may begin to decline. As an example, rewards may be adjusted by reward policies 144 and further viewable at user rewards 128 so that users may have a clearer understanding of their reward policies. As an example, reward policies 144 or rewards manager 112 may include criteria and/or thresholds for user activity, such as how much a user spends with a business over time or cumulative user transaction value over time associated with a business which may determine adjusting the user's equity rewards over time for the business.

Figure 4:
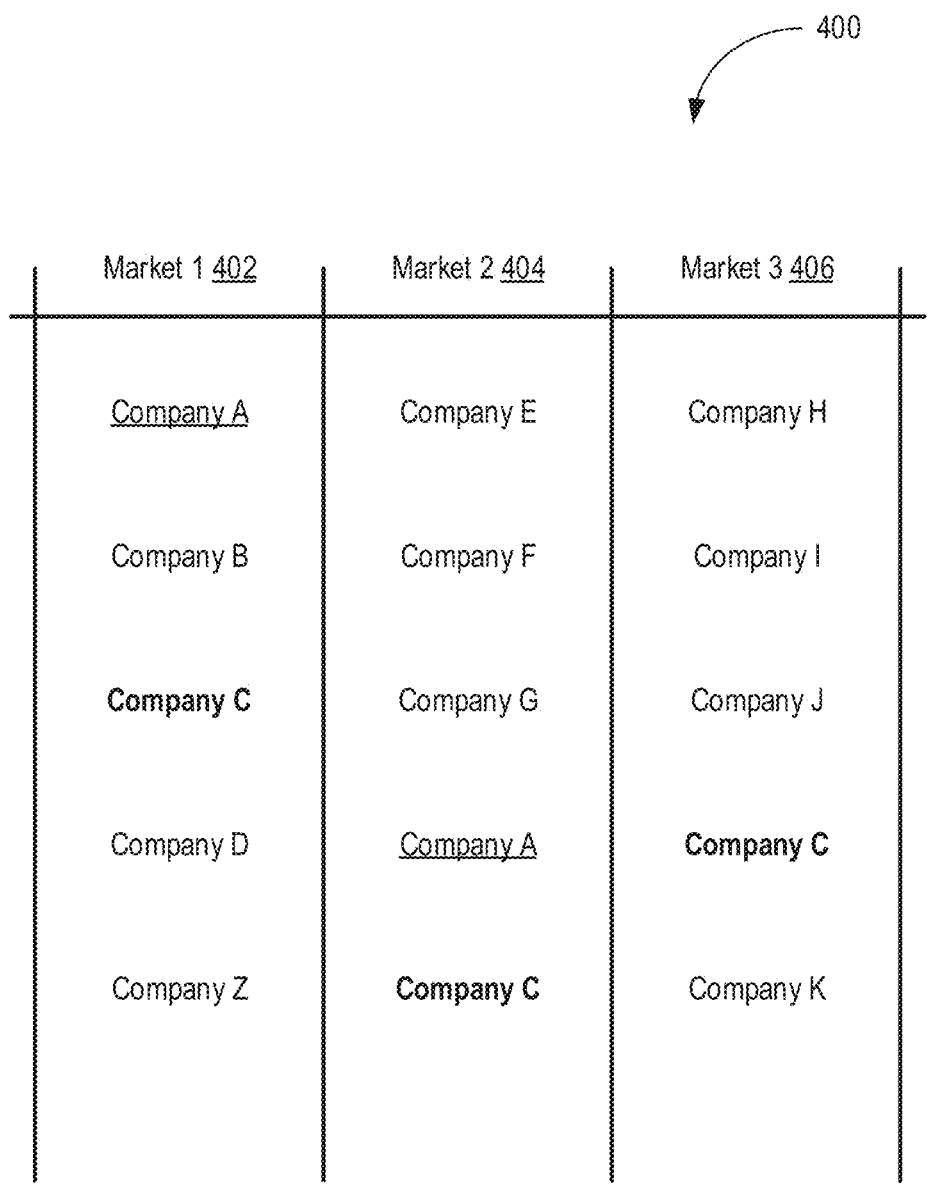
FIG. 4 shows an example distribution of business across markets.

Turning to FIG. 4, an example table is shown representing markets 156 of loyalty platform 108, wherein a number of different companies may be listed (and/or multi-listed) across the available markets. As an example, Company A of FIG. 4 may be multi-listed across market 1 402 and market 404, and Company C may be multi-listed across market 1 402, market 2 404, and market 3 406. As an example, loyalty policies 142 may comprise instructions and/or rule sets for loyalty to businesses across markets. In an example, loyalty policies may allow a user 102 to select loyalty to Company A in Market 1 402 and also select loyalty to Company A in Market 2 404. In an example, reward policies for Company A in market 1 402 and market 2 404 may be the same, however, in some examples, the reward policies may be different. In an example, a user may be allowed to select loyalty to Company C across markets 402, 404, and 406, however in some cases, loyalty manager 110 may include loyalty policies 142 which include limits on loyalty selections per company across a plurality of markets 402, 404, 406. In a further example, markets 156 may include a market rule which may comprise limitations established by admin account 158 which determine how many loyalty selections a user may make per market. As an example, each market of markets 156 may have a unique market rule established by admin account 158.

Turning to FIGS. 5-10 now, representations of exemplary graphical user interfaces (GUI) which may be displayed on a device of a user are shown. As an example, FIGS. 5-10 are shown as GUIs displayed on a mobile phone, however, the GUIs may be adapted to any computing device, mobile or stationary, interactive TV, heads-up display, virtual or augmented reality, or any other display comprising a user input functionality. In an example, the computing device of the user for viewing and operation of GUIs of FIGS. 5-10 may be connected to the Internet. For simplicity, FIGS. 5-10 may be discussed collectively.

As an example, with respect to any and all figures described, when notifications, alerts, loyalty-switch offers, or otherwise are mentioned to be "displayed" or provided to the user, it may be understood that any notifications, alerts, loyalty-switch offers, or otherwise are sent from a computing device to be displayed or provided via a mobile phone, desktop computer, laptop, personal computer and/or computing device of any kind and may be displayed via a display.

Figure 5:
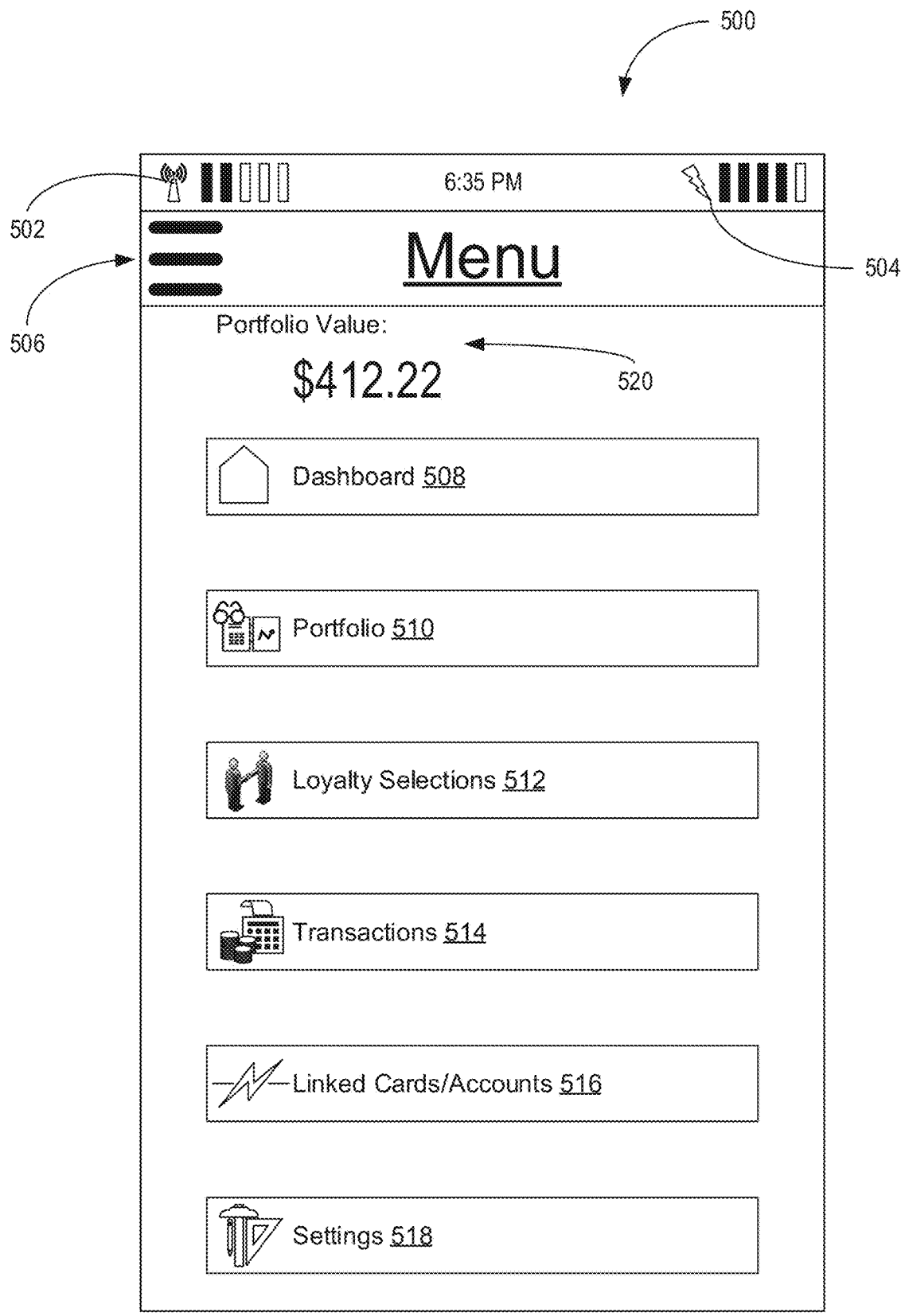

FIG. 5 is an example graphical user interface including a graphical user interface (GUI) 500 of a main menu screen for organizing user navigation of loyalty platform 108 on a computing device. As an example, GUI 500 is displayed on a mobile phone as indicated, as an example, by status bars 502 and 504 representing cellular communications tower or Wi-Fi reception and battery life status, respectively. GUI 500 may include a persistent menu button 506 as three horizontal dashes. Persistent menu button 506 may be displayed upon further GUI pages and upon a user's selection when other GUI pages are displayed, selection of the persistent menu button 506 may return a user to GUI 500. In an example, GUI 500 includes selectable elements 502-518 to navigate through the platform to access other linked GUIs such as Dashboard 508 (represented in FIG. 7), Portfolio 510 (represented in FIG. 8), Loyalty Selection 512 (represented in FIG. 9), Transactions 514 (represented in FIG. 6), Linked Cards/Accounts 516 (represented in FIG. 10), and Settings 518, though not limited to only accessing these. Additionally, GUI 500 may include a portfolio value which may comprise the total monetary value of user equity 130 and user funds 160.

Turning now to FIG. 6, an example Transactions GUI 600 is shown. Transactions GUI 600 shows four exemplary transactions—a first, a second, a third, and fourth transaction, represented respectively by 602-610, 612-620, 622-630, and 632-640. The information populating the fields in GUI 600 may be retrieved by purchase tracking 122 accessing information stored within user account 172. In the first transaction, as an example, a timestamp 602 is shown including at least the date of an example tracked transaction/transaction via purchase tracking 122 and optionally (though not shown) a time of the tracked transaction/transaction. Element 604 provides an indication of value of a user reward, in the form of equity, added to user equity 130. Element 606 may display the total monetary value of a tracked transaction as well as the merchant and/or business with which the user may have conducted the tracked transaction. Element 608 may provide an identifier (in this particular example, a stock ticker symbol) for further identification of the merchant and/or business. Element 610 may display the reward which the user is currently entitled to via reward policies 144. As an example, elements 602-610 of the first example transaction show the user 102 receiving a reward of $0.15 604 which matches to the 2% reward 610 the user is currently receiving. In some examples, the reward 604 may be given in the form of fractional or whole shares, and the element 604 may represent the amount of fractional or whole shares the user may be rewarded with or the monetary value. As the user receives fractional or whole shares the portfolio value 520 shown in FIG. 5 may increase. As time goes on, in an example where they user receives fractional or whole shares of equity, the portfolio value 520 shown may fluctuate due to changes in value of equity based upon market trends. In such an example, equity allocation system 120 may additionally comprise instructions at updater module 147 to continuously update portfolio values 520 with current equity prices available via exchanges or clearing systems for a plurality of users, wherein the current equity prices may be based upon equity market trends.

Continuing with FIG. 6, the second example transaction shown with elements 612-620 may illustrate, in contrast to the first example transaction, a return transaction having a timestamp 612 where the user may return an item, in this example, to Target. The user may sell or forfeit at least $0.22 worth of equity and/or rewards at element 614, or in some cases less than $0.22 worth of equity and/or rewards (if the share price has depreciated), and in some other cases more than $0.22 worth of equity and/or rewards (if the share price has appreciated), as part of a loyalty policy wherein returning money includes forfeiture and/or sale of equity. The total value of the item and/or items being returned may be displayed at element 616. A stock ticker symbol may be shown at element 618 for the business involved in the tracked transaction. At element 620 the transaction reward available to the user may be displayed. Loyalty policies of 144 may not depend upon returning equity and/or rewards, however, executing a return transaction may only entitle the user to a return of the transaction value less the value of the service charge and equity reward. However, as an example, loyalty policies of 144 may include forfeiture of rewards and/or equity wherein forfeit of equity may include transferring equity to platform account 136.

Continuing with FIG. 6, the third example transaction is shown with elements 622-630 and may illustrate a user receiving a dividend via dividend distribution 152. A clearing system 104 or payments system 150 may communicate with dividend distribution 152 to alert loyalty platform 108 that KROGER (KR) 628 is scheduled to payout dividends wherein a user 102 may receive payout per share (fractional or whole) of the dividend payout. In an example, a user 102 may receive $0.02 dividend based upon having an amount of KR equity in the user equity 130. In an example, a $0.02 dividend may be added to user funds 160 as monetary cash value deposited in the user account 172 of the loyalty platform 108. In another example, a $0.02 dividend may be automatically re-invested in fractional or whole shares of the company which paid-out the dividend. As a further example, a dividend payment may be automatically deposited in a bank and/or payments 150 where a user may have a checking or savings or monetary account. Dividend payouts may increase the portfolio value 520 of a user 102. The dividend distribution of the third example transaction may include a timestamp 622. The value of the dividend added to user funds 106 may be displayed at element 624. Additionally, GUI 600 may include element 626 to display the name of the business which is distributing the dividend. Element 628 may further include a stock ticker symbol of the business from which the dividend is distributed. Element 630 "DIVIDEND" may be a selectable user interface object which may bring up a dialog box providing information about the dividend provided for the third transaction represented by elements 622-630.

Finally, with FIG. 6, a fourth example transaction is shown with elements 632-640 and may illustrate, in contrast to the other examples, a tracked transaction wherein the user is not loyal to the merchant/business with which they conduct the transaction. Element 632 shows a timestamp for a tracked transaction executed by an example user at a business the user is not loyal to. At element 634, the GUI 600 may show a strikethrough (or otherwise indicated canceled) reward of $0.42 offered as a reward for the transaction 636 wherein the user may have spent $42.15 at WALMART, however, as the user is not loyal and has not made a loyalty selection to WALMART, the user may not receive the reward of $0.42. As a further example, element 638 may display a stock ticker symbol for the fourth example transaction. Element 640 may indicate rewards available if the user had selected loyalty to TGT (as provided by loyalty policies 144). Further, in some examples, if a reward is not applied for a transaction but the user thinks they are entitled to a reward for the transaction, the user may enter an input to alert the loyalty platform that the user may be entitled to a reward for a given transaction (e.g., because the user thinks an award was erroneously not applied). As an example, the user may have a loyalty selection to a given hotel group (e.g., hotel group A) and execute a transaction with a hotel within the hotel group (e.g., hotel B). However, because the name of the hotel may not match the name of the hotel group, the transaction may not be identified as reward-earning. In such an example, the user may provide an input alerting the loyalty platform that the transaction should qualify for a reward (e.g., because hotel B is part of hotel group A). In doing so, the loyalty platform may provide a mechanism for correcting missed rewards and the loyalty platform may then learn to correctly apply the reward in the future (e.g., the loyalty platform may update the loyalty policies to reflect that hotel B qualifies for a reward when a loyalty selection to hotel group A is made).

In some implementations, a settling period may be provided by the dividend distribution 152 between the allocation of shares and the eligibility to receive dividends. The settling period may be used to correct for situations where goods are purchased, then subsequently returned (e.g., the staggering allows for the system not to be tricked into giving away dividends too quickly while transactions are still pending (e.g., are still able to be cancelled)). The settling period may be varied with the exchange policies associated with particular platforms, merchants or goods. In some implementations, no settling period is included, for example, when the purchase is for services or "as is" or "final" sales.

Figure 7:
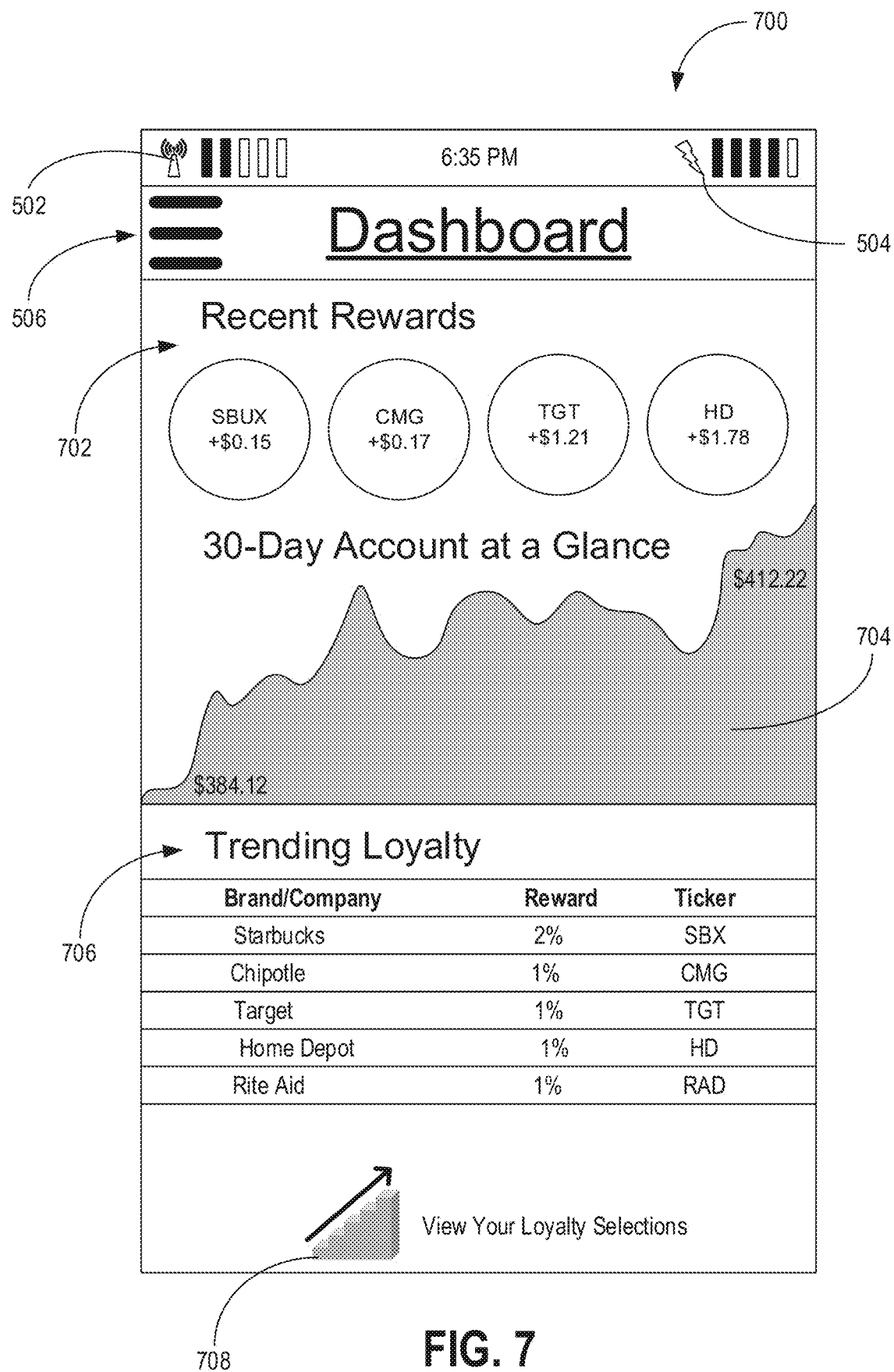
Figure 11:
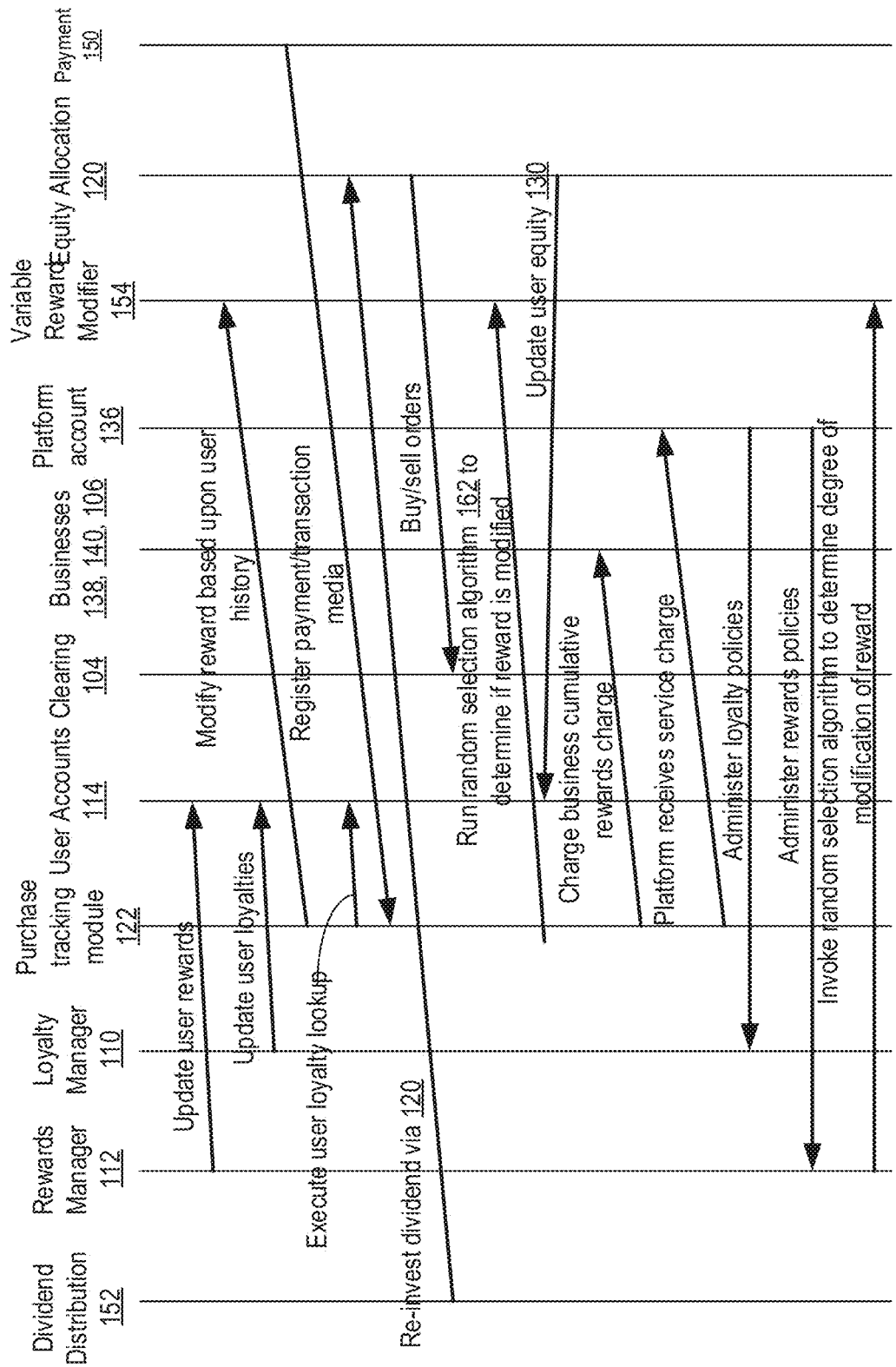
FIG. 11 shows an exemplary communication diagram of the loyalty platform

Turning to FIG. 7, an example Dashboard GUI 700 is shown which may present to the user at least recent rewards 702, a visual account summary 704, popular loyalty 706, and a link to Loyalty Selections (900 FIG. 9). Recent rewards 702 are shown depicting rewards which the user 102 may have recently earned via tracked transactions. GUI 700 also includes a visual account summary 704 showing a "30-day account at a glance" wherein the x-axis represents time and the line moving up and down along the y-axis represents account value for a user 102 and/or portfolio value 720. A table 706 shows brands/companies which have popular loyalty among a plurality of users 102, 116, 118, along with the respective rewards offered for those brands and their ticker symbols. Element 708 may be a selectable user interface element which directs the user to the loyalty selections (FIG. 11).

Figure 8:
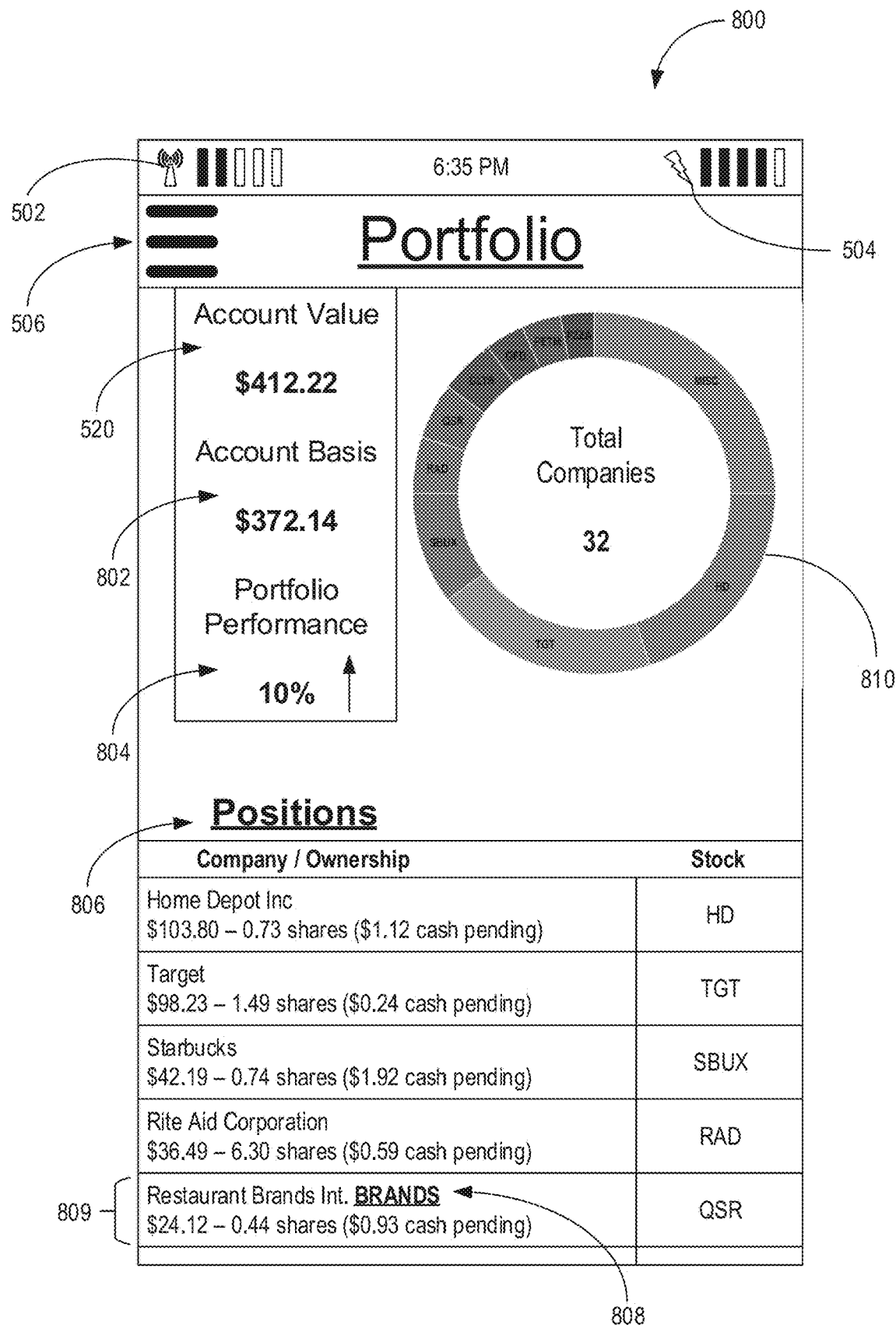

Turning to FIG. 8, an example user GUI Portfolio 800 is shown. As an example, as mentioned previously the account value 520 may be displayed for the user as well as an account basis 802. Account basis 802 may represent the amount of rewards accrued via tracked transactions for which the user has earned rewards. In an example, account value 520 may represent the adjusted value of the account due to appreciation or depreciation of equity and/or rewards in user equity 130 and user funds 160. Additionally, FIG. 8 may include an ownership GUI 810 which may provide an illustrated representing a make-up of user equity 130.

FIG. 8, furthermore, may include a table 806 including positions maintained by a user which may include a user's rewards and/or equity in different companies to which the user has made a loyalty selection. With entry 809 as an example, GUI 800 displays that the user may be assigned $0.44 shares in "Restaurant Brands Int." worth a market value of $24.12. Additionally, entry 809 as an example may include a cash pending notification. As an example, the cash pending notification may inform the user via GUI 800 within table 806 that a purchase of (fractional or whole) shares having a value of $0.93 is pending, the shares to be assigned to the user.

As a further example, GUI 800 may include 0.44 shares of Restaurant Brands Int. at element 808 within positions table 806 which may optionally include a multiple-company signifier, the "BRANDS" signifier 808 and/or interactive UI element 808 within the entry 809 in positions table 806. As an example, a user may make a loyalty selection to a brand and/or a company/business which owns many other companies. When a user makes a loyalty selection to a company/business which owns many other companies, the user may earn rewards in the name of the owning company/business when executing tracked transactions at the owned companies/businesses. In such an example, a user may receive rewards in a parent company, "Restaurant Brands Int." when shopping at any of the "BRANDS" 808. The user may select element "BRANDS" 808 to view the available companies/businesses with which a tracked transaction may earn the user rewards in the owning company (for example, "Restaurant Brands Int."). In a further example, any desirable UI element may be used for 808 (for example, image or text or combination image and text).

Turning now to FIG. 9, an example user loyalty selections GUI 900 showing available loyalty selections is shown. As an example, GUI 900 may provide a search function so that a user may perform a search for a company, business, and/or brand listed in the rewarding-business index, wherein the search may return the company, business, and/or brand and the user may select loyalty or switch loyalty (via selection of a loyalty-switch offer) to. As an example, the search function may return results from loyalty manager 110, specifically markets 156. Expandable UI elements 904 may be provided and upon selection may provide a list of businesses (for example, 907) in the markets 905, wherein the markets may segregate business by function, offering, primary sales, types of sales items, etc. or any desirable theme administered by the loyalty platform 108 via administrator account 158. Collapsible UI elements 906 may be provided to collapse a list 907 of businesses in an expanded market 908 (for example, where all business of the market are displayed, including businesses 916, 918, 920, 922, and 924). As an example, list 907 may include a highlighted UI element 911 to indicate a business/merchant to which the user may have selected a loyalty to. List 907 may include non-highlighted UI elements 913 having the same shape as UI element 911 to indicate businesses/merchants which the user may not have selected loyalty towards in the same market 908 as the business/merchant represented by 911 UI element. UI element 912 may be included to indicate business/merchant 924 which is not yet available for a user to select loyalty to (for example, may be pending approval via administrator account 158). As a further example, business/merchant 920, in an example "McDonalds", may include a "special offer" element 910 which may comprise a loyalty-switch offer. Furthermore, special offer element 910 may also include a help dialog 914 which may explain any loyalty-switch offer promotion terms or provide comparative information related to switching loyalties within a market. Additionally, as an example, special offer element 910 may provide current reward display 926 which may inform and/or display to the user the current reward which the user is entitled to via the loyalty selection made to a business/merchant in a market 905, 908.

Figure 10:
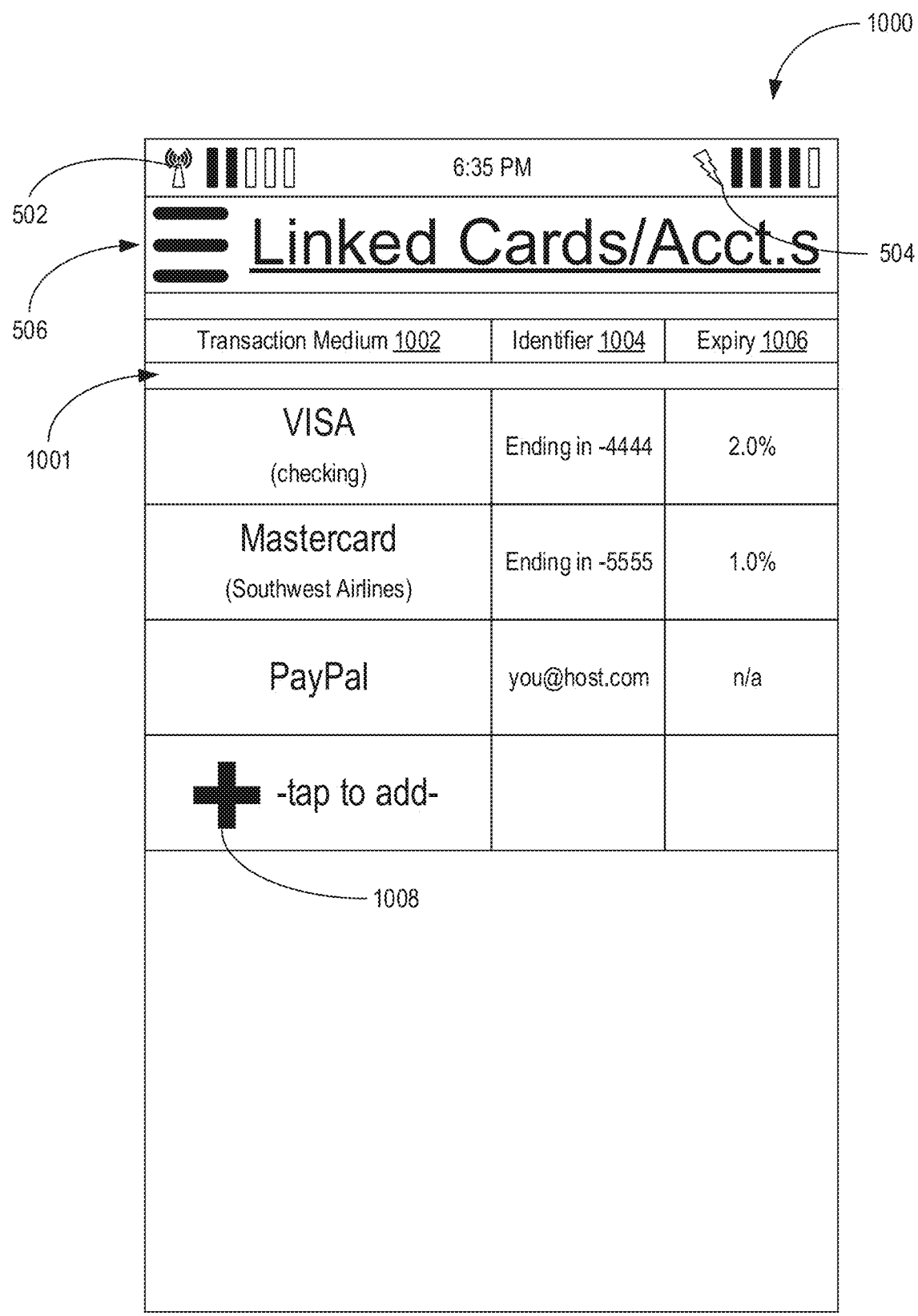

Continuing to FIG. 10, an example Linked Cards/Accounts GUI 1000 may include table 1001 which provides a summary for an example user account 172 representative of payment methods and media stored within payment medium storage 124. Table 1001 may include columns for payment medium 1002, Identifier 1004, and Expiry 1006. Column 1002 may include names or payment/payment media and with which transaction/credit enterprises the payment/payment media function. Identifier column 1004 may include identifiers for different payment media. Expiry column 1006 may include expiration dates for a plurality of payment media described in column 1002. GUI 1000 may include interactive UI element 1008 which may allow a user to include additional payment methods and/or payment media.

Referring now to FIG. 11, an example communication diagram 1100 is provided to provide further detail and clarity into the technical aspects of the reward program. Beginning with dividend distribution 152, when dividends are distributed by a company which a user has selected loyalty to, dividend distribution 152 may transfer those funds to equity allocation system 120 to re-invest the dividend value in the same position. In some examples, dividend distribution 152 may transfer dividend distribution funds to user funds 160, or in some cases, directly to payments 150 (e.g., a checking account).

Next, rewards manager 112 may update user rewards 128, comprising current rewards which the user may receive, of accounts 114 based upon any selected loyalties or loyalty switches to businesses. Additionally, if any reward policies 144 are modified or updated, rewards manager 112 may update user rewards 128 to include the most current rewards available.

Loyalty manager 110 may update user loyalties 126, comprising current loyalties which the user has selected. If any loyalty policies 142 are modified or updated, loyalty manager 110 may update user loyalties 126 to include the most current loyalty policies.

Purchase tracking 122, upon tracking a purchase between a user and a transacting business which the user has selected loyalty to, may trigger the variable reward modifier 154 to run the random selection algorithm 162 to determine if a normal reward may be modified. Additionally, the purchase tracking 122 may charge a transacting business a cumulative rewards charge and provide the equity allocation system 120 with the reward funds and an order to purchase shares (to purchase equity for the user in the transacting business) and provide platform account 136 with the service charge funds. As an example, when purchase tracking 122 receives a notification that a user has executed a transaction through a linked credit card, debit card, or other payment method (e.g., a tracked transaction), purchase tracking 122 may execute, or run a user loyalty lookup and query accounts 114 (specifically user loyalties 126) to determine if the user has selected loyalty to the transacting business. Purchase tracking 122 may confirm registration of payment methods with payments system 150 based upon payment method registration and/or linking further described herein with reference to FIGS. 15-32. As an example, a user may register with the loyalty platform 108 and provide access credentials to purchase tracking 122 to be stored within payment medium storage 124. Purchase tracking 122, as an example, may register with payments 150 by providing the credentials entered by the user upon registering with loyalty platform 108.

Next, platform account 136 may administer and modify loyalty policies 142 as desired by an administrator of loyalty platform 108. Additionally, platform account 136 may administer and modify rewards policies 144 as desired by an administrator of loyalty platform 108.

Next, equity allocation system may execute buy and sell orders with clearing system 104 based upon transaction information from purchase tracking 122. Additionally, equity allocation system 120 may update user equity 130 of accounts 114 when purchase tracking 122 provides equity allocation system 120 with the order to purchase shares in a transacting business that.

Figure 12:
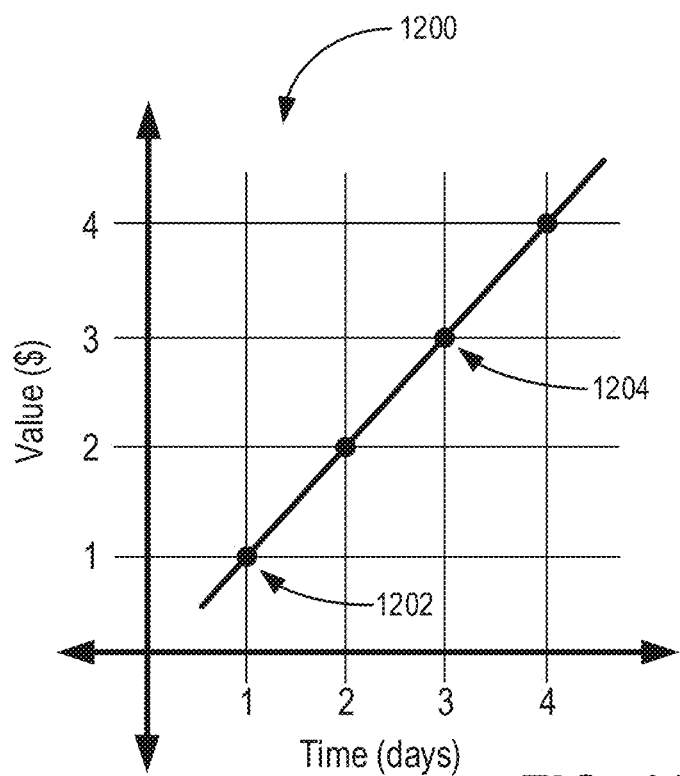
FIGS. 12 and 13 show examples of equity forfeiture as equity appreciates and depreciates.
Figure 13:
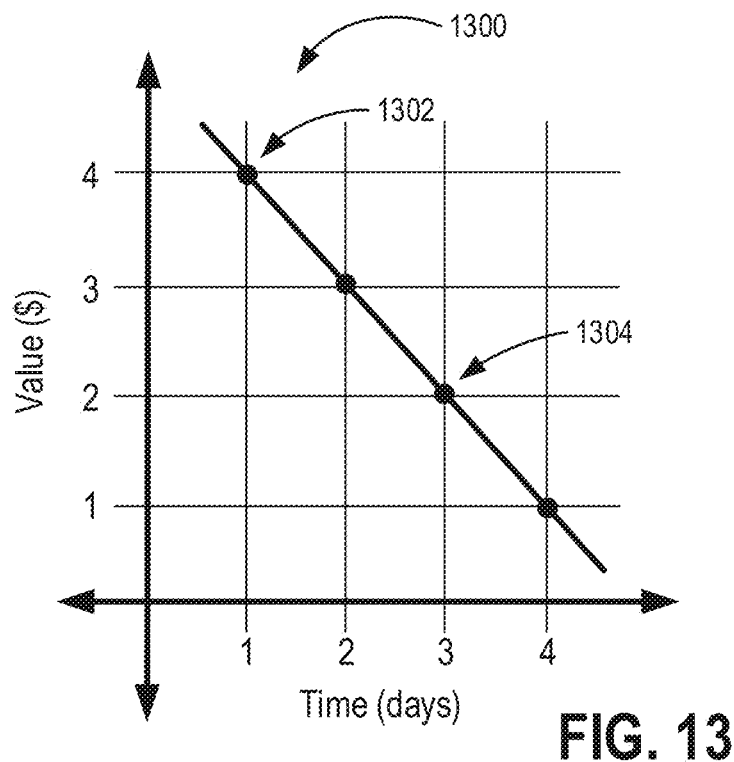

Proceeding to FIGS. 12 and 13, two exemplary graphs, 1200 and 1300, are provided to further illustrate and provide detail regarding forfeiture and sale of shares in the reward program. Referring to graph 1200 of FIG. 12, at 1202 a user may execute a tracked transaction at time 1 day wherein the value of the equity reward assigned to the user is $1 per share. As an example, the user may execute a transaction wherein the user spends $100 dollars. The user may be entitled to 1% equity rewards for the purchase and would receive $1 worth of equity or 1 share. Proceeding to day 3, wherein the value of the share may have appreciated to $3, the user may return the item at 1204 and forfeit the equity reward share, or the user may forfeit only the value of the share. In one example, the user may forfeit the same amount of equity given to the user as a reward on day 1, for example the user was assigned one share and must forfeit one share despite the increase in value on day 3. In another example, the user may forfeit only the value of the share, for example, the user was rewarded with one share on day 1 worth $1, which then on day 3 is worth $3, and as such, the user would only need to return a fraction of the share, for example, ⅓ of a $3 share (the value of the share they were assigned on day 1), due to the appreciation of the equity while assigned to the user.

In another example, the user may elect to sell the shares at 1204 and may execute a sell order via the sell module 178 of the equity allocation system 120. In such an example, the user may earn $2 due to appreciation of the stock price and the total appreciated reward of $3 may be added to user funds 160.

Proceeding to FIG. 13, a contrasting situation may be presented at graph 1300. On day 1, a user may execute a tracked transaction at 1302, spending $400 at a business with which the user has selected a loyalty and is eligible to receive 1% equity rewards. On day 1, the user may spend $400 and receive $4 in equity rewards, and as the value of the share is $4, the user may receive 1 share in the business. By day 3, however, the value of the equity has depreciated to $2 a share and the user may execute a return of the $400 goods at 1304. In such a return example, where the value of the equity has depreciated since the assignment of equity, the user may have to forfeit the whole share, though it may only be worth $2. In another example, if the user has been assigned additional equity in previous purchases, additional equity may also be forfeited in order to fulfil a forfeiture of $4 of equity rewards as the user received on day 1 of 1300 at 1302.

In another example, the user may elect to sell the shares at 1304 and may execute a sell order via the sell module 178 of the equity allocation system 120. In such an example, the user may lose $2 due to depreciation of the stock price and the total reward of $2 may be added to user funds 160.

In a further example, a user may not be assigned shares until a return period is over, such that, equity rewards may not be executed until a user may no longer return an item. In a further example, any forfeited shares may be sold via the clearing system 104 or assigned to the platform account 136 of loyalty platform 108.

Figure 14:
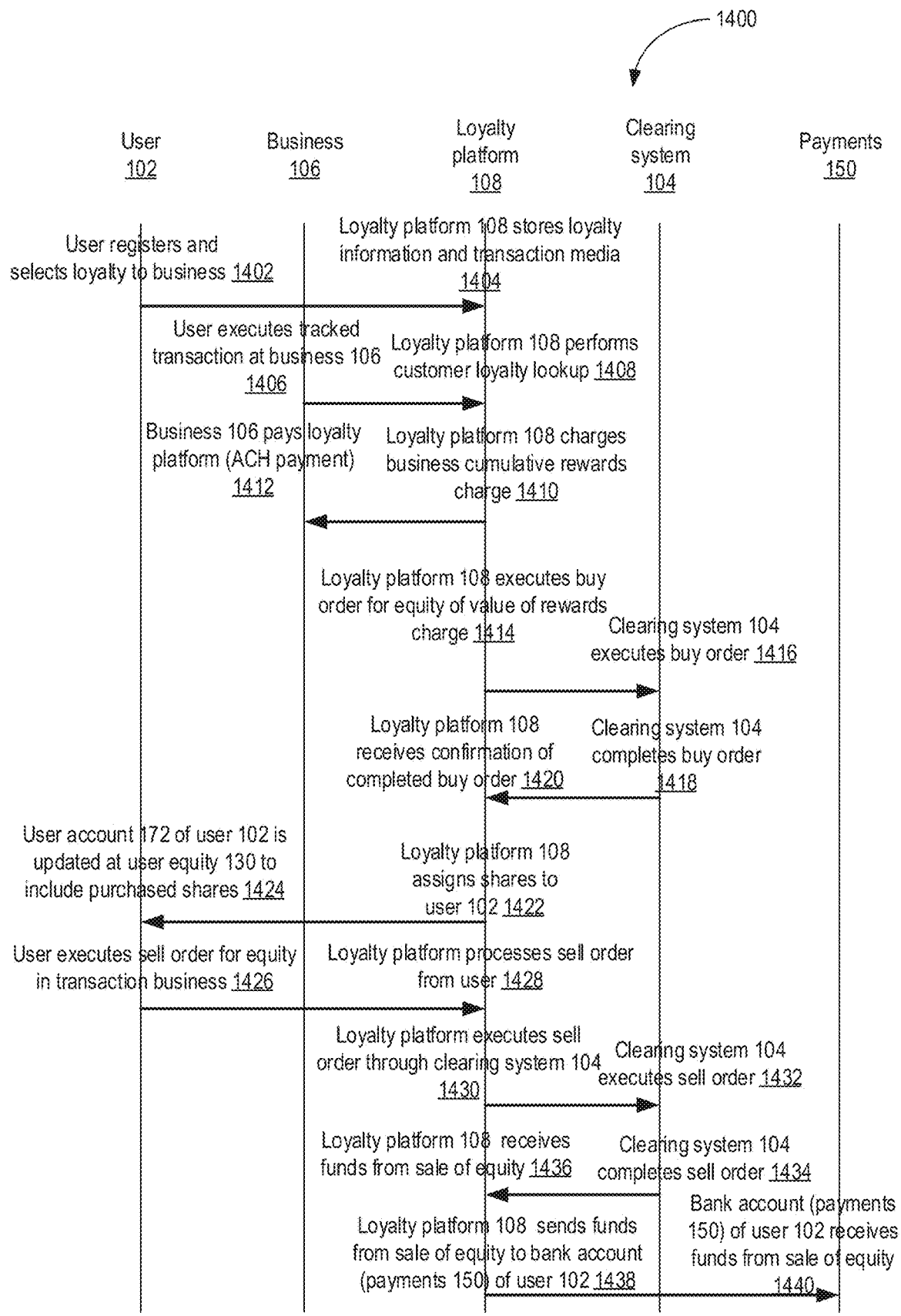
FIG. 14 shows an example communication diagram illustrating example information sent and/or received among computing devices associated with the loyalty platform.

Turning now to FIG. 14, an example communication diagram illustrating communication between loyalty platform 108, business 106, user 102, clearing system 104 and payments 150. Beginning with 1402, a user may register with loyalty platform 108 and select loyalty to an example business 106. At 1404, the loyalty platform may store any loyalty information and payment media information related to banking accounts, credit cards, debit cards, online payment methods, or otherwise. At 1406, a user may execute a tracked transaction with a tracked payment media (tracked by loyalty platform 108) and the loyalty platform may then, at 1408, perform a user loyalty lookup to determine if the user has selected loyalty to the business and to determine the reward associated with selected loyalty to the business based upon reward policies 144. In an example, the user has selected loyalty to the business (where they made the transaction) and at 1410 the loyalty platform 108 then charges the business a cumulative rewards charge. At 1412, the business pays the loyalty platform 108 (for example, via ACH) the amount of the cumulative rewards charge. At 1414, loyalty platform 108 executes a buy order through the clearing system 104 where the buy order has a value of the rewards charge (cumulative rewards charge minus the service charge) for equity in the business. At 1416, the clearing system 104 executes the buy order. At 1418 the clearing system 104 completes the buy order and at 1420 the loyalty platform 108 receives confirmation of the completed buy order. At 1422, loyalty platform 108 assigns shares to user 102 having value of the rewards charge. At 1424, a user account (such as user account 172) or user 102 is updated (user equity 130) to include purchased shares.

At 1426, in an example, a user may decide to execute a sell order for the equity rewards previously received. At 1428, the loyalty platform 108 may process a sell order from the user and then, at 1430, the loyalty platform 108 may execute a sell order through clearing system 104. At 1432, clearing system 104 may execute sell order and at 1434, the clearing system may complete sell order and send funds from sale of equity to loyalty platform. At 1436, the loyalty platform may receive funds from sale of equity and then, at 1438, send the funds from the sale to bank account, checking account, or desired payment method (payments 150) of user 102. At 1440, payments 150 associated with user 102 may receive funds from the sale of equity.

Figure 15:
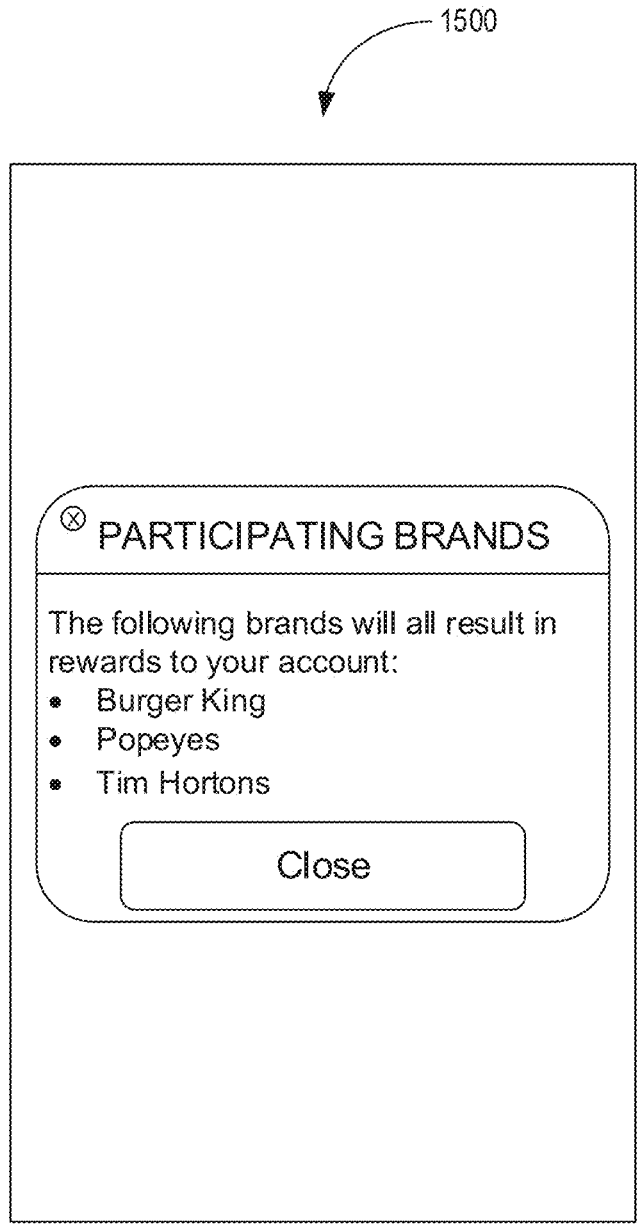
FIGS. 15-16 show example graphical user interfaces of the loyalty platform.

FIG. 15 shows an example Portfolio GUI 1500 which may be an updated Portfolio GUI 800 of FIG. 8. As shown in FIG. 8, element 808 (the "BRANDS" signifier) may be a selectable UI element, which, when selected by a user may bring up a Participating Brands dialog box, as shown in FIG. 15. A Participating Brands dialog box may include information about which businesses are bundled into a brand and which businesses an example user may execute transactions with in order to receive rewards. As an example, and as mentioned above, brands may be a collection of businesses which a user may select loyalty to. By selecting loyalty to a brand, a user may earn rewards when executing transactions with any of the businesses of the brand to which they have selected loyalty.

Figure 16:
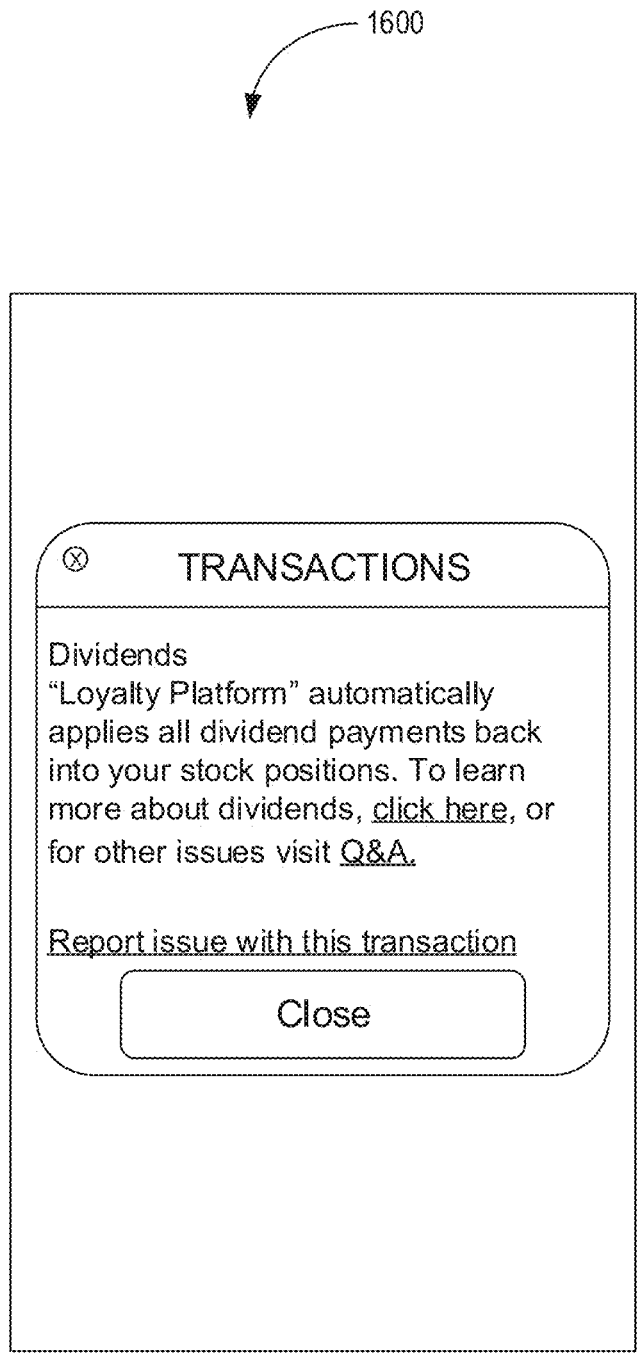

FIG. 16 shows an example Transactions GUI 1600 which may be an updated Transactions GUI 600 of FIG. 6. As mentioned above with reference to FIG. 6, element 630 "DIVIDEND" may be a selectable UI object, which, when selected by an example user may bring up a Transactions dialog box, illustrated in GUI 1600. The Transactions dialog box may include information regarding policies of the dividend distribution 152 and further information about how funds from dividends are handled. As a further example, any elements from FIG. 6 GUI 600 such as reward descriptions 610, 620, 630 and 640 may be selectable UI objects which, when selected by a user, may bring up the Transactions dialog box which may include any appropriate information regarding the reward with which that reward description may be associated.

Figure 17:
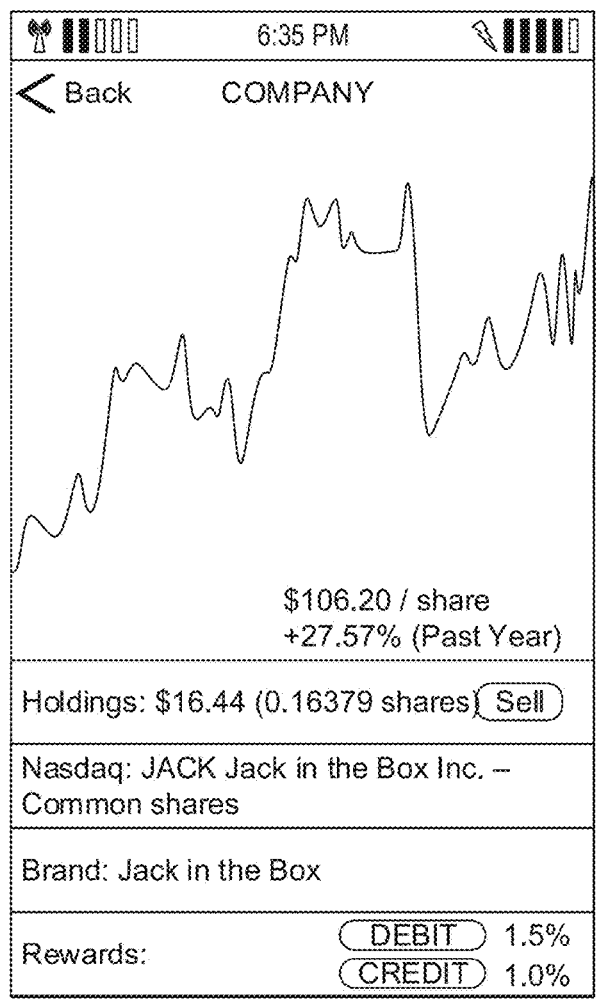

Next, FIGS. 17-21 may depict an example sell process. Turning first to FIG. 17 an example Company GUI 1700 is shown. A user may access a Company GUI 1700 by selecting a business name displayed via another GUI, such as any of the GUIs illustrated herein that include a business displayed thereon. Company GUI 1700, as an example, may include a graph showing the business's stock price over time, equity held by an example user, a Sell button, a stock ticker symbol (e.g., JACK for JACK IN THE BOX INC.), a brand to which the business belongs, and the available rewards. The Sell button may be a selectable UI object which, upon selection by the user, may bring up a first Sell Shares dialog box further shown in FIG. 18.

Figure 18:
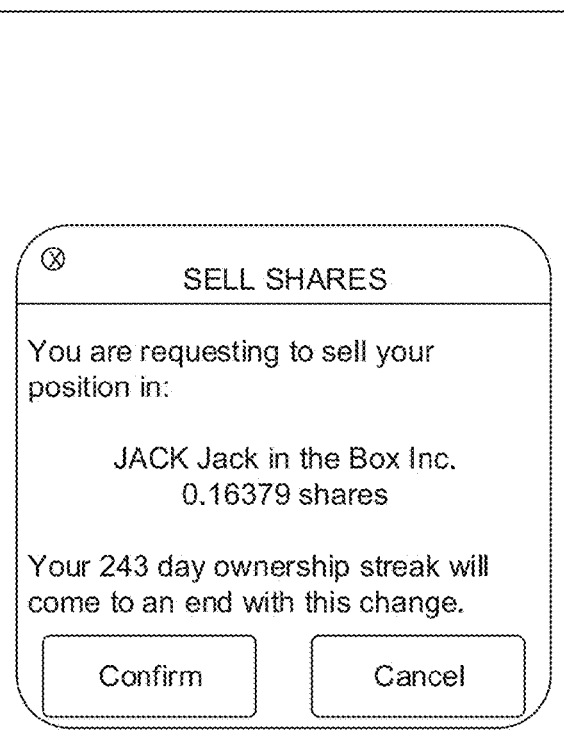

Turning next to FIG. 18, an example first Sell Shares dialog box 1800 is shown. Sell Shares dialog box may include "Confirm" and "Cancel" selectable UI objects which an example user may select in order to, respectively, sell a position in JACK or cancel a sale in JACK. In some cases, according to certain loyalty policies, a user may be forced to sell all equity in a position, while according to other loyalty policies, a user may be allowed to modify the number of shares the user wishes to sell in the position. The first Sell Shares dialog box may additionally include a loyalty notification which may inform a user that an ownership streak will come to an end if they sell all equity in a position. In an example, the ownership streak may be a length of time that a user has ownership in a position, or business. As an example, rewards policies may track ownership streak and based upon increasing ownership streak, a user may receive increased rewards. In an example, a user may select the "Confirm" selectable UI object and the sell module 178 of equity allocation system 120 may begin to execute the sell process with clearing system 104. Further, in some examples, a "Sell Program" selectable UI object may be presented (or another suitably titled selectable UI object) that, when selected, executes a sale of shares associated with a merchant program, which may include shares of stock in more than one company (e.g., rather than individual stocks). For example, a bank may have a first merchant program (through the loyalty platform) that rewards 1% of all transactions on a specific credit card with a pro-rata split of 3 stocks (e.g., stocks A, B, C). A user may earn $10 in each of the 3 stocks. The user may also participate in a second merchant program (via the loyalty platform) where 100% of the reward is in stock A, and thus the user has a total of $20 in stock A, and $10 each in stocks B and C. Selection of the "Sell Program" object (and corresponding indication of the first merchant program) may trigger sale of only the $10 in stock in each that were accumulated via the first merchant program (thus causing $10 of stock in each of the stocks A, B, and C to be sold while keeping the remaining $10 of stock A). In other examples, a request to sell a stock (e.g., stock A) may result in the selling of all shares of that stock regardless of how that stock was earned (e.g., all $20 worth of stock A may be sold).

Figure 19:

Turning now to FIG. 19, an example second Sell Shares dialog box 1900 is shown. The second Sell Shares dialog box may include a confirmation that the sell order has been received as well as a confirmation of the number of shares being sold. The second Sell Shares dialog box may include a "Close" selectable UI object, which, upon a user's selection, may return the user to an updated Company GUI 1910.

Figure 20:
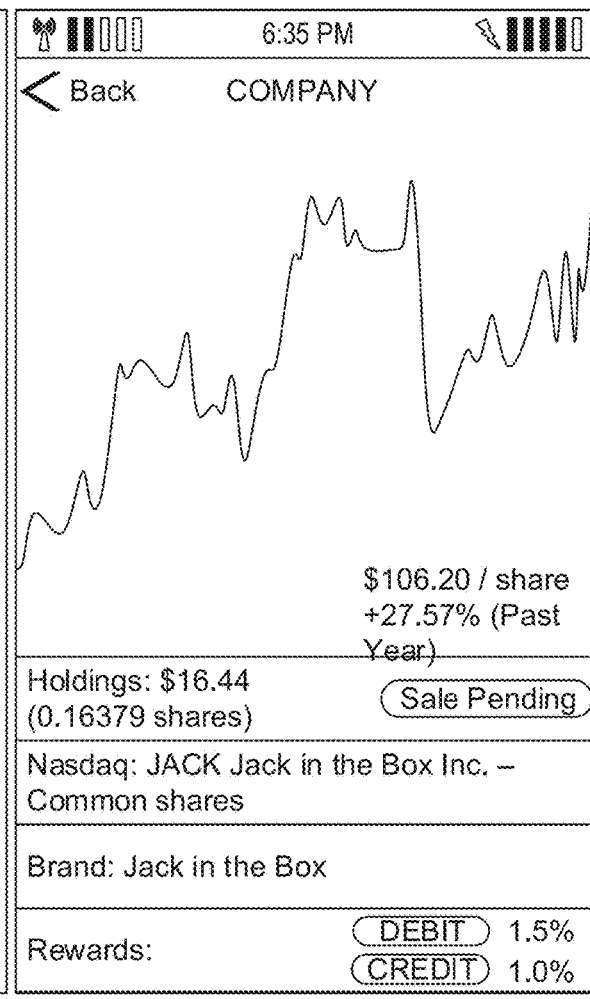

Next, at FIG. 20 the updated Company GUI 1910 is shown where the Sell button has been replaced with a Sale Status indicator which may read "Sale Pending". The Sale Status indicator may be a selectable UI object which a user may select to make modifications to the sell order. Selecting the Sale Status indicator may then bring up a third Sell Shares dialog box.

At FIG. 21, the Updated Company GUI 1920 is shown with the third Sell Shares dialog box shown over updated Company GUI 1910. The third Sell Shares dialog box may include a "Cancel Pending Sell Order" selectable UI object which, upon a user's selection, may cancel a pending sell order, in this example, for shares in JACK. The third Sell Shares dialog may also include a loyalty notification which may inform a user that an ownership streak will come to an end if they sell all equity in a position. In an example, the third Sell Shares dialog window may include an "X" selectable UI object, which, upon a user's selection, will close out of the third Sell Shares dialog window and return the user to Updated Company GUI 1910. Once clearing system 104 is able to execute the sell order, the loyalty platform 108 may receive funds from the sale of shares from clearing system 104 and deposit them in user funds 160.

At FIG. 22, an example Bank Transfer GUI 1930 is shown. The Bank Transfer GUI may include an available cash balance (available funds in user funds 160), an entry field for a user to enter a transfer amount, a bank snapshot, a switch bank option, and a "Next" selectable UI object. As an example, an available cash balance may be determined from available funds in user funds 160 by accounts 114. In another example, the entry field may be a field where a user may enter the amount of funds the user wishes to transfer from user funds 160 to payments system 150 e.g., a bank, checking account). The bank snapshot, as an example, may provide any applicable identifying information relating to the example user's account at payments system 150. The switch bank option may bring up a dialog for a user to select a different payments system to receive the bank transfer. The "Next" selectable UI object may bring up a confirmation window, upon a user's selection, in order to confirm the bank transfer and transfer the amount of funds entered into the entry field from user funds 160 to the appropriate payments 150.

Thus, the loyalty platform as described herein provides a technology-based solution to address multiple issues associated with the administration of purchase-based customer rewards, including inefficient and delayed reward administration, time-consuming and redundant user integration with rewards programs, lack of promotion of brand or company loyalty, and other issues. The loyalty platform may include a particular combination of elements executing specific rules or steps in order to address these issues, including a purchase tracking module, user accounts, loyalty manager, rewards manager, an equity allocation system, and a rewarding-business index. The loyalty platform may execute a sequence of events/steps that address these problems associated with traditional rewards programs. For example, as described above, the loyalty platform may store a single user account for each registered user, where each account includes that user's loyalties (which may include loyalty selections for multiple businesses). In doing so, the functioning of the loyalty platform may be improved by reducing storage (e.g., relative to other platforms that may maintain separate accounts or profiles for each user and each business of each user, thereby resulting in multiple accounts for each user) and/or reducing the processing demands of the loyalty platform and the loyalty platform's contribution to network traffic (e.g., because the loyalty platform can assess each user's selected loyalties without having to query individual businesses or external reward administrators). Additionally, the configuration of the loyalty platform (e.g., the user loyalties saved to the user accounts, the purchase tracking, and the organization of the different businesses into the different markets on the rewarding-business index) and the specific sequence of events as provided in the methods described herein allows for the loyalty platform to provide "exclusionary" loyalty selections that prevent a user from receiving rewards via the loyalty platform from multiple businesses in the same market, thereby promoting customer loyalty. The configurations and methods described herein differ from routine and conventional steps or events normally conducted to administer rewards. For example, some typical rewards may be administered based on POS systems notifying rewards administers when a qualifying transaction has occurred, which may increase network traffic and processing burden on the reward administer devices, limit which types of transactions can be identified, and causes the system to be vulnerable to individual POS system malfunctions. Further, some typical rewards administration systems may be limited to only a single business (e.g., a grocery store may administer its own, individual reward program), which may make it technically challenging to attempt to monitor a given user's transactions with other businesses, offer targeted loyalty switch offers, and exclude a given user from receiving rewards from multiple, competing businesses. Further still, typical reward administration systems that do consolidate multiple different reward programs/different businesses for a given user may still maintain/interface with separate business-specific rewards programs and accounts, which may make the systems onerous and expensive to administer. In some examples, the loyalty platform as described herein may provide a single brokerage account for each user with multiple "sources" to fund the account. For example, a single user can have a loyalty platform brokerage account (also referred to herein as a user account) and be rewarded as indicated herein (e.g., when a transaction is executed at a company to which the user has selected loyalty to). Further, that user may participate in other "programs" that are sponsored by brands or banks, and the user may get rewarded from those programs, all funneling into the same loyalty platform brokerage account. For example, the user may sign up for a new bank account with a bank that offers an optional way to earn stock rewards via the loyalty platform. If the user is new to the platform, the user may get the bank account, and then register with the loyalty platform. IF the user already has an account with the loyalty platform, the user may add that bank program, now creating two different sources of rewards (one from using the loyalty platform and one from the reward rules for the bank partner). This may allow the user to maintain rewards from multiple programs, even those not administered by the loyalty platform, in one single account, which may lower network traffic, increase data security, etc. As another example, the user may be a big coffee drinker and may be part of an established coffee loyalty program. The user may be rewarded by the coffee loyalty program (e.g., with 500 points), and can use those points to get free food and drinks at the coffee company, or the user may convert those points to stock in the coffee company.

An additional embodiment directed to systems and methods for a loyalty platform which enables privately held companies (PHCs) to reward users with success-linked crypto assets based on tracked purchases and user loyalty selections is described below with respect to FIGS. 23A-33. The success-linked assets may increase or decrease in value based on the revenue (or other metrics) of the associated PHC, thereby fostering long term user loyalty by enabling the user to build wealth as accrued rewards increase or decrease in value based on the success/revenue of rewarding PHCs.

Figure 23A:
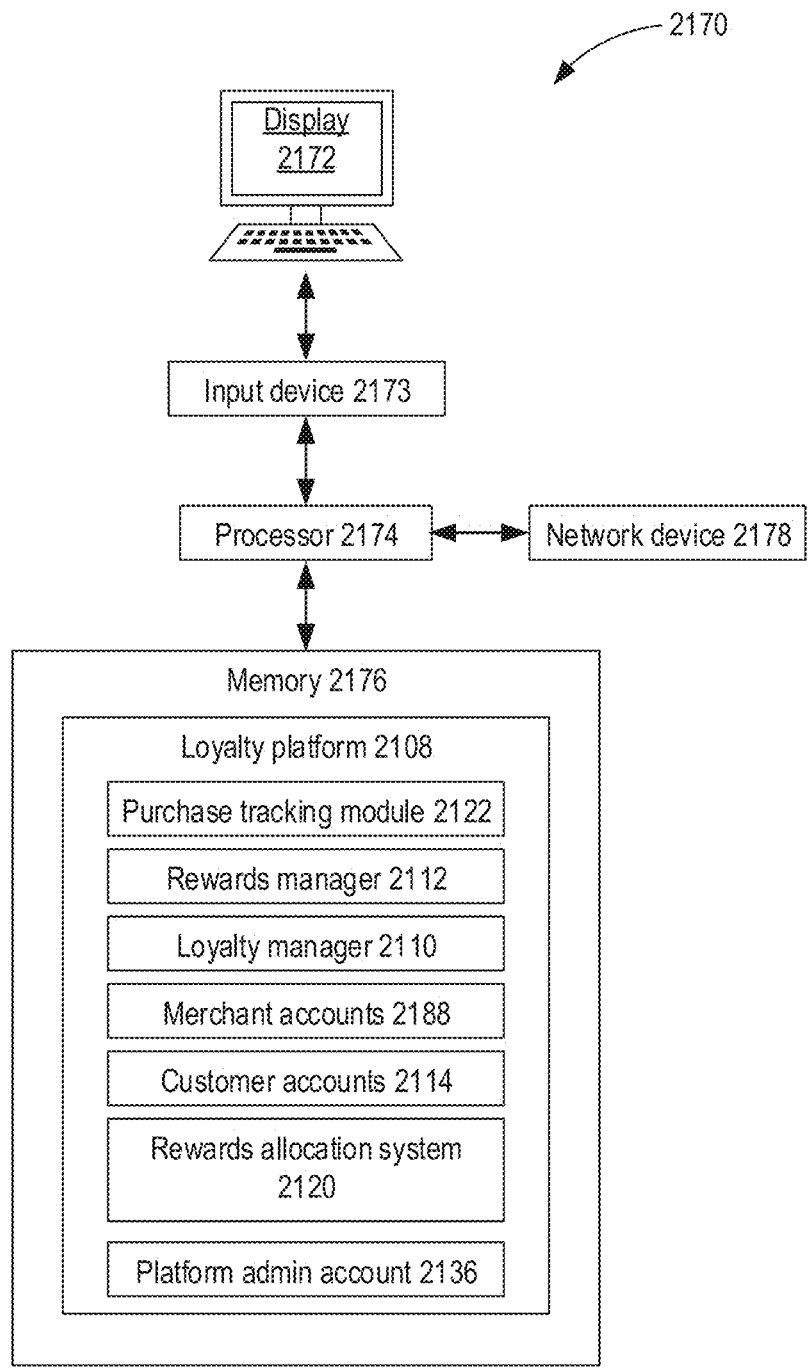
FIG. 23A shows an example of a computing system.
Figure 25A:
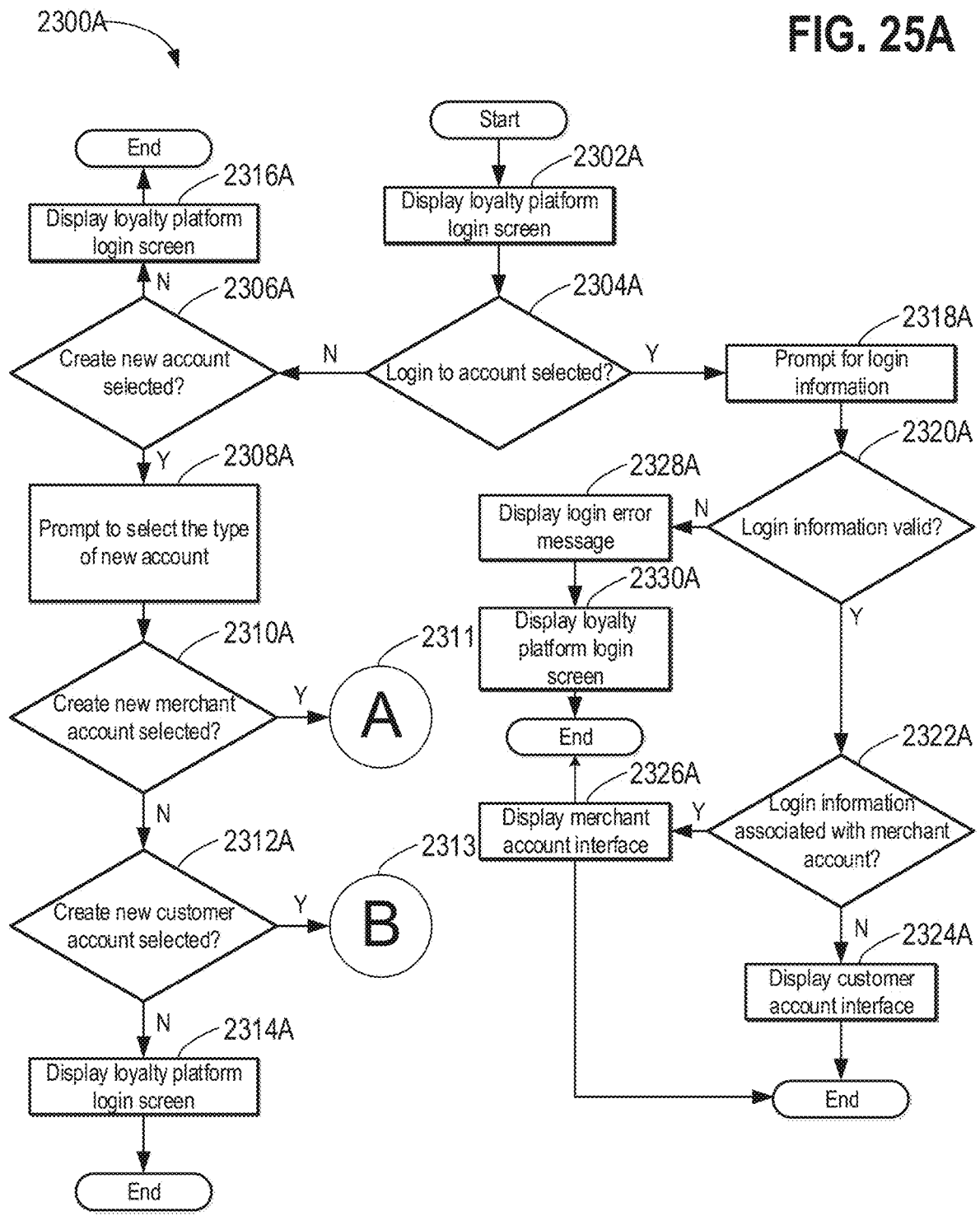
FIGS. 25A, 25B, and 25C show flowcharts of example methods for creating merchant or user accounts on a loyalty platform.
Figure 25B:
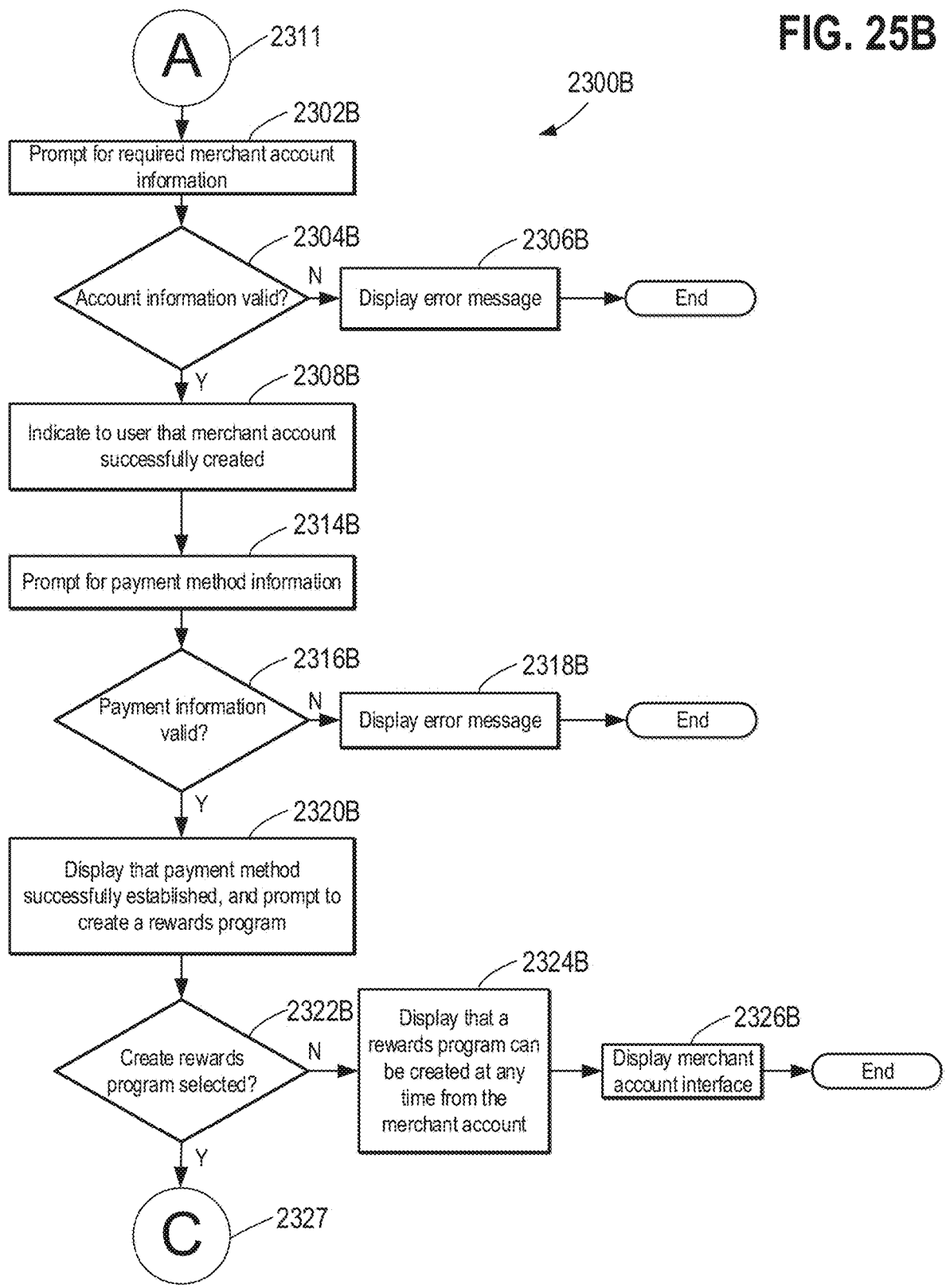
Figure 25C:
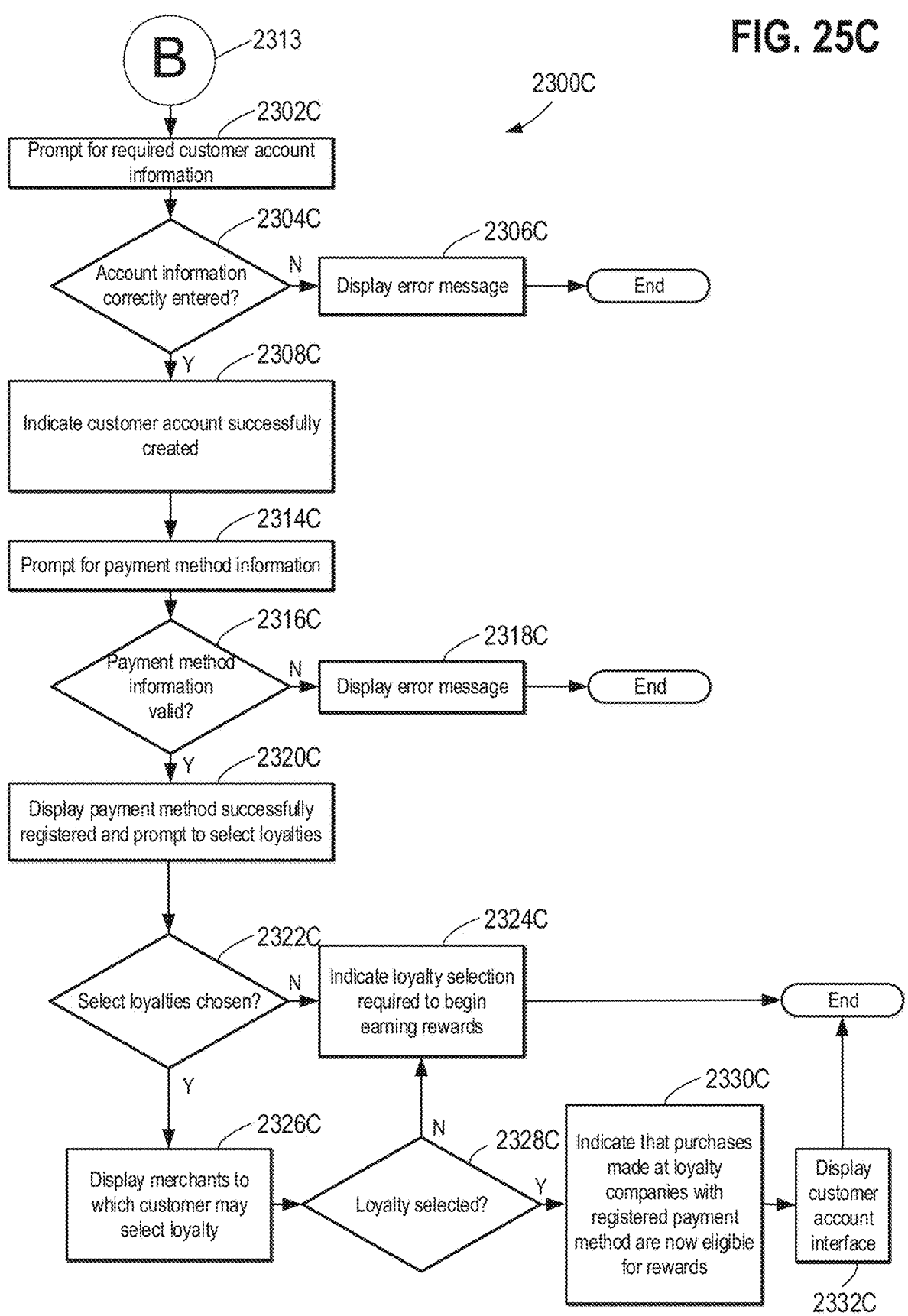
Figure 25D:
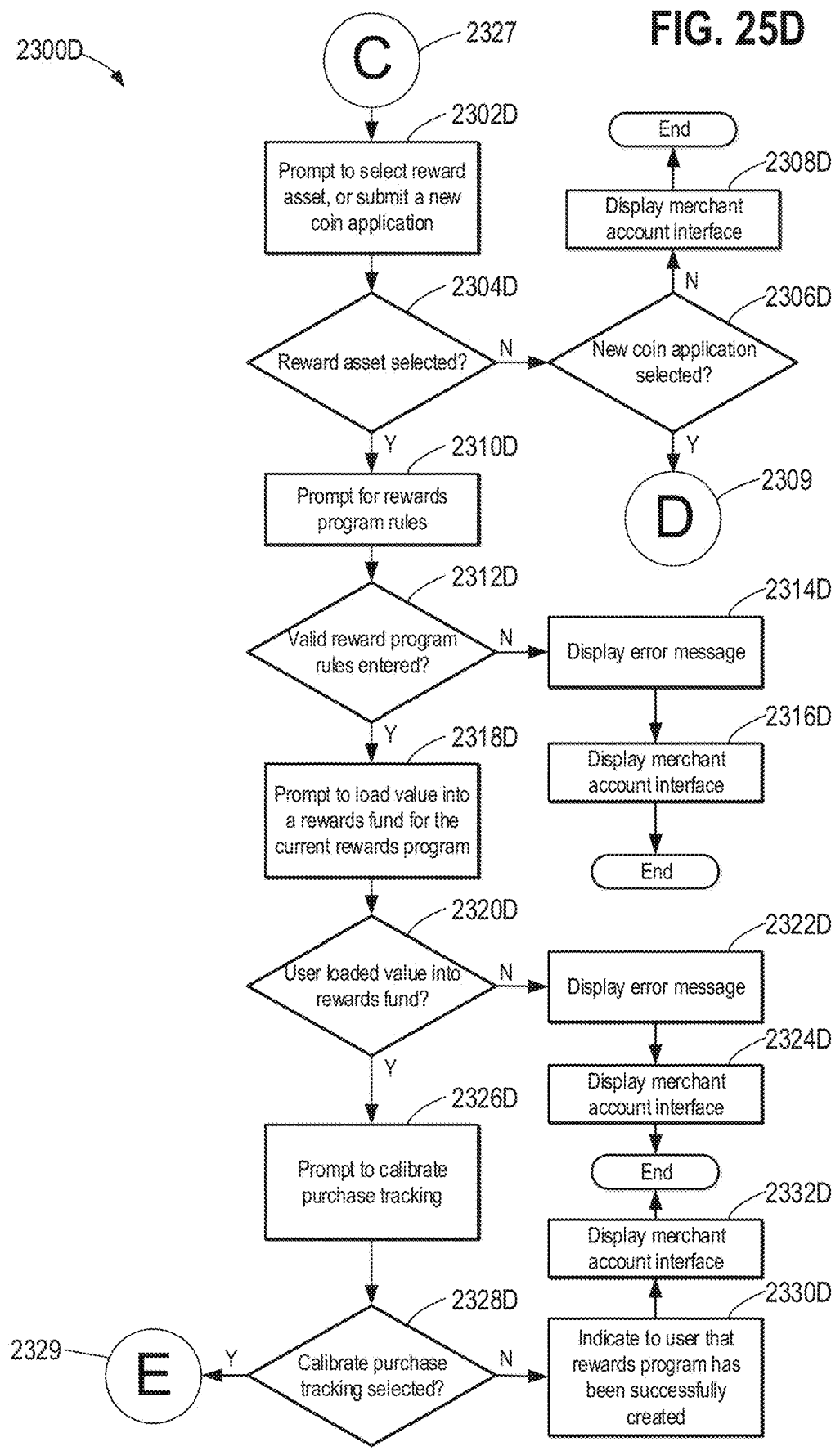
FIGS. 25D, 25E, and 25F show flowcharts of example methods for creating a rewards program using a loyalty platform.
Figure 25E:
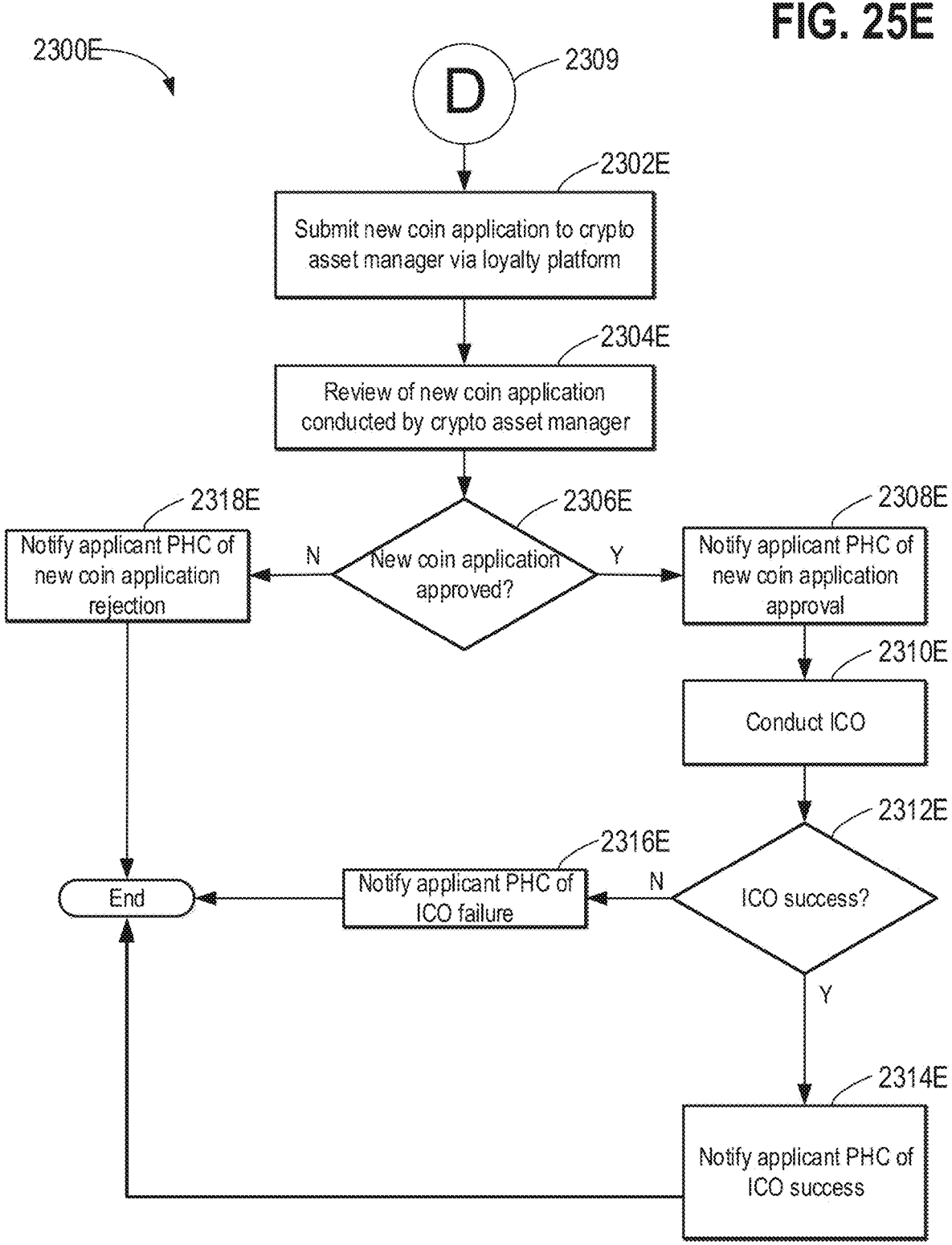
Figure 25F:
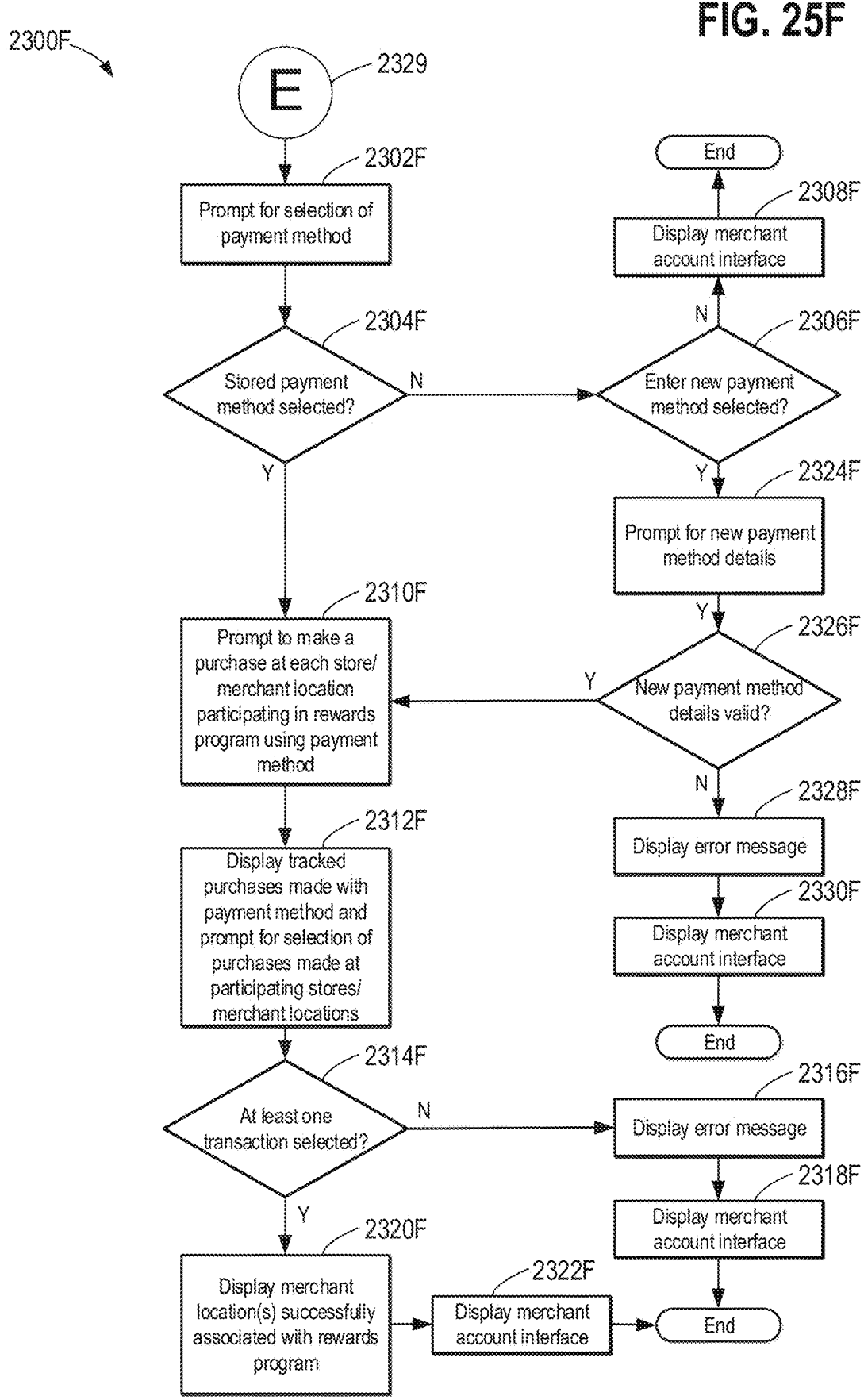
Figure 26B:
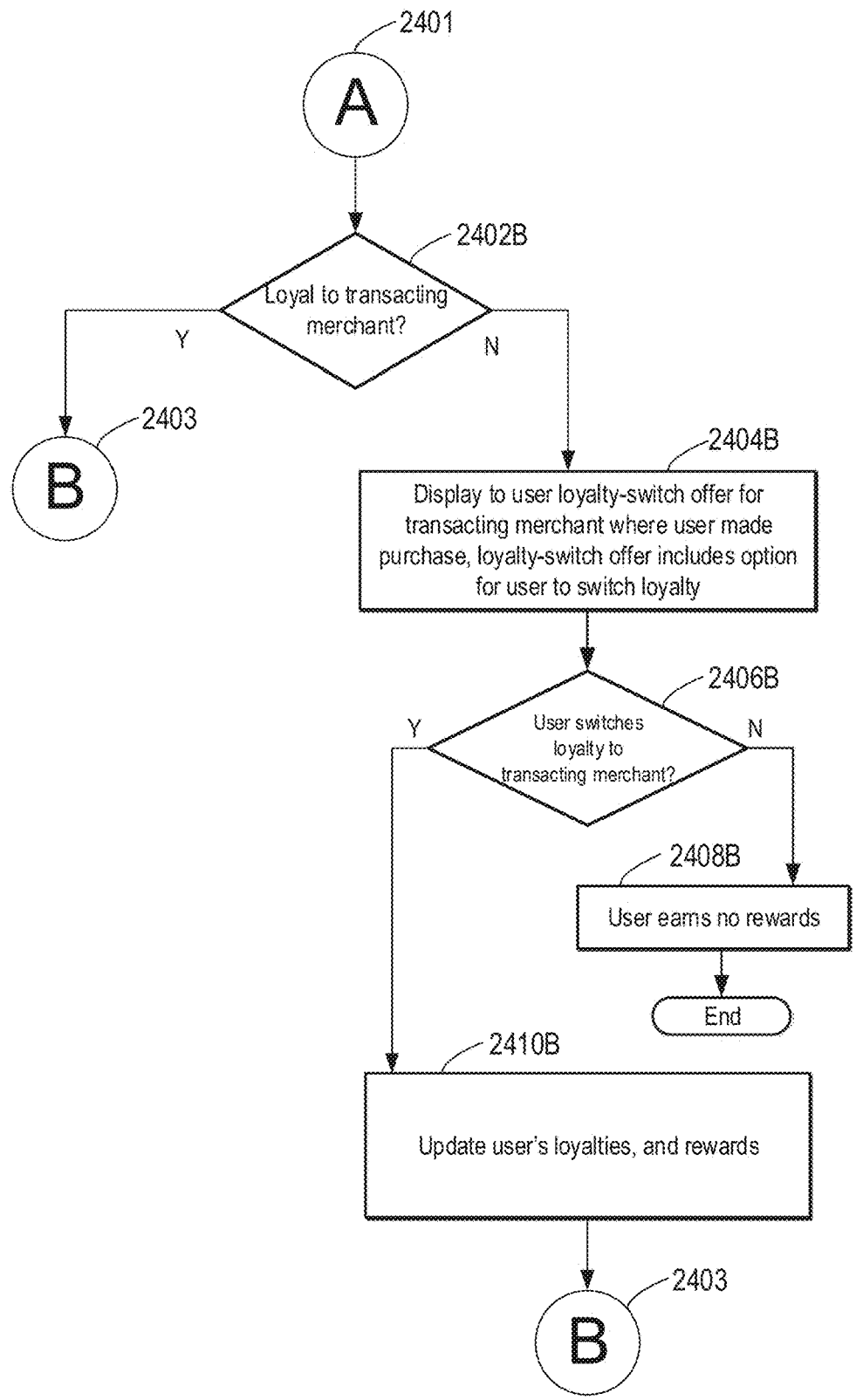

A general shortcoming of conventional rewards programs is a lack of lasting relationship or equity built with each interaction that creates mutual alignment of interests. The user may receive a discount, or possibly aggregate points towards some future reward, but the merchant and the user do not have a symbiotic vested interest in the success of the company. A computing system, an example of which is shown in FIG. 23A, may include memory with instructions stored therein for carrying out the functions of a loyalty platform, such as that shown in FIG. 23B. The loyalty platform may enable PHCs to establish increased long term user loyalty, as well as mutual alignment of interests with its customers, by providing success-linked assets to users as rewards for certain behaviors, such as purchasing goods or services from the PHC. In one example, the success-linked asset rewarded to users of a PHC may include equity in a publicly traded company, or a commodity, the price of which is correlated with the success or revenue of the PHC. In another example, the rewarded success-linked asset may include a cryptocurrency or other crypto asset which may increase in value based on the revenue or success of the PHC, or group of PHCs, with which the crypto asset is associated. FIG. 24 shows a high level flowchart of an example process by which PHCs and users of the PHC may create accounts on a loyalty platform, which enables distribution of the success-linked rewards based on eligible user purchases made at participating PHCs. PHCs may create an account on the loyalty platform, an example of which is shown in more detail in FIGS. 25A and 25B. Once the PHC has created an account on the loyalty platform, said PHC may create an equity rewards program to increase user loyalty. An example method by which a PHC may create a rewards program using the loyalty platform is shown in FIG. 25D. As part of the process of rewards program creation, PHCs may request issuance of a new crypto asset. The value of the success-linked crypto asset may be associated with said PHC (or a class of PHCs) and the success-linked crypto asset may be designed to increase in value based on operation of a deflation mechanism, wherein the deflation mechanism may operate in proportion to the success or revenue of the PHC, thereby coupling PHC success/revenue with the value of the success-linked crypto asset. Success-linked crypto assets may herein be referred to as equity-like rewards, as, similar to shares of stock in a business, success-linked crypto assets may increase or decrease in price based on performance of an associated business. Rewarding users with the success-linked crypto asset may more efficiently align user interests and loyalty with the PHCs providing the rewards. An example of a process by which a PHC may request creation of a success-linked crypto asset is shown in FIG. 25E. Additionally, FIG. 25F shows an example method by which PHCs may increase the accuracy with which eligible purchases made by users are linked with the rewards programs of the PHCs, thereby increasing the efficiency and accuracy of rewards distribution. FIGS. 26A-26C show an example of how the purchase tracking module of the loyalty platform tracks user purchases, links the user purchases to reward programs of rewarding PHCs, and transfers success-linked assets from linked rewards programs to user accounts based on the tracked purchases. In this way, increased user loyalty to PHCs may be enabled via a success-linked asset rewards program operated through a loyalty platform. The methods discussed above, and given in more detail below, may be stored in non-transitory memory of a computing system, and executed by a processor of the computing system. An example of one such computing system is given below.

In one example, the disclosure provided herein provides for a method including: receiving a loyalty selection from a user, the loyalty selection comprising a selection of a privately held company listed in a database of a loyalty platform in order to receive a success-linked crypto asset associated with the selected privately held company; matching a user purchase with the privately held company by correlating details of the user purchase with the database of the loyalty platform using a calibrated purchase tracking module; determining an amount of success-linked crypto assets based on a monetary value of the user purchase, a user transaction history, and one or more reward policies; distributing the amount of success-linked crypto asset to a user account of the user; and displaying the amount of success-linked crypto asset distributed to the user account.

In another example, a privately held company may create a rewards program with a loyalty platform, the platform automatically tracking user purchases made at the privately held company, and rewarding the user for making the purchases by allocating an amount of an equity-like asset selected by the privately held company to an account of the user on the loyalty platform. The amount of the asset awarded may be based on the purchase amount, the rules of the rewards program as established by the privately held company, and the user loyalty selections.

In one example, the user may be rewarded with an amount of an asset based on a loyalty selection to the privately held company (e.g., represented by a loyalty level). The asset awarded to the user may increase or decrease in price over time based on the success or revenue of the privately held company (and is herein also referred to as a success-linked asset, or success-linked crypto asset), such that the user may have a vested interest in the success of the privately held company due to the correlation between the success of the company and the price of the user's accrued success-linked asset.

In a further example, the success-linked asset may be a crypto asset with a built in deflation mechanism, wherein the deflation mechanism may cause the monetary value of the asset to correlate with revenue of one or more associated privately held companies. The deflation mechanism of the success-linked crypto asset may include a buy-back-and-burn mechanism, wherein a portion of each eligible purchase made at the privately held company goes to buy back a portion of the total supply of the crypto asset, and then burn this portion (immutably remove this portion of the crypto asset from circulation), thereby reducing the total supply and increasing the value of the remaining crypto asset. In another example, the deflation mechanism may include a commodity or security backing process, wherein a portion of each eligible purchase made at the privately held company is used to buy a commodity or security for which the success-linked crypto asset represents ownership. Thus, as more eligible purchases are made at the privately held company, the amount of commodity, or security, backing the crypto asset, and for which the crypto asset may be exchanged, may increase. In this way, privately held companies, which are not able to offer stock as a way to build user loyalty, may instead reward users with a success-linked asset that has a value which may increase over time based on the success, or revenue, of said privately held company. In this way, mutual alignment of interests between users and the privately held companies may be established and long term user-company loyalty may be facilitated.

FIG. 23A shows an example computing system 2170, which includes a display 2172, an input device 2173, a processor 2174, memory 2176, and network device 2178. Memory 2176 may comprise any form of memory device known in the art of computers, and may have instructions stored therein, which upon execution by processor 2174 carry out one or more steps of the methods herein described. Memory 2176 may have instructions store therein which enable one or more functions of a loyalty platform, such as loyalty platform 2108. Loyalty platform 2108 may be a non-limiting example of loyalty platform 108 of FIG. 1A. Loyalty platform 2108, as described in more detail below, includes a purchase tracking module 2122, a rewards manager 2112, a loyalty manager 2110, merchant accounts 2188, user accounts 2114, reward allocation system 2120, and platform admin account 2136. Input device 2173 enables a user to interface with computing system 2170, and may comprise one or more hardware devices, such as a mouse, keyboard, touch screen, or cameras, which enable a user to input information into a computing system, or manipulate information stored within a computing system. Computing system 2170 may further include one or more network devices, such as network device 2178 which enable computing system 2170 to interact with other electronic devices or computing systems, such as by sending data to, or receiving data from, said other electronic devices. Network device 2178 may enable access to a local area network, or may enable connection to the Internet. Computing system 2170 may be connected to one or more other computing systems by any method known in the art of computers for sending information between two electronic devices. Display 2172 may comprise a monitor, touch screen, projector, or any other device known in the art of computers for enabling a user to observe or sense information.

Figure 23B:
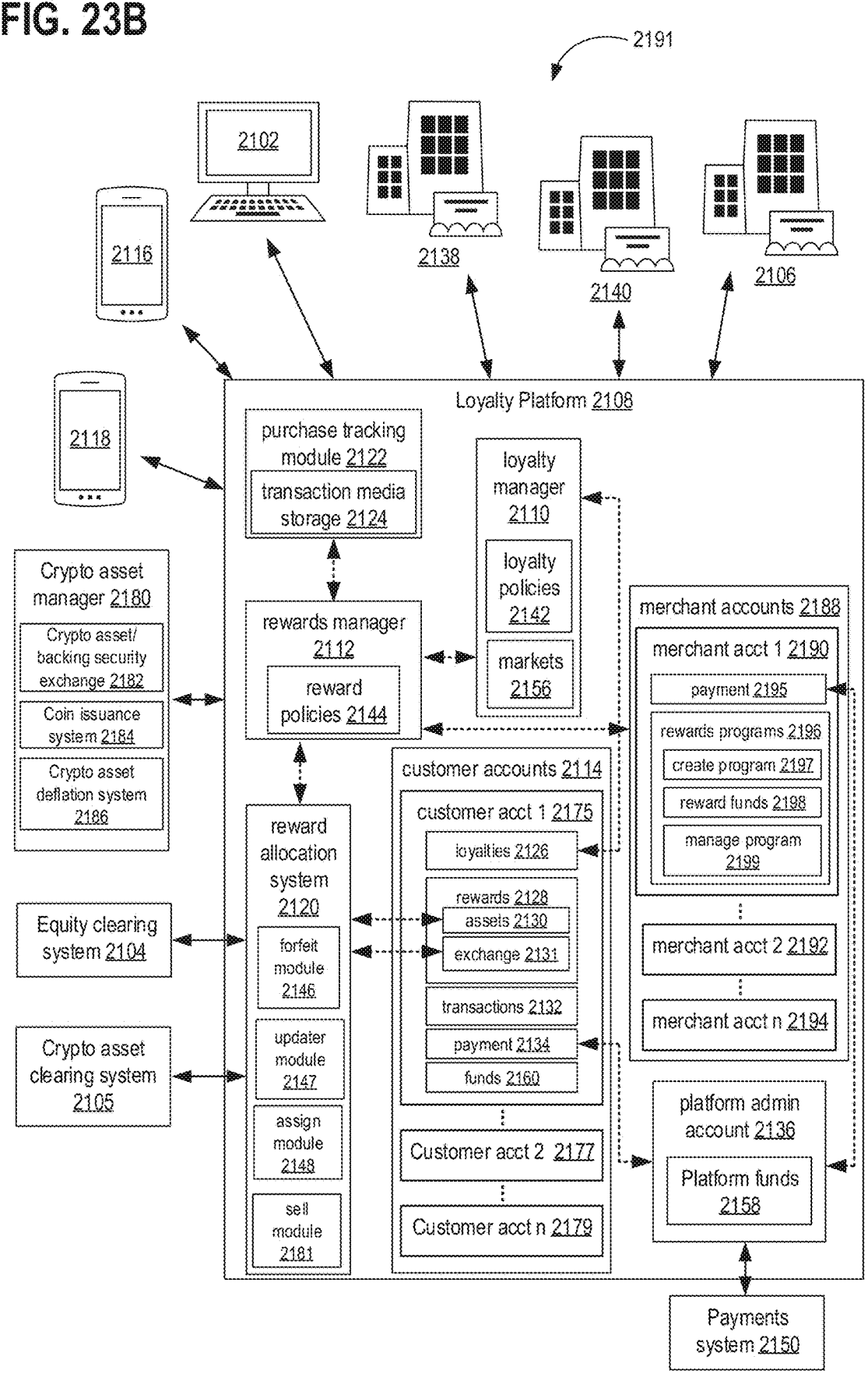
FIG. 23B shows an example of a loyalty platform.

FIG. 23B schematically shows an example loyalty system 2191 that includes a loyalty platform 2108, an equity clearing system 2104, a crypto asset clearing system 2105, a crypto asset manager 2180, and a payments system 2150. A plurality of users 2102, 2116, and 2118 may register with loyalty platform 2108 using user computing devices, wherein the user computing devices may be network-connected devices such as computers and/or mobile phones, and execute transactions (for example, make purchases, trade or sell rewards, etc.). Companies 2138, 2140, and 2106, which may comprise PHCs, may create merchant accounts, such as merchant accounts 2188 on the loyalty platform 2108, to create rewards programs and incentivize user loyalty thereby. In one example, based upon a loyalty selection (e.g., selecting one business of the plurality of companies 2138, 2140, 2106 in a given market) made by a user (for example, user 2102), the user may be entitled to a reward upon conducting a transaction with the selected company.

Equity clearing system 2104 may comprise one or more computing devices each including a processor, memory, communication interface, and/or other components. The memory of the computing device(s) of equity clearing system 2104 includes instructions or rules for managing a clearing house for assignment of public shares. As a further example, equity clearing system 2104 may comprise a clearing house for assignment of non-public shares. Equity clearing system 2104 may communicate with reward allocation system 2120 of loyalty platform 2108 in order to execute transactions such as the buying or selling of shares via the assign module 2148 of the reward allocation system 2120.

Crypto asset clearing system 2105 may comprise one or more computing devices each including a processor, memory, communication interface, and/or other components. The memory of the computing device(s) of crypto asset clearing system 2105 includes instructions or rules for managing a clearing house for assignment of crypto assets. As a further example, crypto asset clearing system 2105 may comprise a public crypto asset exchange, such as Binance, Gdax, Coinbase, and similar exchanges. Crypto asset clearing system 2105 may communicate with reward allocation system 2120 of loyalty platform 2108 in order to execute transactions such as the buying or selling of crypto assets via the assign module 2148 of the reward allocation system 2120.

Crypto asset manager 2180 may comprise one or more computing devices each including a processor, memory, communication interface, and/or other components. The memory of the computing device(s) of crypto asset manager 2180 includes instructions or rules for managing the creation, maintenance, and exchange, of crypto assets created for, or used by, loyalty platform 2108. In one example, crypto asset manager 2180 includes a coin issuance system 2184, which manages PHC requests for new coins, conducts initial coin offerings (ICOs) based upon a successful request (an approved new coin application) for a new coin issuance by a PHC. In another example, crypto asset manager 2180 implements crypto asset deflation mechanism 2186, which carries out the deflation mechanism built into each crypto asset. In one example, the deflation mechanism of a crypto asset may comprise a process by which the monetary value of a crypto asset is made to correlate with the revenue, productivity, profitability, capital, or other metric of success of the PHC. In an example, a portion of each purchase made at a PHC may be used to purchase an amount of a traditional security which backs the crypto asset, such as using a portion of each sale made at the PHC to buy a quantity of NYSE:GLD (gold) which backs the crypto asset, thereby increasing the monetary value of the crypto asset over time based on the revenue of the PHC, similar to a traditional stock (this is what is herein referred to as an equity-like, or success linked asset). In another example of an equity-like crypto asset, the deflation mechanism may comprise using a portion of eligible revenue or profit from the PHC to buy back and burn (burn in this case meaning to immutably erase or remove from circulation) an amount of the crypto asset, thereby permanently reducing the supply of the crypto asset, and increasing the value of the remaining crypto asset. In another example, crypto asset manager 2180 may enable the exchange of crypto assets and the backing securities underlying said crypto assets via a crypto asset/backing security exchange 2182. For example, holders of a crypto asset backed by NYSE:GLD may exchange said asset on exchange 2182 for an amount of NYSE:GLD, where the amount of the NYSE:GLD depends on the amount of crypto asset exchanged, and on the total pool of NYSE:GLD backing the crypto asset at the time of the exchange. In a more specific example, if 100 units of a security are backing a crypto asset, and a user exchanges 1% of the total supply of said crypto asset using crypto asset/backing security exchange 2182, that user will receive 1 unit of the backing security in exchange for the 1% of the total supply of the crypto asset. The 1% of the total supply crypto asset in the previous example will now belong to the crypto asset manager 2180. See FIG. 31 and FIG. 33 for additional examples of crypto asset issuance and deflation mechanisms.

Payments system 2150 may comprise one or more computing devices each including a processor, memory, communication interface, and/or other components. The memory of the computing device(s) of payments system 2150 includes instructions or rules for disbursing and/or receiving payments via one or more banks, bank accounts, credit card accounts, checking accounts, online payments systems, or virtual wallets. In some examples, payments system 2150 may include discrete accounts, each of which may be associated with a user account such as accounts 2175, 2177, and 2179 of user accounts 2114, or accounts 2190, 2192, and 2194 of merchant accounts 2188, on the loyalty platform 2108.

Users 2102, 2116, 2118, in an example, may be associated with user accounts 2175, 2177, 2179. As an example, use of the term "user" or "prospective user" may contemplate any legal entity, whether individual or corporate, which may participate in rewards programs offered by participating PHCs through the loyalty platform 2108 by making purchases. Each user may communicate with loyalty platform 2108, for example, via a user computing device. Each user computing device may include a processor, memory storing instructions executable by the processor, display, user input devices, and a communication interface.

PHCs 2138, 2140, 2106 may be any merchant, business place, brand, or entrepreneur or entrepreneurial entity associated with loyalty platform 2108. As an example, a PHC may comprise any company or merchant or brand (herein the terms company, merchant, business, and brand, are used interchangeably) that does not offer equity for purchase or trading, and may in other words be referred to as non-publicly traded. Each PHC may communicate with loyalty platform 2108, for example, via a PHC computing device. Each PHC computing device may include a processor, memory storing instructions executable by the processor, display, input devices, and a communication interface.

Loyalty platform 2108 may include a plurality of modules including a loyalty manager 2110, rewards manager 2112, user accounts 2114, merchant accounts 2188, reward allocation system 2120, purchase tracking module 2122, and platform admin account 2136. The various modules of the loyalty platform 2108 may include instructions stored in one or more storage media that are executable by one or more processors of one or more computing devices. In one example, each module may be stored on memory of and/or executed by a processor of a single computing device. In other examples, the modules may be stored on multiple memories and/or executed by multiple processors distributed across multiple computing devices.

Loyalty platform 2108 may further comprise a rewarding-business index (such as rewarding-business index 186), wherein information relating to PHCs registered with loyalty platform 2108 may be stored. As an example, information relating to PHCs stored in the rewarding-business index may include PHC locations (such as GPS coordinates, longitude and latitude, street address, etc.), a PHC description (such as a title), PHC hours of operation, indication of which market(s) the PHC operates in, and other information which may be used to uniquely identify a PHC. In one example, PHC information stored in the rewarding-business index may be used to correlate a user purchase to a specific PHC providing equity-like rewards to users through the loyalty platform, thereby facilitating allocation of an equity-like reward associated with the PHC to the user based on the user purchase, and further based on the user having made a loyalty selection to the identified PHC. In one example, the rewarding-business index may comprise a database, stored on one or more computing systems implementing the loyalty platform.

Loyalty manager 2110 administers loyalty policies 2142 and updates user loyalties 2126 of accounts 2114 with updated loyalty policies relating to companies to which a user may select loyalty. Loyalty manager 2110 includes loyalty policies 2142 and markets 2156. Markets 2156 may be a database or module which may further represent suitable information regarding categorization of companies affiliated with the system 2191 into discrete markets or business segments wherein the companies segmented into different markets compete in some way or offer similar products and/or services. Loyalty manager 2110 may represent suitable information regarding loyalty selections of the loyalty platform 2108. As a non-limiting example, loyalty manager 2110 may include market definitions for a market such as "Groceries (National)." In some examples, companies not affiliated and/or companies pending affiliation or partnership with the platform may be listed in the markets database. In an example, companies listed in the markets database may have different statuses such as "non-partner" (if not partnered with the platform), "partner" (if partnered with the platform), and "pending partner" (if partnership with the platform is pending). Company statuses in the markets 2156 may be useful as this may allow users to be made aware of companies which may or may not become platform partners over time, which may factor into a user's decision to select loyalty to a particular business in a market. In one example, a "Groceries (National)" market may include large, nation-wide grocery chains, not limited to, for example, COSTCO, ALBERTSON'S, DOLLAR GENERAL, and KROGER. In another example, a "Coffee shops (Regional)" market may include regional coffee shops and cafes, not limited to, for example, PEET'S COFFEE, SEATTLE'S BEST COFFEE, STUMPTOWN COFFEE ROASTERS, and COURIER COFFEE. In an example, a market may have any number of companies included, and there may be any number of markets included in markets 2156. In an example, market definitions may be defined by administrators of the platform admin account 2136.

Additionally, loyalty manager 2110 may include loyalty policies 2142 which may further include instructions or information relating to managing loyalties across markets 2156 of loyalty platform 2108. Separating companies into individual markets may be a complicated undertaking, as many business and/or merchants exist not only in one market, but are diversified and compete in many different markets. For example, a massive big-box store, such as WALMART sells not only groceries, but also home goods such as electronics, prescription medications, and clothing. As such, loyalty manager 2110 may further include loyalty policies 2142 that limit the loyalty selections for a user across different markets, so that a user may only select loyalty to a particular business across different markets (of markets 2156) a particular number of times. In an example, a user may be allowed to select loyalty to only one business for a single market. In another example, a user may be allowed to select a first loyalty to a business in a first market and to select a second loyalty to the business in a second market. In a further example, a user may be allowed to select loyalty to a business as many times as allowed by loyalty policies 2142 across different markets, if the business is "multi-listed" or offered as a loyalty selection across different markets. In a further example, a user may be allowed to select loyalty to one or more companies listed within a market.

Rewards manager 2112 may be a module or database and may include reward policies 2144 which may further include instructions or information comprising rules for providing and distributing rewards based upon a user's loyalty selection of a transacting merchant (business with which transaction occurs). Additionally, reward policies 2144, in an example, may include specific rule sets regarding rewards for a user executing purchases at or with a particular business to which the user has selected loyalty via the loyalty platform. As an example a user's long-term loyalty may be rewarded with increased rewards. In some examples rewards may increase over time. In some examples, rewards may randomly and/or predictably vary over time. In some instances, variable, increasing, and/or long-term loyalty rewards may form stronger user-company relationships and user loyalty. Additionally, if a user switches loyalties from a first company in a first market to a second company in the first market, a promotional, "loyalty-switch offer" may be made available to the user. In an example, a "loyalty-switch offer" may comprise a period of increased rewards per transaction with the business. In an example, a "loyalty-switch offer" might also comprise any of a cash reward, discounted purchases, a set amount of equity or crypto asset, or any other loyalty-switch promotion desired by the administrators of the loyalty platform. As a further example, platform admin account 2136 may modify reward policies 2144 of rewards manager 2112.

User accounts 2114 may be a module or database including instructions, information, and/or rules relating to personal and loyalty platform 2108 information for each user 2102, 2116, 2118 associated with the loyalty platform 2108. User accounts 2114 may include a plurality of user accounts. As an example, user 2102, 2116, and 2118 may register with loyalty platform 2108 via a smartphone, computer, point-of-sale unit at companies 2106, 2138, 2140, or other network-enabled computing device in order to build and create user accounts 2175, 2177, 2179 associated with (as an example) users 2102, 2116, and 2118, respectively, the accounts being stored in user accounts 2114. User accounts may include a user account interface associated with said account, offering access to various features or data, relating to the user account. In one example, the user account interface may enable access to features or utilities, such as information regarding each user, including user loyalties 2126, user rewards 2128 (which further includes the assets 2130 assigned to each user, and an exchange 2131 wherein each user may trade or sell the accrued/rewarded assets), user transactions 2132, which records a history of user transactions and displays rewards granted per eligible transaction, user payments 2134 (e.g., payment preferences, methods, or transaction media), and funds 2160, each associated with a respective user, such as user 2102. As an example, user loyalties 2126 may include the companies and/or brands which the user has selected via a loyalty selection for a single business in a defined market. User rewards 2128 of a user's account may include a list of assets 2130 which the user has accrued through tracked purchases made at PHCs to which the user has selected loyalty, and who had an active rewards program established through the loyalty platform at the time of the tracked transaction. User rewards 2128 may further include an exchange 2131 through which each user may trade or sell accrued rewards. Said rewards may comprise cryptocurrency or crypto assets which are representative of the rewarding PHC or whose price is linked to the value, profitability, and/or revenue of the rewarding PHC. Rewards may further include a traditional equity of a company closely associated with the rewarding PHC, such that the value of the associated equity may increase as the revenue and/or profitability of the PHC increases. User transactions 2132 may include a history of transactions executed by a user tracked by loyalty platform 2108 via purchase tracking module 2122. User payment 2134 may include user preferences for payment or a virtual wallet held by the loyalty platform 2108. User funds 2160 may include electronic funds stored for a user which may be used for purchases made via the loyalty platform 2108 and/or, as an example, user funds 2160 may include funds received via dividend payments from equity, or equity-like rewards, held in assets 2130. As an example, accounts 2114 may be updated continuously, via communication between rewards manager 2112, loyalty manager 2110, purchase tracking module 2122, reward allocation system 2120, on a schedule, and/or in response to a trigger in order to keep user account information updated so that a user may be able to receive up-to-date account information. In an example, purchase tracking module 2122 may trigger a user account 2175 update based upon receiving a notification of a tracked transaction between a user and a PHC, and purchase tracking module 2122 may command rewards manager 2112 and loyalty manager 2110 to update the user account 2175. FIG. 3C gives an example of a method by which a user, such as users 2102, 2116, or 2118 may create an account, such as user accounts 2175, 2177, or 2179.

Merchant accounts 2188 may be a module or database including instructions, information, and/or rules relating to information for each PHC registered with the loyalty platform 2108, such as PHCs 2106, 2138, 2140. Merchant accounts 2188 may comprise a plurality of distinct merchant accounts associated with separate PHCs and/or companies. As an example, PHCs 2106, 2138, and 2140 may register with loyalty platform 2108 via a smartphone, computer, or other network-enabled computing device in order to build and create merchant accounts 2190, 2192, and 2194 associated with (as an example) PHCs 2106, 2138, and 2140, respectively. Merchant accounts may include a merchant account interface which may enable the associated PHC or user to access one or more features or utilities of the corresponding merchant account, such as information relating to rewards programs (including funds allocated to rewards programs, rewards program rules, etc.), stored payment methods (previously entered payment methods), or may enable submission of a request for issuance of a new crypto asset (via a new coin application), or management of one or more aspects of an existing rewards program. A merchant account interface may comprise a graphical user interface, with fields with which a user may interact using an input device. In one example input devices may include a keyboard, mouse, touchscreen, or other known user input devices. In another example, user interaction with a field may include selecting the field, inputting data into the field, navigating to a new display page by clicking on the field, etc. FIGS. 25A and 25B give an example of a method by which a PHC may create a merchant account on loyalty platform 2108. As an example, accounts 2188 may include information for each PHC, including payment 2195, rewards programs 2196, which further includes utilities for creating a new rewards programs, such as create program 2197 which enables the PHC to create a new rewards program by following a step by step process and filling in required information, reward funds 2198 which tracks and displays the current funds allocated by the PHC for active rewards programs, and manage program 2199, which enables the PHC to adjust rewards program rules, or to cancel the rewards program. Merchant accounts, such merchant account 2190, enable PHCs registered with loyalty platform 2108 to create, fund, implement, control, and terminate, rewards programs which incentivize user loyalty by providing novel rewards, such as crypto currencies or PHC associated equity, which give the user not just an immediate reward, but a reward which grows as user patronized companies succeed.

Reward allocation system 2120 may manage assigning, selling, and forfeiting equity as well as updating current crypto asset prices or equity reward prices. Reward allocation system 2120 may additionally include forfeit module 2146, updater module 2147, assign module 2148, and sell module 2181, which may be a module or database configured with rules and/or instructions in order to execute buy, sell, and/or forfeit orders of fractional or whole equity or crypto assets between loyalty platform 2108 and equity clearing system 2104 or crypto asset clearing system 2105, as well as, in some examples, between user accounts 2114 (including user accounts 2175, 2177, 2179) and platform admin account 2136.

Purchase tracking module 2122 may be a database or module configured to include instructions and rules configured to track virtual and real-world (e.g., in-store) purchases between users 2102, 2116, 2118 and PHCs 2138, 2140, 2106. The purchase tracking module system may further include transaction media storage 2124 (e.g., a database) in order to track purchases for user accounts 2175, 2177, 2179 associated with users 2102, 2116, 2118 who may execute transactions using transaction media which have been registered (or linked) and stored at transaction media storage 2124. As an example, transaction media stored within transaction media storage 2124 may include any applicable payment methods not limited to credit cards, debit cards, and online payment systems (for example, PAYPAL). In an example, transaction media storage 2124 may include registration information relating to credit cards used for transactions between users and companies. In another example, transaction media storage 2124 may include registration information relating to only payments systems used for transaction between users and companies. In another example, purchase tracking module 2122 may receive a notification or indication that a user has executed a transaction (for example, purchase or return).

The loyalty platform 2108 may additionally include platform admin account 2136 which may comprise an equity account, such as platform funds 2158, tied to the loyalty platform 2108, and as an example, in some cases the loyalty platform 2108 may accumulate shares and/or funds based upon a user's transaction with a business where the transaction is tracked through the platform. In some instances, when a user forfeits shares the loyalty platform 2108 may retain the forfeited shares within platform funds 2158. Furthermore, platform admin account 2136 may provide platform administrators with rights to make any modifications to the loyalty platform—for example, adding or removing companies to the loyalty selections available through loyalty manager 2110, modifying rewards options available through rewards manager 2112, modifying user accounts 2114, merchant accounts 2188, and modifying reward allocation system 2120.

Loyalty platform 2108 may comprise a computing system including one or more computing devices each including a processor and memory. The computing devices may optionally include display(s), user input device(s), communication interface(s), and/or other components.

The processor may include one or more physical devices configured to execute instructions. For example, the processor may be configured to execute instructions that are part of one or more applications, services, programs, routines, libraries, objects, components, data structures, or other logical constructs included in loyalty platform 2108.

The memory includes one or more physical devices configured to hold instructions executable by the processor to implement the methods and processes described herein. When such methods and processes are implemented, the state of memory may be transformed—e.g., to hold different data. The terms "module", "program", and "system" may be used to describe an aspect of the computing device(s) implemented to perform a particular function. The terms "module", "program", and "system" may encompass individual or groups of executable files, data files, libraries, drivers, scripts, database records, etc.

The display may be used to present a visual representation of the loyalty platform 2108. This visual representation may take the form of a graphical user interface (GUI). The display may include one or more display devices. User and/or PHC input device(s) may comprise or interface with one or more user-input devices such as a keyboard, mouse, touch screen, and/or game controller. Additionally, the communication interface may be configured to communicatively couple the loyalty platform 2108 with one or more other computing devices, such as the payments system 2150, equity clearing system 2104, crypto asset clearing system 2105, crypto asset manager 2180, user computing devices, and/or business computing devices. The communication interface may include wired and/or wireless communication devices compatible with one or more different communication protocols. As non-limiting examples, the communication interface may be configured for communication via a wireless telephone network, or a wired or wireless local- or wide-area network. In some embodiments, the communication interface may allow the loyalty platform 2108 to send and/or receive messages to and/or from other devices via a network such as the Internet.

Any of the computing devices, modules, or elements described herein with reference to exemplary system 2191 of FIG. 23B may communicate with each other via a network. For example, loyalty platform 2108 may communicate with equity clearing system 2104, crypto asset clearing system 2105, crypto asset manager 2180, and payments system 2150 via a network.

Loyalty platform 2108 enables benefits for both PHCs and users by providing a mechanism for PHCs to provide rewards to loyalty users through creation of loyalty based user rewards programs, and for loyalty users to be automatically and efficiently rewarded for eligible purchases made at PHCs to which they are loyal. Loyalty platform 2108 enables PHCs to create bespoke rewards programs which cater to that specific PHCs business model and vision. Loyalty platform 2108 enables the creation, implementation, and management of a novel rewards program for companies, including PHCs, which in some examples includes creation of custom crypto assets for a PHC, or a group or class of PHCs. The crypto assets may be used as a reward asset given to loyalty users based on tracked purchases, said crypto asset may mimic in some aspects a traditional equity in the PHC, thus enabling PHCs to obtain at least some of the advantages of publicly traded institutions, such as long term user loyalty creation through stake sharing. Additionally, platform 2108 provides users the ability to choose loyalties, grow wealth by earning rewards which grow as the companies that user patronizes grows, and sell or trade earned rewards, either amongst other users using loyalty platform 2108, or on asset exchanges, such as equity clearing system 2104 or crypto asset clearing system 2105. A high level flowchart of an example method by which loyalty platform 2108 enables these benefits is shown in FIG. 24.

Turning to FIG. 24, a high level flowchart of an example method 2200 showing how a loyalty platform, such as loyalty platform 2108 of FIG. 23B, enables PHCs and users to participate in a mutually beneficial rewards program. The rewards program may incentivize long term user loyalty to PHCs, by enabling users of the PHC to accrue equity, or equity-like rewards, from everyday purchases.

Method 2200 begins at 2202, which includes the PHC registering with the loyalty platform by inputting information into one or more fields of a loyalty platform interface/display. The input information may enable the platform to identify the PHC and determine in which markets said PHC operates (as described in more detail by example flowcharts shown in FIGS. 25A and 25B). Step 2202 of method 2200 also includes the PHC creating a rewards program which may include defining rewards program rules, specifying an asset to reward users with, and allocating funds to be used to provide said rewards (described in more detail by FIGS. 25D, 25E, and 25F). Method 2200 may then proceed to 2204.

At 2204, method 2200 includes creating a user account on the loyalty platform. User account creation may include linking or registering a payment medium/transaction medium with the loyalty platform (such as a credit card, debit card, and/or other payment/transaction medium), thereby enabling the platform to track purchases made by the user and reward the user based on eligible purchases. User account creation my further include user loyalty selection, wherein the user may select amongst PHCs with active rewards programs on the loyalty platform to choose loyalty to, and thereby become eligible to receive rewards based upon purchases made at said PHCs. FIG. 25C, described below, illustrates in more detail an example method for user account creation. Method 2200 may then proceed to 2206.

At 2206, method 2200 includes the loyalty platform tracking user purchases made using the registered or linked payment method, and distributing rewards to a user account on the loyalty platform based on eligible purchases made at rewarding companies to which user has selected loyalty (described in more detail with regard to FIGS. 26A-26C). In one example, eligible purchases may include purchases made by users with an active user account on the loyalty platform, the purchase occurring at a PHC or business to which the user has selected loyalty, and said PHC or business having an active rewards program through the loyalty platform (with a positive non-zero rewards program fund balance associated with said active rewards program). In this way, PHCs and users may be advantageously connected through a loyalty platform which enables creation, execution, and management, of a rewards program offering equity, or equity-like, rewards.

Turning now to FIG. 25A, a flowchart for an example method 2300A for logging into, or registering with, a loyalty platform is shown.

Method 2300A begins at 2302A, which includes displaying a loyalty platform login screen to the user (user will herein imply either users or PHCs). In one example, the login screen may be displayed on a display apparatus of a network connected device of the one or more users of the loyalty platform, such as a screen of a smartphone, or a monitor of a computer. The login screen may display to the user instructions for interacting with the login screen, such as where to input login information, and/or how to create a new account on the platform, as well as other information pertinent to the usage of the loyalty platform. In one example, the login screen is a combined login screen for all users regardless of user type (users are either users or companies as defined herein, with companies further including PHCs). In another example, the login screen may be differentiated based on user type, such as a first login screen or interface for users, and a second login screen or interface for companies. The login screen may prompt the user to login to an account, or for first time users, to create a new account. Method 2300A may then proceed to 2304A.

At 2304A method 2300A includes the loyalty platform determining if the user has selected to login to an account. If at 2304A the loyalty platform determines that the user has selected to login to an account, method 2300A may then proceed to 2318A. At 2318A the loyalty platform may prompt the user to input account information into designated fields on the display/interface. In one example account information includes a username and password uniquely associated with a pre-existing account on the loyalty platform. In another example, the login information includes a signal received from a biometric scanner, such as a fingerprint or retinal scanner, said signal uniquely associated with one or more biometric features previously associated with a pre-existing account on the loyalty platform. Upon user submission of login information, method 2300A may then proceed to 2320A. At 2320A, method 2300A includes evaluating if the user input login information is valid. Validation of user login information may include matching a username and password to a pre-existing account on the loyalty platform. In another example login information validation may include assessing if one or more or a combination of user authentication metrics have been passed, or that one or more pieces of biometric data of the current user matches with a selected account or username. If at 2320A the loyalty platform determines that the login information was not valid, such as if the login information does not match with any currently existing account, then method 2300A may proceed to 2328A, whereat a login error message may be displayed on the user display or interface, and which may include one or more pieces of information relating to how/why the login information was not valid. Method 2300A may then proceed to 2330A, whereat the loyalty platform returns to the platform login screen, such as at 2302A. Method 2300A may then end.

However, if at 2320A the login information was determined to be valid by the loyalty platform, method 2300A may proceed to 2322A, whereat the login information entered by the user is matched with an existing account, and the loyalty platform determines if that account is a merchant account. If at 2322A, the loyalty platform matches the login information with an existing merchant account, method 2300A may then proceed to 2326A, whereat the loyalty platform will proceed to display the merchant account interface to which the login information corresponds. In one example the merchant account interface may have been previously customized by the user to enable rapid identification and display of one or more pieces of relevant information associated with said merchant account. In another example, the merchant account interface may include one or more features indicated or discussed regarding merchant accounts 2188 in FIG. 23B, such as payment, rewards program creation and management, allocation of funds for operation of an existing rewards program, etc. After 2326A, method 2300A may then end. However, if at 2322A the loyalty platform determined that the login information was not associated with a merchant account, method 2300A may then proceed to 2324A, whereat the user account interface, to which the login information uniquely matched, is displayed. This is because, in this embodiment, user accounts are of two types, and if the account is not a merchant account, the account is a user account. The user account interface may include access to one or more or all of the features shown or discussed in regards to user accounts 2114 of FIG. 23B, such as loyalties, assets, trades, transactions, payment, and funds. Method 300A may then end.

However, if at 2304A it was determined that the user had not selected to login to account, method 2300A may then have proceeded to 2306A, where the loyalty platform may have evaluated if the user had selected to create a new account. If at 2306A the platform determined that the user had not selected to create a new account, then method 2300A would proceed to 2316A, whereat the login screen would be displayed to the user, such as at 2302A, and method 2300A may then end. However, if at 2306A the loyalty platform determined that the user had selected to create a new account, method 2300A may then proceed to 2308A, whereat the user would be prompted to select the type of the new account. In one example, account types comprise merchant accounts and user accounts. In other examples, account types may also include subsets of these account types, or may include additional account types, such as administrator accounts. Method 2300A may then proceed to 2310A. At 2310A, method 2300A includes the loyalty platform evaluating if the user selected to create a new merchant account. If at 2310A the loyalty platform determined that the user selected to create a new merchant account, method 2300A may then proceed to 2311, wherein the merchant account creation method is executed by the loyalty platform as given in more detail by FIG. 25B.

However, if at 2310A the loyalty platform determines that the user did not select to create a new merchant account, then the method 2300A proceeds to 2312A, whereat the user input is evaluated to determine if the user selected to create a new user account. If at 2312A, the loyalty platform determines that the user selected to create a new user account, then method 2300A may proceed to 2313, wherein the user account creation method is executed by the loyalty platform as given in more detail by FIG. 25C. Finally, if at 2312A, the loyalty platform determines that the user did not select to create a new user account, method 2300A may proceed to 2314A, whereat the loyalty platform displays the login screen to the user, as at 302A. Method 2300A may then end.

In this way, users of the loyalty platform can login to existing user accounts, or merchant accounts, or can select to create a new user account or merchant account. FIGS. 25B and 25C illustrate an example method for creating new merchant accounts and user accounts.

Turning now to FIG. 25B, an example method 2300B is shown. Method 2300B gives one example of a method by which a new merchant account may be created on the loyalty platform. By creating a new merchant account, pertinent information required to identify the PHC, and create and implement a rewards program for that PHC, are input into the loyalty platform.

Method 2300B begins at 2302B, where the loyalty platform prompts the PHC to input merchant account information (such as that shown by FIG. 27) into designated fields on the display/interface using user input devices. In one example merchant account information may include a new account username, a new account password, company name or ID, company address(es)/locations, company contact information, relevant markets in which said companies operates. In one example, merchant account information may be stored in a database, such as the rewarding-business index, and subsequently used to facilitate linking user purchases with registered merchant reward programs. Once the loyalty platform has detected that all required fields have been filled, and that the PHC has selected to proceed, or in some other way received an indication that all required merchant account information has been input, method 2300B may then proceed to 2304B.

At 2304B, method 2300B includes evaluating the merchant account information for validity. Validity evaluation may include one or more input screening techniques which compares the format of input data with an expected format of input data, or confirms that input account information links to a real and unique companies or location. If the loyalty platform determines that the user input merchant account information is not valid, method 2300B may then proceed to 2306B, whereat the loyalty platform may display an error message to the user. Said error message may indicate how/why user input failed the validity evaluation, and may make recommendations to the user for correctly inputting said information in a subsequent attempt. Method 2300B may then end.

If at 2304B, the merchant account information was determined to be valid, method 2300B may then proceed to 2308B. At 2308B method 2300B includes indicating to the PHC that merchant account information was successfully entered, and that a new merchant account has successfully been created based on the input data. Method 2300B may then proceed to 2314B.

At 2314B method 2300B includes prompting for input of payment method information into designated fields on the display/interface using input devices. In one example payment information may include credit card information, such as a credit card number, expiration date, and pin. In another example, payment information may include a digital wallet address, or account information for a digital payment service (such as PayPal, Venmo etc.). Upon an indication to the loyalty platform that the payment method information has been entered, method 2300B may then proceed to 2316B.

At 2316B, method 2300B may include evaluating input payment information for validity. Validity evaluation may include one or more input screening techniques which compares the format of input data with an expected format of input data, or confirms that input payment information links to a real and unique payment account, wallet, or service. If the loyalty platform determines that the payment information is not valid, method 2300B may then proceed to 2318B, whereat the loyalty platform may display an error message to the user. Said error message may indicate how/why input payment method information failed the validity evaluation, and may make one or more recommendations for correctly inputting said information. Method 2300B may then end.

If at 2316B, the loyalty platform determines that the payment information is valid, method 2300B may then proceed to 2320B. At 2320B, method 2300B includes indicating that a payment method was successfully established, and that a rewards program may now be created using said payment method. 2320B may then include prompting the PHC to create a new rewards program, wherein the prompt may be displayed via a display of a PHC computing device. Method 2300B may then proceed to 2322B.

At 2322B, method 2300B may include evaluating if the PHC has selected to create a new rewards program. If at 2322B, the loyalty platform determines that the PHC selected to create a new rewards program, method 2300B may proceed to 2327, wherein a method for creating a new rewards program is executed by the loyalty platform, as shown in more detail by FIG. 25D. However, if at 2322B the loyalty platform determines that the PHC selected not to create a new rewards program, method 2300B may then proceed to 2324B, whereat the loyalty platform may indicate to the PHC that a new rewards program may be created anytime through the merchant account interface. From 2324B, method 2300B may proceed to 2326B, where the loyalty platform may display the merchant account interface. Method 2300B may then end.

In this way, method 2300B may enable PHCs using the loyalty platform for the first time, to create a new account with the loyalty platform. This account may further enable creation of a rewards program based at least partially on the information entered during the new merchant account creation. An analogous process may be used by the loyalty platform to create new user accounts, an example of which is illustrated in FIG. 25C.

Turning now to FIG. 25C, an example method 2300C for creating a new user account is shown. Method 2300C enables new users to register with the loyalty platform and create a new user account, and thereby become eligible to earn equity, or equity-like rewards through everyday purchases.

Method 2300C begins at 2302C, where the loyalty platform prompts the user to input user account information into designated fields on the display/interface using user input devices. In one example new user account information may include user contact information, username, password, information from identity documents (passport, driver's license etc.), social security number, bank routing number and account number (for direct deposits of funds earned via accrued rewards), and other information known in the art as required or beneficial for new user registration with equity brokers. Once the loyalty platform has detected that all required fields have been filled, and that the user has selected proceed, or that the loyalty platform has in some other way received an indication that all requested new user account information has been input, method 2300C may then proceed to 2304C.

At 2304C, method 2300C includes evaluating the user input user account information for validity. Validity evaluation may include one or more input screening techniques which compares the format of input data with an expected format of input data, or confirms that input account information links to a real and unique identity. If the loyalty platform determines that the user input user account information is not valid, method 2300C may then proceed to 2306C, whereat the loyalty platform may display an error message to the user. Said error message may indicate how/why user input failed the validity evaluation, and may make one or more recommendations to the user for correctly inputting said information in a subsequent attempt. Method 2300C may then end.

However, if at 2304C, the user input user account information was determined to be valid, method 2300C may then proceed to 2308C. At 2308C method 2300C includes indicating to the user that user account information was successfully entered, and that a new user account has successfully been created based on the input data. Method 2300C may then proceed to 2314C.

At 2314C, method 2300C includes prompting the user to input payment method information into designated fields on the display/interface using user input devices. Payment information entered by the user is used by the loyalty platform to track purchases made by the user for purposes of loyalty purchase identification and automatic reward allocation, as given in more detail by FIGS. 26A-26C. In one example payment information may include credit card information, such as a credit card number, expiration date, and pin. In another example, payment information may include a digital wallet address, or account information for a digital payment service (such as PayPal, Venmo, etc.). Upon an indication to the loyalty platform that the user has entered information in all of the required fields, method 2300C may then proceed 2316C.

At 2316C, method 2300C may include evaluating the user input payment information for validity. Validity evaluation may include one or more input screening techniques which compares the format of input data with an expected format of input data, or confirms that input payment information links to a real and unique payment account, wallet, or service. If the loyalty platform determines that the user input payment information is not valid, method 2300C may then proceed to 2318C, whereat the loyalty platform may display an error message to the user. Said error message may indicate how/why user input failed the validity evaluation, and may make one or more recommendations to the user for correctly inputting said information in a subsequent attempt. Method 2300C may then end.

If at 2316C, the loyalty platform determines that the user input payment information is valid, method 2300C may then proceed to 2320C. At 2320C, method 2300C includes indicating to the user that the payment medium was successfully linked, and that user loyalties may now be selected. 2320C may then include prompting the user to select loyalties. Method 2300C may then proceed to 2322C.

At 2322C, method 2300C may include evaluating if the user chose to make loyalty selections. If at 2322C, the loyalty platform determines that the user selected not to make loyalty selections, method 2300C may proceed to 2324C, whereat the loyalty platform indicates via display/interface to the user that loyalty selection is required before rewards may be earned. Method 2300C may then end. However, if at 2322C the loyalty platform determines that the user chose to select loyalties, method 2300C may proceed to 2326C.

At 2326C, method 2300C may include the loyalty platform displaying a list of companies or PHCs with active rewards programs offered through the loyalty platform, to which the user may make a loyalty selection and begin earning rewards. The display/interface may include one or more fields with which the user may interact to indicate which loyalty selections the user wishes to make, such as check boxes, or a drag-and-drop selection process. Upon an indication to proceed generated by the user and received by the loyalty platform, method 2300C may then proceed to 2328C. A loyalty user of a PHC is herein defined as being a user who has an active loyalty selection to the PHC.

At 2328C, method 2300C includes the loyalty platform evaluating user input to determine if a loyalty selection to one or more companies was made. If at 2328C the loyalty platform determines that no loyalty selections were made, method 2300C may proceed to 2324C, whereat the loyalty platform indicates via display/interface to the user that loyalty selection is required before rewards may be earned. Method 2300C may then end.

If at 2328C the loyalty platform determines that one or more loyalty selections have been made by the user, then method 2300C may proceed to 2330C, whereat the loyalty platform indicates to the user via display/interface that purchases made using linked payment media at PHCs to which the loyalty selection(s) were made, are now eligible for rewards. Method 2300C may then proceed to 2332C, whereat the user account interface is displayed, from which the user may access one or more of the features/utilities indicated by FIG. 23B, such as user accounts 2114. Method 2300C may then end.

In this way, method 2300C enables new users to quickly establish a new account on a loyalty platform which may further enable the user to begin accruing rewards based on purchases made with a linked/registered payment method at PHCs participating in an active rewards program through the loyalty platform.

Turning now to FIG. 25D, an example method 2300D by which a PHC may create a new rewards program is shown. Method 2300D enables companies to create equity or equity-like rewards programs which drive long term user loyalty and may increase user demand, both in the short and long term.

Method 2300D begins at 2302D, whereat a loyalty platform prompts the PHC to select an asset to use for rewarding user loyalty, or, to submit a new coin application which may lead to issuance of a new crypto asset which may represent the PHC providing said reward. In one example, reward assets are a traditional equity of a publicly traded companies closely associated with the rewarding PHC (non-publicly traded business), such as stock in a coffee roasting company used as a reward to users who make purchases at, and have made a loyalty selection to, a local café (the local café buying a substantial amount of product from the publicly traded coffee roasting company). In another example, a reward asset may be a pre-existing cryptocurrency or crypto asset which is linked with a particular PHC or class/category of PHC, such as, for example, LocalCoin, which may be associated with local grocers (the precise definition of which companies may be associated with LocalCoin may reside within the whitepaper of LocalCoin). In one example, Local-Coin may have a built in and immutable deflation mechanism which links its value with the revenue, profit, capital, or other aspect, of the associated local grocers, and may in this way behave as an analog, or substitute for, traditional equity. In another example, the PHC may decide that none of the existing assets suitably reflect stake in the PHC, and my elect to submit an application containing ideas for a new crypto asset or cryptocurrency which represents PHC ownership, or stake in the success of the PHC. One example embodiment of a reward selection prompt/display/interface is shown in FIG. 29. Subsequent to the loyalty platform prompting the PHC to select an asset to use in the new rewards program, method 2300D may then proceed to 2304D.

At 2304D, method 2300D includes evaluating if the PHC has selected an asset to reward with in the new rewards program. If at 2304D, the loyalty platform determines that no asset has been selected, method 2300D may proceed to 2306D, whereat method 2300D includes the loyalty platform evaluating if the PHC has selected to submit a new coin application to create a new crypto asset which suits the goals of the PHC. If at 2306D it is determined that the PHC has selected to submit a new coin application, method 2300D proceeds to 2309, wherein the new coin application submission method is executed. If at 2306D, it is determined that the PHC has not selected to submit a new coin application, method 2300D may proceed to 2308D, whereat the loyalty platform returns to the merchant account interface, and method 2300D may then end.

Going back to 2304D, if the loyalty platform determines that the PHC has selected a pre-existing asset, either a traditional equity asset or a crypto asset, then method 2300D may proceed to 2310D, whereat the loyalty platform displays a prompt for new rewards program rules. Along with said prompt, the display/interface may include one or more fields in which the PHC may input said rewards program rules. In one example, rewards program rules may include the rate of reward, such as selection of a percent of each loyalty user purchase which is used to reward said loyalty user. An example of an interface of the rewards program which may take rewards program rules input is shown in FIG. 29, which shows by example, a rewards rate of 4% selected, with indications of the deflation mechanism/LocalCoin fee (0.25%) and the loyalty platform fee (0.25%). In other examples, valid rewards program rules may include parameters relating to an echelon based rewards system, which entitles loyalty users to a higher rate of reward based upon cumulative purchases at rewarding PHC, or other such rules which may relate to one or more aspects of the reward rate, reward type (asset type), reward program duration, or reward program eligibility. From 2310D, method 2300D may then proceed to 2312D, at which PHC input reward program rules may be validated by the loyalty platform, either automatically, or manually by a loyalty platform administrator. If invalid rewards program rules have been input, method 2300D may proceed to 2314D, whereat an error message is displayed to the PHC, which may indicate the reason for the determination of invalidity of rewards program rules made at 2312D. Method 2300D may then proceed to 2316D, displaying the merchant account interface to the PHC, and method 2300D may then end. However, if at 2312D, it is determined that valid rewards program rules were input, method 2300D may then proceed to 2318D, whereat the loyalty platform may prompt the PHC to load value into a rewards fund for the current rewards program using the payment method previously established during initial account creation. An example of such a prompt/interface/display is shown in FIG. 28. Subsequent to prompting the PHC to load value into a rewards program fund, method 2300D may then proceed to 2320D.

At 2320D, method 2300D may include determining if assets have been successfully loaded into a rewards program fund. If at 2320D it is determined that assets have not been successfully loaded into a rewards program fund, then method 2300D may proceed to 2322D, whereat an error message may be displayed to the PHC indicating incomplete or unsuccessful transferring of funds. Additionally, the error message may include one or more details relating to the reason for fund transfer failure, or invalid data input. Method 2300D may then proceed to 2324D, displaying the merchant account interface to the PHC. Method 2300D may then end.

However, if at 2320D, the loyalty platform determines that value has been successfully loaded into a rewards program fund, method 2300D may then proceed to 2326D, whereat the loyalty platform may prompt the PHC to conduct purchase tracking module calibration, and thereby increase the accuracy with which user purchases made at PHC locations are successfully identified and linked with the rewards program of the PHC, and thus made eligible for reward allocation. Method 2300D may then proceed to 2328D, whereat it is determined if the PHC has selected to conduct purchase tracking module calibration. If at 2328D, the loyalty platform determines that the PHC has selected to conduct purchase tracking module calibration, method 2300D may then proceed to 2329, wherein the purchase tracking module calibration method is executed. However, if at 2328D, the loyalty platform determines that the PHC has selected not to conduct purchase tracking module calibration, method 2300D may proceed to 2330D, which may include the loyalty platform indicating via display to the PHC that a new rewards program has successfully been created. 2330D may further including displaying to the PHC that purchase tracking module calibration may be conducted at any time through the merchant account interface. Method 2300D may then proceed to 2332D, whereat the loyalty platform displays the merchant account interface. Method 2300D may then end.

In this way, method 2300D enables a PHC to create equity, or equity-like, rewards programs which foster long term user loyalty and align user and PHC interests though providing rewards, such as equity or equity-like crypto assets, to users based on a loyalty selection by said user, and further based on tracked purchases made by the user at the PHC.

Turning now to FIG. 25E, an example method 2300E by which a PHC may submit a new coin application to a crypto asset manager, and based upon said application the crypto asset manager may conduct an initial coin offering (herein abbreviated ICO), to create a new crypto asset which may enable long term user loyalty to institutions or PHCs associated with said crypto asset.

Method 2300E begins at 2302E, which includes submission of a new coin application to the crypto asset manager via a loyalty platform merchant account interface. In one example, the new coin application includes a model for a new crypto asset, which may be considered analogous to a "white paper", detailing such aspects of the new crypto asset as: which PHCs or institutions may be associated with said crypto asset (for example, only local business which provide tea or coffee as a primary source of income and are not publicly traded), how said crypto asset may be used (what utility the asset has, or what rights or privileges possessing the asset entails), and/or what deflation mechanisms, if any, operate on the crypto asset to link it to PHC success/revenue (such as a security backing deflation mechanism which increases the value of the crypto asset over time based on PHC revenue, or a buy-back-and-burn deflation mechanism wherein a portion of PHC profits are used to reduce the total supply of the crypto asset over time). Method 2300E may then proceed to 2304E.

At 2304E, method 2300E includes the crypto asset manager reviewing the new coin application, and assessing the likelihood of ICO success for such a crypto asset. In one example the review process may occur based on a set schedule, such as 2 weeks after submission of a new coin application. Following completion of review of the new coin application, method 2300E may then proceed to 2306E.

At 2306E, method 2300E includes evaluating if the new coin application was approved by the crypto asset manager. If the new coin application was not approved, then method 2300E may proceed to 2318E, whereat the applicant (the applying PHC) may be notified of rejection of the submitted new coin application, and additionally, may be prompted to make amendments or resubmit the application following such amendments as appropriate. Method 2300E may then end.

If at 2306E the new coin application was approved by the crypto asset manager, method 2300E may then proceed to 2308E, whereat the applicant PHC may be notified of the approval of the submitted new coin application, and informed of next steps to be taken by the crypto asset manager and/or given a tentative timeline for when the ICO will be conducted, and potentially when the new crypto asset may be available on the open market (and thus useable in a rewards program). Method 2300E may then proceed to 2310E.

At 2310E, method 2300E includes the crypto asset manager or other loyalty platform affiliated entity initiating and conducting an ICO for the new crypto asset. The ICO may comprise any of the steps or processes known in the art for obtaining initial investment for a new crypto asset. Briefly, older or more established digital assets are transferred to a digital wallet of the crypto asset manager, in exchange for issuance and transfer of the new crypto asset to the digital wallets of the investing parties. In one example, the rate of exchange between the older crypto assets (such as Bitcoin, Ethereum, Litecoin, etc.) for the new crypto asset may be fixed. In another example this exchange rate may scale based on the number of investors, amount of investment, time till ICO closes, round of investment (in the case that the ICO has multiple rounds of investment), etc. Allocation of older crypto assets or other funds obtained by the crypto asset manager during the ICO will be detailed in the new crypto asset whitepaper, which may have been created entirely or in part by the applicant PHC through the loyalty platform. In one example, a set portion of the fund raised during the ICO may be used to establish and operate the new crypto asset network (miners, or other suitable hardware/infrastructure for maintaining the new crypto asset). In another example, a set amount of the funds raised during the ICO may be allocated to purchase a backing security for the new crypto asset, such as NYSE:GLD, or other traditional security, which may lend stability to the price of the new crypto asset. Holders of the new crypto asset may be entitled to exchange the new crypto asset for the backed security via the crypto asset manager, such as through an account created on a loyalty platform, such as loyalty platform 2108. Additionally, the amount of traditional security backing the new crypto asset may increase in time based on revenue at associated PHCs, such as based by allocating a percentage of PHC revenue to purchasing additional backing security, or through allocating a percentage of PHC revenue to buy and remove an amount of the new crypto asset of circulation. Upon completion of the ICO, method 2300E may then proceed to 2312E.

At 2312E, method 2300E includes the crypto asset manager evaluating if the ICO was successful. ICO success may be based on the amount of funds generated during the ICO. In one example, ICO success may be determined by an amount of funds raised during the ICO being greater than a pre-determined threshold amount of funds. In another example, ICO success may be determined based on a total percent of the newly issued crypto asset being sold being greater than a pre-determined threshold. Upon determination by the crypto asset manager that the ICO of the new crypto asset was a success, method 2300E may then proceed to 2314E, whereat the applicant PHC is notified of the success of the ICO, and given a tentative timeline for when the new crypto asset will be available on the open market, and thus usable for rewards programs, method 2300E may then end.

Alternatively, if at 2312E, the crypto asset manager determines that the ICO was a failure, method 2300E may then proceed to 2316E, whereat the applicant PHC may be notified of the ICO failure for the new crypto asset. Method 2300E may then end.

In this way, method 2300E may enable creation of new crypto assets by PHCs or other institutions. Said new crypto assets may provide an alternative to equity rewards, which PHCs may use in conjunction with a rewards program created on, and implemented by, a loyalty platform. By offering crypto assets, which enable a host of features and functionalities which traditional rewards or equity cannot (such as built in deflation mechanisms, automated voting rights on company decisions, etc.), PHCs or other institutions unable to provide traditional equity rewards to users may stand on more equal footing with larger corporations, by increasing immediate and long term user loyalty, and aligning user interests with the interests of the PHC.

One issue encountered with automated rewards systems which allocate rewards to users based on purchases made at small or privately held companies is the difficulty associated with accurately matching a spend ID with a specific merchant. Often the spend ID/transacting merchant description (the merchant information accessible to the loyalty platform which accompanies a tracked transaction recorded, such as merchant location, business type, etc.) may not include sufficient information to uniquely identify the merchant with which the user purchase was made, and thus a user may not receive accurate rewards (e.g., the user may receive rewards even when making purchases at a company other than the company participating in the rewards program, or may incorrectly be denied rewards because the spend ID/transacting merchant description at one location of a company having multiple locations is substantially different than the spend IDs/transacting merchant descriptions at other locations of the same business). When inaccurate rewards are determined or awarded, a user and/or merchant may contest the reward (or lack thereof) and/or the reward administrator may be forced to undergo additional rounds of information gathering/matching to determine the correct merchant, which may drain the resources of the reward administrator via unnecessary processing steps and/or increased network traffic. The inventors herein have identified methods to at least partially mitigate these issues, such as, in one example, requesting each participating PHC to calibrate the purchase tracking module according to a method, such as method 300F below.

Turning now to FIG. 25F, an example method 2300F for enabling more accurate purchase tracking is shown. Instructions for carrying out method 2300F may be stored in non-transitory memory of one or more computer readable memory devices of a loyalty platform, such as loyalty platform 2108.

Method 2300F begins at 2302F, which includes prompting a PHC to select a payment method. Said prompting may include displaying one or more fields into which payment method information may be entered, and/or may include displaying a drop down menu of payment methods previously used on the loyalty platform and stored in memory. In the case of previously stored payment methods, the PHC may select which of said stored payment methods to use for the purchase tracking module calibration process. Method 2300F may then proceed to 2304F.

At 2304F, method 2300F includes evaluating if the PHC selected a stored payment method. If the loyalty platform determines that no previously used payment method was selected, the method 2300F may then proceed to 2306F. At 2306F, the loyalty platform may evaluate if the PHC has selected to enter a new payment method. If the loyalty platform determines that the PHC did not select to enter a new payment method, then method 2300F may proceed to 2308F, which includes the loyalty platform returning to the merchant account interface. Method 2300F may then end.

However, if at 2306F the loyalty platform determines that the PHC selected to enter a new payment method, method 2300F may then proceed to 2324F. At step 2324F, method 2300F includes the loyalty platform prompting the PHC to input details of the new payment method to be used for purchase tracking calibration. Upon indication that the PHC has completed entering details of the new payment method, method 2300F may proceed to step 2326F. At 2326F the loyalty platform may conduct input validation of the new payment method details to ensure that the payment method details match to a real and unique payment account, such as a bank account. If at 2326F, the loyalty platform determines that valid payment method details were not entered, method 2300F may proceed to 2328F, whereat the loyalty platform may display an error message to the PHC. In one example the error message may include details regarding the reason for the determination of invalid payment method details, such that the user may rectify the issue upon a subsequent attempt. Method 2300F may then continue to 2330F, whereat the loyalty platform may display the merchant account interface, and method 2300F may then end.

However, if at 2326F the loyalty platform made a determination that the payment method details entered by the PHC are valid, method 2300F may proceed to 2310F, whereat the loyalty platform may indicate to the PHC that the payment method is now ready for purchase tracking calibration, and purchases may now be made at each participating location of the PHC. Method 2300F may then proceed to 2312F.

At 2312F, method 2300F includes displaying a list of recent purchases made via the selected payment method. Step 2312F further includes prompting the PHC to select each of the purchase IDs/transacting merchant descriptions listed which were made at a PHC location participating in one or more rewards programs. In one example, each transaction ID/transacting merchant description may have a check box associated with it, such that the user may "check" each of the transaction IDs/transacting merchant descriptions associated with a purchase made at a PHC location. In another example, each PHC location may be uniquely associated with a purchase ID. Method 2300F may then proceed to 2314F.

At 2314F, method 2300F includes determining if at least one transaction presented in the displayed list was selected by the PHC, such that at least one transaction ID/transacting merchant description was associated with at least one PHC location. If no transactions IDs/transacting merchant descriptions were associated with PHC locations, method 2300F may proceed to 2316F which includes loyalty platform displaying an error message indicating to the PHC that at least one transaction ID/transacting merchant description and one PHC location should be associated in order to enable purchase tracking calibration. Method 2300F may then proceed to 2318F, whereat the loyalty platform may return to the merchant account interface, and method 2300F may then end.

However, if at 2314F, the loyalty platform determines that at least one purchase ID/transacting merchant description and one PHC location have been associated, method 2300F may then proceed to 2320F. At 2320F method 2300F includes displaying the PHC location(s) successfully associated with the rewards program. Further, the association (e.g., the mapping) between the PHC location(s) and transaction ID/transacting merchant description may be saved at the loyalty platform and applied by the purchase tracking module to identify future purchases made at the PHC location(s). Purchases made at these locations may now be more accurately tracked/linked to the PHC and thus associated with rewards programs offered by said PHC, as each participating PHC location is now mapped to a purchase ID/transacting merchant description, thus increasing the accuracy of reward purchase tracking and reward allocation based on user spends at these locations. Method 2300F may then proceed to 2322F, whereat the loyalty platform may return to the merchant account interface. Method 2300F may then end.

In this way, method 2300F enables PHCs or other companies to calibrate purchase tracking by creating a map between merchant locations and spend IDs/transacting merchant descriptions, thus enabling the purchase tracking module of the loyalty platform to more accurately identify purchases made by users at these PHCs. This method may apply to PHCs, as described herein, but may be applied to virtually any type of merchant or business, including publically traded companies. For example, method 2300F may be applied to any business listed in the rewarding-business index of the loyalty platform, in order to accurately map business locations and transaction IDs/transacting merchant descriptions. In doing so, reward-earning transactions may be more accurately identified and rewards may be administered in a more accurate and efficient manner, which may reduce the processing burden of the loyalty platform and thereby improve the functioning of the loyalty platform.

Turning now to FIGS. 26A, 26B, and 26C, an exemplary flowchart illustrating methods 2400A, 2400B, and 2400C is shown. Methods 2400A, 2400B, and 2400C are transaction process methods of the computer-based rewards program, executed by the loyalty platform 2108. In this and other examples, "loyalty" or "loyalty selection" may be a selection of a first business in a market made by a user entitling the user to certain privileges including, but not limited to, equity rewards, discounts, special offers, promotions, and others. Making a "loyalty" selection entitles the user to the receipt of privileges from the first business of the market to which loyalty has been selected, but may preclude, or exclude, the user from receiving privileges from a second business, or other companies, in the market. In some examples, a user may be presented with a "loyalty-switch offer" which may be an offer for other privileges provided by a second business in the market, based upon a forfeit of loyalty and privileges to the first business and a selection of loyalty to the second business in the market.

Beginning with 2402A, a purchase tracking module (e.g., purchase tracking module 2122 of FIG. 23B) of a loyalty platform may receive an indication, or notification, that a user (for example, user 2102, 2116, 2118 of FIG. 23B) has made a purchase or executed a transaction, comprising a dollar amount, with a business (for example, PHCs 2138, 2140, 2106 of FIG. 23B), hereinafter referred to as the "transacting merchant". As described further, herein, the purchase tracking module may be configured to link to credit cards, debit cards, or any other trackable transaction medium, and when the link is completed, the purchase tracking module may receive all purchase notifications made with that trackable transaction medium. As an example, the transacting merchant may be listed within markets (e.g., markets 2156 of FIG. 23B). At 2404A the purchase tracking module may track and identify the business and the user involved in the transaction. As an example relating to FIG. 26A, a user may make a purchase with the use of a credit card, tracked by purchase tracking module, at a business. Moving to 2406A, purchasing module may then execute a user loyalty lookup, comprising looking up the user's loyalties stored in user accounts (e.g., user accounts 2114 of FIG. 23B) at user loyalties (e.g., user loyalties 2126 of FIG. 23B). Proceeding to 2408A, the method determines if the user is loyal to any business in the market. If the user loyalty lookup returns that the user is loyal to a business or merchant or brand in the market, then the method proceeds to 2401 of FIG. 26B, which will be explained in more detail below. As a further example, the user loyalty lookup may be executed by the purchase tracking module.

If the user loyalty lookup determines the user is not loyal to any business in the market, the method proceeds to 2410A, where the purchase tracking module requests, or queries, a loyalty manager (e.g., loyalty manager 2110 of FIG. 23B) for available or offered user equity rewards with the transacting merchant. Additionally, at 2410A, the loyalty manager may provide an option for the user to select loyalty in the market to the transacting merchant. The option provided by loyalty manager may include information regarding loyalty policies (e.g., loyalty policies 2142 of FIG. 23B) relating to the transacting merchant. The option provided by loyalty manager may, in an example, include notifications of the rewards available to the user if the user selects the option for the user to select loyalty in the market to the transacting merchant.

Proceeding to 2412A, method 2400A determines if the user has switched loyalty to the transacting merchant. If the user does select the loyalty-switch offer, the method may proceed to 2416A, wherein the user may earn the loyalty-switch offer. Additionally, as an example, the loyalty manager module may update the user's loyalties at user loyalties of user accounts, and the rewards manager (e.g., rewards manager 2112 of FIG. 23B) may update the user's current assets (e.g., assets 2130 of FIG. 23B) of user accounts. Furthermore, if the user accepts the loyalty-switch offer, the method may proceed to 2403 of FIG. 26C. If the user does not select the loyalty-switch offer, the method may proceed to 2414A wherein the user earns no equity rewards, privileges, or any other rewards which may comprise selecting the loyalty-switch offer and selecting loyalty to the transacting merchant.

Continuing now with FIG. 26B, at 2402B method 2400B includes determining if the user has made a loyalty selection to the transacting merchant. Determining if the user made a loyalty selection to the transacting merchant may include looking up the user's loyalties stored in user accounts at user loyalties via the purchasing module executing the user loyalty lookup. If the user loyalty lookup returns that the user is loyal to the transacting merchant, and is therefore intended to receive a reward according to the loyalty policies set forth, the method may proceed to 2403 of FIG. 26C, explained in more detail below. If the lookup at step 2402B determines that the user is not loyal to the transacting merchant, method 2400B may then proceed to 2404B where the loyalty manager may present the user with a loyalty-switch offer which may include an option for the user to select a loyalty to the transacting merchant and terminate previously-selected loyalty to another business in the market. As an example, the terms and policies of a loyalty-switch offer may be stored within loyalty policies. In some examples, loyalty-switch offers may include whole or fractional amounts of equity or crypto assets. In some examples, loyalty-switch offers may include equity, or equity-like, rewards offered on transactions and/or discounts on transactions. In an example, loyalty-switch offers may be temporary or permanent or may be based upon any user behavior as defined by the business responsible for the loyalty-switch offer and/or the platform. In an example, loyalty-switch offers may include temporarily higher or increased equity rewards for transactions executed with the transacting merchant.

Additionally, loyalty-switch offers may be presented, offered, or made available to the user at any time, for example, when the user is browsing through available loyalty selections, or as another example, at any desirable time when a user is interacting with the loyalty platform. In an example, a user who is conducting a transaction with a business, with which the user has not selected loyalty (for a given market), may receive a notification, for example via the purchase tracking module or the loyalty manager. The purchase tracking module or loyalty manager may inform the user that equity rewards may not be rewarded for the current transaction based on current loyalty selections. In some cases if the user is merely present within, at, or near a business the user is not loyal to, the notification may further include a loyalty-switch offer so that the user may begin to earn rewards and/or privileges associated with the transacting merchant.

After presenting the loyalty-switch offer to the user, at 2406B, the method 2400B continues where the purchase tracking module queries the loyalty manager and/or user loyalties to determine if the user has switched loyalty to the transacting merchant. If the user does not switch loyalty to the transacting merchant and declines the loyalty-switch offer, the method 2400B may proceed to 2408B where the user earns no equity rewards for the transaction. Contrastingly, if the user does switch loyalty to the transacting merchant, the method 2400B may proceed to 2410B where the loyalty manager may update the user's loyalties at user loyalties of user accounts. The method may further include the rewards manager updating the user's rewards (e.g., rewards 2128 of FIG. 23B) of user account (e.g., user account 2175 of FIG. 23B) to include the privileges and/or benefits of the loyalty-switch offer. After the user account (for example, user account 2175) has been updated, the method 2400B may then proceed to 2403 of FIG. 26C. As an example, if a user has selected loyalty to a first business but then selects loyalty to a second business via a loyalty-switch offer, the purchase tracking module may update user loyalties to include information that the user has now canceled loyalty or loyalty selection to the first business and selected loyalty to the second business.

Turning now to FIG. 26C, at 2402C of method 2400C, the purchase tracking module may have tracked a purchase between a user and a business with which the user has made a loyalty selection. As such, the loyalty platform may distribute a reward to the user account associated with the user via a reward allocation system, such as reward allocation system 2120 of FIG. 23B, based upon the user rewards of the user account.

In an example, a reward, which may comprise equity, or equity-like crypto assets, may be stored at assets, in user accounts. The example set forth above and herein may provide incentive for users to repeatedly shop (or increase number of transactions) and spend more money at companies which they have selected loyalty to as they may receive rewards, in some cases equity rewards, or equity-like crypto assets. In such an example, users may exhibit increased loyalty to stores or PHCs where they receive rewards.

At 2406C, the purchase tracking module may charge a transacting merchant a cumulative rewards charge wherein the cumulative rewards charge includes the value of the reward and a service charge. As an example, a service charge may be a fee charged by a loyalty platform (such as loyalty platform 2108 of FIG. 23B) for brokering the equity or equity-like reward, and the service charge may be a percentage of the total transaction dollar amount or it may be a flat dollar fee. In another example, the service charge may further include fees used for the creation, maintenance, or deflation mechanisms of, equity-like crypto assets, and as such a portion, or all, of the service charge may be allocated to a crypto asset manager, such as crypto asset manager 2180 of FIG. 23B. In another example, the cumulative rewards charge may be transferred from a rewards program fund previously loaded with value by the rewarding business, such as reward funds 2198 of FIG. 23B.

At 2408C, the purchase tracking module may request the reward allocation system to issue a buy order with an equity clearing system (e.g., equity clearing system 2104 of FIG. 23B), or crypto asset clearing system (e.g., crypto asset clearing system 2105 of FIG. 23B), for equity or crypto asset proportional to the amount of the reward. Once the equity clearing system, or the crypto asset clearing system, settles the transaction, at step 2410C, an assign module (e.g., assign module 2148 of FIG. 23B) of the reward allocation system may update the user asset to include the assigned reward, and method 2400C may end.

In some examples, the method may include determining a reward based upon any one or any combination of: the loyalty selection, and a transaction history of the user. If the user has made a loyalty selection to the transacting merchant, then the user may receive a reward. Furthermore, based upon the loyalty policy (e.g., stored in loyalty policies 2142 of FIG. 23B) of the transacting merchant, the reward may be modified based upon a transaction history of transactions (e.g., transactions 2132 of FIG. 23B) made by the user and/or the reward may be modified based upon a method of a user payment (e.g., user payment 2134 of FIG. 23B). For example, if a user meets certain criteria based upon past transaction history with the transacting merchant, then the user may receive a modified award. Furthermore, as an example if a user increases their spending, e.g., the frequency of transactions and/or amount of money spent per transaction, the user may receive a greater reward. Furthermore, as an example, if a user decreases his or her spending, the user may receive a lesser reward. In some examples, a modified reward may comprise a modified equity, or equity-like, reward percentage wherein the percentage of the transaction monetary value put towards equity rewards is modified based upon transaction history and/or loyalty history. In some examples, a modified reward may comprise an equity, or equity-like, reward percentage, as disclosed above, as well as a set amount of equity (either fractional or whole shares). As an example, rules and/or instructions for modifying rewards based upon transaction history or user behavior or user history, as mentioned above, may be included in reward policies.

As a further example, if a user uses a particular credit card or particular payment method, which may be promoted or preferred with respect to the transacting merchant, then the user may receive a modified reward based upon a modification policy, wherein the modification policy applies a reward modifier to the reward based upon the payment method used for the transaction.

Turning to FIGS. 27-30 now, representations of exemplary graphical user interfaces (GUI) which may be displayed on a device of a user are shown. As an example, FIGS. 27-30 are shown as GUIs displayed on a mobile phone, however, the GUIs may be adapted to any computing device, mobile or stationary, interactive TV, heads-up display, virtual or augmented reality, or any other display comprising a user input functionality. In an example, the computing device of the user for viewing and operation of GUIs of FIGS. 27-30 may be connected to the Internet. For simplicity, FIGS. 27-30 may be discussed collectively.

As an example, with respect to any and all figures described, when notifications, alerts, loyalty-switch offers, or otherwise are mentioned to be "displayed" or provided to the user, it may be understood that any notifications, alerts, loyalty-switch offers, or otherwise are sent from a computing device to be displayed or provided via a mobile phone, desktop computer, laptop, personal computer and/or computing device of any kind and may be displayed via a display.

FIG. 27 is an example graphical interface including a graphical user interface (GUI) 2500 for PHC input of new merchant account information. GUI 2500 may be included as part of a method for merchant account creation, such as in method 2300B at step 2302B of FIG. 25B. GUI 2500 may comprise one or more fields for input of merchant account information, such as addresses of store locations, address of business headquarters, business type (markets in which the business operates), and business contact information (such as email, phone number, etc.). Additionally, GUI 2500 may include one or more messages or written instructions to the PHC, for clarification of required input, which may be displayed to the PHC via the display device. Data input into one or more of the fields may occur via an input device, such as a touch screen of a smartphone, a keypad, a keyboard, a mouse, or other hardware devices suitable for converting user gestures or motions into data for storage in one or more computer memory devices of loyalty platform 2108.

Turning now to FIG. 28, an example graphical interface is shown, including a graphical user interface (GUI) 2600 for PHC input of payment method information. GUI 2600 may be displayed on a PHC display device by a loyalty platform, such as loyalty platform 2108 of FIG. 23B, as part of a method for new rewards program creation, such as method 2300D at step 2318D of FIG. 25D. GUI 2600 may comprise one or more fields for input of payment method information, such debit card numbers, credit card numbers, bank account information, digital wallet address and key, or any other information associated with a payment account or payment service by which the PHC may load funds into a newly created rewards program. GUI 2600 may further include one or more fields wherein the PHC may specify an amount of value to load into a rewards program using the payment method. Data input into one or more of said fields may occur via an input device, such as a touch screen of a smartphone, a keypad, a keyboard, a mouse, or other hardware devices suitable for converting gestures or motions into data for storage in one or more computer memory devices of loyalty platform 2108. Payment method information entered into a GUI, such as GUI 2600, may be stored on memory of the loyalty platform, and such a stored payment method may be selected for future purchases made on the loyalty platform without the PHC reentering the payment method details.

FIG. 29 is an example graphical interface including a graphical user interface (GUI) 2700 for PHCs or other companies to select an asset with which to reward loyalty users. GUI 2700 may be included as part of rewards program creation, such as in method 2300D at step 2302D and/or 2310D of FIG. 25D. GUI 2700 may display selectable reward assets, such as equities or crypto assets, and the selectable assets may be organized by type (U.S. securities or crypto assets), associated companies (all assets related to a certain market or industry), or may be searchable using a search field. The assets with which a given PHC or other business may choose to reward their users may be based on information provided during loyalty platform account creation, and as such, the selectable assets on GUI 2700 may be based on this information. Additionally, GUI 2700 may include details regarding selectable assets which may facilitate asset selection by the PHC or other business. In one example, crypto assets may include information regarding the deflation mechanism of said asset, the PHCs associated with the crypto asset, and the criterion specifying which companies or PHCs may reward using the crypto asset. Additionally, GUI 2700 may include one or more fields for selecting the rate (flat or percent of purchase) with which loyalty users are rewarded. In some examples the rate of rewards is a fixed percentage of the loyalty user purchase amount (monetary amount). In another example, the reward rate may be based on a loyalty history, or transaction history, of the loyalty user, such as a rate schedule which gives a higher rate of reward to users with a consistent history of spending at the rewarding business. GUI 2700 may further include a cumulative fee breakdown, showing the total fee charged per transaction (either as a flat amount or as a percent of the transaction total), and the allocation of the cumulative fee. Data input into one or more of said fields may occur via an input device, such as a touch screen of a smartphone, a keypad, a keyboard, a mouse, or other hardware devices suitable for converting gestures or motions into data for storage in one or more computer memory devices of loyalty platform 2108 of FIG. 23B.

Turning now to FIG. 30, an example graphical interface including a graphical user interface (GUI) 2800 for calibrating purchase tracking is shown. GUI 2800 may be included as part of a method for purchase tracking calibration, such as in method 2300F at step 2302F and 2312F of FIG. 25E. GUI 2800 may comprise one or more fields for input of payment method information, spend IDs (history of tracked purchases) on said payment method, and business location at which an associated spend occurred. Additionally, GUI 2800 may include one or more messages or written instructions to the PHC, for clarification of required input, which may be displayed to the PHC via the display device. In one example, selecting a previously registered payment method causes a history of tracked purchases made with the payment method to be displayed on GUI 2800, such as via a pulldown menu, wherein the transactions may be selectable. In another example, business locations may be displayed, and selectable, such that business locations previously input and stored in computer readable memory of a loyalty platform, such as during merchant account creation as at step 2302B of method 2300B of FIG. 25B, may be displayed to the PHC along with an indication of the purchase tracking calibration status of that business location (such as verified or unverified). In another example, by selecting a business location and a tracked purchase made using the payment method at that business location, a purchase tracking system or module, such as purchase tracking module 2122 of FIG. 23B, may associate the selected purchase (including the spend ID) with the selected business location. Associating/linking spend IDs with specific business locations in this way enables more accurate mapping of spends to business locations, which in turn enables more accurate rewards distribution to users and improves the functioning of the loyalty platform by reducing the distribution of inaccurate rewards that can cause increased processing by the loyalty platform. Data input into one or more of said fields may occur via an input device, such as a touch screen of a smartphone, a keypad, a keyboard, a mouse, or other hardware devices suitable for converting gestures or motions into data for storage in one or more computer memory devices of loyalty platform 2108.

Turning now to FIG. 31, an illustrative diagram showing an example process 2900 of how a crypto asset manager, such as crypto asset manager 2180 of FIG. 23B, may create a new crypto asset through an ICO, such as may occur in method 2300E at step 2310E of FIG. 25E. Process 2900 includes allocating 50% of the revenue made from the ICO to initiate the deflation mechanism of the crypto asset, which is an asset backing mechanism in this case, by buying an amount of a traditional security for which the newly issued crypto asset may be exchanged, such as on crypto asset/backed security exchange 2182 hosted by the crypto asset manager. Process 2900 further includes allocating 50% of the funds raised via the ICO to the crypto asset manager. In one example, ICO funds allocated to the crypto asset manager are used to develop the network (nodes, miners, etc.) required for implementation of a crypto asset. In other examples, ICO funds allocated to the crypto asset manager may be used to market the new crypto asset, or to cover costs associated with conducting an ICO. Process 2900 further illustrates that newly issued crypto asset is distributed to ICO investors following successful completion of the ICO. Following crypto asset distribution, the newly issued crypto asset may be listed on crypto asset exchanges, such as crypto asset clearing system 2105.

Turning now to FIG. 32, an illustration of an example process 2910 is shown. Process 2910 illustrates how PHCs may increase user demand by providing equity-like rewards via a loyalty platform.

Figure 33:
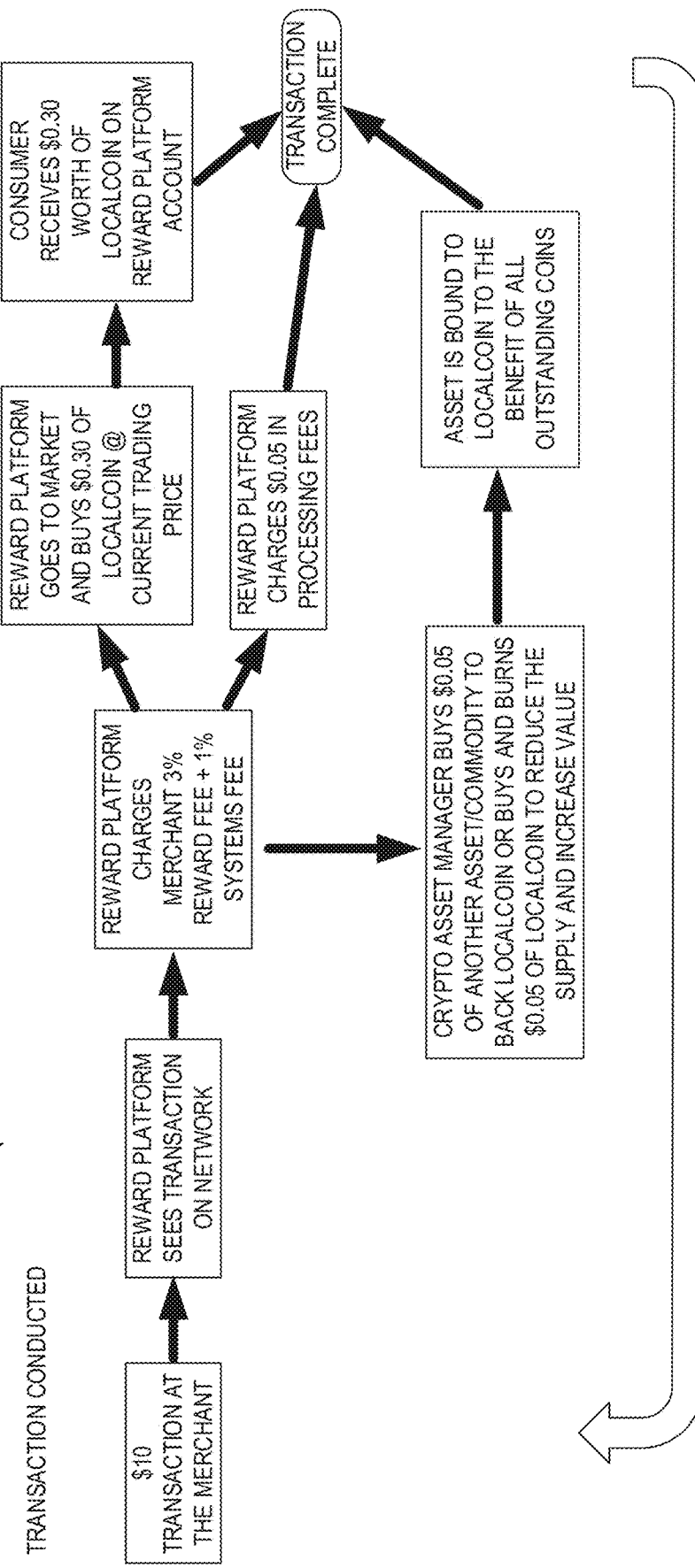

Turning to FIG. 33, an example transaction model 2920 of a crypto asset is shown in diagram. Transaction model 2920 illustrates one example of how a crypto asset, used as part of a rewards program, may increase in value based on transactions made at rewarding business or PHCs (a rewarding business or PHC is herein defined to mean a business or other entity, registered with a loyalty platform, and actively conducting a rewards program through the loyalty platform). In transaction model 2920, the loyalty platform dictates that a portion of each loyalty transaction goes to the crypto asset manager to implement the deflation mechanism associated with the given crypto asset, as directed by the loyalty platform. Thus, as the number of loyalty transactions increase, the amount of money allocated to the deflation mechanism of the crypto asset increases (thereby increasing its value). This is one example by which a crypto asset may be tied or linked to the revenue or success of a company, which may be especially advantageous in cases where the company is not publicly traded and thus may particularly benefit from creation of an equity-like asset. The crypto asset manager may use these funds to implement the deflation mechanism detailed in the whitepaper of the crypto asset. In one example, the deflation mechanism includes the crypto asset manager buying a portion of a backing security for the crypto asset, with the backing security being a security with low price volatility in some examples. In another example, the deflation mechanism includes the crypto asset manager buying an amount of the crypto asset at market price, and burning said amount (immutably removing said amount from circulation), thereby reducing the total supply of the crypto asset and increasing the value of the remaining crypto asset.

In one example, a method of providing an equity-like reward with a loyalty platform includes receiving an indication of a user purchase at a selected company, based on a relationship defined for the user and the selected company, receiving a request to issue a reward to the user for the user purchase, and, responsive to receiving the request, determining a success-linked crypto asset for the user based on one or more characteristics of the transaction, the user, and/or the selected company. The method may further include issuing the determined success-linked crypto asset to an account associated with the user, and triggering display, on a user computing device of an indication of the success-linked crypto asset. In a first example of the method, an amount of the determined success-linked crypto asset may additionally or alternatively be based on one or more of a purchase amount for the transaction, rules of a rewards program as established by the selected company, and loyalties selected by the user. A second example of the method optionally includes the first example, and further includes the method, wherein a value of the determined success-linked crypto asset is based on a revenue generated by the selected company. A third example of the method optionally includes one or both of the first example and the second example, and further includes the method, wherein the success-linked crypto asset includes a commodity or security backing the success-linked crypto asset. A fourth example of the method optionally includes one or more of the first through the third examples, and further includes the method, wherein issuing the success-linked crypto asset to the account includes generating an updated account total that includes the success-linked crypto asset and updating the account to reflect the updated account total. A fifth example of the method optionally includes one or more of the first through the fourth examples, and further includes the method, wherein the transaction is a first transaction, the method further comprising receiving an indication of a second transaction in which the user requests to use at least a portion of assets in the account toward a purchase amount associated with the second transaction, determining a value of the assets in the account based on an amount of success-linked crypto assets in the account and a revenue of the selected company at a time of the second transaction, and withdrawing a number of the success-linked crypto assets based on the purchase amount and the determined value of the success-linked crypto assets. In this way, the method has a technical effect of increasing an efficiency of the asset management system using a single asset (the success-linked crypto asset) to respond to both user transactions and company performance (e.g., revenue).

In another example, a method of grouping companies for providing success-linked rewards with a crypto asset management system, the method including receiving selection from a user indicating loyalty to a selected company, the selected company being included in a rewards program group of privately-held companies, receiving an indication of a transaction performed by a user at the selected company, based on a relationship defined for the user and the rewards program group, receiving a request to issue a reward to the user for performing the transaction, responsive to receiving the request, determining a success-linked crypto asset for the user based on one or more characteristics of the transaction, the user, and/or the rewards program group, issuing the determined success-linked crypto asset to an account associated with the user, the success-linked crypto asset having a value that is based on revenue generated by members of the rewards program group, triggering display, on a display device associated with the user, of an indication of the success-linked crypto asset. In a first example of the method, the method may additionally or alternatively further include monitoring, with the crypto asset management system, a value of the account based on changes in the revenue generated by the members of the rewards program group. A second example of the method optionally includes the first example, and further includes the method, wherein an amount of the determined success-linked crypto asset is based on one or more of a purchase amount for the transaction, rules of a rewards program as established by the selected company, and loyalties selected by the user. In this way, the method has a technical effect of increasing an efficiency of an asset management system by combining rewards programs for multiple companies (e.g., based on a class or other grouping feature for the companies and a loyalty selection from a user).

Another embodiment disclosed herein is directed to systems and methods for a loyalty platform providing fractional equity rewards to users based on tracked user loyalty purchases (the term "user" or "users" is herein used interchangeably with the terms "customer" or "customers"), as shown and described below with respect to FIGS. 34A-63. Conventional reward programs, such as mail-in rebates or reward points based programs, suffer because they fail to build user loyalty with a particular brand in the long term. One reason for this failure is that one-time rewards, like a rebate or a physical prize rewarded after redeeming a certain number of accumulated points, do little to align the interests of the user with the interests of the rewarding company beyond a certain limited time frame. Another factor limiting the success of conventional reward programs to generate user loyalty is the effort required on the part of the user to record and/or submit proof of purchases which may be eligible for a reward, such as when a user is required to enter a code or other proof of purchase into an online account in order to receive credit/points for the purchase, or when a proof of purchase must be mailed-in in order to receive a rebate. Additionally, in points based rewards programs, accrued points often come with an expiration date or date when the points must be redeemed by, thereby placing an additional burden on the user to hurriedly redeem their points and further exacerbating the inability of such programs to maintain user loyalty over the long term. Points frequently have no real value outside the scope of a rewards program and, as such, mean little to customers in the grand scheme of their financial picture. Furthermore, rewards programs often have unrealistic goals requiring many dollars spent and points earned in order to earn a small reward.

One approach to increase customer loyalty over the long term is to reward customers with shares of stock in the businesses they patronize. As shares of stock held by customers may establish a meaningful long term relationship between customers and brands, rewarding customers with an equity reward, as opposed to a cash reward, enables greater longer term loyalty and alignment of interests between customers and brands. However, as shares of stock are conventionally bought and sold on the open market as whole shares, and as the price for a single share of stock in a business may be substantial (for example, the price of Amazon stock at the time of writing is $1,829/share), it may be unrealistic to reward a customer purchase with a whole share of stock, such as when a purchase amount is relatively small (especially in comparison to a share price associated with the transacting business/brand). As such, the potential of equity reward programs to generate customer loyalty has remained unrealized and there is a recognized need to provide a method for rewarding customers with fractional shares of stock.

Conventional methods aimed at addressing these issues teach providing fractional shares of stock as rewards to customers who engage in promotional activity, wherein the fractional shares of stock may be transferred to the customer from an inventory containing a supply of whole shares of stock. In one example, when a customer is eligible to receive a $5 reward based on participation in a promotional activity with a business, that $5 reward may be in the form of $5 of stock in the business, which may take the form of a fractional share of stock and may be allocated to the customer from a supply of whole shares of stock stored in an inventory of the reward provider. Further, a supply of shares of stock in the inventory of the reward provider may increase based on the amount of fractional shares of stock held by all customers, such that the amount of shares of stock in the inventory account is equal to or greater than the cumulative amount of shares of stock held by all customers.

However, the inventors herein have identified several issues with the above approach. In one example, the conventional approach discussed above may require maintaining an inventory of whole shares of stock (for providing fractional equity rewards) which is equal to or greater than an aggregate number of shares of stock held by the customers. Such a method of inventory control may require increasing the amount of stock held in the inventory as the total amount of stock held by customers increases, which may result in a large number of shares of stock being held in the inventory with a correspondingly large financial risk assumed by the reward provider. In another example, the above approach fails to account or provide mitigating actions for situations in which a delay occurs between when a customer claims a reward and when that reward is allocated to the customer. Such delays may reduce the ability of rewards to incentivize customer behavior by decoupling the incentive (the reward) from the incentivized behavior in the mind of the customer. Reward allocation delays may occur for numerous reasons, especially in the case of rewards comprising fractional shares of stock which may require more processing time and are conventionally less liquid than whole shares of stock. In one example, a reward delay may occur when funds from a merchant to be used to purchase the reward are not immediately available (such as when funds from a merchant must be transferred from a bank account of the merchant to an account of the reward provider), or when the reward amount exceeds an amount shares of stock currently held in an inventory and therefore must be purchased from the open market. In such cases, the customer may feel frustrated by the delay and the lack of feedback regarding the reward.

The embodiments disclosed herein may address these issues by enabling distribution of fractional equity rewards to users with a reduced probability of reward delay, a reduced amount of shares of stock held in an inventory account, and with reduced user frustration. In a first example, a method may include determining a first fractional number of shares of stock in a business to reward a user based on a tracked user loyalty purchase conducted by the user with the business, displaying an equity reward status to the user, aggregating the first fractional number of shares of stock in the business with one or more pending equity rewards in the business to form an aggregate pending equity reward, responding to the aggregate pending equity reward being greater than a pending reward threshold by purchasing a whole number of shares of stock in the business, wherein the whole number of shares of stock is equal to or greater than the aggregate pending equity reward, transferring a portion of the whole number of shares of stock to a merchant facilitation account associated with the business, transferring a remainder of the whole number of shares of stock to a residual account, distributing the first fractional number of shares of stock in the business to a reward account of the user from the merchant facilitation account associated with the business, and displaying an updated equity reward status to the user.

In this way, fractional shares of stock in a business may be distributed to customers in a timely manner based on tracked user loyalty purchases using a loyalty platform, while reducing risk associated with maintaining a large inventory of stock (wherein the risk may include a financial risk associated with holding equity), and while informing users of the status of their pending fractional equity rewards, thereby reducing user frustrations associated with potential reward delays. As an example, by providing the user with an equity reward status, which may comprise a graphical user interface displaying an amount of fractional shares earned as a reward for a user loyalty purchase, along with an estimated reward fulfillment time for the reward, user behavior may be more effectively incentivized via the fractional equity reward, as the equity reward status may be received faster than delivery of the fractional equity reward itself, and thus may more closely couple an incentivized behavior with the incentive for that behavior. As another example, by maintaining merchant deposit accounts on the loyalty platform, wherein the merchant deposit accounts are associated with businesses seeking to reward their customers in fractional shares of equity, the amount of time between the loyalty platform receiving funds from the merchant to purchase a stock reward, and distribution of that reward to the user based on rewardable action, may be reduced. [The merchant deposit accounts on the loyalty platform allow for rapid replenishment of funds to consumers, which in turn decreases the time to reward a consumer. This also allows for easy financial reconciliation for the merchant to understand or confirm that the funds supplied match the rewards distributed. The inclusion of the merchant deposit accounts on the loyalty platform also reduces network traffic since funds are pulled from a centralized location and not each time funds are required. Further, the merchant deposit accounts on the loyalty platform provides a security benefit because the configuration reduces network calls for transferring funds, since the funds and withdrawal/movement of the funds occurs within the loyalty platform, hence the system is much easier to secure than if the merchant deposit accounts were not included on the loyalty platform. For example, if the merchant deposit accounts were external to the loyalty platform, funds would be drawn each time a reward was applied, causing an external transaction with a merchant or merchant bank each time, and the more times any network executes an external communication/withdrawal, the externalities can add security risk.

Examples of a loyalty platform and related features are disclosed in U.S. Provisional Patent Application No. 62/697,284, entitled "DISTRIBUTING SUCCESS-LINKED REWARDS TO CUSTOMERS OF PRIVATELY HELD COMPANIES," filed on Jul. 12, 2018, and U.S. Provisional Patent Application No. 62/543,884, entitled "DETERMINING EQUITY REWARDS BASED UPON PURCHASE BEHAVIOR", filed on Aug. 10, 2017. The entire contents of each of the above-identified applications are hereby incorporated by reference for all purposes. The fractional equity rewards may comprise amounts of fractional shares of stock. As used herein, the terms fractional equity rewards, fractional shares of stock, fractional equity, fractional shares, fractions of Exchange Traded Funds (ETFs), fractional amounts of stock, and similar terms shall be used interchangeably, and shall be understood to refer to positive, non-zero, non-integer amounts of shares of stock. For example, the term fractional shares of stock may refer to amounts of stock such as 1.2 shares, 0.00040 shares, 0.017397 shares, 23.7 shares, and irrational amounts of shares of stock such as pi shares, or e shares. In some examples the stock may be publically traded, while in other examples the stock may be non-publically traded. The fractional equity reward may be provided to a user by the loyalty platform based on a tracked user loyalty purchase made at a business, wherein the business has a Merchant Agreement with the loyalty platform to provide loyalty customers of said business with rewards of equity on behalf of the business, and wherein a user loyalty purchase may comprise a purchase made by a user at a business to which the user has made a loyalty selection. As an example, the loyalty platform may have an agreement with a business, Coffee Company (a made up business for use as an example, we shall refer to the stock in Coffee Company as CC) to reward loyalty customers of Coffee Company with fractional shares of CC stock based on purchases made by these loyalty customers. The term loyalty customer(s) as used herein (with reference to a business, company, or brand) refers to customers who have made an exclusionary loyalty selection to a brand (in this example, to the Coffee Company), wherein the loyalty selection may exclude the customer from receiving rewards from competing brands (competing brands may comprise brands offering similar products, or brands which operate in a same market, wherein a market is a brand category defined by the loyalty platform). As an example, Coffee Company may reward loyalty customers with fractional shares of CC stock in an amount of 2% of a monetary value of customer purchases. As an example, based on a customer with a loyalty selection to Coffee Company conducting a purchase at Coffee Company with a monetary value of $50.00, that customer may be eligible to receive $1.00 worth of CC stock via the loyalty platform. With a current share price of CC stock being $52.15/share, the loyalty customer in the above example may receive a fractional share of CC in the amount of 0.01917 shares CC. In examples where stocks for a given business is not publicly traded, a non-stock asset, such as a crypto asset, may be provided in a similar manner to the stocks described above. For example, a crypto asset (or a number of crypto assets) that has a value tied to a revenue of the associated business may be provided to a user as a reward, where the monetary value of a unit of the crypto asset may vary with a revenue or other valuation of the business.

Figure 34A:
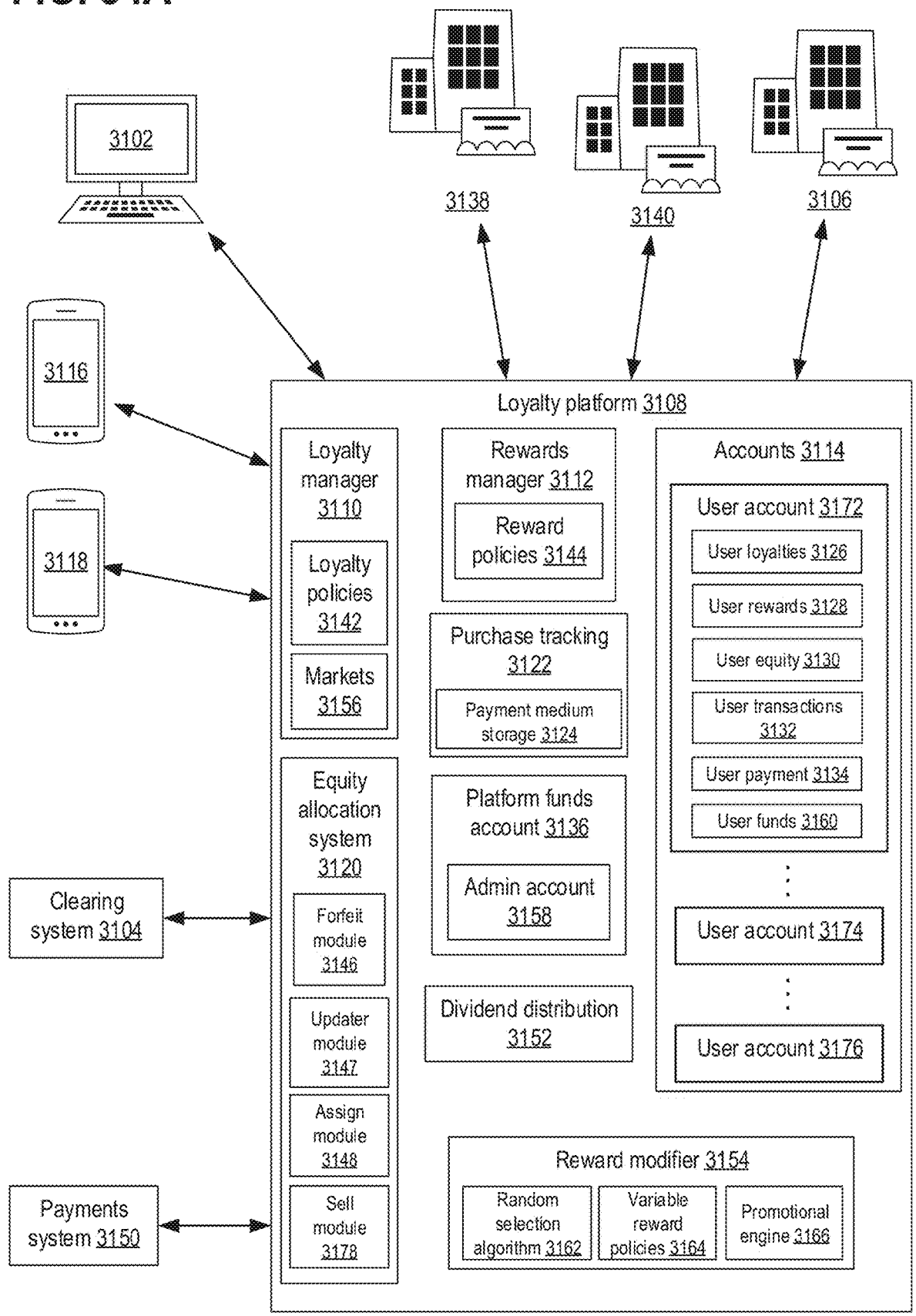
FIG. 34A shows another example of a loyalty platform.
Figure 37:
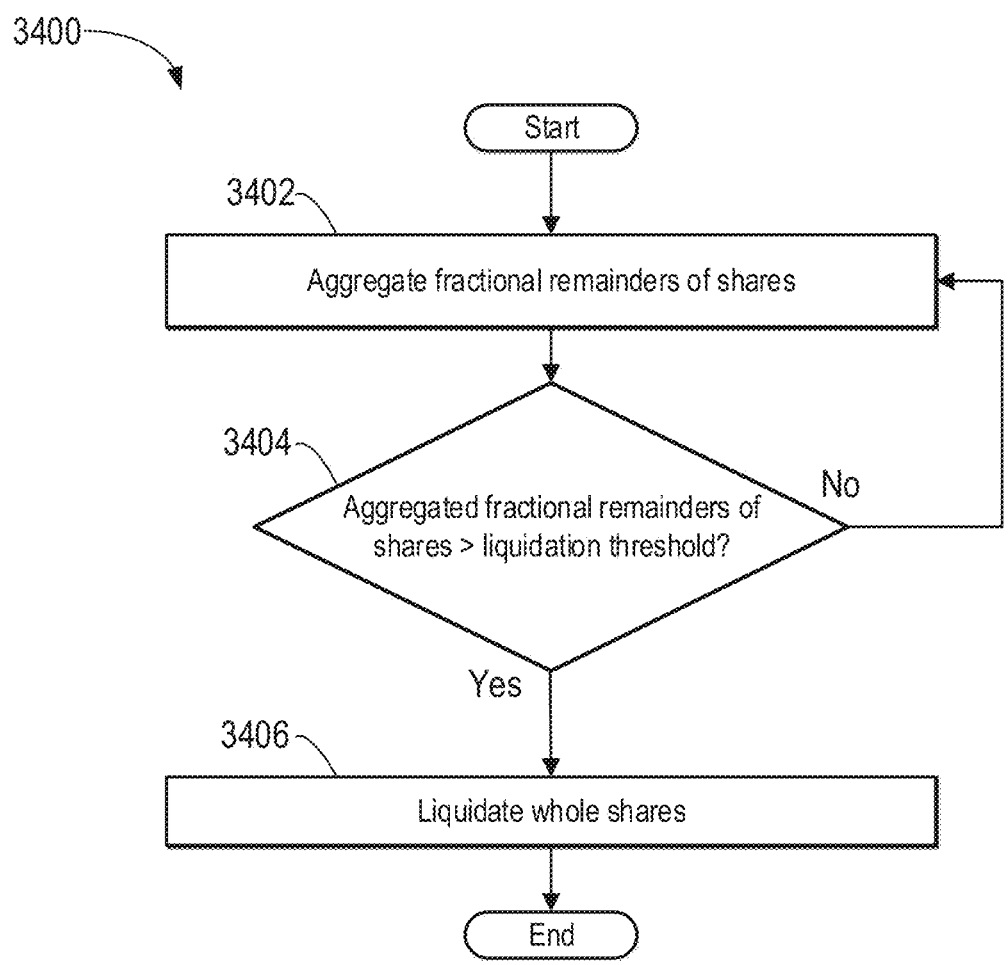
FIG. 37 shows a high level flowchart of a method for aggregating and liquidating fractional remainders of equity of the loyalty platform.
Figure 38:
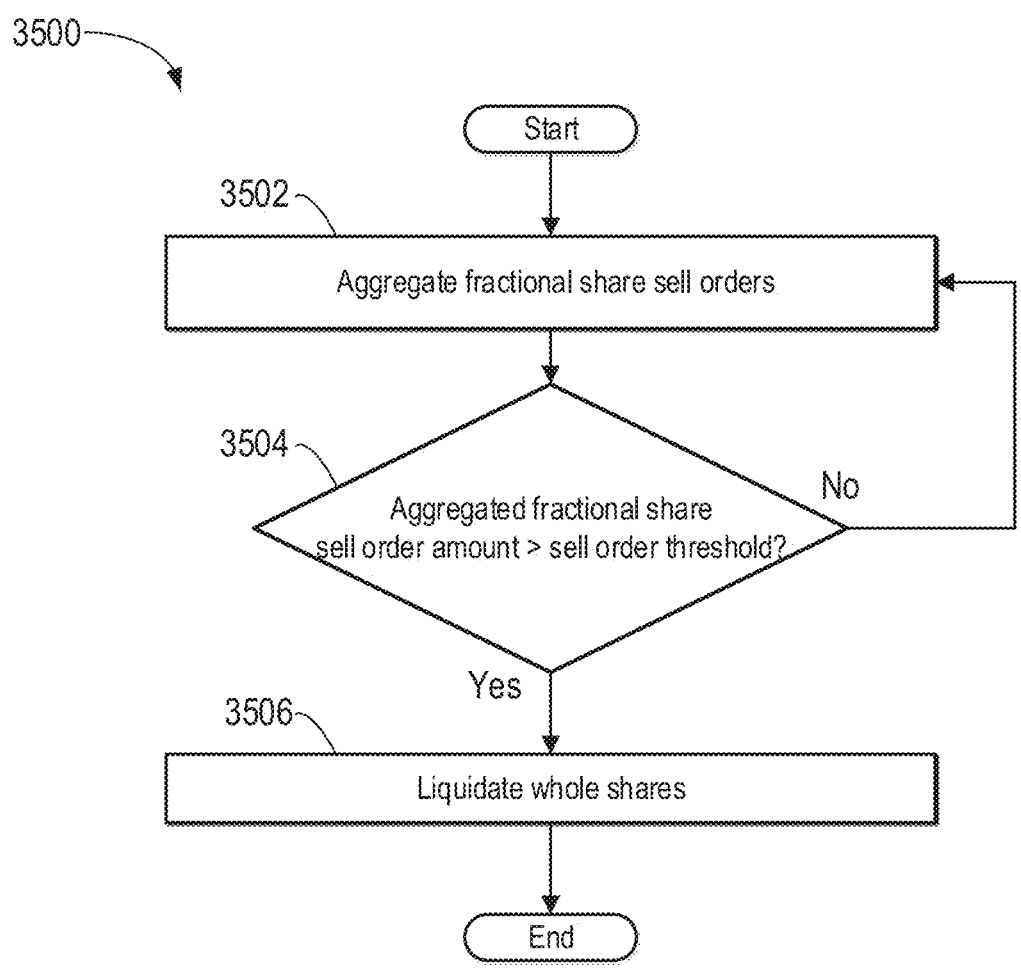
FIG. 38 shows a high level flowchart of a method for aggregating and executing user fractional equity sell orders.
Figure 39:
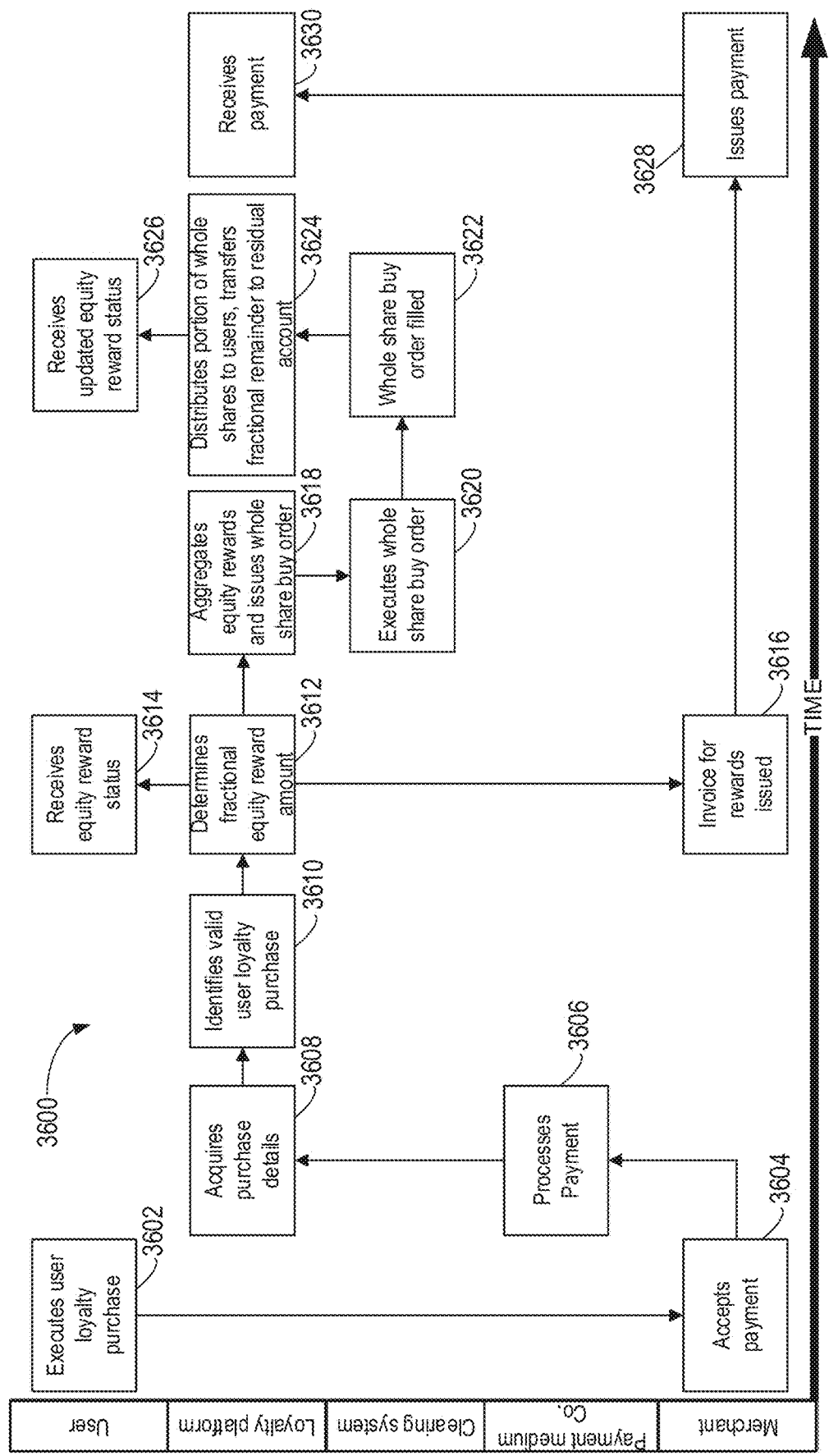
FIG. 39 shows an example timeline for distributing fractional equity rewards to users of the loyalty platform.
Figure 40:
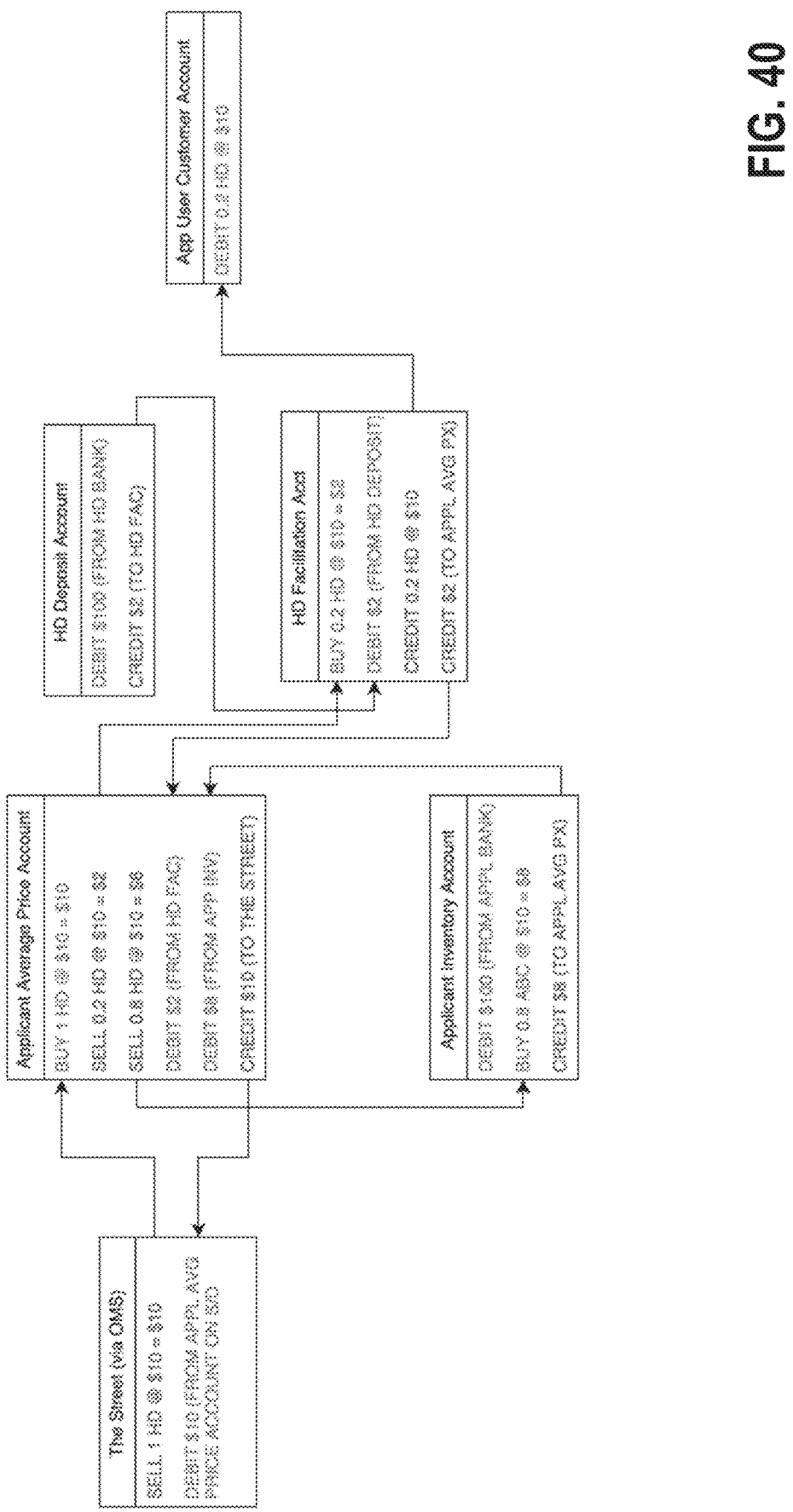
FIG. 40 shows example transactions for acquiring and distributing equity rewards using the loyalty platform.

The following description provides examples of systems and methods which may enable a loyalty platform, such as loyalty platform 3108 shown in FIG. 34A, to distribute fractional equity rewards to users while reducing a probability of reward distribution delay, reducing an amount of stock held by the loyalty platform, and reducing user frustration by providing equity reward statuses and estimated reward fulfilment times for fractional equity rewards. The loyalty platform may be implemented by one or more computing systems, such as computing system 3180 shown in FIG. 34B. Computing system 3180 may include non-transitory memory, which may include instructions that when executed carry out one or more steps of one or more of the methods herein disclosed, such as methods 3300, 3400, 3500, and 3600 discussed in detail below. It will be understood that loyalty platforms, such as loyalty platform 3108, may be implemented by more than one computing system, such as in a distributed computing scheme, wherein various functionalities of the loyalty platform may be enabled by a plurality of networked computing systems working in concert. Loyalty platform 3108 may comprise an equity allocation system, such as equity allocation system 3120 shown in FIG. 35, which may distribute fractional shares of stock to users based on tracked user loyalty purchases according to a method, such as method 3300 shown in FIG. 36. FIG. 37 shows one example of a method by which an equity allocation system of a loyalty platform, such as equity allocation system 3120, may liquidate fractional remainders of shares accumulated or aggregated in a residual account of a loyalty platform. Liquidation of aggregated fractional remainders of shares, such as by execution of method 3400, may maintain the amount of stock in the residual account below a liquidation threshold, thereby reducing the amount of risk assumed by the loyalty platform. FIG. 38 shows one example method by which an equity allocation system of a loyalty platform may enable users who have earned fractional equity rewards to place sell orders for part, or all, of their accumulated fractional equity rewards. FIG. 39 illustrates an example timeline for distributing fractional shares of equity to users of a loyalty platform using an equity allocation system, while FIG. 40 illustrates one specific example of distributing a fractional equity reward to a user. FIGS. 41-63 illustrate example graphical user interfaces of the loyalty platform, including graphical user interfaces which may be displayed to users by one or more of the systems herein disclosed, or as part of one or more steps of one or more of the methods herein disclosed.

In one example of a method for distributing fractional shares of stock to a user according to the current disclosure, a user of the loyalty platform may make a purchase at a participating business to which the user has made a loyalty selection (such as a business listed in rewarding-business index 3186 discussed in detail below) using a linked payment medium (such as a linked payment card). Once the payment settles between a payment card company and the participating business, a fractional share amount needed to satisfy a dollar reward amount is determined by the loyalty platform (for example, based on a 1% reward rate, a $100 purchase made by a user to a participating business may be eligible for a $1 reward of stock in the participating business, thus the dollar reward amount is $1 and the fractional equity reward will be a function of the dollar reward amount and a current market price of the stock to be purchased). Once a fractional share amount is determined for a given purchase, an equity reward status may be displayed to a user, indicating the current status of the pending fractional equity reward, which may comprise the fractional share amount and an estimated reward fulfillment time for the fractional equity reward. The fractional shares of stock to be rewarded to the user, which may herein be referred to as a pending fractional equity reward, may be aggregated with other pending fractional equity rewards earned by other users of the loyalty platform. For one example, pending fractional equity rewards from a plurality of users may be aggregated until the total amount of aggregated pending fractional equity rewards exceeds a pending reward threshold. A whole share buy order may then be entered in an average price account of the loyalty platform based on the aggregated pending fractional equity rewards. For example, if the aggregated pending fractional equity reward is 0.8 shares of stock X, a whole share buy order of the closest whole share amount which is greater than the aggregated pending fractional equity reward may be placed, in this case, a buy order for 1.0 shares of stock X may be placed. Once the buy order is fulfilled through a whole share transaction on the open market (such as through the NYSE), a portion of the whole shares in the average price account may be purchased from the average price account by a merchant facilitation account (in this case, the portion may be the 0.80 shares of stock X owed to the plurality of users).

The portion of the whole shares acquired by the merchant facilitation account may then be distributed or apportioned to the plurality of users in satisfaction of the aggregated pending fractional equity reward. For example, the merchant facilitation account may distribute the acquired 0.8 shares of stock X by allocating 0.5 shares of stock X to user A and 0.3 shares of stock X to user B, based on user A having a pending fractional equity reward of 0.5 shares of stock X and user B having a pending fractional equity reward of 0.3 shares of stock X. Upon distribution of the fractional equity rewards to the plurality of user accounts associated with the plurality of users, an updated equity reward status may be displayed to the plurality of users, indicating that the pending fractional equity reward has been distributed. Although in the current example the user receives two equity reward statuses, it is within the scope of the disclosure to send any number of equity reward statuses, which may be sent at any time during the process of aggregating, acquiring, and distributing, pending fractional equity rewards. For example, equity reward statuses may be displayed to a user via a display of a user computing device upon determination of an amount of fractional shares to be distributed to said user; a display to the user once the fractional equity reward has been aggregated with other fractional equity rewards; a display to the user upon acquisition of shares of equity by the merchant facilitation account; and a display to the user upon transfer of the pending fractional equity reward to the account of the user. Each of the fractional equity reward statuses may comprise different information and each equity reward status may further contain an updated estimated reward fulfillment time.

The funds used by the merchant facilitation account to buy the portion of the whole shares from the average price account may originate from the merchant deposit account; therefore funds may flow from the merchant deposit account to the open market by passing through the merchant facilitation account and the average price account. In addition to lowering network traffic and security risk as explained above, this process may help facilitate troubleshooting and resolution of performance issues by "splitting the circuit" into two portions, e.g., drawing from the merchant deposit account into another account, and then using the average price account to purchase shares. Thus, in the event there is an error in the movement of funds, the error may be more easily identified and resolved. A fractional remainder of shares left in the average price account after the portion of shares used to reward users has been purchased by the merchant facilitation account (in this case the fractional remainder of shares is 1.0–0.8=0.20 shares of stock X) may be purchased by a residual account of the loyalty platform and transferred thereto. Equity acquired by the average price account may be allocated to a merchant facilitation account and residual account within a threshold duration of time, such that the balance of equity within the average price account after a duration may be zero. For example, the process of allocating the portion of the whole shares of stock to the merchant facilitation account and transferring the fractional remainders of shares to the residual account may be completed within 24 hours, such that the average price account does not hold positions in equity for more than a 24 hour period. Whole share remainders of stock in the residual account may be sold on the open market. For example, a whole share remainder of stock in the residual account may be sold upon a total amount of stock within the residual account exceeding a liquidation threshold. In another example, a whole share remainder of stock may be sold periodically, such as after a predetermined duration of time has elapsed. In one example, selling a whole share remainder of stock may occur by placing a sell order from the residual account on the open market. In another example selling a whole share remainder of stock may occur by transferring the whole share remainder to the average price account and placing a sell order for the whole share remainder on the open market via the average price account. In this way, an amount of stock within a residual account of the loyalty platform may be reduced to below a liquidation threshold, thereby reducing the amount of risk assumed by the loyalty platform. Upon settlement, funds obtained from selling the whole share remainder may replenish the cash balance in the residual account, and may be used to purchase fractional remainders of shares left over after subsequent cycles of fractional equity reward distribution.

The loyalty platform may provide a notice to the participating business indicating an amount of funds needed to replenish a merchant deposit account maintained by and within the loyalty platform on behalf of the participating business. Funds stored within the merchant deposit account of the participating business may be utilized by the loyalty platform on behalf of the participating business to purchase shares of stock to reward customers of the participating business. "Replenish", as used herein with reference to funds within a merchant deposit account, may refer to maintaining funds within a merchant deposit account above a threshold amount of funds. In one example, a threshold amount of funds to be maintained within a merchant deposit account may be determined as a dollar amount corresponding to ten days' worth of fractional equity rewards for that business, such as may be determined using a rolling average rate of fractional equity reward distribution for a given business. The participating business may, based on the provided notice, direct its bank to transfer via ACH this dollar amount to the merchant deposit account.

FIG. 34A schematically shows an example loyalty platform 3108. Loyalty platform 3108 may be implemented by one or more computing systems. In one example, loyalty platform 3108 may be implemented by a server. In another example, loyalty platform 108 may be implemented by a plurality of computing systems working in concert, such as through a network connection, wherein each of the plurality of computing systems may implement part of the loyalty platform 3108. Loyalty platform 3108 may be configured to electronically communicate with external computing systems, such as user computing systems 3102, 3116, and 3118, businesses 3106, 3138, and 3140, clearing system 3104, and payments system 3150. In one example, loyalty platform 3108 may be configured to electronically communicate with one or more additional computing systems via a network such as the Internet, wherein the electronic communication may in one example comprise transmission and reception of data between the loyalty platform 3108 and one or more additional computing systems.

User computing devices 3102, 3116, 3118, which may interface with loyalty platform 3108 via a network connection, may each be associated with at least one user and further associated with at least one user account stored in non-transitory memory of one or more a computing systems implementing loyalty platform 3108. As an example, use of the term "user" or "prospective user" or may refer to any legal entity, whether individual or corporate. Each user computing device may be associated with a user and thus enable the user to communicate with loyalty platform 3108.

In one example, user computing devices 3102, 3116, 3118 may be associated with user accounts 3172, 3174, 3176 and may be any associated corporation or associated individual. Users associated with user computing devices 3102, 3116, and 3118 may register with loyalty platform 3108 and make user purchases at a plurality of businesses, such as businesses 3138, 3140, 3106. Based upon user loyalty selections, wherein a loyalty selection may comprise a selection of an exclusionary loyalty to one business in a market, the user may be entitled to a fractional equity reward upon executing a user loyalty purchase (a purchase between a user and a business with which the user has made a loyalty selection). Additionally, the user may be excluded from receiving rewards from unselected businesses based on the loyalty selection. In one example, upon distribution of the fractional equity reward to a user account, such as user account 3172 within user accounts 3114 on loyalty platform 3108, the loyalty platform 3108 may transmit an equity reward status via network connection to the user computing device to display information pertaining to a pending fractional equity reward (as used herein, the terms pending fractional equity reward, and pending reward, refer to a fractional share of stock to which a user is entitled based on a user loyalty purchase, but which has not yet been distributed to the user). In one example, an equity reward status, such as that illustrated in FIG. 42, may indicate a current stage or state of reward distribution for a pending fractional equity reward or for a plurality of pending fractional equity rewards. In another example, an equity reward status may include an estimated reward fulfillment time for a pending fractional equity reward, such as an expected date by which the pending fractional equity reward may be distributed to the user account or an estimated duration of time until one or more stages or steps of the reward distribution process are completed (for example, a stage or step of the reward distribution process may comprise one or more of calculating the fractional equity reward, aggregating the fractional equity reward, purchasing the fractional equity reward, and distributing the fractional equity reward to the user account).

User computing devices 3102, 3116, 3118 may each include a processor, memory, communication interface, display, user input devices, GPS/position sensors, and/or other components. In one example, a location of user computing device 3116 may be determined via a GPS system associated therewith. In one example, information from loyalty platform 3108 may be transmitted to user computing device 3118 via a network connection (such as the Internet) between user computing device 3118 and loyalty platform 3108, for rendering within an interface or display implemented at user computing device 3116. The display may be used to present a visual representation of the loyalty platform 3108. This visual representation may take the form of a graphical user interface (GUI), examples of which are illustrated in FIGS. 41-63, 69-71, 75A-B, and 77A-C. The communication interface may communicatively couple the loyalty platform 3108 with one or more other computing systems, such as the payments system 3150, clearing system 3104, user computing devices, and/or business computing devices. The communication interface may include wired and/or wireless communication devices compatible with one or more different communication protocols. As non-limiting examples, the communication interface may be configured for communication via a wireless telephone network, or a wired or wireless local- or wide-area network. User input device(s) may comprise one or more user-input devices such as a keyboard, mouse, touch screen, or game controller.

Clearing system 3104 may comprise one or more computing devices each including a processor, memory, communication interface, and/or other components. The memory of the computing device(s) of clearing system 3104 includes instructions or rules for managing a clearing house for assignment of public shares. As a further example, clearing system 3104 may comprise a clearing house for assignment of non-public shares. Clearing system 3104 may communicate with equity allocation system 3120 of loyalty platform 3108 in order to execute transactions such as the buying or selling of shares, or fractional shares, via average price account 3260 of the equity allocation system 3120.

Payments system 3150 may comprise one or more computing devices each including a processor, memory, communication interface, network adapter, user input device(s), and/or other components. The memory of the computing device(s) of payments system 3150 includes instructions or rules for disbursing and/or receiving payments via one or more banks, bank accounts, credit card accounts, checking accounts, online payments systems, or virtual wallets. In some examples, payments system 3150 may include discrete accounts, each of which may be associated with a user account 3172, 3174, 3176 of accounts 3114 on the loyalty platform 3108.

Businesses 3138, 3140, and 3106 may be any merchant, business place, brand, bank, financial institution, entrepreneur or entrepreneurial entity associated with loyalty platform 3108. As an example, use of the term "business" or "merchant" or "brand" may contemplate any stock corporation, whether private or public. Each business may communicate with loyalty platform 3108, for example, via a business computing device. Each user computing device may include a processor, memory storing instructions executable by the processor, display, user input devices, and a communication interface.

Figure 34B:
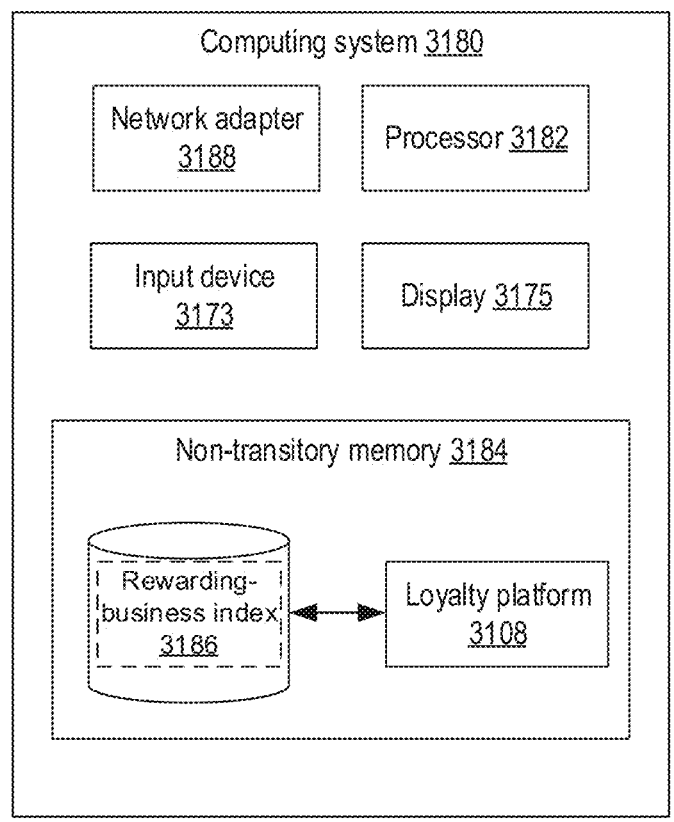
FIG. 34B shows an example of a computing system implementing the loyalty platform of FIG. 34A.

Any of the computing devices, modules, or elements described herein with reference to FIG. 34A and FIG. 34B may communicate with each other via a network. For example, loyalty platform 3108 may communicate with clearing system 3104 and payments system 3150 via a network.

Loyalty platform 3108 may include a plurality of modules including a loyalty manager 3110, rewards manager 3112, accounts 3114, equity allocation system 3120, purchase tracking 3122, platform account 3136, dividend distribution 3152, and reward modifier 3154. As illustrated in exemplary FIG. 34B, the various modules of the loyalty platform 3108 may include instructions stored in non-transitory memory 3184 that are executable by processor 3182 of computing system 3180. In other examples, the modules may be stored on multiple memories and/or executed by multiple processors distributed across multiple computing devices connected by a network.

Loyalty manager 3110 administers loyalty policies 3142 and updates user loyalties 3126 of accounts 3114 with updated loyalty policies relating to businesses to which a user may make a loyalty selection. Loyalty manager 3110 includes loyalty policies 3142 and markets 3156. Markets 3156 may be a database or module which may further represent suitable information regarding categorization of businesses affiliated with loyalty platform 3108 into discrete markets or business segments wherein the businesses segmented into different markets compete in some way or offer similar products and/or services additionally/alternatively, such information may be stored in rewarding business index 3186 shown in FIG. 34B. Loyalty manager 3110 may represent suitable information regarding loyalty selections of the loyalty platform 3108. As a non-limiting example, loyalty manager 3110 may include market definitions for a market such as "Groceries (National)." In some examples, businesses not affiliated and/or businesses pending affiliation or partnership with the platform may be listed in the markets database. In an example, businesses listed in the markets database may have different statuses such as "non-partner" (if not partnered with the platform), "partner" (if partnered with the platform), and "pending partner" (if partnership with the platform is pending). Business statuses in the markets 3156 may be useful as they may allow users to be made aware of businesses which may or may not become platform partners over time, which may factor into a user's decision to make a loyalty selection to a particular business in a market. In one example, a "Groceries (National)" market might include large, nation-wide grocery chains, not limited to, for example, COSTCO, ALBERTSON'S, DOLLAR GENERAL, KROGER. In an example, a market may include any number of businesses and there may be any number of markets included in markets 3156. In an example, market definitions may be defined by administrators of the platform account 3136.

Additionally, loyalty manager 3110 may include loyalty policies 3142 which may further include instructions or information relating to managing loyalties across markets 3156 of loyalty platform 3108. Separating businesses into individual markets is not so simple, as many business and/or merchants exist not only in one market, but are diversified and compete in many different markets. For example, a massive big-box store such as WALMART sells not only groceries, but also home goods, including electronics, prescription medications, and clothing. As such, loyalty manager 3110 may further include loyalty policies 3142 that limit the loyalty selections for a user across different markets, so that a user may only select loyalty to a particular business across different markets (of markets 3156) a particular number of times. In an example, a user may be allowed to select loyalty to only one business for a single market. In another example, a user may be allowed to select a first loyalty to a business in a first market and to select a second loyalty to the business in a second market. In a further example, a user may be allowed to select loyalty to a business as many times as allowed by loyalty policies 3142 across different markets, if the business is "multi-listed" or offered as a loyalty selection across different markets. In a further example, a user may be allowed to select loyalty to one or more businesses listed within a market.

Further, in some examples, loyalty manager 3110 may process loyalty switches of the user. In one example a user may elect to switch-loyalties after receiving a loyalty-review from the loyalty platform. In one example, a "loyalty review" may display to a user a purchase history, along with an indication of which purchases received loyalty rewards, which purchases did not receive loyalty rewards, and which purchases could have received a greater amount of loyalty rewards if a loyalty-switch was made. For example, the loyalty platform may display a "loyalty review" button within a user interface on a display of a user device, upon selection of the "loyalty review" button by the consumer, a purchase history in the grocery category (as used herein, a category of the loyalty platform is equivalent to a market of the loyalty platform) may be displayed in the user interface, wherein the purchase history may indicate that the user was spending 40% (of the total spent in the grocery category of the loyalty platform) over the last 3 months at Kroger, and 60% at Albertson's, but their loyalty is to Kroger. Based on the information displayed to the user by the loyalty review, the user may elect to switch loyalties from Kroger to Albertson's. In one example, the loyalty review may include automatically prompting a user with a loyalty-switch offer upon a determination that the user spends more with a business in a market to which the user is not currently loyal than the user spends with a business to which the user is currently loyal. In response to a user selecting a loyalty switch offer, loyalty manager 3110 may update user loyalties associated with an account of a user, such as user loyalties 3126 of user account 3172.

Rewards manager 3112 may be a module or database and may include reward policies 3144 which may further include instructions or information comprising rules for providing fractional equity rewards based upon a user's selected loyalty to a transacting business (business with which transaction occurs). Additionally, reward policies 3144, in an example, may include specific rule sets regarding equity rewards for a user executing purchases at or with a particular business (herein referred to as business reward policies) to which the user has selected loyalty via the loyalty platform. As an example, a user's long-term loyalty may be rewarded with increased equity rewards. In some examples, equity rewards may increase over time while in other examples, equity rewards may randomly and/or predictably vary over time. In some examples, variable, increasing, and/or long-term loyalty rewards may form stronger user-business relationships and user loyalty. Additionally, if a user switches loyalties from a first company in a first market to a second company in the first market, a promotional "loyalty-switch offer" may be made available to the user. In an example, a "loyalty-switch offer" may comprise a period of increased equity rewards per transaction with the business. For example, a "loyalty-switch offer" might also comprise any of a cash reward, discounted purchases, a set amount of equity, or any other loyalty-switch promotion desired by the administrators of the loyalty platform. As a further example, administrator account 3158 or platform account 3136 may modify reward policies 3144 of rewards manager 3112.

Accounts 3114 may be a module or database including instructions, information, and/or rules relating to personal and loyalty platform information for each user 3102, 3116, 3118 associated with the loyalty platform 3108. As an example, users 3102, 3116, and 3118 may register with loyalty platform 3108 via a smartphone, computer, point-of-sale unit at businesses 3106, 3138, 3140, or other network-enabled computing device in order to build and create user accounts 3172, 3174, 3176 associated with (as an example) users 3102, 3116, and 3118, respectively, the accounts being stored in accounts 3114. As an example, accounts 3114 may include user information for each user, including user loyalties 3126, user rewards 3128, accumulated user equity 3130, user transactions 3132, user payments 3134 (including, in some examples, payment preferences, methods, or payment media), and user funds 3160.

User equity 3130 may include equity currently assigned to a user, such as fractional shares of stock. In one example, user equity 3130 may comprise a brokerage account maintained by clearing system 3104, wherein the clearing system 3104 acts as the custodian of individual user equity accounts. Loyalty platform 3108 may receive up-to-date information regarding user equity accounts maintained by clearing system 3104, enabling the loyalty platform 3108 to inform a user of the current amount of accumulated equity. Further, loyalty platform 3108 may communicate with clearing system 3104 to conduct buys, sells, trades, or other transactions on behalf of the user. In another example, the loyalty platform 3108 may maintain an omnibus account with clearing system 3104, and the loyalty platform 3108 may further create individual brokerage accounts/user equity accounts, such as user equity 3130, maintained within the loyalty platform itself. In this example, the loyalty platform may use the omnibus account to purchase allotments of equities, which may then be journaled/distributed to individual user equity accounts to satisfy pending equity rewards.

Figure 48:
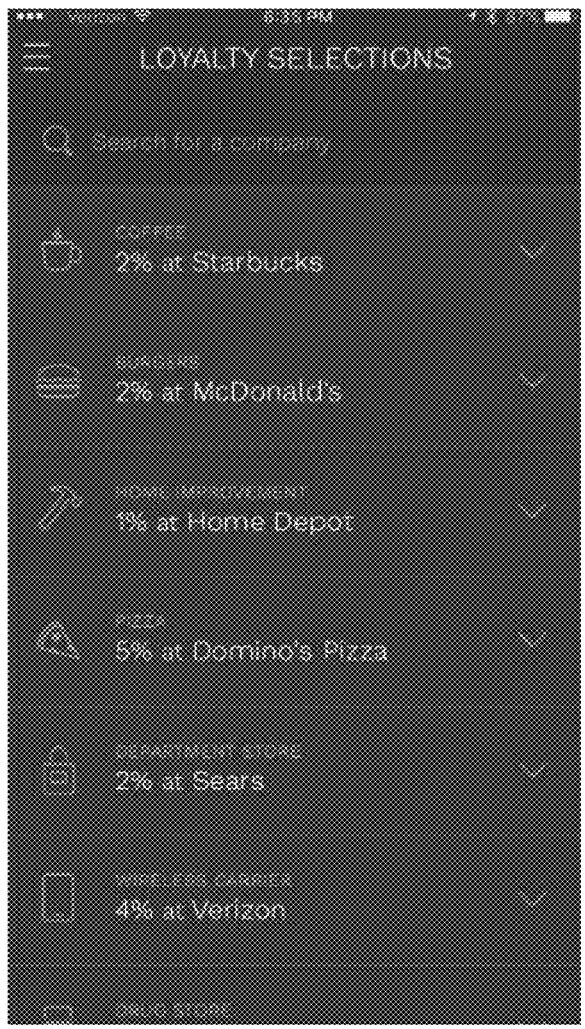
Figure 49:
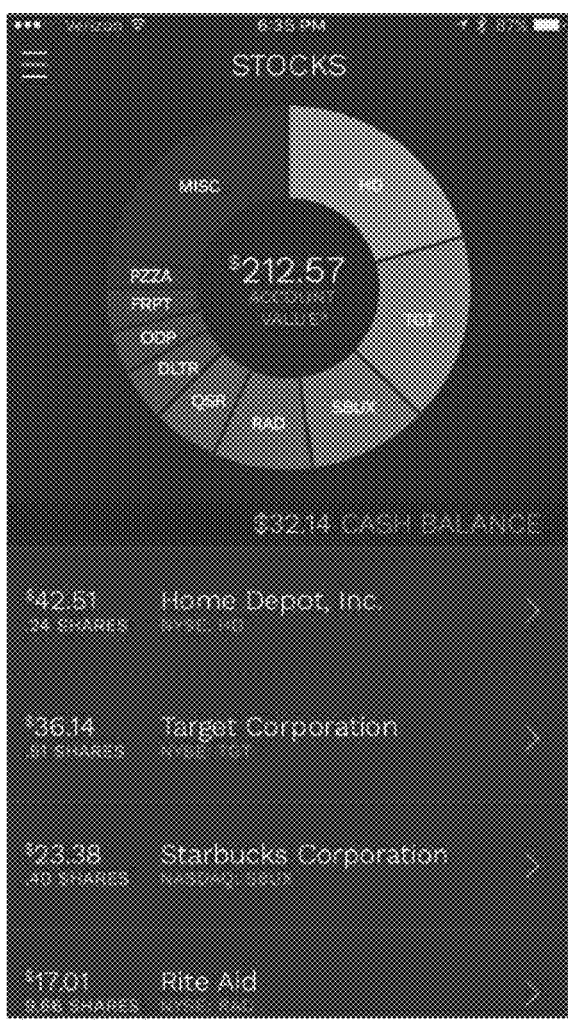
FIGS. 49-50 show example graphical user interfaces for displaying a user's reward portfolio.
Figure 50:
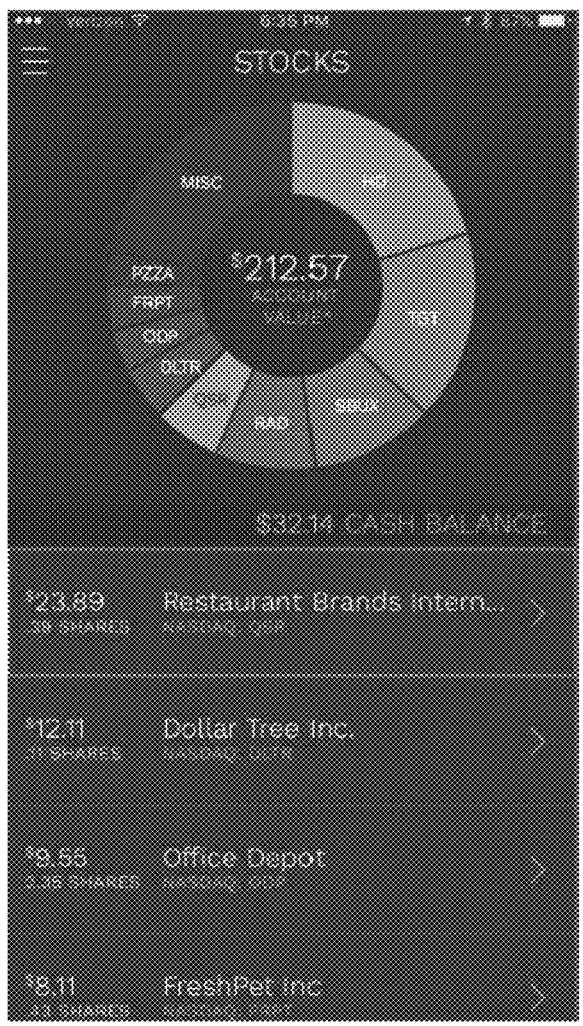
Figure 51:
FIGS. 51-55 show example graphical user interfaces for placing a fractional equity sell order.
Figure 52:
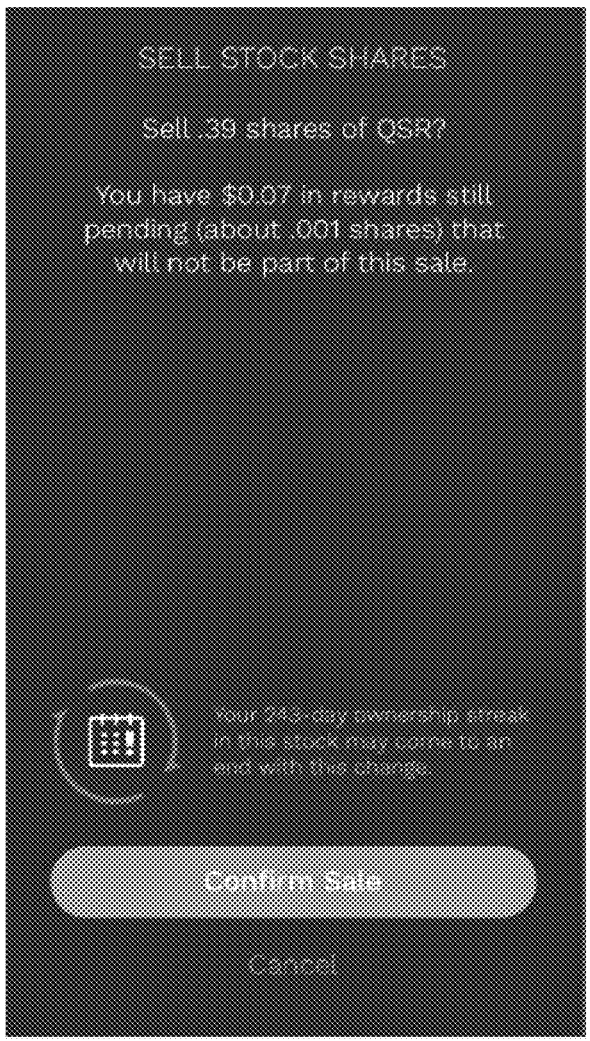
Figure 53:
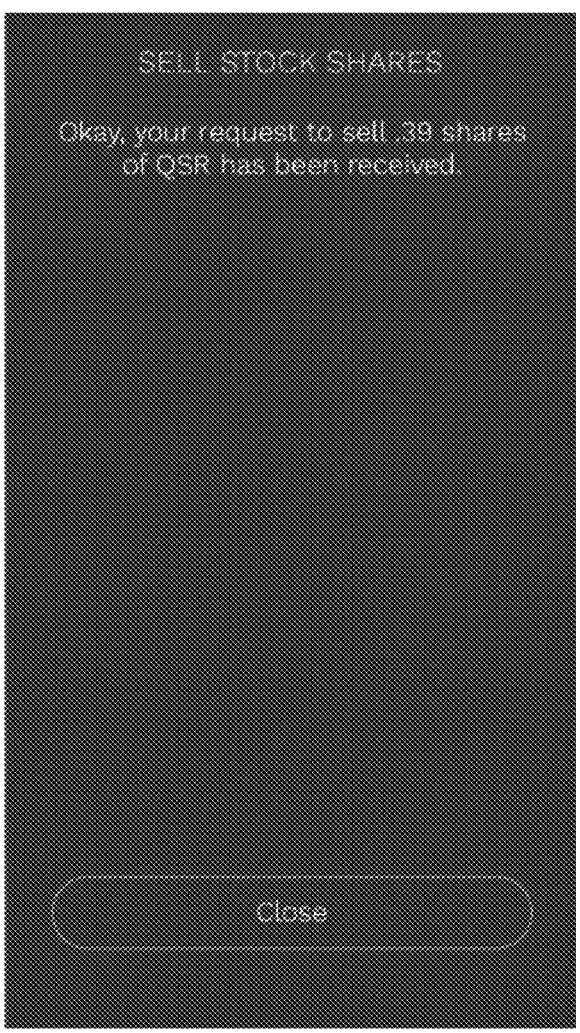
Figure 54:
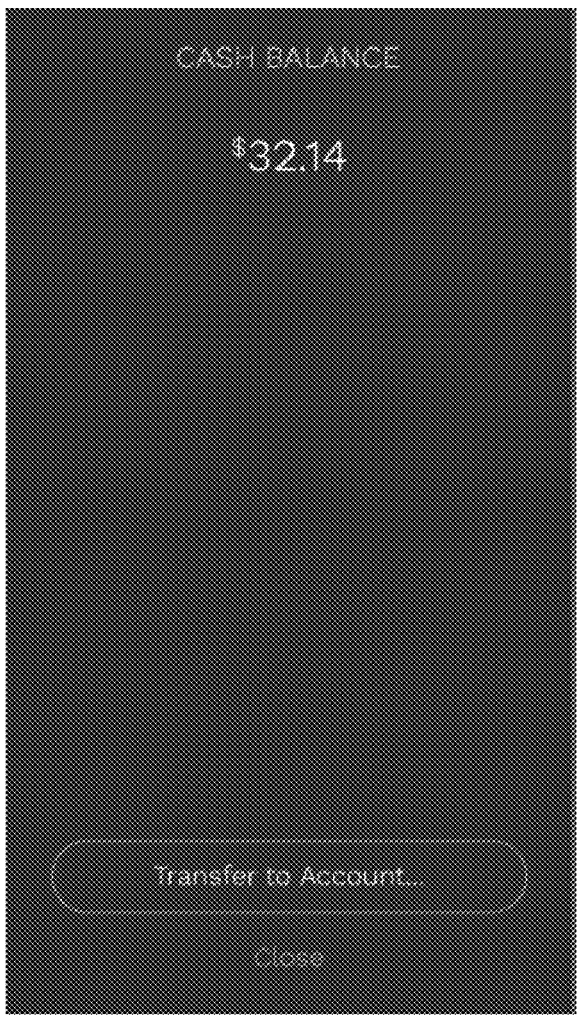
Figure 55:
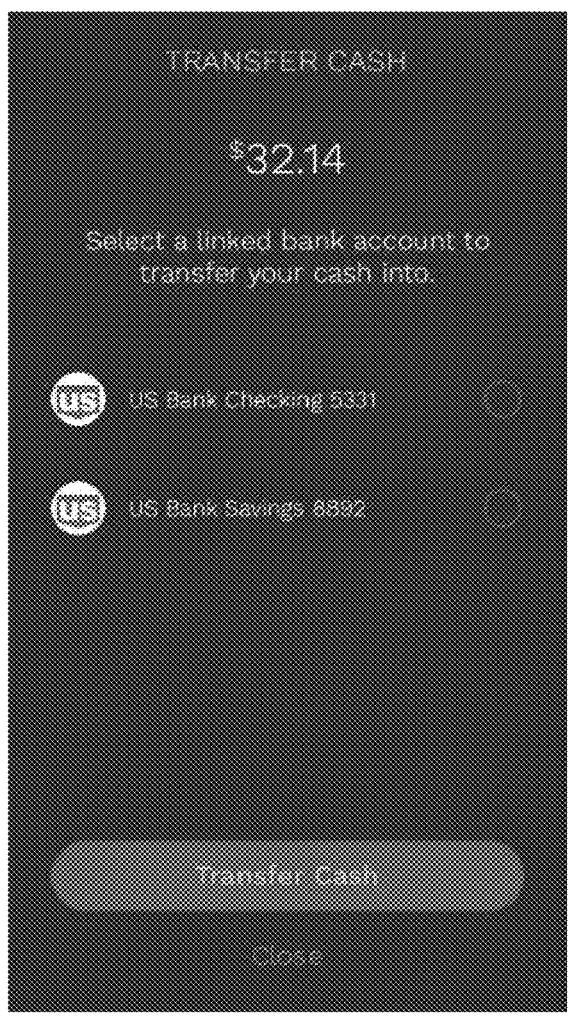
Figure 56:
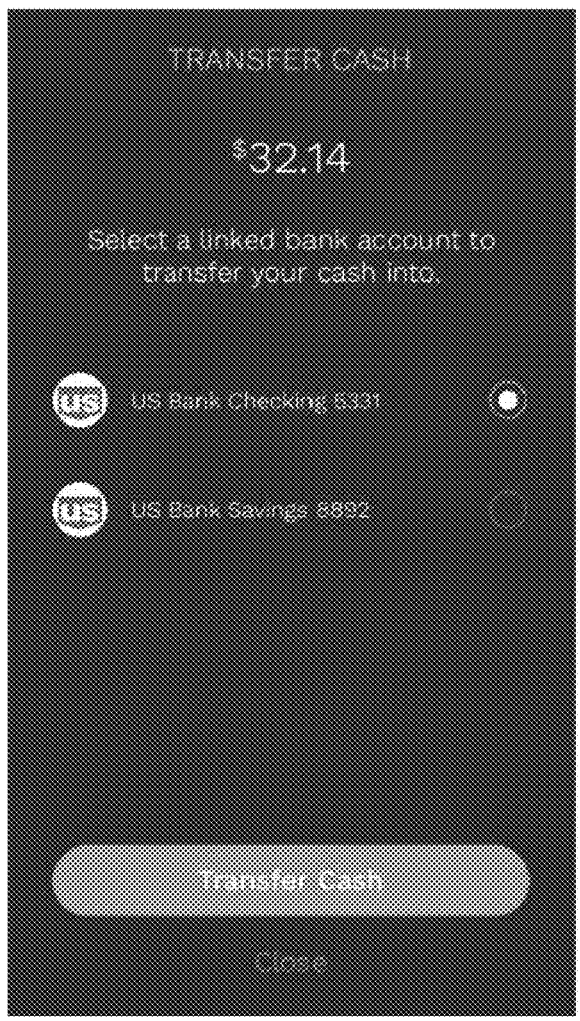
FIGS. 56-57 shows example graphical user interfaces for sending funds from a user account on the loyalty platform to a bank account.
Figure 57:
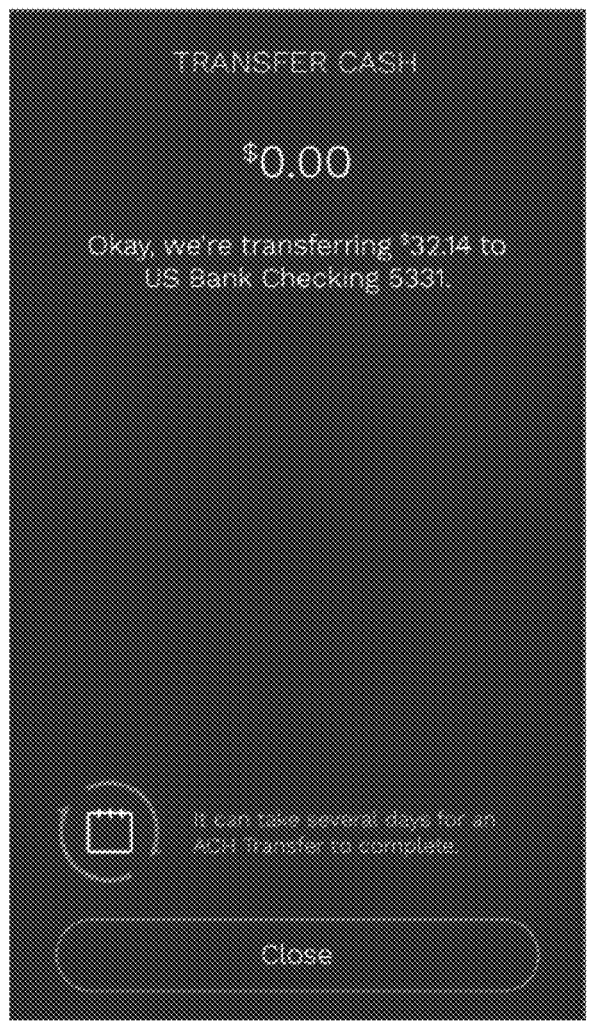
Figure 60:
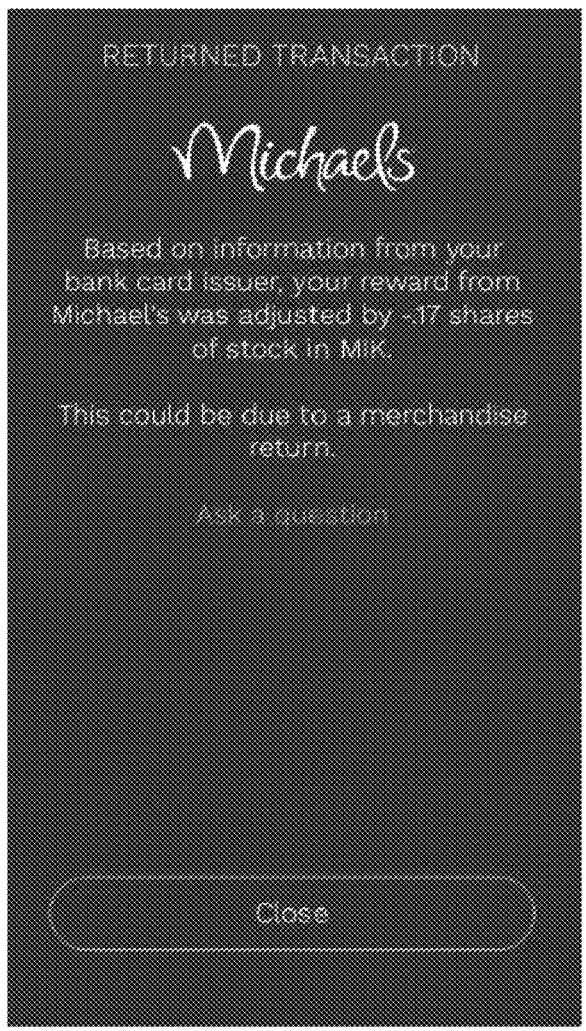
Figure 61:
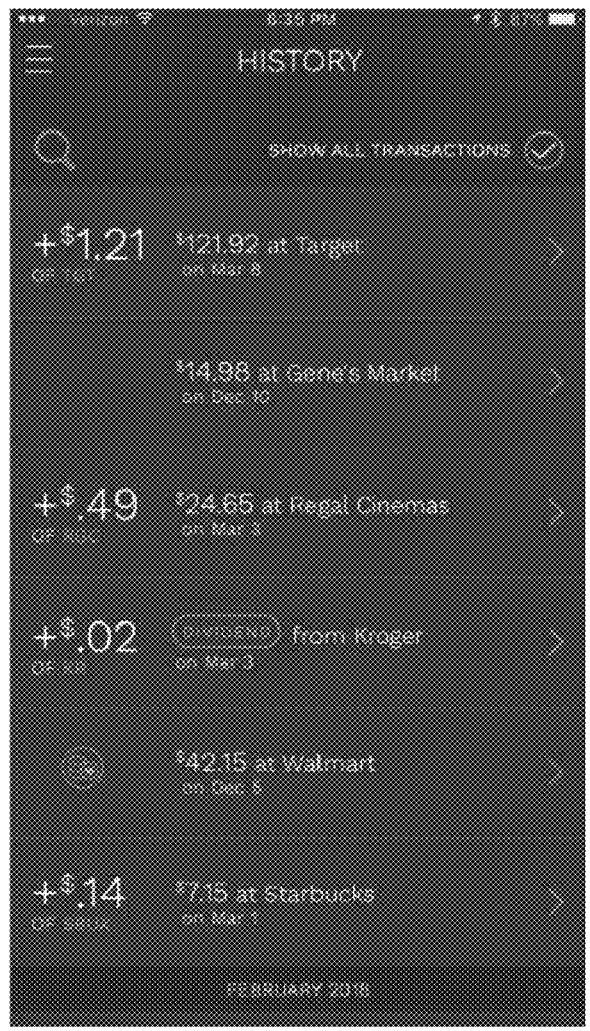
Figure 62:
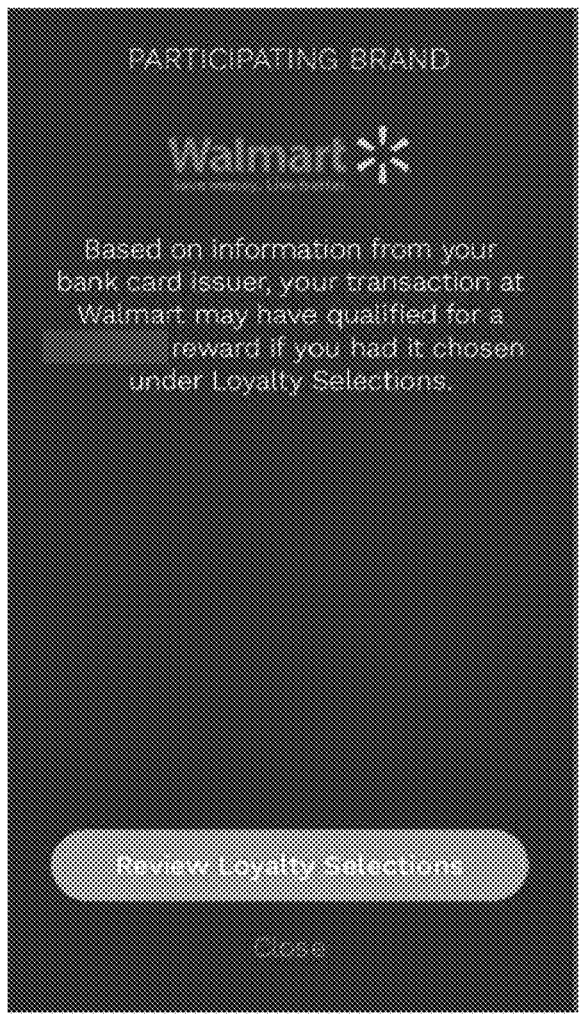
Figure 63:
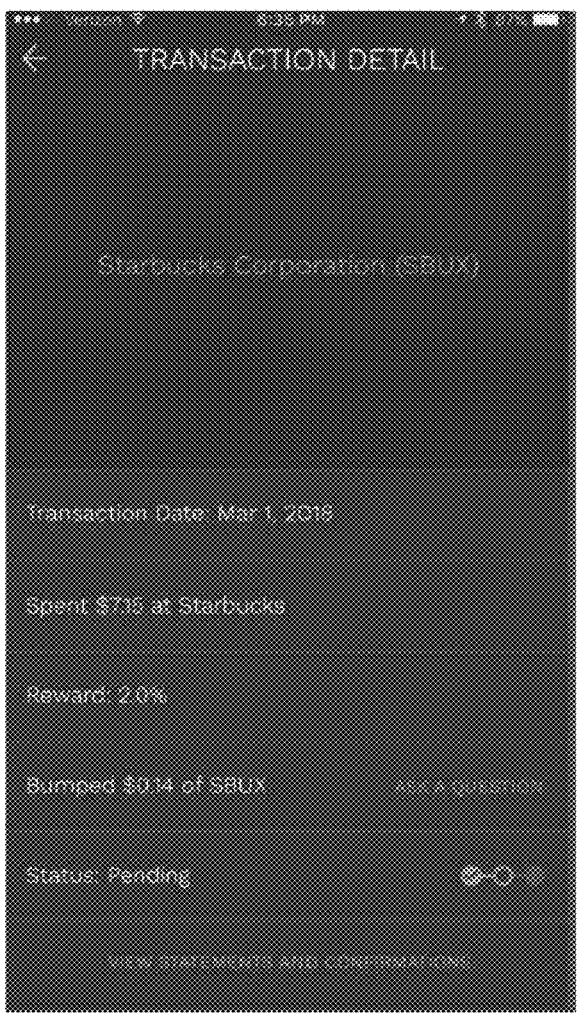

User loyalties 3126 may include the businesses and/or brands to which the user has made a loyalty selection in a defined market, and which may be displayed to a user via a graphical user interface, for example, the graphical user interfaces shown in FIG. 48 and/or FIG. 49. User rewards 3128 of a user's account may include the rewards for which the user is currently eligible based on user loyalty purchases, such as when making a transaction using payment media registered (or linked) with purchase tracking 3122. As used herein, payment media, or a payment medium, may refer to credit cards, debit cards, virtual wallets, or other devices capable of conducting electronic transactions, which are associated with a payment account, such as a checking account. User transactions 3132 may include a history of tracked user purchases executed by a user using one or more linked payment media and tracked by loyalty platform 3108 via purchase tracking 3122. User payment 3134 may include user preferences for payment or a virtual wallet held by the loyalty platform 3108. User funds 3160 may include electronic funds stored for a user which may be used for purchases made via the platform or, as an example, user funds 3160 may include funds received via dividend payments from dividend distribution 3152. As an example, accounts 3114 may be updated continuously, via communication between rewards manager 3112, loyalty manager 3110, purchase tracking 3122, equity allocation system 3120, dividend distribution 3152 and reward modifier 3154, on a schedule, or in response to a trigger in order to keep user account information updated so that a user may be able to receive up-to-date information regarding their account. In an example, purchase tracking 3122 may trigger a user account 3172 update based upon receiving a notification of a tracked user loyalty purchase and purchase tracking may command rewards manager 3112 and loyalty manager 3110 to update the user account 3172, such as by transmitting an equity reward status to user account 3172 based on the tracked user loyalty purchase.

Equity allocation system 3120 may manage purchasing, distributing, selling/liquidating, and forfeiting equity as well as updating current share prices. Equity allocation system 3120 may include forfeit module 3146, updater module 3147, assign module 3148, and sell module 3178, and may be a module or database configured with rules and/or instructions for executing buy, sell, and/or forfeit orders of fractional or whole shares between loyalty platform 3108 and clearing system 3104 as well as, in some examples, between accounts 3114 (including user accounts 3172, 3174, 3176) and platform account 3136. Equity allocation system 3120 may additionally comprise a plurality of merchant deposit accounts for holding funds used to purchasing equity rewards, a residual account for holding fractional remainders of shares leftover after distribution of fractional equity rewards to the plurality of users is complete, an average price account for conducting street-side whole share purchases and sells, as well as one or more merchant facilitation accounts for temporarily holding fractional equity rewards during fractional equity reward distribution. The merchant deposit accounts, merchant facilitation accounts, residual account, and average price account are not shown in FIG. 34A, but are shown and discussed in detail below, with reference to FIG. 35.

Purchase tracking 3122 may be a database or module configured to include instructions and rules configured to track virtual and real-world (e.g., in-store) purchases between users 3102, 3116, 3118 and businesses 3138, 3140, 3106. The purchase tracking system may further include payment medium storage database 3124 in order to track purchases for user accounts 3172, 3174, 3176 associated with user computing devices 3102, 3116, 3118 who may execute transactions using payment media which have been registered (linked) and stored at payment medium storage 3124. As an example, payment media stored within payment media storage 3124 may include any applicable payment methods not limited to credit cards, debit cards, and online payment systems (for example, PAYPAL). In an example, payment medium storage 3124 may include registration information relating to credit cards used for transactions between users and businesses. In another example, payment medium storage 3124 may include registration information relating to only payments systems used for transaction between users and businesses. In another example, purchase tracking 3122 may receive a notification or indication that a user has executed a transaction (for example, purchase or return).

The loyalty platform 3108 may include platform account 3136, which may comprise an administrator account 3158 enabling platform administrators with the ability to make modifications to the loyalty platform 3108, for example, adding or removing businesses to the loyalty selections available through loyalty manager 3110, modifying rewards options available through rewards manager 3112, modifying accounts 3114, modifying equity allocation system 3120, modifying dividend distribution 3152, and varying the rewards provided to users at reward modifier 3154.

The loyalty platform 3108 may include platform account 3136, which may comprise an administrator account 3158 enabling platform administrators with the ability to make modifications to the loyalty platform 3108, for example, adding or removing businesses to the loyalty selections available through loyalty manager 3110, modifying rewards options available through rewards manager 3112, modifying accounts 3114, modifying equity allocation system 3120, modifying dividend distribution 3152, and varying the rewards provided to users at reward modifier 3154.

Loyalty platform 3108 may also include dividend distribution 3152 as a database or module comprising instructions or rules which may enable communication with clearing system 3104 in order to distribute dividend payments whenever they are set to occur (such as quarterly). Clearing system 3104 may, as an example, have information relating to when dividend payments are to be made and how much money or stock per share may paid-out. In one example, if a first business initiates a dividend payment process while a user holds a number of shares of stock in that business, but the user sells the number of shares of stock in the business before the dividend is received by the loyalty platform (such as may occur upon a user selecting to switch loyalty from the first business to a second business), once the dividend is received by the loyalty platform the loyalty platform may offer that dividend to the user as a cash reward (if the dividend comprises cash) or as an equity reward (if the dividend comprises an amount of shares of stock), the loyalty platform may further offer the user an option to redistribute the received dividend. Dividend payments handled by dividend distribution 3152 may, in some examples, be sent to user funds 3160 in user account 3172. In another example, dividend payments handled by dividend distribution 3152 may be sent directly to payments 3150 via instructions included at user funds 3160 to send payment to an account with payments 3150 associated with user account 3172.

Reward modifier 3154 may be a module or database containing instructions configured to provide a reward modification to the normal reward, based upon random selection or based upon one or more actions taken by the user, such as a loyalty switch, accumulating more than a threshold amount of loyalty rewards, or further based one or more policies or promotional events of the rewarding business. As an example, the user may be entitled to a reward, or a normal reward, based upon the user's loyalty selection to a business, and, the normal reward may be modified based upon variable reward policies (discussed herein) to form a modified reward. As explained herein, when a user 3102, 3116, 3118 executes a transaction, the purchase tracking 3122 notifies reward modifier 3154 of the transaction (which may have been made between a user and business wherein the user had made a loyalty selection to the business of the transaction) and further queries reward modifier 3154 to see if the normal reward may receive a modified reward. As explained above with respect to FIG. 1A, the reward modifier 3154 may include a random selection algorithm 3162, variable reward policies 3164, and a promotional engine 3166.

Turning now to FIG. 34B, example computing system 3180 is shown. Computing system 3180 may implement loyalty platform 3108 alone, or in combination with other computing systems. In one example, computing system 3180 may comprise a server. Computing system 3180 includes display 3175, input device 3173, processor 3182, network adapter 3188, and non-transitory memory 3184.

Display 3175 may comprise a monitor, touch screen, projector, or any other device known in the art of computers for enabling a user to observe or sense information rendered by a digital device. Computing system 3180 may have stored within non-transitory memory 3184 instructions for rendering data, such as loyalty platform 3108 data, within a graphical user interface which may be displayed by display 3175.

Input device 3173 enables a user to interface/interact with computing system 3180, and may comprise one or more hardware devices, such as a mouse, keyboard, touch screen, motion tracking camera, or other devices configured to transform user motions, gestures, sounds, or other user actions into an electronic form which may enable a user to input data, or transmit, select, modify, or otherwise interact with data or data structures stored in or displayed by computing system 3180.

Processor 3182 may include one or more physical devices configured to execute instructions stored in non-transitory memory. For example, processor 3182 may be configured to execute instructions that are part of one or more applications, services, programs, routines, libraries, objects, components, data structures, or other logical constructs included in loyalty platform 3108.

Network adapter 3188 may comprise one or more physical device associated with computing system 3180, enabling transmission and reception of data between computing system 3180 and one or more additional computing systems. Network adapter 3188 may enable computing system 3180 to access a local area network, and/or the Internet, and exchange data therewith, such as data which may enable tracking of user purchases and matching between transacting businesses and businesses registered with the loyalty platform (and therefor included in the rewarding-business index).

Non-transitory memory 3184 includes one or more physical devices configured to hold data, including instructions executable by the processor to implement the methods and processes described herein. When such methods and processes are implemented, the state of non-transitory memory 3184 may be transformed—e.g., to hold different data. The terms "module" and "program" may be used to describe an aspect of the computing system implemented to perform a particular function. The terms "module" and "program" may encompass individual or groups of executable files, data files, libraries, drivers, scripts, database records, etc. Non-transitory memory 3184 includes the various files/routines/methods of loyalty platform 3108 that when executed by processor 3182 perform one or more of the steps herein described with reference to one or more of the disclosed methods. Computing system 3180 may optionally include display(s), user input device(s), communication interface(s), and/or other components.

As shown in FIG. 34B, non-transitory memory 3184 includes rewarding-business index 3186. Rewarding-business index 3186 may be stored within non-transitory memory 3184 of computing system 3180, and may comprise a database or module containing information regarding businesses registered with loyalty platform 3108. In one example, rewarding-business index 3186 may be used by computing system 3180 in conjunction with purchase tracking 3122 to quickly determine if a user purchase executed at a business is eligible for a fractional equity reward by matching a description of the transacting business, obtained by purchase tracking 3122, with a description stored in rewarding-business index 3186 associated with a business offering fractional equity rewards to loyalty users through loyalty platform 3108.

In some examples, computing system 3180 may be configured to implement a neural network or other machine learning algorithm, wherein the neural network comprises a classifier type neural network, configured to receive as input one or more details of a user transaction/purchase (also referred to as a transacting business description) and to use said input to produce as output a probability rank for one or more, or each, of the businesses stored within rewarding business index 3186, wherein the probability rank indicates for a given business, the probability that the purchase occurred with said business. In other examples, computing system 3180 may be configured to execute one or more machine learning algorithms capable of learning a non-linear mapping from a feature space comprising purchase details, to an output space comprising business classification scores/probabilities, wherein the learning algorithms may have access to rewarding business index 3186, which includes an up to date listing of all businesses partnered with the loyalty platform.

To facilitate accurate matching between a transacting business and its associated reward program/policies implemented by loyalty platform 3108, rewarding-business index 3186 may include various features or pieces of data relating to the businesses listed therein. In one example, rewarding-business index 3186 comprises a database with each entry therein corresponding to a unique business, wherein said entry may comprise a name/title, a link to the reward/loyalty policies established by the business, the status of the reward program associated with that business (such as "active", "cancelled", "pending deposit of funds", etc.).

In one example, a business interested in offering equity rewards via loyalty platform 3108 to customers to incentivize greater customer loyalty may register their business with loyalty platform 3108. The registration process for businesses may include inputting information relating to the business into loyalty platform 3108 and this information may be stored in non-transitory memory of computing systems implementing loyalty platform 3108. In one example, business information may be stored in rewarding-business index 3186 of one or more computing systems implementing the loyalty platform 3108, such as computing system 3180. As an example, the business information input into the rewarding-business index as part of the business registration process may include a description of the business, business payment information, business contact information, business locations/addresses, business hours of operation, markets in which the business operates (which may also be stored in markets 3156), business reward policies/loyalty policies defining how a fractional equity reward is determined based on tracked user loyalty purchases (which may also be stored in one or more additional locations of loyalty platform 3108, such as in loyalty policies 3142, and reward policies 3144), and other information which may enable the loyalty platform 3108 to uniquely identify the business and operate a customer loyalty program customized for that individual business. In one example, a link to loyalty policies and/or reward policies associated with a business registered with the loyalty platform 3108 may be included in an entry in rewarding-business index 3186. In one example, rewarding business index 3186 may contain an equation or algorithm (or a link pointing to a location in non-transitory memory wherein the equation or algorithm is stored) for determining an amount of fractional shares of stock to be allotted to a user based on a tracked user loyalty purchase conducted using a linked payment medium.

Further, rewarding-business index 3186 may include product data regarding one or more products offered by one or more brands, wherein the product data may be used to match a tracked user loyalty purchase with a brand or business providing rewards through loyalty platform 3108. In one example, product data may include product codes/identifiers for one or more products belonging to a brand. In a more specific example, rewarding-business index 3186 may include a catalogue/database of products and product identifiers provided by one or more brands operating a loyalty program through loyalty platform 3108, wherein the catalogue/database may include stockkeeping unit codes (SKUs) enabling unique identification for one or more products provided by one or more brands registered with loyalty platform 3108. In one example, a user may conduct a purchase with a business, wherein the business sells products from a plurality of brands, and upon execution of the purchase, the business may transmit POS data regarding the transaction to the loyalty platform, wherein the POS data may include SKU level detail regarding each of the purchased products. The loyalty platform may match the one or more purchased products with one or more brands using rewarding-business index 3186 by correlating the SKU codes included within the POS data to SKU codes included in rewarding-business index 3186. In one example, the rewarding business index comprises a list of product identifiers for each brand/business included therein, and upon matching an SKU code included in POS data transmitted to the loyalty platform 3108 from a business with an SKU code listed under a first brand in the rewarding-business index 3186 the loyalty platform 3108 may determine that the user is eligible to receive a reward from the first brand. The loyalty platform 3108 may, in response to matching one or more brands using the POS data, reward the user based on the reward policies of the reward programs provided by the one or more brands, and further based on the price of the one or more products purchased from the one or more brands. In another example, upon execution of a transaction between a user and a business, the business may determine which brands correspond to the one or more purchased products, and may transmit the indicated brands to the loyalty platform 3108. In this way, the loyalty platform may reward a user with rewards from a plurality of brands/businesses based on a single purchase, by resolving a purchase using data of each purchased product. In some examples, based on a user purchase with a business, wherein the purchase comprises a purchase for a product from a brand, wherein both the business and the brand provide rewards through the loyalty platform, and wherein the user has an active loyalty selection to both the business and the brand, the user may receive rewards from both the business and the brand through the loyalty platform.

A business or brand listed in rewarding-business index 3186 may be removed, deleted, or overwritten, upon suspension or cancellation of the equity rewards program established for that business. In another example, upon cancellation or suspension of a customer loyalty program offered by a business, a flag may be set in the entry corresponding to that business in the rewarding-business index, thereby indicating that no equity rewards may be earned based on tracked user loyalty purchases at this business at this time, thus retaining business information within the rewarding-business index and bypassing the need to re-enter information relating to said business into the rewarding-business index in the event that the customer loyalty program associated with the business is resumed at a later time.

Rewarding-business index 3186 may be stored in a location of non-transitory memory 3184 of computing system 3180 and information stored therein may be accessed by computing system 3180 upon execution by processor 3182 of one or more methods stored in loyalty platform 3108, some examples of which are described herein. In one example, rewarding-business index 3186 may be accessed by purchase tracking 3122 of loyalty platform 3108 to attempt to match/correlate a description of a business with which a user recently made a purchase (herein also referred to as a transacting business description) with a description stored in rewarding-business index 3186. The transacting business description, comprising data pertaining to the transacting business, may be obtained by loyalty platform 3108 via a linked payment medium used to conduct the purchase, or alternatively, through a point of sale device of the transacting business which is configured to transmit purchase details to the loyalty platform, or from a third party purchase data aggregator. If the transacting business description matches a description of a business stored in rewarding-business index 3186, the user may be entitled to a fractional equity reward for the tracked user loyalty purchase and one or more additional actions may be taken, such as look-up of the reward policies linked with the rewarding business. The link may be stored in rewarding business-index 3186 in a location associated with the rewarding business description, the link may point to a location of non-transitory memory 3184 associated with reward policies 3144. Thus, rewarding-business index 3186 enables computing system 3180 to automatically determine if a tracked user purchase is eligible to receive a reward or may be eligible to receive a reward (such as upon a user accepting a loyalty-switch offer) without requiring the user to submit proof-of-purchase information, or perform other potentially annoying tasks employed by conventional rewards programs.

In this way, rewarding-business index 3186 may enable loyalty platform 3108 to rapidly and automatically determine if a tracked user purchase is in fact a tracked user loyalty purchase and is therefore eligible to receive a fractional equity reward. This may reduce the time between when a user executes a user loyalty purchase and when a fractional equity reward based on that purchase is distributed to the user compared to conventional approaches which require a user to manually input a code or other proof-of-purchase/proof-of-reward. Additional features of the disclosure which may further enable increased speed of fractional equity reward distribution, as well as further enable increased liquidity in the fractional equity rewards once distributed, are discussed below with reference to FIG. 35 and the equity allocation system 3120 therein.

Thus, the loyalty platform operates as an intermediary between a number of merchants, a number of users, and external equity brokers/platforms such as the clearing system and payments system. This enables the loyalty platform to manage loyalty programs with a number of merchants and allows each merchant to maintain a loyalty program without directly handling its operation. Because the loyalty platform is associated with multiple, uniquely identified merchants, users do not need to create a separate profile for each merchant or loyalty program, but can instead have a single account that is usable with multiple merchants. By storing only one account for each user, the loyalty platform may be improved by reducing the storage space needed to store duplicative user accounts for users that have loyalty selections to multiple businesses. Further, the inclusion of the link to reward policies of a merchant stored in rewarding business-index in a location associated with the rewarding business description may improve the efficiency of the loyalty platform by allowing for the automatic determination of reward eligibility of a tracked user purchase, which may lower processing and communication demands on the loyalty platform (e.g., because the loyalty platform can quickly and easily determine the reward policies without having to navigate/search through unnecessary folders/storage locations and/or because the loyalty platform does not have to prompt the user to submit external documentation). By storing/managing a single account for each user, the loyalty platform may facilitate, for a given or each merchant, a base of consumers who may already have brokerage/loyalty platform accounts, reducing friction from joining their program. Further, this creates more of a "marketplace" of merchant loyalty programs, which enables merchants to potentially partner with other merchants. For the consumer, the loyalty platform provides a single location to very easily add other merchant programs, provides a single place to get support and/or obtain key documents such as tax forms, provides an aggregate and holistic portfolio view of a user/consumer's stock holdings, and provides a single location for seeking education about the stock market.

Figure 35:
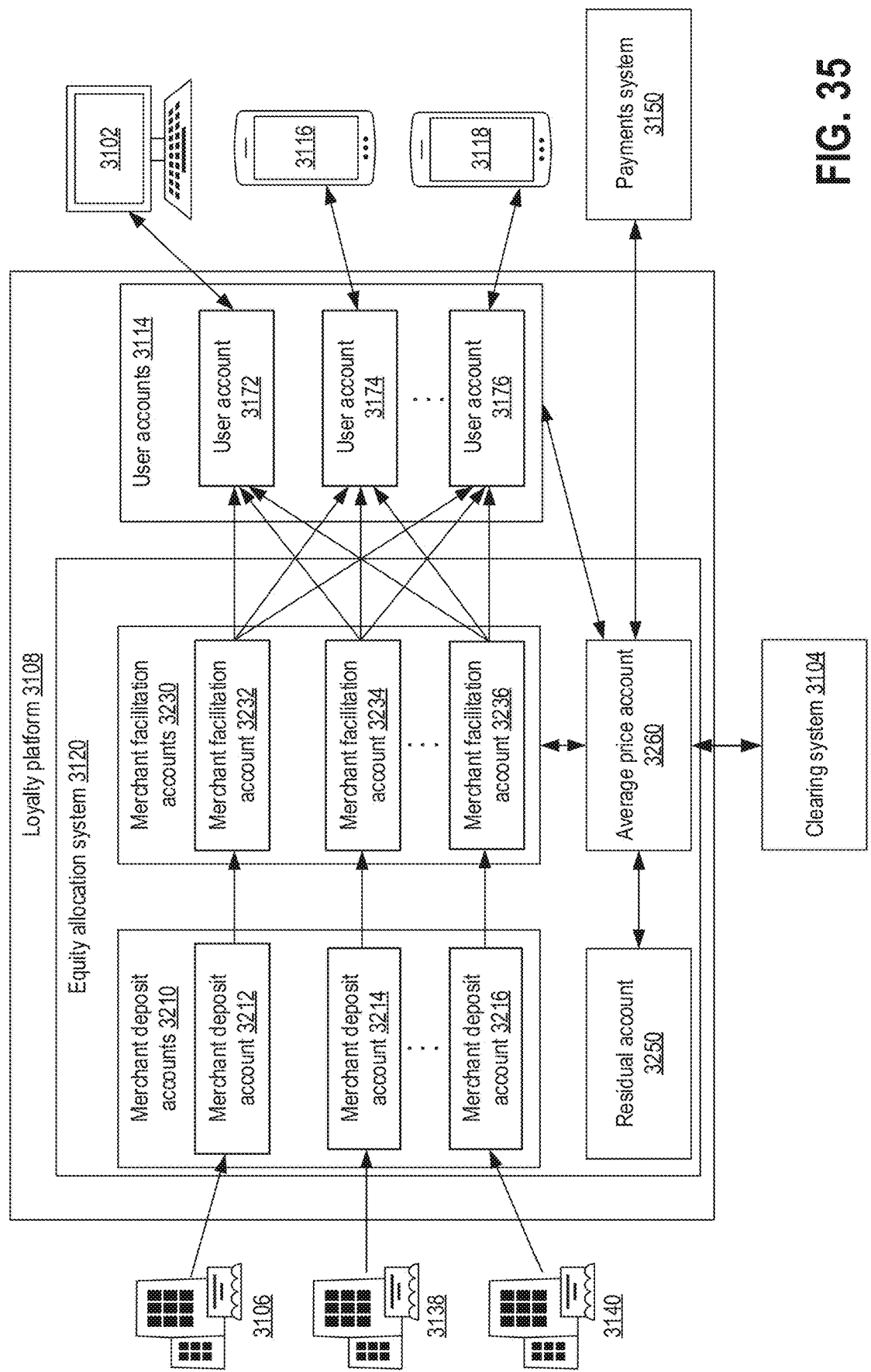
FIG. 35 shows an example equity allocation system of the loyalty platform.

FIG. 35 shows equity allocation system 3120, which represents one exemplary embodiment of a system for acquiring, aggregating, distributing, liquidating, and otherwise managing fractional equity rewards on a loyalty platform, such as loyalty platform 3108. Elements of FIG. 35 which were previously illustrated and described above shall retain their numbering in FIG. 35. Although the accounts within equity allocation system 3120, as discussed herein, are included within loyalty platform 3108, it will be appreciated that such accounts may be held or maintained by a third party without departing from the scope of the current disclosure. In one example, the accounts discussed with reference to FIG. 35 may be maintained by a brokerage firm on behalf of a loyalty platform. In another example, the loyalty platform may operate and/or maintain the accounts discussed with reference to FIG. 35. In the case that the accounts within equity allocation system 3120 are operated by a third party brokerage firm, equity allocation system 3120 may electronically communicate with one or more of the accounts via a network to enable one or more of the steps or actions described herein with reference to said accounts.

The accounts discussed with reference to FIG. 35 may comprise instructions stored in non-transitory memory of a computing system, such as a computing system implementing loyalty platform 3108, wherein the instructions enable the accounts to hold, trade, buy, and sell securities. In one example the securities may comprise shares of stock in a business. In another example the securities may comprise other kinds of securities, such as one or more of government bonds, municipal bonds, Exchange Traded Funds (ETFs), mutual funds, futures options, and stock options. In another example, the accounts discussed with reference to FIG. 35 may be configured to buy, sell, trade, hold, or otherwise interact with, digital assets, such as cryptocurrency, tokens, smart contracts, etc. In one example, the accounts discussed with reference to FIG. 35, such as average price account 3260 may be configured to hold, trade, buy and sell shares of stock in publically traded businesses. The accounts discussed with reference to FIG. 35 may also be configured to send and receive funds (fiat currency, such as USD) to one or more other accounts, such as, but not limited to, other accounts discussed with reference to FIG. 2. In one example, merchant facilitation account 3232 may send an amount of USD to the average price account 3260 in exchange for an amount of a security, such as a share of stock. Equity allocation system 3120 is shown accompanied by various interacting systems, such as user computing systems 3102, 3116, and 3118, businesses 3106, 3138, and 3140, clearing system 3104, and payments system 3150. Equity allocation system 3120 may alone, or in conjunction with other systems herein described, perform one or more steps of methods 3300, 3400, 3500, and 3600 herein disclosed. Equity allocation system 3120 comprises merchant deposit accounts 3210, merchant facilitation accounts 3230, residual account 3250, and average price account 3260.

Merchant deposit accounts 3210 may comprise a plurality of merchant deposit accounts, each corresponding to a unique business. As depicted in FIG. 35, merchant deposit accounts 3210 comprise merchant deposit account 3212, merchant deposit account 3214, and merchant deposit account 3216, which are associated with business 3106, business 3138, and business 3140, respectively. Although FIG. 35 depicts three merchant deposit accounts, the current disclosure will be understood to provide for any number of merchant deposit accounts, each associated uniquely with a business, to facilitate the distribution of fractional equity rewards on behalf of the business. As part of a Merchant Agreement between the loyalty platform and a business seeking to provide fractional equity rewards to loyalty customers via the loyalty platform, a business may agree to maintain a minimum balance of funds within the merchant deposit account associated with that business. The funds within a merchant deposit account may comprise fiat currency, such as USD, or other stable and highly liquid currencies which may be used to purchase shares of stock. It will be appreciated that the minimum amount of funds to be maintained in each of the plurality of merchant deposit accounts 3210 may be determined on a business by business basis and, as such, may be different for each merchant deposit account.

In one example, the minimum balance of funds for a merchant deposit account associated with a business may increase as a running average rate of fractional equity reward distribution for that business increases. For example, if the total amount of fractional equity rewards earned per day by loyalty customers of business A doubles, the minimum amount of funds to be maintained in the merchant deposit account associated with business A may also double. In another example, the minimum amount of funds to be maintained in a merchant deposit account of a business may be based on a predetermined threshold, wherein the threshold is equal to the minimum amount of funds. As another example, a threshold defining the minimum amount of funds to be maintained by a business in an associated merchant deposit account may be determined as a total monetary value of all fractional equity rewards distributed to users on behalf of that business over the previous 10 days. As another example, the methods for determining the minimum amount of funds to be maintained in a merchant deposit account associated with a business and used to provide fractional equity rewards to users on behalf of that business may be adjusted based on an upcoming event, such as a sale, a promotional offer, a holiday (such as black Friday, Christmas, etc.), or other foreseeable future events which may influence the amount of fractional equity rewards earned by users.

By maintaining a minimum amount of funds within each of the plurality of merchant deposit accounts 3210, a probability of interruption/delay in the distribution of fractional equity rewards to users, such as may occur if the balance of a merchant deposit account reaches zero, is reduced. Further, by basing the minimum amount of funds to be maintained in each of the merchant deposit accounts on an individual business basis and on a running average rate of fractional equity reward distribution for each business, a balance may be struck between minimizing the amount of capital a business needs to commit for a reward program and reducing the probability that a fractional equity reward earned by a user may be delayed. Further, the minimum amount of funds in each of the plurality of merchant deposit accounts may be updated in real time based on the above described factors (e.g., running average rate of fractional equity rewards, predicted events), which may enable substantially real time adjustment of the actual amount of funds in each merchant deposit account to reduce a probability of fractional equity reward distribution delay. With the loyalty platform acting as the intermediary, the loyalty platform may implement and apply rules to ensure that each merchant deposit account has the respective minimum amount of funds to enable purchase of demanded whole shares of stock, in an automatic and substantially real time manner, which may improve the efficiency of the loyalty platform by reducing the processing demands associated with instances where insufficient funds are available in a given merchant deposit account and the loyalty platform has to prompt the merchant for additional funds, during which time stock prices may fluctuate and thereby the previously calculated funds needed to purchase the shares of stock may be outdated, prompting recalculation.

Each of the plurality of merchant deposit accounts in merchant deposit accounts 3210 may be uniquely associated with a merchant facilitation account stored in merchant facilitation accounts 3230. Said another way, there may be a one-to-one correspondence between each business using the loyalty platform, each merchant deposit account and each merchant facilitation account. For example, merchant deposit account 3212, associated with business 3106, may also be associated with merchant facilitation account 3232, and may transfer funds to merchant facilitation account 3232 to enable the purchase of shares of stock for use as fractional equity rewards for loyalty customers of business 3106. Merchant facilitation accounts 3230 comprise merchant facilitation account 3232, merchant facilitation account 3234 (associated with merchant deposit account 3214 and business 3138), and merchant facilitation account 3236 (associated with merchant deposit account 3216 and business 3140).

Although FIG. 35 shows three merchant facilitation accounts within merchant facilitation accounts 3230, it will be appreciated that there may be any number of merchant facilitation accounts stored within merchant facilitation accounts 3230. Merchant facilitation accounts 3230 may comprise brokerage accounts and thus may be configured to hold both fiat currency and equity. Each of the merchant facilitation accounts stored within merchant facilitation accounts 3230 may be configured to communicate with other modules, systems, or components of loyalty platform 3108. For example, merchant facilitation accounts 3230 may have access to each of the user accounts stored within user accounts 3114, which may enable merchant facilitation account to calculate aggregate pending fractional equity rewards owed to these user accounts by one or more of the plurality of merchant facilitation accounts within merchant facilitation accounts 3230. In another example, the calculation of pending fractional equity rewards associated with each of the plurality of merchant facilitation accounts may be determined on a per account basis; that is, each of the merchant facilitation accounts may perform an independent calculation of the amount of pending fractional equity rewards it may satisfy. Merchant facilitation accounts 3230 may also communicate, that is send and receive data, with merchant deposit accounts 3210. In one example, based upon a determination by a merchant facilitation account within merchant facilitation accounts 3230, an amount of aggregate pending fractional equity rewards owed by that account to one or more of a plurality of users is greater than a threshold amount, a request may be sent by the merchant facilitation account to an associated merchant deposit account, requesting a transfer of an amount of funds to meet, or reduce below the threshold, the amount of aggregate pending fractional equity rewards.

Each of the merchant facilitation accounts within merchant facilitation accounts 3230 may be configured to send and receive funds and shares of stock. For example, each account within merchant facilitation accounts 3230 may be configured to receive funds from merchant deposit accounts 3210, transfer funds to the average price account 3260, receive shares of stock from the average price account 3260, and distribute the received shares of stock amongst a plurality of user accounts. As a specific example, $500 may be transferred from merchant deposit account 3214 to merchant facilitation account 3234 (by loyalty platform 3108 on behalf of business 3138), which may then be transferred to the average price account 3260 in exchange for $500 worth of equity (purchased by the average price account 3260 from an exchange, such as the NYSE). Once the $500 worth of equity is received by merchant facilitation account 3234, it may be distributed by merchant facilitation account 3234 to a plurality of user accounts stored within user accounts 3114, to satisfy pending fractional equity rewards. The $500 worth of equity may comprise an amount of fractional shares of stock or may be a number of whole shares of stock. In the case that the $500 worth of equity comprises a fractional amount of shares of stock, the average price account 3260 may round-up the fractional amount of shares of stock to the nearest whole share to enable the buy-order to be executed by a conventional exchange. For example, if the $500 equates to 9.6 shares of stock, the average price account may round-up the 9.6 shares to 10.0 shares, with the 9.6 shares being transferred to merchant facilitation account 3234 and the fractional remainder share of 0.4 being transferred from the average price account 3260 to residual account 3250. The 9.6 shares (the portion of the whole shares purchased by the average price account 3260 using funds received from merchant facilitation account 3234) may then be distributed to a plurality of user accounts, such as user account 3172, user account 3174, and user account 3176, to satisfy pending fractional equity rewards associated with those accounts.

Average price account 3260 may be configured to conduct whole share buys and sells via clearing system 3104. In one example, clearing system 3104 may comprise a computing system with instructions for executing buy and sell orders for securities on an open market, such as the NYSE. Average price account 3260 may be configured to send and receive both funds and securities to/from one or more of the other accounts discussed with reference to FIG. 35. Average price account 3260 may comprise instructions stored in non-transitory memory of a computing system to perform one or more of the functions/steps/methods discussed herein. In one example, average price account 3260 may comprise instructions to allocate purchased whole shares of stock within a duration of time from the time of purchase, thereby reducing the balance for a given equity to zero by a pre-determined duration from the time of purchase. In one example the duration of time may be 24 hours. In another example, the duration of time may be 6 hours. In another example, the average price account may comprise instructions to allocate the entirety of acquired/purchased whole shares of stock by a pre-determined time. For example, average price account 3260 may be configured with instructions to allocate the entirety of its securities to other accounts of the loyalty platform and/or equity allocation system 3120 by market close each day, such that securities are not held by average price account 3260 overnight.

Residual account 3250 may purchase fractional remainders of shares from average price account 3260 leftover after a first portion of whole shares purchased by the average price account is used to satisfy pending fractional equity rewards, such that the average price account does not hold positions in a security for longer than a duration, wherein the duration may be based on regulatory rules or may be actively adjusted to reduce penalties or risk associated with holding securities such as stock. In one example, within a 24 hour period of the average price account 3260 executing a whole share purchase via clearing system 3104, a first portion of the purchased whole shares (which may comprise a fractional amount of shares) may be transferred to one of the accounts within merchant facilitation accounts 3114 (for distribution to users) and a fractional remainder of shares, equal to the difference between the purchased whole shares and the transferred portion of shares may be purchased by the residual account. In this way, all shares purchased by the average price account 3260 may be transferred to other accounts within a duration of time, such that after the duration, the balance of the average price account 3260 for the purchased whole shares is zero.

A monetary expense of the fractional remainder of shares purchased by residual account 3250 may be debited from residual account 3250 and credited to average price account 3260 in exchange for the fractional remainder of shares. The fractional remainder of shares transferred to the residual account may generally be less than a single share of stock, which may not be easily sold on conventional markets. The inventors herein have recognized this and have provided approaches which may enable rapid and efficient liquidation/exchange of fractional shares of stock. As an example, the residual account 3250 may aggregate fractional remainders of shares from multiple cycles of fractional equity reward distribution, such that over time, the amount of fractional remainders of shares may exceed a liquidation threshold and a whole number of shares may be sold by residual account 3250. The liquidation threshold may in one example comprise a single share, such that upon exceeding the liquidation threshold a single whole share of equity may be sold via clearing system 3104. The liquidation threshold may comprise any positive non-zero amount of equity and may comprise fractional or whole numbers of shares. For example, a liquidation threshold for a stock may comprise 1.0 shares, but may alternatively comprise 5.23 shares, 100.1 shares, 3 shares, etc. As a plurality of different stocks may be used for fractional equity rewards, residual account 3260 may accumulate a plurality of different types of stock and each may have an associated liquidation threshold, wherein each liquidation threshold may be determined for the individual stock, such that a plurality of liquidation thresholds corresponding to the plurality of different stock types may be used.

Upon exceeding the liquidation threshold, the loyalty platform 3108 may determine an amount of whole shares of stock to for which to place a sell order. The amount of whole shares to be sold may be unique for each stock and may depend on the liquidation threshold. For example, upon an aggregated amount of fractional remainders of stock, for a given stock, in the residual account 3250 exceeding a liquidation threshold of 1.0 shares, a whole share sell order in the amount of 1.0 shares of stock may be placed, either by residual account 3250, or by the average price account 3260 on behalf of the residual account 3250. In another example, upon the aggregated fractional remainders of shares of stock, for a given stock, exceeding a liquidation threshold of 10.5 shares of stock, a whole share sell order in the amount of 2.0 shares of stock may be placed. The whole share sell order of the aggregated fractional remainders of shares may be executed via the average price account 3260, such that the amount of whole shares aggregated by the residual account 3250 are transferred to average price account 3260 and then sold via clearing system 3104 on the open market. Alternatively, the whole share sell order may be executed directly by residual account 3250. Upon fulfillment of the sell order for the amount of whole shares, funds in exchange for the whole shares may be transferred to residual account 3250 and used in subsequent cycles of reward distribution to purchase additional fractional remainders of shares of stock. In this way, funds in the residual account 3250 may change slowly over time, such that an initial amount of funds placed in the residual account 3250 for purchasing fractional remainders of shares may require replenishment with reduced frequency compared to alternative approaches.

Figure 84:
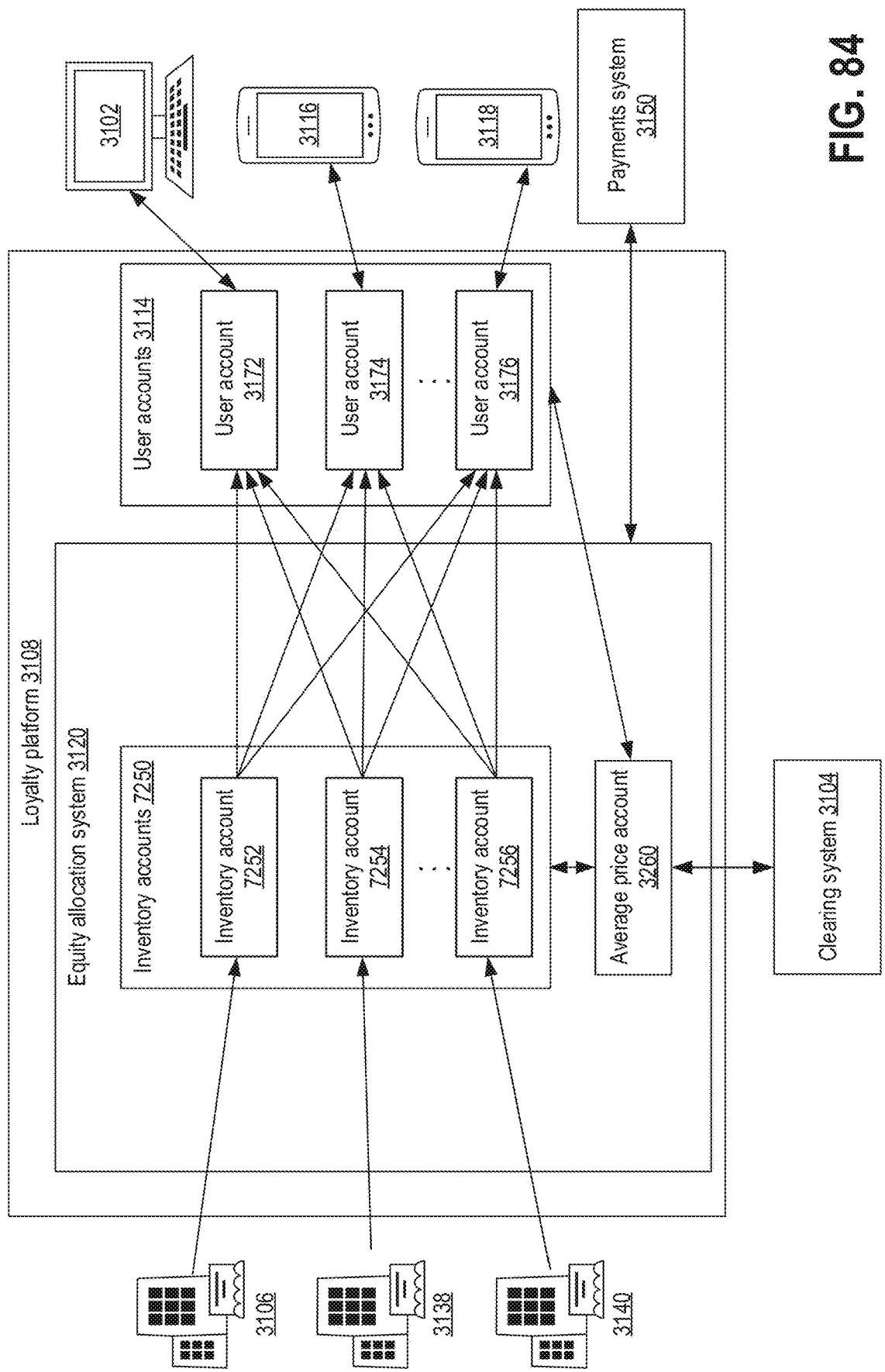
FIG. 84 shows a further example of the equity allocation system of the loyalty platform.

In some examples, as shown in FIG. 84, equity allocation system 3120 includes inventory accounts 7250. Inventory accounts 7250 may comprise a plurality of inventory accounts, and each may be funded by a unique business/merchant to enable said inventory account to reward loyalty customers of the merchant with fractional equity rewards on behalf of the merchant. In one example, each inventory account may provide fractional equity rewards to a plurality of users, wherein the fractional equity rewards comprise shares of stock in the business/merchant funding the inventory account, such that inventory account A, funded by business B may provide fractional equity rewards to users of a loyalty platform comprising fractional shares of stock in business B.

As depicted in FIG. 84, inventory accounts 7250 comprise inventory account 7252, inventory account 7254, and inventory account 7256, which are associated with business 3106, business 3138, and business 3140, respectively. Although FIG. 84 depicts three inventory accounts, the current disclosure will be understood to provide for any number of inventory accounts, each associated uniquely with a business, to facilitate the distribution of fractional equity rewards on behalf of the business. In one example, as part of a Merchant Agreement between the loyalty platform and a business seeking to provide fractional equity rewards to loyalty customers via the loyalty platform, a business may agree to fund an associated inventory account to enable a pre-purchased supply of shares within an associated the inventory account to remain above a lower supply threshold. In another example, the business may agree to fund an associated inventory account based on the discretion of the loyalty platform. It will be appreciated that the lower supply threshold, as well as the upper supply threshold of each of the plurality of inventory accounts within inventory accounts 7250 may be determined individually, and may therefore each comprise unique upper supply thresholds and lower supply thresholds or may comprise the same upper supply thresholds and lower supply thresholds, or may comprise any combination of upper supply thresholds and lower supply thresholds of any positive, non-zero value. In one example, when a pre-purchased supply of shares within an inventory account exceeds an upper supply threshold, a number of whole shares from the pre-purchased supply of shares may be automatically sold/liquidated, such as by placing a sell order via average price account 3260, to maintain the pre-purchased supply of shares below the upper supply threshold. The number of whole shares sold, based upon the pre-purchased supply of shares exceeding the upper supply threshold, may vary based on the amount by which the pre-purchased supply of shares exceeds the upper supply threshold, and likewise, the number of whole shares purchased based on the pre-purchased supply decreasing below a lower supply threshold may vary based on the extent to which the pre-purchased supply is below the lower supply threshold. In one example, a minimum number of whole shares may be purchased, or sold, to return a pre-purchased supply of shares to between the upper supply threshold and lower supply threshold. In another greater than the minimum number of whole shares may be purchased, or sold, to return a pre-purchased supply of shares to between the upper supply threshold and lower supply threshold. Funds obtained from liquidating/selling a number of whole shares from the pre-purchased supply of shares may return to the inventory account for later use (such as for use in purchasing additional shares to replenish the pre-purchased supply of shares). In a contrasting example, when a pre-purchased supply of shares within an inventory account is lower than a lower supply threshold, a number of whole shares of stock may be automatically purchased, such as by placing a buy order via average price account 3260, to replenish the pre-purchased supply of shares and maintain the pre-purchased supply of shares above the lower supply threshold.

In one example, the upper and lower supply thresholds for an inventory account providing fractional equity rewards to users on behalf of a business may increase as a running average rate of fractional equity reward distribution for that business increases. For example, if the total amount of fractional equity rewards earned per day by loyalty customers of business A doubles, the lower supply threshold and upper supply threshold of an inventory account associated with business A may also double. In another example, if a predicted event is determined to increase a rate of fractional equity reward accrual by loyalty customers of a business, the upper and lower supply thresholds for an inventory account providing fractional equity rewards to loyalty customers on behalf of that business may also increase. Some examples of predicted events may include a sale, the end of a fiscal year (or other date relative to the fiscal year), a deadline associated with taxes, a promotional offer, a holiday (such as black Friday, Christmas, etc.), or other foreseeable future events which may influence the amount of fractional equity rewards earned by users. In another example, based on a variance of fractional equity reward accrual for loyalty customers of a business increasing, (for example, a standard deviation for a running average rate of fractional equity reward accrual increasing), a lower supply threshold may be decreased and an upper supply threshold may be increased, for an inventory account distributing fractional equity rewards to loyalty customers of the business. In a contrasting example, based on a variance of fractional equity reward accrual for loyalty customers of a business decreasing, (for example, a standard deviation for a running average rate of fractional equity reward accrual decreasing), a lower supply threshold may be increased and an upper supply threshold may be decreased, for an inventory account distributing fractional equity rewards to loyalty customers of the business. As another example, the upper and lower supply thresholds of an inventory account associated with a business may be determined based on a total monetary value of all fractional equity rewards distributed to users on behalf of the business over the previous 10 days.

By dynamically adjusting a pre-purchased supply of shares within an inventory account based on an upper and lower supply threshold, as discussed above, a probability of interruption/delay in the distribution of fractional equity rewards to users, such as may occur if the pre-purchased supply drops below the lower supply threshold, is reduced. Further, by determining the upper and lower supply thresholds for each of the plurality of inventory accounts individually, and based on a running average rate of fractional equity reward distribution for each business associated therewith, a balance may be struck between reducing the amount of equity held within an inventory account and reducing the probability that a fractional equity reward earned by a user may be delayed.

Inventory accounts 7250 may comprise brokerage accounts and thus may be configured to hold both fiat currency and equity. Each of the inventory accounts within inventory accounts 7250 may be configured to communicate with other modules, systems, or components of loyalty platform 3108. For example, inventory accounts 7250 may have access to each of the user accounts stored within user accounts 3114, which may enable inventory accounts 7250 to calculate aggregate pending fractional equity rewards owed to these user accounts by one or more of the plurality of inventory accounts within inventory accounts 7250. In another example, the calculation of pending fractional equity rewards associated with each of the plurality of inventory accounts may be determined on a per account basis; that is, each of the inventory accounts with inventory accounts 7250 may perform an independent calculation of the amount of pending fractional equity rewards it may be responsible for satisfying. In one example, based upon a determination by an inventory account, such as inventory account 7254, that an amount of aggregate pending fractional equity rewards owed by inventory account 7254 to one or more of a plurality of user accounts is greater than a threshold amount, a request may be sent by inventory account 7254 to business 3138 requesting a transfer of an amount of funds to conduct a whole share purchase with, to increase the pre-purchased supply of shares held within inventory account 7254.

Each of the inventory accounts within inventory accounts 7250 may be configured to send and receive funds and shares of stock. For example, each account inventory accounts 7250 may be configured to receive funds from payment system 3150, transfer funds to the average price account 3260, receive shares of stock from the average price account 3260, and distribute the shares of stock from a pre-purchased supply of shares amongst a plurality of user accounts. As a specific example, $500 may be transferred from a bank account of a business, via payment system 3150, to inventory account 7256, which may then be transferred to the average price account 3260 in exchange for $500 worth of equity (purchased by the average price account 3260 from an exchange, such as the NYSE). Once the $500 worth of equity is received by inventory account 3256, it may be added to a pre-purchases supply of shares stored therein, and used to provide fractional equity rewards to a plurality of user accounts stored within user accounts 3114, to satisfy pending fractional equity rewards. The $500 worth of equity may comprise an amount of fractional shares of stock or may be a number of whole shares of stock. In the case that the $500 worth of equity comprises a fractional amount of shares of stock, the average price account 3260 may round-up the fractional amount of shares of stock to the nearest whole share to enable the buy-order to be executed by a conventional exchange. For example, if the $500 equates to 9.6 shares of stock, the average price account may round-up the 9.6 shares to 10.0 shares.

Average price account 3260 may be configured to conduct whole share buys and sells via clearing system 3104. In one example, clearing system 3104 may comprise a computing system with instructions for executing buy and sell orders for securities on an open market, such as the NYSE. Average price account 3260 may be configured to send and receive both funds and securities to/from one or more of the other accounts discussed with reference to FIG. 84. Average price account 3260 may comprise instructions stored in non-transitory memory of a computing system to perform one or more of the functions/steps/methods discussed herein. In one example, average price account 3260 may comprise instructions to allocate purchased whole shares of stock within a duration of time from the time of purchase, thereby reducing the balance for a given equity to zero by a pre-determined duration from the time of purchase. In one example the duration of time may be 24 hours. In another example, the duration of time may be 6 hours. In another example, the average price account may comprise instructions to allocate the entirety of acquired/purchased whole shares of stock by a pre-determined time. For example, average price account 3260 may be configured with instructions to allocate the entirety of its securities to other accounts of the loyalty platform and/or equity allocation system 3120 by market close each day, such that securities are not held by average price account 3260 overnight.

In this way, the loyalty platform acts as intermediary between businesses and the clearing system and payments system, to allow the purchase and sale of whole shares of stock as well as distribution of fractional rewards to user accounts be performed by a single, consolidated platform (the loyalty platform) rather than each business attempting such a configuration individually. In doing so, normalization and standards for operating a loyalty program that rewards in stocks may be provided. This also allows businesses to rely on the loyalty platform for network and other technical security in one place, not having to take that burden themselves, hence lowering their risk and facilitating better data security because the loyalty platform is able to provide data back-up, the loyalty platform is secure. This also makes the math significantly easier—if each company was buying and selling shares, each company would have to purchase and fulfill full shares. If the loyalty platform has six partners (as an example) who all reward wholly or partially (meaning the consumer has opted for each transaction to be split pro rata into 3 stocks) in stock in a given company (e.g., a coffee company), then the loyalty platform can bunch those orders for both buying and selling, making the stock inventory risk significantly lower compared to each company doing it themselves, while also lowering network traffic and increasing data security. As an example, if each of three companies is rewarding in a given stock and the price of that stock is $4000 per share, and there is an individual in each program who wants to sell 25% of a share, each company would have to own a full share, and then sell it, then distribute the sell proceeds to those individuals. The financial risk is therefore $3000 for each company. For the loyalty platform, it would be buying/selling 75% of a share (three individuals, each with 25% of a share), hence a lower financial risk. For the consumer/end user, the benefits are enormous—one location, one login to see one's aggregate portfolio. A consumer/user can sell at one time all holdings in a stock, regardless of where that stock was earned. The loyalty platform may also provide location for tax forms, one secure login, etc. Thus, the loyalty platform, acting as the intermediary between a plurality of customers/users and merchants, may lower network traffic by providing a single platform for users to conduct multiple activities with multiple merchants (thereby reducing the number of web searches, logins, and communication occurring) and may increase data security by lowering the number of secure logins and external communications.

Figure 36:
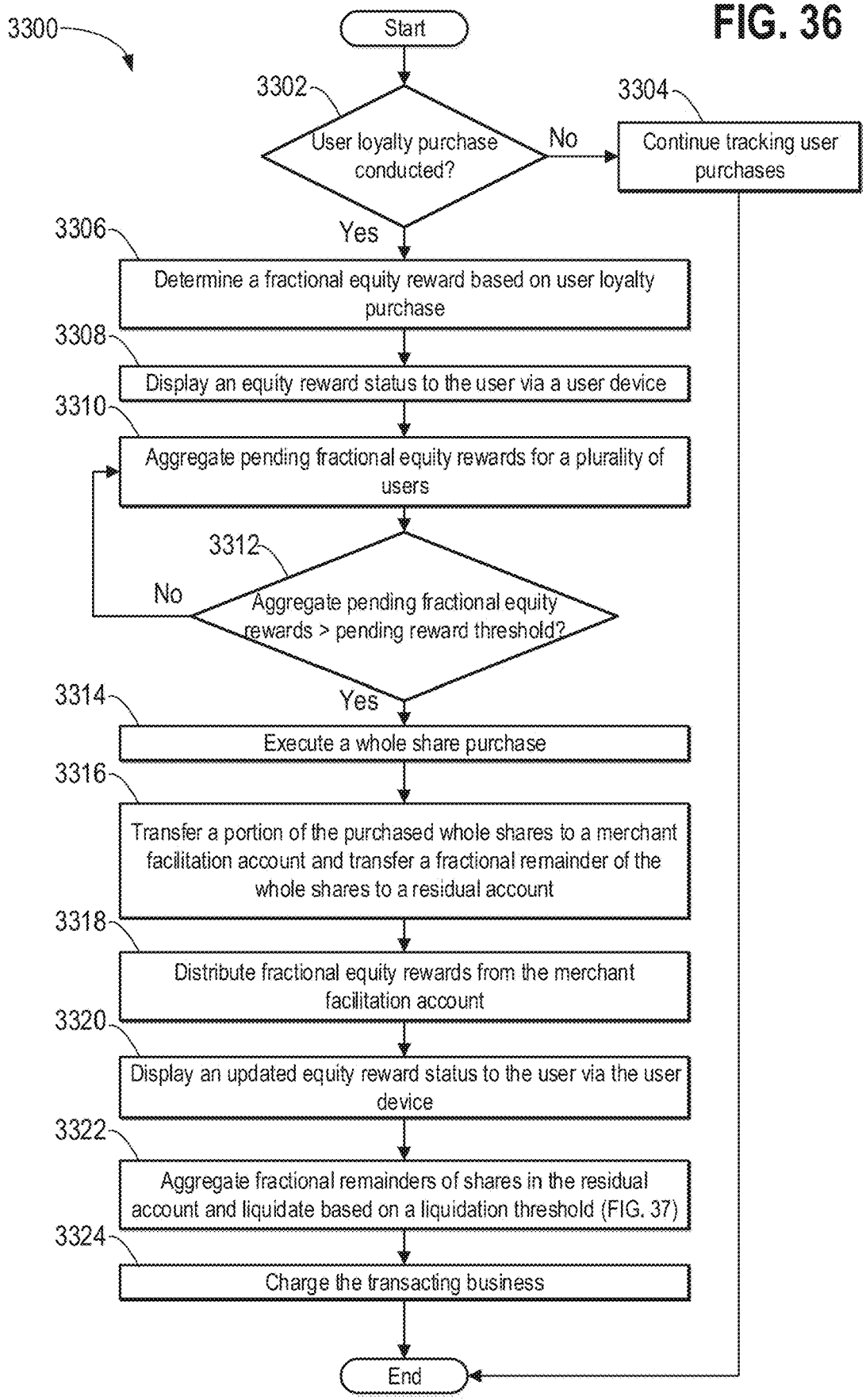
FIG. 36 shows a high level flowchart of a method for acquiring and distributing fractional shares of stock to users of the loyalty platform.

Turning to FIG. 36, an example method 3300 for distributing fractional equity rewards is shown. Method 3300 may enable faster distribution of fractional equity rewards to users compared to conventional methods. For example, by using funds in a merchant deposit account of the loyalty platform for acquisition of whole shares of stock to satisfy the pending fractional equity rewards, a delay of reward distribution which may occur when transferring funds from a merchant bank account may be avoided. In another example, by aggregating pending fractional equity rewards of the plurality of users and executing a whole share purchase based on the aggregated pending fractional equity rewards surpassing a pending reward threshold, an amount of stock left over from the whole share purchase (that is, not distributed to a user as a reward) may be reduced, thereby reducing the amount of stock held by the loyalty platform and reducing a risk assumed by the loyalty platform. Additionally, by indicating to users the progress/current stage of their pending fractional equity rewards, such as by indicating to a user when a transaction entitles that user to a reward, indicating that the process of reward distribution has been initiated, and indicating when the reward has actually been distributed to their account, user impatience may be reduced.

Method 3300 may be stored in non-transitory memory of a computing system implementing a loyalty platform, such as computing system 3180, and one or more, or all, of the steps of method 3300 may be automatically executed by the loyalty platform, or by one or more subcomponents, modules, databases, or subsystems of the loyalty platform.

Method 3300 begins at 3302, wherein a loyalty platform, such as loyalty platform 3108, may determine if a user loyalty purchase has been conducted. A user loyalty purchase may comprise a transaction in which a user, with an account on a loyalty platform and a loyalty selection to a first business, exchanges currency with the first business in exchange for goods or services, wherein the first business is registered with the loyalty platform and provides fractional equity rewards to loyalty customers therethrough. The first business may be included in a database of the loyalty platform, such as rewarding business index 3186, and this database may be used to correlate information obtained regarding a user purchase with a business registered with the loyalty platform and actively offering equity rewards therethrough.

In one example, the loyalty platform may obtain details of a user purchase through a third party data aggregator, or alternatively the loyalty platform itself may receive details of a user loyalty purchase via payment media account information provided to the loyalty platform by the user, such as during a user account creation process. The loyalty platform may then correlate purchase details with a database of registered businesses to ascertain if the user purchase was conducted with a business offering fractional equity rewards through said loyalty platform. The process of correlation may comprise inputting purchase details acquired for a given transaction into a neural network trained to match a set of purchase details with a unique business within a database of the loyalty platform. In another example, the neural network may output a confidence score for said matching, such that for a given transaction, a confidence score associated with the most likely business may be output. A confidence threshold for business matching may be employed, such that above a confidence level, the process of reward distribution may proceed, and below the confidence threshold, no reward may be earned. In another example, a confidence rating below a confidence threshold may trigger a manual review process for a given transaction, wherein the details of the tracked purchase may be displayed for manual evaluation, and a determination of if a user loyalty purchase occurred may be made.

The loyalty platform may further ascertain which customer account is associated with the tracked user purchase and may subsequently determine if said user account has an active loyalty selection to the business with which the user conducted their purchase. If the business is registered with the loyalty platform and the user account associated with the purchase includes a loyalty selection to the business, the tracked user purchase is determined to be a tracked user loyalty purchase, and is therefore eligible for a fractional equity reward. However, if at 3302 it is determined that no user loyalty purchase has been conducted, method 3300 may proceed to 3304, which includes the loyalty platform continuing to track/monitor user purchases. Method 3300 may then end. However, if at 3302 it was determined that a user loyalty purchase has occurred, method 3300 may proceed to 3306.

At 3306, method 3300 includes determining a fractional equity reward based on user loyalty purchase. The determination of a fractional equity reward may be based on a monetary value of the user loyalty purchase, reward policies of the business with which the purchase was conducted, and may further be based on a transaction history or loyalty history of the user who conducted the loyalty purchase. As an example, based on a user loyalty purchase with a monetary value of $150 and further based on the reward policies of the business with which said purchase was conducted comprising a reward rate of 2%, the user may be eligible for $3 worth of a fractional equity in stock Y (the USD equivalent of a reward to be distributed in the form of equity may be herein referred to as a dollar reward amount). Step 3306 of method 3300 may further include calculating the amount of fractional shares to distribute to the user based on the dollar reward amount and further based on a current market price of the stock to be rewarded. Continuing with the above example, based on the $3 reward of stock Y to be distributed to the user, and further based on a $30/share price for the stock to be rewarded to the user, it may be determined at step 3306 that the user is to receive 0.100 shares of stock Y. Upon determining the fractional equity reward to be distributed to a user (herein also referred to as a pending fractional equity reward), method 3300 may then proceed to 3308. The reward amount and corresponding fractional reward may be rounded up or down to the prescribed number of decimal places. For example, a $3.24 purchase at a 2% reward yields $0.0648. That may be rounded to $0.07 or rounded down to $0.06 at the discretion of the loyalty platform. Alternatively, at 3306, the business with which the user loyalty purchase was conducted may transmit a dollar amount to the loyalty platform to reward a user. The business may further transmit an indication of one or businesses/brands for which the dollar amount is to be used to purchase equity in.

At 3308, method 3300 includes displaying an equity reward status to the user. The equity reward status may be rendered on a display of a computing device associated with the user account to receive the pending fractional equity reward. In one example, the equity reward status may comprise one or more of a push notification, email, or other electronic communications. In one example, the equity reward status may indicate the amount of fractional shares of stock to be distributed to a user, the title of the purchase for which the reward was earned, and an estimated reward fulfillment time of the reward. The amount of the pending fractional equity reward may be determined as indicated above, with reference to step 3306, while the estimated reward fulfillment time may be based on one or more parameters associated with the fractional equity reward distribution process. As an example, the estimated reward fulfillment time may be based on one or more of the current amount of pending fractional equity rewards, a rolling average fulfilment time for previously distributed rewards, a current rate of pending fractional equity reward aggregation, and an amount of funds held within the merchant deposit account associated with the current pending fractional equity reward. For example, an estimated reward fulfillment time may be fine-tuned by adjusting a rolling average fulfillment time with a current rate of aggregation for pending fractional equity rewards in the same stock as the current reward. In the case that the rate of aggregation is above a baseline level, such as when a current rate of aggregation is above a running average rate of aggregation, the running average rate of fulfillment time may be decreased to produce the estimated fulfillment, which may be displayed via a display of a user computing device. It will be appreciated that, although method 3300 includes displaying a first equity reward status and an updated equity reward status, any positive integer number of equity reward statuses may be displayed to a user computing device to enable updates regarding the pending fractional equity reward based on any number of steps or events occurring during the fractional equity reward distribution process. Upon displaying the equity reward status method 3300 may then proceed to 3310.

At 3310, method 3300 includes aggregating pending fractional equity rewards for a plurality of users to form an aggregate pending equity reward. In one example, the pending fractional equity rewards may be aggregated by a merchant facilitation account which may be responsible for satisfying said rewards. The amount of aggregated pending fractional equity rewards may be communicated by the merchant facilitation account to the merchant deposit account and the average price account of the loyalty platform. Aggregation may comprise a numerical addition of a new pending fractional equity reward to a previously aggregated (and unsatisfied) amount of pending fractional equity rewards. The aggregated pending fractional equity rewards may be stored in non-transitory memory of a computing system associated with the loyalty platform and may be accessed by one or more of the accounts within an equity allocation system of the loyalty platform. Method 3300 may then proceed to 3312.

At 3312, method 3300 includes evaluating if aggregated pending fractional equity rewards exceed a pending reward threshold. The pending reward threshold may be chosen to limit or reduce the fractional remainder of stock left over after purchasing a whole number of shares and distributing a portion of those shares to users to satisfy the pending fractional equity rewards (each cycle of pending reward aggregation, reward purchase, and reward distribution may be herein referred to as a reward distribution cycle). For example, the pending reward threshold may be chosen such that the amount of aggregated pending fractional equity rewards is within a threshold of a nearest whole number of shares. In a specific example, a pending reward threshold of 0.8 shares of stock X may be chosen in order to reduce the fractional remainder of shares left over after 1.0 shares of stock X is purchased, and a 0.80 shares of stock X is taken from the purchased 1.0 shares to satisfy pending fractional equity rewards, thereby limiting the amount of fractional remainders of shares to 0.20 shares of stock X or less. If the loyalty platform determines that the aggregated pending fractional equity rewards do not exceed a pending reward threshold, method 3300 may return to 3310 and continue aggregating pending fractional equity rewards until the amount of aggregated rewards exceeds the pending reward threshold. The pending reward threshold enables control over the amount of stock held within the residual account of the loyalty platform and may thereby control the amount of capital held within the residual account to enable the reward distribution process. However, if at 3312 the loyalty platform determines that the pending fractional equity rewards exceed the pending reward threshold, method 3300 may proceed to 3314.

At 3314, method 3300 includes executing a whole share purchase based on the amount of aggregated pending fractional equity rewards. For example, based on the amount of aggregated pending fractional equity rewards surpassing a pending reward threshold, an indication may be sent to the average price account to execute a whole share purchase based on the aggregated pending fractional equity rewards. If the amount of aggregated pending fractional equity rewards do not equal a whole number of shares, the amount of aggregated pending fractional equity reward may be rounded-up to the nearest whole number of shares and the average price account may place a buy order for this number of whole shares (this is herein referred to as the whole share buy order). For example, if the amount of aggregated pending fractional equity rewards is 0.95 shares of stock Y, this amount may be rounded-up to 1.00 shares of stock Y, which is the nearest whole number of shares, and a buy order, or a whole share purchase, for this amount may be placed on a clearing system by the average price account. Once the whole share purchase order/buy order has been filled, the average price account may be debited a monetary value corresponding to the purchased whole shares of stock and the average price account may be credited with the purchased amount of whole shares of stock. Method 3300 may then proceed to 3316.

At 3316, method 3300 may include transferring a portion of the purchased whole shares to a merchant facilitation account and transferring a fractional remainder of the whole shares to a residual account. For example, based on 0.95 shares of stock Y of aggregated pending fractional equity rewards, 1.00 shares of stock Y may be purchased by the average price account, with a first portion of the purchased whole shares of stock going to a merchant facilitation account (0.95 shares in this example) in exchange for an amount of funds equivalent to the monetary value of the portion, and with the fractional remainder of shares (0.05 shares in this example) going to a residual account in exchange for an amount of funds equivalent to the monetary value of the fractional remainder of shares. Further, the allocation of the purchased whole shares of stock from the average price account to the merchant facilitation account and the residual account may occur within a threshold duration of the time at which the whole share purchase order was completed, such that the balance of shares in the average price account after the duration of time may be zero (until the next cycle of reward distribution for a given business registered with the loyalty platform). Method 3300 may then proceed to 3318.

At 3318, method 3300 includes distributing fractional equity rewards from the merchant facilitation account to a plurality of users, based on pending fractional equity rewards owed to the plurality of users. For example, the portion of the purchased whole shares in a given merchant facilitation account, may be distributed amongst the plurality of users in amounts equal to the pending fractional equity reward amounts owed to each user, such as were aggregated in step 3310. For example, 0.8 shares of stock in a merchant facilitation account corresponding to business Z may be distributed to a user account of user A and a user account of user B, to satisfy pending fractional equity rewards of 0.2 shares of stock in business Z and 0.60 shares of stock in business Z, owed to user A and user B respectively, wherein 0.20 shares of the 0.80 shares are transferred to the account of user A and 0.60 shares of the 0.80 shares are transferred to the account of user B. An order of distribution of the portion of equity in the merchant facilitation account may be determined by the loyalty platform. In one example, the order of fractional equity reward distribution may be based on a timing of when the user loyalty purchases associated with each fractional equity reward occurred, such that users with rewards pending for longer durations may have an associated fractional equity reward distributed to an associated account before a user with a reward pending for a shorter duration. As the amount of shares of stock allocated to the merchant facilitation account is equal to an aggregated amount of pending fractional equity rewards, there may be no residual equity remaining in the merchant facilitation account upon completion of each reward distribution cycle. Method 3300 may then proceed to 3320.

At 3320, method 3300 may include displaying an updated equity reward status to one or more of the plurality of users to whom a fractional equity reward was distributed in step 3318. In one example, the updated equity reward status may include a visual representation of the amount of fractional equity reward distributed to a user account on the loyalty platform, along with updated totals of equity held by the user account in a reward portfolio. The equity reward status may be rendered within a graphical user interface implemented by a display of a user computing device used to connect with the loyalty platform over a network, such as the Internet. In one example, the equity reward status may be transmitted to the user in the form of a push notification, an email, a text message, or other form of electronic communication. Upon distribution of an amount of fractional equity from a merchant facilitation account to a plurality of user accounts, each of the users associated with the plurality of user accounts may receive an updated equity reward status. An order of sending the updated equity reward statuses may be staggered to reduce consumption of bandwidth by the loyalty platform at any given instant to below a threshold level of bandwidth. Alternatively, each updated equity reward status may be sent out without staggering, and as such a plurality, or all, of the updated equity reward statuses may be sent out simultaneously. Each of the updated equity reward statuses may contain unique information, specifically pertaining to the associated user and user account. Method 3300 may then proceed to 3322.

At 3322, method 3300 includes aggregating fractional remainders of shares in the residual account and liquidating a whole number of shares from this aggregated amount based on the aggregated fractional remainders of shares exceeding a liquidation threshold, as is discussed in more detail with reference to FIG. 37. Method 3300 may then proceed to 3324.

At 3324, method 3300 may include charging the business (on whose behalf fractional equity rewards were distributed to the plurality of users) based on the distributed fractional equity rewards. In one example, the loyalty platform may charge a participating business after completion of a reward distribution cycle based on an amount of funds within a merchant deposit account associated with the participating business decreasing below a threshold amount of funds. Where, in one example, the threshold amount of funds may comprise a dollar amount projected to equal 10 days of fractional equity rewards, based on the current rate of fractional equity reward distribution for that business. The charge may comprise a first amount of funds needed to replenish the merchant deposit account associated with the business, and a second amount of funds to pay the loyalty platform service fee, where the service fee may have been previously agreed on within the Merchant Agreement between the loyalty platform and business. A bank account, or other payment account of the business, may transfer the first and second amount of funds to the loyalty platform via a payment system, such as payment system 3150. The first amount of funds may be sent to the merchant deposit account, while the second amount of funds may be sent to a bank account of the loyalty platform, or alternatively, to an account within the loyalty platform. Method 3300 may then end.

In this way, method 3300 may enable fractional shares of stock to be distributed to a plurality of users more rapidly than conventional methods, while reducing the amount of equity needed to be maintained within an inventory account and reducing user frustration associated with lack of feedback regarding equity reward statuses.

Turning now to FIG. 37, an example method 3400 for managing a residual account is shown. One or more of the steps of method 3400 may be automatically executed by a loyalty platform, such as loyalty platform 3108, configured with an equity allocation system, such as equity allocation system 3120. As discussed previously with reference to FIG. 35, a residual account, such as residual account 3250, may be included within a loyalty platform, and may perform functions related to managing residual securities unallocated after distribution of fractional equity rewards. In some examples, a residual account within a loyalty platform may also obtain and manage fractional shares of stock forfeit by users. Method 3400 gives one example of a method by which a residual account of a loyalty platform may aggregate and liquidate fractional remainders of shares leftover after fractional equity rewards have been distributed to users, and may enable a reduction of the amount of equity held by a residual account of a loyalty platform, thereby also reducing a financial risk and/or regulatory burden associated with holding equity. Although the example of method 3400 is given with reference to a single stock, it will be appreciated that the residual account may conduct similar, or the same, method of inventory management with each of a plurality of different stocks used by the loyalty platform to reward user purchases. In one example, there may be a plurality of residual accounts, each managing fractional remainders of shares for a single type of stock, and therefore there may be a one-to-one correspondence between a plurality of stocks used to reward users on a loyalty platform, and the plurality of residual accounts. In another example, a single residual account may be used, which is configured to hold the plurality of different stocks, and may execute management methods on each of the plurality of stocks.

Method 3400 begins at 3402, which may include aggregating fractional remainders of shares. As discussed above, during a fractional reward distribution cycle, a fractional remainder of shares of stock may be left over after all pending fractional equity rewards (for that stock) are satisfied. This fractional remainder of shares, may be aggregated/accumulated within a residual account of the loyalty platform. In one example, a number of whole shares may be purchased by an average price account, and a portion of the whole shares (which may comprise a fractional number of shares) may be transferred to a merchant facilitation account as part of a reward distribution process (see FIG. 36). In many cases, the number of whole shares and the portion of shares may differ by a fractional share amount, thus leaving a fractional remainder of shares in the average price account. This fractional remainder of shares may be purchased by the residual account, and aggregated with any previously aggregated stock of the same type currently held by the residual account. Thus, after each reward distribution cycle for a given stock, an amount of aggregated fractional remainders of shares within the residual account may increase. Method 3400 may then proceed to 3404.

At 3404, method 3400 includes evaluating if the aggregated fractional remainders of shares are greater than a liquidation threshold. The liquidation threshold may be determined separately for each type of stock used by the loyalty platform to reward users, and may be based on the rate of reward distribution associated with a given stock (such as how rapidly are new rewards in a given stock earned), a volatility of the stock, and a price of the stock. The liquidation threshold may comprise a non-negative, non-zero number of shares of a given stock, and may be a fractional or whole number of shares. In one example, the comparison between the amount of aggregated fractional remainders of shares and the liquidation threshold may occur after each reward distribution cycle for a given stock. In another example, the comparison may occur after each aggregation event (that is, after new fractional remainders of shares are added to the inventory). In yet another example, the comparison may occur at regular, predetermined intervals. If at 3404, the loyalty platform determines that the aggregated fractional remainders of shares are below the liquidation threshold, method 3400 may return to 3402 and continue to aggregate fractional remainders of shares. However, if at 3404 the loyalty platform determines that the aggregated fractional remainders of shares are greater than the liquidation threshold, method 3400 may proceed to 3406.

At 3406, method 3400 includes liquidating a whole number of shares from the residual account by executing a whole share sell on the open market. The number of whole shares to be sold may be based on a difference between the liquidation threshold and the aggregated amount of fractional remainders of shares. For example, as the difference between the fractional remainders of shares and the liquidation threshold increases (that is, as the fractional remainders of shares increases above the liquidation threshold) the number of whole shares to be sold via the whole share sell may increase, thereby enabling the fractional remainders of shares held in the residual account (for a given stock) to be reduced to below a liquidation threshold even if the amount of fractional remainders of shares is well above the liquidation threshold. In another the whole number of shares liquidated may comprise a largest number of whole shares within an amount of aggregated fractional remainders of shares. For example, if there is 5.3349 shares of stock X within a residual account of a loyalty platform, based upon a liquidation threshold of 5.0 shares of stock X, the residual account may place a sell order for the largest number of whole shares of stock X, which is 5.0 shares in this case.

In another example, the minimum number of whole shares may be liquidated, such that the amount of aggregated fractional remainders of shares is reduced to below the liquidation threshold. In an example, if there is 5.3349 shares of stock X within a residual account of a loyalty platform, based upon a liquidation threshold of 5.0 shares, the residual account may place a sell order for the minimum number of whole shares which would result in the amount of aggregated fractional remainders of shares being reduced to below the liquidation threshold, which in this case would be 1.0 shares (and the amount remaining would be 4.3349 shares of stock X). Executing a whole share sell may include placing a whole share sell order on one or more securities markets, such as the NYSE, via a clearing system, such as clearing system 3104. Funds obtained from liquidating whole numbers of shares from the fractional remainders of shares within the residual account may be used to replenish funds spent by the residual account to purchase fractional remainders of shares, and in that way the amount of new funds to be transferred to the residual account to enable it to purchase fractional remainders of shares may be reduced. Method 3400 may then end.

In this way, method 3400 may enable efficient reduction in the amount of equity held in a residual account of a loyalty platform, by liquidating whole numbers of aggregated fractional remainders of shares based on a liquidation threshold.

Turning now to FIG. 38, an example method 3500 for aggregating and executing user sell orders, which may comprise sell orders for fractional shares of stock. One or more of the steps of method 3500 may be automatically executed by a loyalty platform, such as loyalty platform 3108, configured with an equity allocation system, such as equity allocation system 3120. Method 3500 may enable user sell orders for fractional shares of stock to be rapidly executed, without the loyalty platform directly buying back fractional shares of stock from users. Conventionally, a difficulty of dealing in fractional shares of stock is that securities markets generally do not deal in fractional shares of stock, and therefore a user wishing to execute a sell order for an amount of fractional shares may be required to pay additional fees for such an order, or may simply be unable to complete such an order. Method 3500 may mitigate this issue, without requiring the loyalty platform to directly purchase fractional shares of stock from its users.

Method 3500 begins at 3502, which includes aggregating user fractional sell orders. In one example, fractional sell orders may be computationally aggregated, such as by summing all pending user sell orders. Alternatively, user sell orders may be aggregated by transferring user equity to be sold to an account, such as the average price account, and pooling/aggregating the equity to be sold with the account. Upon placing a sell order, a user may receive a sell order status displayed via a display of a computing device associated with the user. The sell order status may indicate to the user the amount of equity to be sold, such as by rendering the amount within a graphical user interface, which may comprise an amount of fractional shares of stock, as well as an indication of what stage of the sell process the sell order is currently in. Method 3500 may then proceed to 3504.

At 3504, method 3500 includes evaluating if the aggregated fractional share sell order amount is greater than a sell order threshold. This evaluation may occur upon each new user sell order for a given stock. Alternatively, the evaluation may occur at regular, pre-determined intervals of time. The sell order threshold may be based on a rate of sell order aggregation, a time since placement of the oldest sell order in the aggregated sell order, and liquidity of the stock comprising the sell order (such as may be indicated by evaluating volume of trade on the open market for the stock). Alternatively, the sell order threshold may be a pre-determined value. The sell order threshold may be unique for each of the plurality of stocks used to reward users on the loyalty platform. As an example, the sell order threshold may comprise a whole number of shares, or alternatively the sell order threshold may comprise a fractional amount of shares. In one example, a default sell order threshold may be adjusted based on a duration of time since the oldest sell order in the aggregated sell order being evaluated was placed. In a specific example, a default threshold of 5.0 shares of stock may be decremented to 4.0 shares of stock based on the length of elapsed time since the first sell order within the aggregated sell order was placed surpassing a threshold. For example, a based on the oldest sell order within an aggregated sell order exceeding a threshold wait time of 1 day, a sell order threshold may be decreased. In this way, a duration of wait for execution of a user sell order may be reduced. In another example, a sell order threshold may comprise a predetermined whole number of shares, such as 1.0 shares. If at 3504 the loyalty platform determines that the aggregated fractional share sell order amount is not greater than the sell order threshold, method 3500 may return to 3502, and continue to aggregate fractional share sell orders from the plurality of users. However, if at 3504 it is determined that the aggregated fractional share sell order is greater than a sell order threshold, method 3500 may proceed to 3506.

At 3506, method 3500 includes liquidating a number of whole shares of the aggregated fractional share sell order. The number of whole shares liquidated from the aggregated fractional share sell order may be based on the amount of the aggregated fractional share sell order. In one example, the maximum number of whole shares within the aggregated fractional share sell order may be sold. As a specific example, based on an aggregated fractional share sell order amounting to 2.566 shares of stock X, a whole share sell order for 3.0 shares of stock X may be placed with a clearing system. Funds obtained from liquidating whole shares of stock comprised of a plurality of aggregated user fractional share sell orders may be allocated to the plurality of user accounts associated with the plurality of aggregated user fractional share sell orders. As an example, if user A placed a sell order for 0.5 shares of stock X, and user B placed a sell order for 0.5 shares of stock X, based on a liquidation threshold of 1.0 shares of stock X, a whole share sell order may be placed, and executed, for the 1.0 shares. Funds from the whole share sell for the 1.0 shares of stock X may be distributed to user accounts associated with user A and user B in proportion to the amount of the executed sell order comprising stock owned by that user, so in this case 50% of the funds go to an account belonging to user A, and 50% of the funds go to an account belonging to user B. Upon execution of the whole share sell order based on the aggregated fractional share sell orders, method 3500 may then end.

In this way, sell orders for fractional shares of equity, which may conventionally require additional fees or time to sell, may be efficiently and timely sold, by aggregating fractional share sell orders from a plurality of users, and executing a whole share sell order based on the amount of the aggregated fractional share sell orders exceeding a sell order threshold.

Turning now to FIG. 39, an example method 3600 for distributing fractional shares of stock to users of a loyalty platform based on tracked user loyalty purchases is shown. On the left side of FIG. 39, a column is displayed which indicates what agent/system performs a given step of the method. A step, indicated by a box in the flowchart, horizontally aligned (such as within a same row of a matrix) with an agent/system in the left hand column may be considered to be performed by that agent/system for purposes of example method 3600. As a specific example, step 3628 of method 3600 is horizontally aligned with "Merchant", which indicates that step 3628 is conducted by a business registered with the loyalty platform, which may herein also be referred to as a merchant. Running along the bottom of FIG. 39, is an arrow labeled "TIME", this arrow indicates the chronology of the steps of method 3600, with steps to the right occurring later, steps to the left occurring earlier, and steps vertically aligned occurring substantially concurrently, or within a threshold duration of time of one another. For example, steps aligned vertically may occur within the same 24 hour duration of time.

Method 3600 begins at 3602, wherein a user executes a user loyalty purchase using a linked payment medium. The linked payment medium may comprise a credit card, debit card, other payment card, cellphone based payment app, NFC based payment system, or other types of electronic payment systems which may provide a digital record of a transaction.

Step 3604 of method 3600 includes the payment being accepted by the merchant. The merchant in this example comprises a business registered with the loyalty platform, and to whom the user (as indicated by the "user" in the left hand column of FIG. 39), has made a loyalty selection (wherein the loyalty selection may be stored in a user account associated with the user on non-transitory memory of one or more computing systems implementing a loyalty platform). Once the user's payment is accepted by the merchant, method 3600 may proceed to step 3604.

At step 3606, method 3600 may include the payment medium company processing the payment made during the user loyalty purchase. For example, in the case that the linked payment medium comprises a credit card, step 3606 may comprise the credit card company processing the new charge made by the account (the account in this example referring to a user account within the credit card company) to which the user loyalty purchase was charged, and from which funds were obtained to complete the purchase. Processing of the payment may include recording one or more details associated with the user loyalty purchase, such as a date, time, and physical location of the purchase. Once the payment has been processed by the payment medium company, method 3600 may proceed to step 3606.

At step 3608, method 3600 includes the loyalty platform receiving transaction details associated with the user loyalty purchase. In one example, a third party data aggregator may compile and transmit purchase details from a plurality of different payment medium companies, such as various banks, credit card companies, etc. In another example, the payment medium company may provide purchase details directly to the loyalty platform.

At step 3610, method 3600 includes identifying if a valid user loyalty purchase occurred based on the tracked purchase details. In one example, purchase details may be correlated with a database associated with the loyalty platform, such as rewarding-business index 3186, to ascertain if the business at which the purchase occurred is registered with the loyalty platform, and currently offering fractional equity rewards to users. Further, step 3610 may include looking up a user's loyalty selections, such as by identifying which user account is associated with a tracked purchase (which may be accomplished by determining which account registered a payment medium used to conduct the transaction) and then determining if the user has an active loyalty selection to the business with which the purchase was executed. If at 3610 it is determined that a valid user loyalty purchase occurred, method 3600 may proceed to step 3612.

At step 3612, method 3600 includes determining/calculating a fractional share amount (a fractional equity reward) to reward the user based on the tracked user loyalty purchase. The determination may be based on a duration of user loyalty selection to the business, a transaction history of the user, a dollar amount (monetary value) of the purchase, and reward policies of the business, stored within the loyalty platform. Once a fractional share amount to reward the user has been determined, method 3600 may proceed to step 3614.

At step 3614, method 3600 includes displaying an equity reward status to the user. In one example the equity reward status may include an indication of fractional share amount to which the user is now entitled based on the recently conducted user loyalty purchase, the equity reward status may further include an indication of a timing of distribution of the fractional share amount.

At step 3616, method 3600 includes invoicing the merchant for the dollar amount of the fractional equity reward, the invoice may further include one or more charges, such as a service fee for the loyalty platform. Method 3600 may then proceed to step 3628, which includes the merchant issuing a payment to the loyalty platform based on the invoice. At step 3630, the loyalty platform may receive the payment from the merchant, and may allocate the received funds. In one example, a portion of the funds may be allocated to a merchant deposit account to provide future rewards of the merchant with fractional equity rewards based on user loyalty purchases.

Returning to step 3612, method 3600 may also proceed to 3618, which includes the loyalty platform aggregating fractional equity rewards and issuing a whole share buy order with a clearing system based on the aggregated rewards. Fractional equity rewards aggregated together may comprise shares of stock in a given business, so that pending fractional equity rewards of stock X are aggregated together into a first aggregate amount, while pending fractional equity rewards of stock Y are aggregated together into a second aggregate amount, but the first and second amounts may not be aggregated together, and no aggregate amount of a mixed stocks may occur. The amount of the whole share buy order may be determined as discussed in more detail above. As one example, the whole share buy order may comprise a number of whole shares within one share of the amount of aggregated fractional equity rewards. As a specific example, based on pending fractional equity reward amount of 2.35 shares of stock X, a whole share buy order of 3.0 shares of stock X may be placed, which is the rounded-up amount of the aggregated pending fractional equity rewards. Method 3600 may then proceed to step 3620

At step 3620, method 3600 includes a clearing system executing the whole share buy order placed in step 3618. Method 3600 may then proceed to 3622.

At step 3622, method 3600 includes the whole share buy order being filled. Method 3600 may then proceed to step 3624.

At step 3624, method 3600 includes the loyalty platform receiving from the clearing system the purchased amount of whole shares. The purchased amount of whole shares my deposited within an average price account of the loyalty platform, and may subsequently be allocated to a plurality of users to satisfy pending fractional equity rewards of the plurality of users. This may include first transferring a portion, equal to the aggregated pending fractional equity rewards, from the average price account to a merchant facilitation account, before apportioning the portion in the merchant facilitation account amongst the plurality of users. A fractional remainder of shares leftover after satisfying the pending fractional equity rewards may be purchased by, and stored within, a residual account of the loyalty platform. Method 3600 may then proceed to step 3626.

At step 3626, method 3600 includes displaying an updated equity reward status to a user via a display of a user computing device. The updated equity reward status may indicate that an amount of fractional equity has been transferred to an account associated with the user. The updated equity reward status may further include updated totals for equity held within the account of the user on the loyalty platform. Method 3600 may then end.

Focusing now on FIG. 40, one specific example of a process for distributing a fractional equity reward to a user is illustrated. The example includes transactions between an average price account, a residual account, a merchant facilitation account and merchant deposit account (the merchant being Home Depot "HD" in this example), and a user account. Funds from the average price account are used to purchase a number of whole shares of HD stock, a portion of the whole shares is purchased by a merchant facilitation account (using funds which originate from a merchant deposit account) and transferred to a user account to satisfy a pending fractional equity reward, while a fractional remainder of shares of the whole shares is purchased by the residual account.

Figure 41:
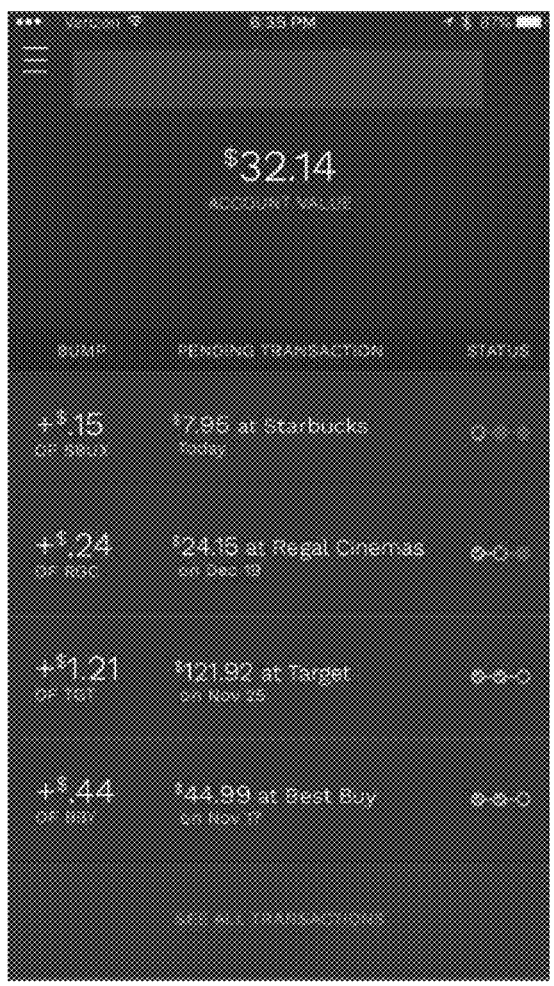
FIGS. 41 and 42 show example graphical user interfaces of the loyalty platform.
Figure 42:
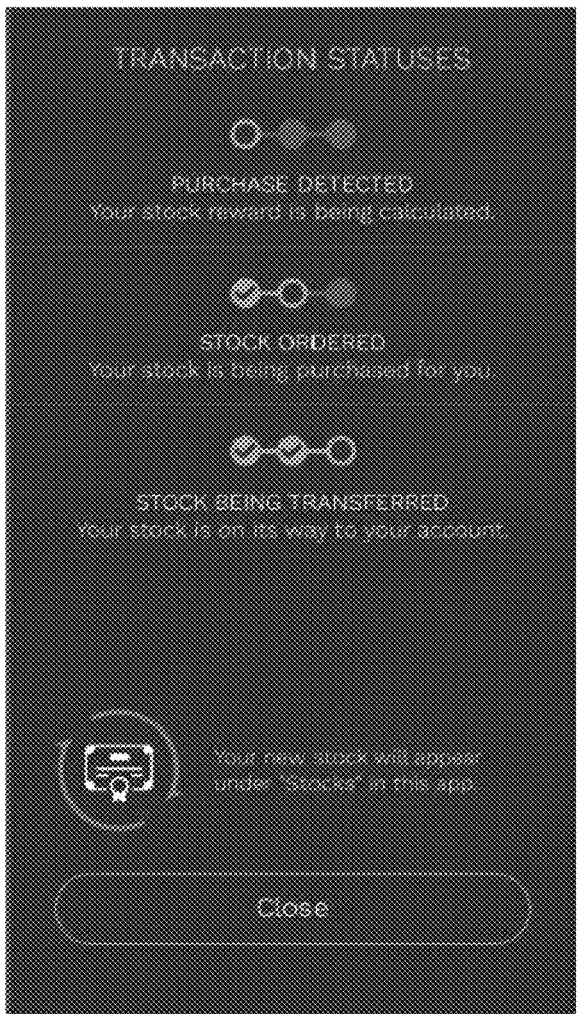
Figure 43:
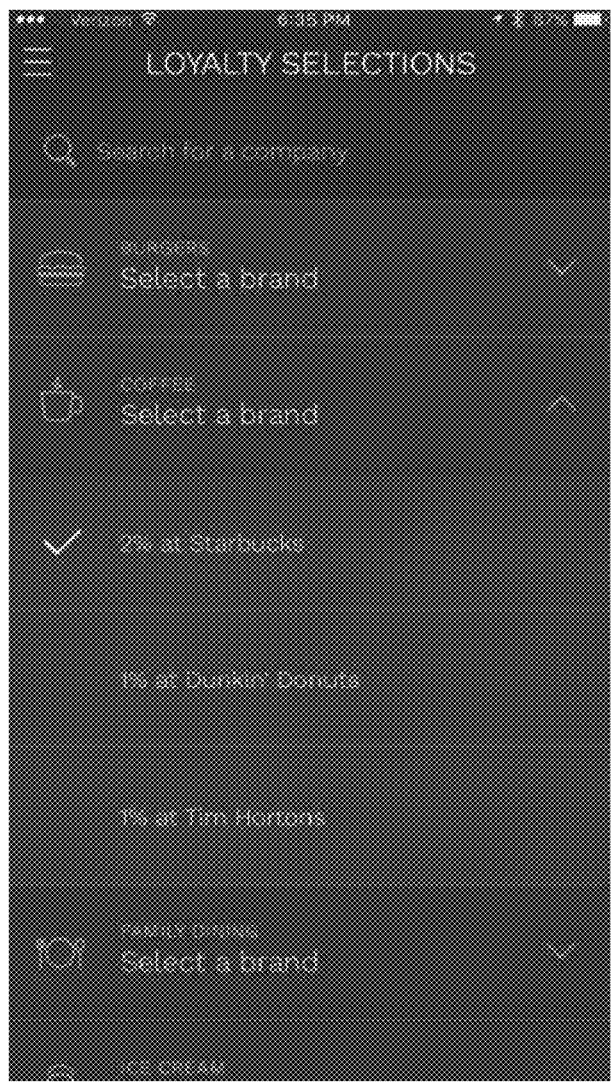
FIGS. 43-48 show example graphical user interfaces associated with loyalty selections.
Figure 44:
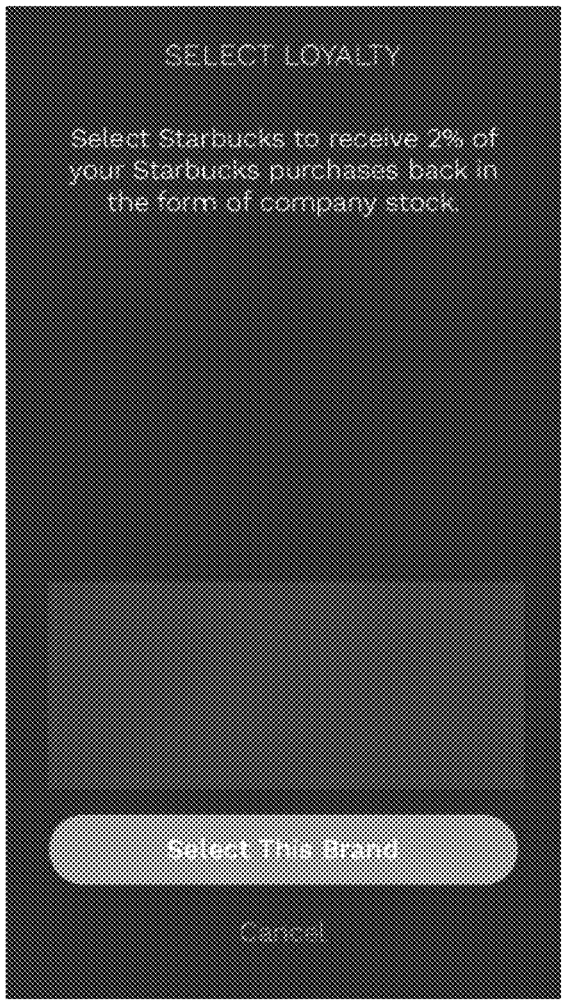
Figure 45:
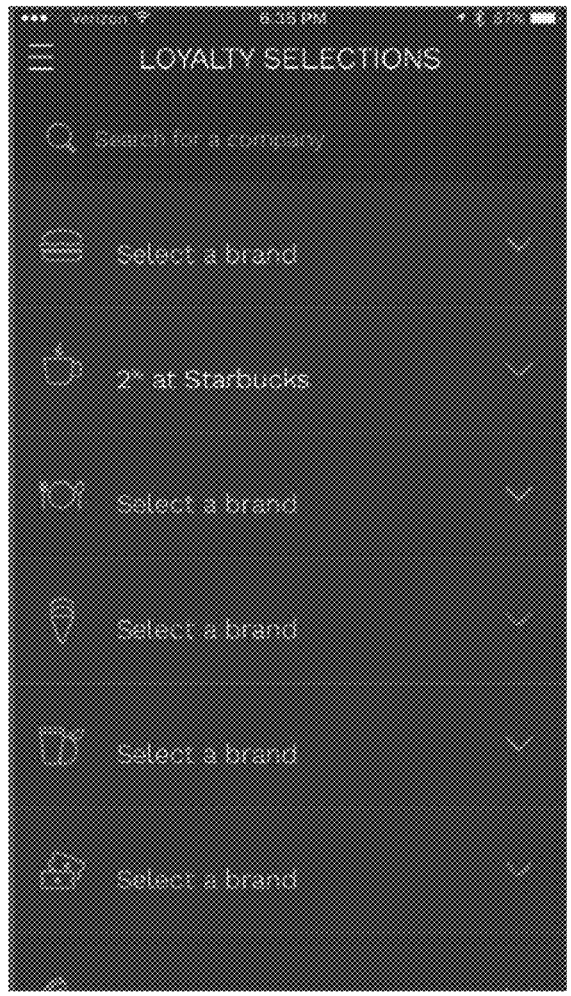
Figure 46:
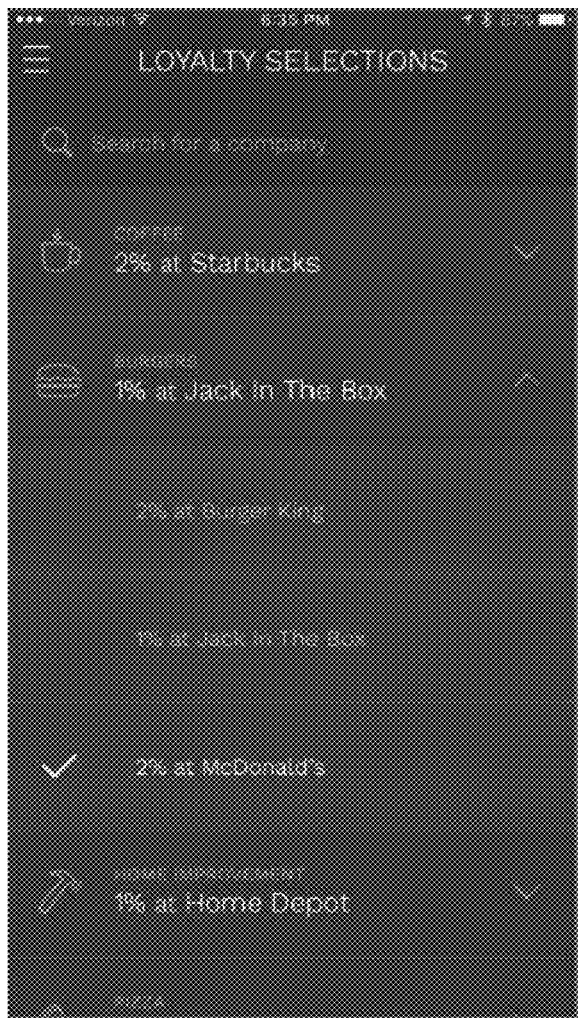
Figure 47:
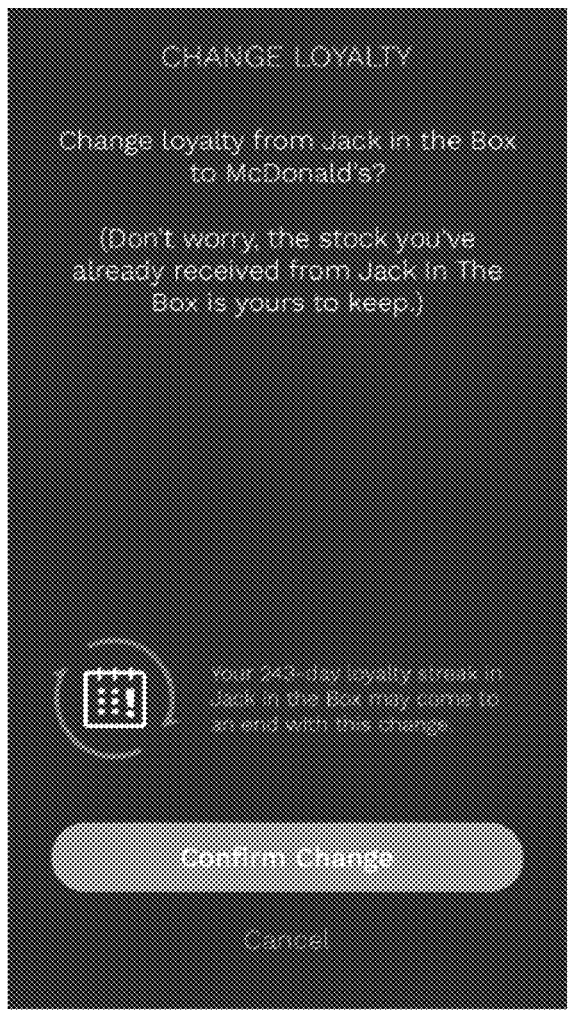

FIGS. 41 and 42, illustrate example graphical user interfaces 3700 and 3710 which may be displayed by the loyalty platform via a user computing device during the process of fractional equity reward distribution. Interface 3700 and 3710, give two examples of equity reward statuses which may be displayed to a user to indicate a current status of one or more pending fractional equity rewards.

FIGS. 43, 44, 45, 46, 47, 48, 49 and 50, illustrate example graphical user interfaces 3720, 3730, 3740, 3750, 3760, 3780, 3790 and 3800, which may be displayed by the loyalty platform via a user computing device to illustrate a user's current loyalty selections, and reward portfolio (a reward portfolio comprises received user equity rewards).

FIGS. 51, 52, 53, 54, 55, 56 and 57, illustrate example graphical user interfaces 3810, 3820, 3830, 3840, 3850, 3860 and 3870, which may be displayed by the loyalty platform via a user computing device to during an equity reward sell process, which may comprise placing a user sell order for part, or all, of fractional equity rewards accumulated by a user in a user account. The user sell order may comprise a sell order for an amount of fractional shares of stock.

FIGS. 58, 59, 60, 61, 62, and 63 illustrate example graphical user interfaces 3880, 3890, 3900, 3910, 3920, and 3930 which may be displayed by the loyalty platform to illustrate a user's transaction history, including previous tracked purchases, rewards earned based on previous tracked purchases, rewards which could have been earned if a user had selected loyalty to a transacting business, and other such information.

Another embodiment directed to systems and methods for a loyalty platform, such as a loyalty platform that provides equity rewards and/or fractional equity rewards to users based on tracked user loyalty purchases (the term "user" or "users" is herein used interchangeably with the terms "customer" or "customers") is shown in FIGS. 64A-71. The embodiment described with respect to FIGS. 64A-71 may enable distribution of equity rewards to users with reduced user frustration during rewards enrollment by automatically identifying businesses in which to enroll the user. For example, to aid in creating an outstanding user experience by simplifying application set up, the disclosed system may pre-populate user rewards selections based upon a near real-time computer analysis of prior spending on a payment card or within a depository account the user has linked to within a client application, just seconds prior during account set up. In an example, the user will see the results of that analysis as pre-selected businesses and/or merchants and be presented with a confirmation button and text that informs the user of the ability to make changes, corrections, or void a category all together, along with a disclosure that informs the user that pre-populated businesses and/or merchants are based upon observed prior spending habits and do not constitute investment recommendations.

In a first example, a method for enrolling a user in one or more equity rewards programs comprises, receiving from a third-party aggregator a transaction history for one or more financial accounts associated with the user, determining a first set of businesses associated with transactions in the transaction history, generating an equity rewards list including one or more businesses selected from the first set of businesses, displaying, via a display of a user device, the equity rewards list and a request to confirm the one or more businesses included in the equity rewards list, and responsive to receiving user input at the user device confirming the equity rewards list, enrolling the user in a respective equity rewards program for each business in the equity rewards list. In this way, delays in enrollment may be reduced, as the method may not rely upon a user scrolling through large lists of available rewards programs to make selections. Furthermore, the example method allows for continuous updates to rewards program enrollment as new transactions are performed. For example, responsive to detecting a new transaction for a selected business, the method may further include outputting a request for the user to confirm enrollment in a rewards program associated with the selected business. The request may be presented responsive to the first transaction for that business, or responsive to determining that a threshold number or percentage of transactions (e.g., in a given category associated with the type of the business) have been performed, in some examples. It may also occur later, in the event the consumer changes purchase behavior, and the loyalty platform detects a higher degree of loyalty to another business. In this case, the request may be presented to the consumer to suggest a change in loyalty based upon a "loyalty review" process (examining the consumer's transaction behavior and presenting recommendations via a GUI display).

In a second example, some of the above issues may be addressed by a computing system including a processor, a display, and a memory storing instructions executable by the processor to receive, from a user, information regarding a financial account to be linked to a loyalty rewards platform account, receive, from a third-party aggregator, a transaction history for one or more financial accounts associated with the user, determine a first set of businesses associated with transactions in the transaction history, generate an equity rewards list including one or more businesses selected from the first set, display, via the display, the equity rewards list and a request to confirm the equity rewards list, and responsive to receiving user input at the user device confirming the equity rewards list, enroll the user in a respective rewards program for each business in the equity rewards list. In this example, the user may be eligible to receive an equity reward associated with each business in the list of businesses and is excluded from receiving equity rewards associated with each business not included in the list of businesses.

In a third example, some of the above issues may be addressed by a method including: receiving by a transaction inspector a transaction history, generating by the transaction inspector a transaction profile that identifies businesses attributed to transactions in the received transaction history, linking by the transaction inspector the transaction profile to the received transaction history, and, for each of the businesses identified in the transaction profile, enrolling the user in a respective rewards program associated with the respective business. In this way, the example method may perform a behavior-based approach to enrolling a user in rewards programs, in which user behaviors (e.g., spending habits) are derived based on transaction history information and used to determine businesses that have rewards programs that the user may be interested in joining. In the example method, further businesses may be identified by analyzing demographic information for the user and correlating businesses with the demographic information to generate a demographic profile that identifies businesses that are associated with other users that are similar to the user. For example, the method may further include generating a confidence score indicating a likelihood that a given business will be of interest to the user based on a correlation between demographic information for the user and demographic information for users that are enrolled in a rewards program for the given business.

In a fourth example, some of the above issues may be addressed by a method including determining a common behavior set including one or more of a purchase behavior of a user and demographic information of the user, displaying a correlation result including a group of businesses, each business in the group of businesses selected based on a match of a respective profile of the business to the common behavior set, receiving a user selection of one or more businesses in the group, and, for each of the businesses selected by the user selection, enrolling the user in a respective rewards program associated with the respective business.

In a fifth example, some of the above issues may be addressed by a method including, responding to a first brand/business discontinuing a rewards program operated through the loyalty platform by automatically selecting one or more additional brands and prompting a user to make a loyalty selection to one of the one or more additional brands, wherein the one or more additional brands have active loyalty programs operated through the loyalty platform, and wherein the user had an active loyalty selection to the first brand/business when the first brand/business discontinued the rewards program. The automatically selected additional brands may be selected by the loyalty platform based on a purchase history of the user. The one or more additional brands may be designated within a same market/category of the loyalty platform. In this way, a loyalty platform may intelligently select one or more new brands for a user to select loyalty to based on the actual spending habits of the user upon responsive to a first brand ending a rewards program, thereby enabling the user to continue to earn rewards through user loyalty purchases. This may reduce user frustration upon realizing that a brand to which they have previously selected loyalty is no longer offering loyalty rewards. This may further reduce an amount of time/effort a user may exert in finding and selecting a new brand to begin earning rewards with.

Examples of a loyalty platform and related features are disclosed in U.S. Provisional Patent Application No. 62/697,284, entitled "DISTRIBUTING SUCCESS-LINKED REWARDS TO CUSTOMERS OF PRIVATELY HELD COMPANIES," filed on Jul. 12, 2018, and U.S. Provisional Patent Application No. 62/543,884, entitled "DETERMINING EQUITY REWARDS BASED UPON PURCHASE BEHAVIOR", filed on Aug. 10, 2017. The entire contents of each of the above-identified applications are hereby incorporated by reference for all purposes.

The following description provides examples of systems and methods which may enable a loyalty platform, such as loyalty platform 3108 shown in FIG. 34A, to suggest businesses and/or merchants that have loyalty rewards programs in which a user may enroll. The suggestions may be targeted to a particular user based on transaction information for the user, demographic information of the user, and/or other suitable contextual information. For example, during a sign up process, payment card (e.g., credit/debit card) linking may occur relatively early on in the process. During the time between the user linking a card and the user completing details related to an associated upcoming brokerage account, there is enough time to fetch recent transaction history of the user's linked accounts. Given the raw feed of recent transactions (e.g., within approximately the last three months), an auto-selection system may categorize and analyze received information to create a tentative profile of the user. It could be determined from a resulting dataset that within the last few months, that the user has spent $X at one brand and less than half that at their closest competitor within one of the system's categories. The above determination, as well as the user's known location, age, and/or other pertinent details may be used to construct a highly-accurate representation of the brands, businesses, and/or merchants for which the user has an affinity. Once the aforementioned tentative profile is completed for the user, then a loyalty selection process can be significantly auto-filled based on the user's recent spending habits. Within a system-defined brand, business, and/or merchant category, a user's loyalty between two or more brands, businesses, and/or merchants may be too ambiguous to be automatically selected, thus prompting the system to explicitly ask the user. Also, a user might not have any spending habits within a particular brand, business, and/or merchant category. Such categories may be intentionally deemphasized to avoid clutter for the user. For other brands, businesses, and/or merchants where loyalty can be determined automatically, the user may still manually override and make a choice of brand, business, and/or merchant within a few taps.

The loyalty platform may be implemented by one or more computing systems, such as computing system 3180 shown in FIG. 34B. Computing system 3180 may include non-transitory memory, which may include instructions that when executed carry out one or more steps of one or more of the methods herein disclosed, such as methods 4200, 4300, 4500, and 4600 described in detail below with respect to FIGS. 64A, 64B, 65, 67, and 68. It will be understood that loyalty platforms, such as loyalty platform 3108 may be implemented by more than one computing system, such as in a distributed computing scheme, wherein various functionalities of the loyalty platform may be enabled by a plurality of networked computing systems working in concert. Loyalty platform 3108 may comprise an equity allocation system, which may distribute fractional shares of stock to users based on tracked user loyalty purchases. It is to be understood that loyalty platform 3108 is a non-limiting example of a loyalty platform used in the methods and systems described in FIGS. 64A, 64B, 65, 66, 67, and 68.

Figure 64A:
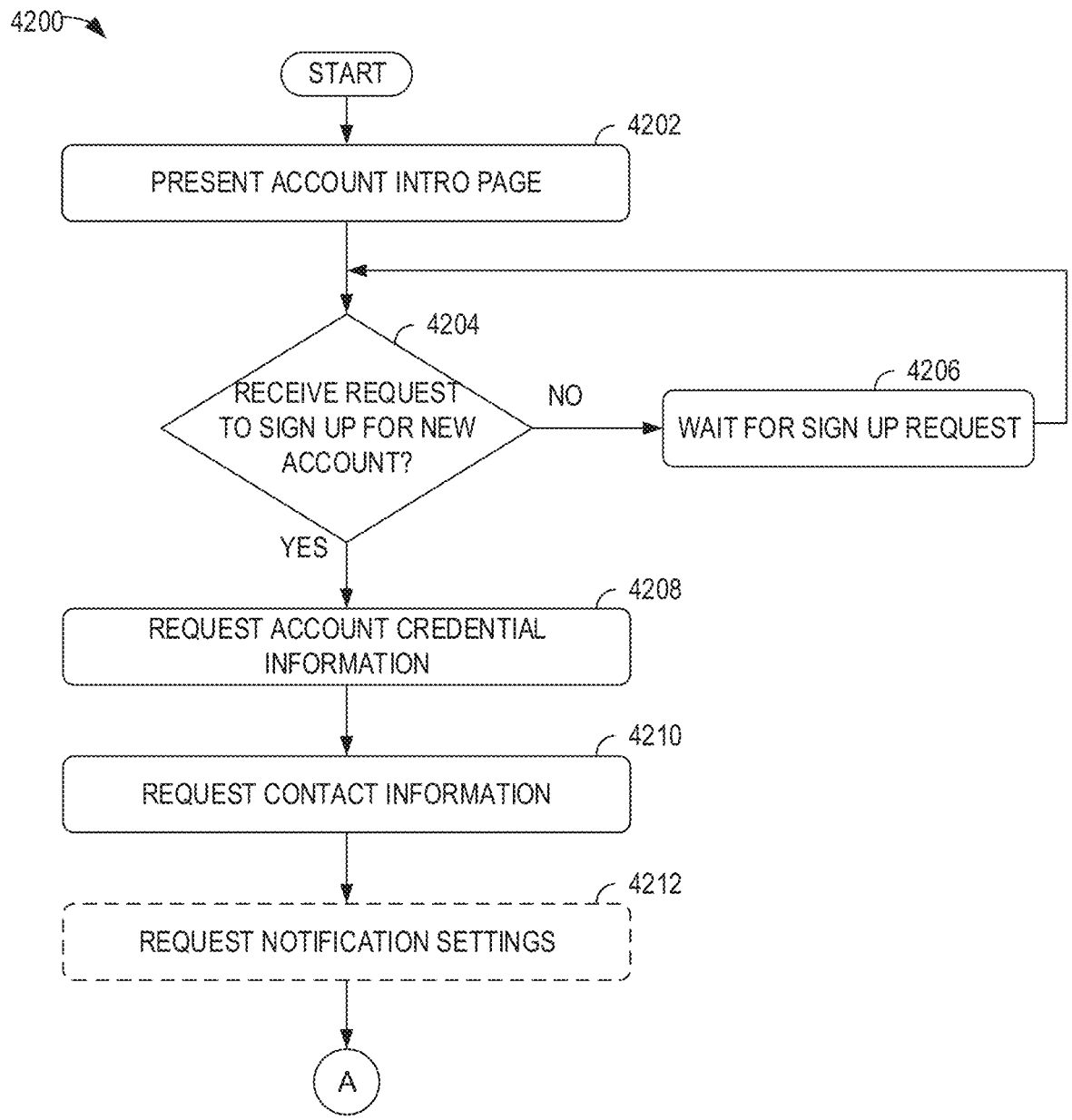
FIGS. 64A and 64B show flowcharts for an example method of signing up for a loyalty platform.
Figure 64B:
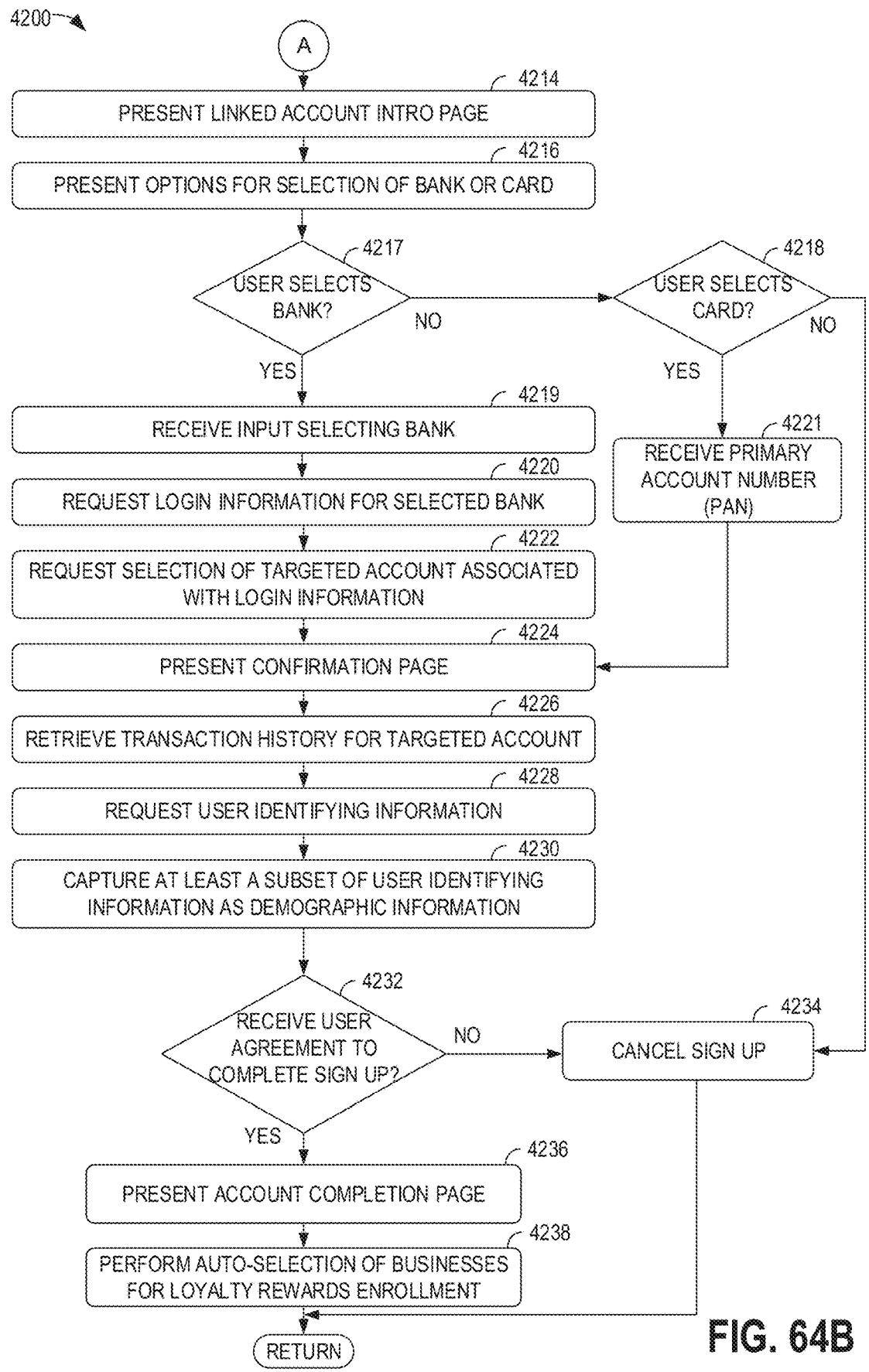

In order to enroll in one or more of the loyalty rewards programs described above, a user may first sign up for the loyalty platform, then select businesses (hereinafter, a "business" is to be understood to refer to a business, a merchant, a brand, and/or any other entity that may be associated with a loyalty rewards program) and/or associated loyalty rewards programs for enrollment. FIGS. 64A and 64B show a flow chart of an example method 4200 for signing up for a loyalty platform. Method 4200 may be performed by executing instructions at a user device (e.g., a mobile device executing a loyalty platform application) and/or a platform device (e.g., at a server and/or other device providing the loyalty platform), each of which may include one or more of the components of computing system 3180 of FIG. 34B as described above. For example, the user device may include a display for presenting a graphical user interface that is used to perform the features of method 4200 that involve presenting information and/or presenting a request for information. In examples where method 4200 is performed using multiple devices, information relating to the actions of the method may be shared between devices.

At 4202, the method includes presenting one or more account introduction pages via a graphical user interface. It is to be understood that different pages may be shown prior to account creation, which may be navigated via user input to the graphical user interface (e.g., via swiping through different pages, each page of which may provide helpful information for a new user of the loyalty platform and/or other information). For example, the page may include both "log in" and "sign up" options that may be selected by a user.

At 4204, the method includes determining whether a request to sign up for a new account (e.g., a new loyalty platform account) is received. If the request is not received (e.g., "NO" at 4204), the method includes waiting for a sign up request, as indicated at 4206, and returns to check for the request at 4204. If the request to sign up for the loyalty platform is received (e.g., "YES" at 4204), the method includes requesting account credential information at 4208. The request may come from any number of sources, including partner brands, banks, the loyalty platform or other businesses. For example, via one or more different pages of a graphical user interface, the request for account credential information may include requests for an email address, a password, a confirmation of an entered email address, and/or other credentials to be used for subsequent logins to the loyalty platform.

Returning to FIG. 64A, at 4210, the method includes requesting contact information. For example, via one or more different pages of a graphical user interface, the request for contact information may include a request for a phone number (e.g., of a mobile phone) including a country code. Optionally, the method may include requesting notification settings at 4212, including a request to enable notifications or to skip notifications. If notifications are enabled, an operating system-specific pop-up or other confirmation screen may be displayed to confirm the selected notifications settings. In some examples, parameters of notifications may be set via a graphical user interface, such as a type of allowed notification (e.g., visual alert, audible alert, vibrating alert, etc.), a location of allowed notification, and types of alerts to provide via the notifications.

Method 4200 continues in FIG. 64B with actions that are performed after a successful loyalty platform account creation. At 4214, the method includes presenting a linked account introduction page. For example, the linked account introduction page may request a user to link a financial account (e.g., a debit card, a credit card, a checking account, etc.) with the loyalty platform. Purchases made via the linked account or with the linked payment card may be used to determine rewards associated with one or more associated rewards programs governed by the loyalty platform. Although a single linked account process is shown, it is to be understood that a user may link multiple accounts and/or cards to the loyalty platform and earn rewards based on purchases made via any of the linked accounts.

Returning to FIG. 64B, the method includes presenting, via a graphical user interface, options for selection of a bank for the linked account or selection of a payment card, as indicated at 4216. In one example, the options may include multiple selectable bank identifiers and/or an option to enter a bank that is not listed. In another example, 4216 may also include displaying an option to directly enter payment card information, thereby bypassing the bank selection process.

At 4217 the method includes determining if the user selected to link a bank account. In one example, the loyalty platform may determine that a user has selected to link a bank account by receiving data from a user device indicating selection of one or more banks. In another example, the loyalty platform may determine that a user has not selected to link a bank account with the loyalty platform in response to receiving data indicating input of payment card data. If at 4217 it is determined that the user has not selected a bank account to link with the user loyalty platform, the method may proceed to determine if the user has instead selected to enter card information directly, as indicated at 4218. If at 4218 it is determined that the user has not selected to enter card information the method may proceed to cancel the sign up process, as at 4234. For example, if a user has not selected a bank account or a payment card to link with the loyalty platform for a pre-determined duration of time, method 4200 may proceed to 4234 where the sign up process may be cancelled.

However, if at 4218, it is determined that the user has selected to enter payment card information directly, method 4200 may proceed to step 4221. At step 4221, the loyalty platform may receive payment card information. In one example, payment card information may comprise payment card data transmitted to the loyalty platform via a user device, such a cell phone, desktop computer, etc. The payment card information may comprise primary account number (PAN), which in one example may comprise a 16-digit card number uniquely identifying a payment card. In another example, the payment card information may comprise a card ID number, cryptographic signature, etc. In another example, a user may link a credit/debit card number directly from the card, which may include inputting a 16-digit PAN. Following receipt of the payment card information, method 4200 may proceed directly to step 4224, where a confirmation page is displayed to the user, bypassing steps 4219, 4220, and 4222. In some examples, linking a payment card with the loyalty platform may enable the loyalty platform to receive transaction details for transactions conducted with the payment card. In some examples, the loyalty platform may receive a transaction/purchase/spend history associated with the payment card following linkage of the payment card with the loyalty platform.

Returning to 4217, if at 4217 the loyalty platform determines that the user has selected to link a bank account with the loyalty platform, method 4200 may proceed to step 4219.

At 4219, the method includes receiving input selecting a bank for an account to be linked to the loyalty platform. At 4220, the method includes requesting login information (e.g., username/personal identifier, password/PIN, security questions/answers, etc.) for the selected bank.

Once logged into an account to be linked to the loyalty platform account, the method includes requesting a selection of a targeted account associated with the login information, as indicated at 4222 of FIG. 64B. For example, a user may have a single set of login credentials that is used for a debit card account, a credit card account, a checking account, and/or a savings account at a selected bank. The user may select which account(s) is to be linked to the loyalty platform account via a graphical user interface. Upon selection of one or more linked accounts, a confirmation page may be presented, as indicated at 4224 of FIG. 64B. The confirmation page may also serve as a brokerage account introduction page.

As indicated at 4226 of FIG. 64B, method 4200 further includes retrieving a transaction history for the targeted account(s). For example, responsive to selecting and/or confirming selection of one or more accounts to be linked to the loyalty platform account, the user device and/or a server device may request and receive information regarding recent (e.g., within a threshold amount of time, such as the prior three months) transactions for the selected one or more accounts (e.g., directly from a financial institution associated with the selected one or more accounts and/or from a third party transaction aggregator). The information may include, for each transaction made with the selected one or more accounts, a description of the transaction (e.g., as generated by a point-of-sale system at the time of the transaction), a geolocation of the transaction, an amount spent, and/or previous spending behavior of the user (e.g., associated with the transaction and/or associated with the business at which the transaction occurred). In some examples, the transaction history may identify a business at which the transaction is conducted. In other examples, the business (or an estimate of the business) at which the transaction is conducted may be derived using other information regarding the transaction (e.g., as described below with respect to FIG. 67).

After retrieving the historical transaction, the method may proceed to setting up a brokerage account. At 4228, the method includes requesting user identifying information, such as a legal name (e.g., first name and last name), date of birth, an optional trusted contact, an address (e.g., a street address, optionally using a mapping application programming interface in the graphical user interface), a social security number, a citizenship (e.g., by showing a list of selectable countries), an employment status (e.g., by showing a list of selectable employment statuses), brokerage information (e.g., whether the user is an employee of the brokered account, whether the user is subject to backup withholdings by the Internal Revenue Service, whether the user is a 10% shareholder at a publicly traded company, etc.), and/or other user information (e.g., user behaviors, preferences, etc., which may be entered or derived from evaluating other information sources such as social media activity for the user). The method further includes capturing at least a subset of the user identifying information as demographic information for the user, as indicated at 4230.

Returning to FIG. 64B, the method includes determining if a user agreement to complete the loyalty platform signup is received, as indicated at 4232. If a user agreement to complete the sign up is not received (e.g., if a user does not accept agreements laid out in an agreement page of the user interface, "NO" at 4232), the method includes cancelling the sign up process at 4234 and returning. In some examples, all entered information may be deleted as part of the cancellation at 4234. In other examples, entered information may be saved for a threshold period of time after cancellation at 4234 to enable a user to quickly resume signing up (e.g., in the case of an accidental cancellation). If a user agreement to complete the sign up is received (e.g., if the user accepts agreements laid out in an agreement page of the user interface, "YES" at 4232), the method includes presenting an account completion page, as indicated at 4236.

Figure 69:
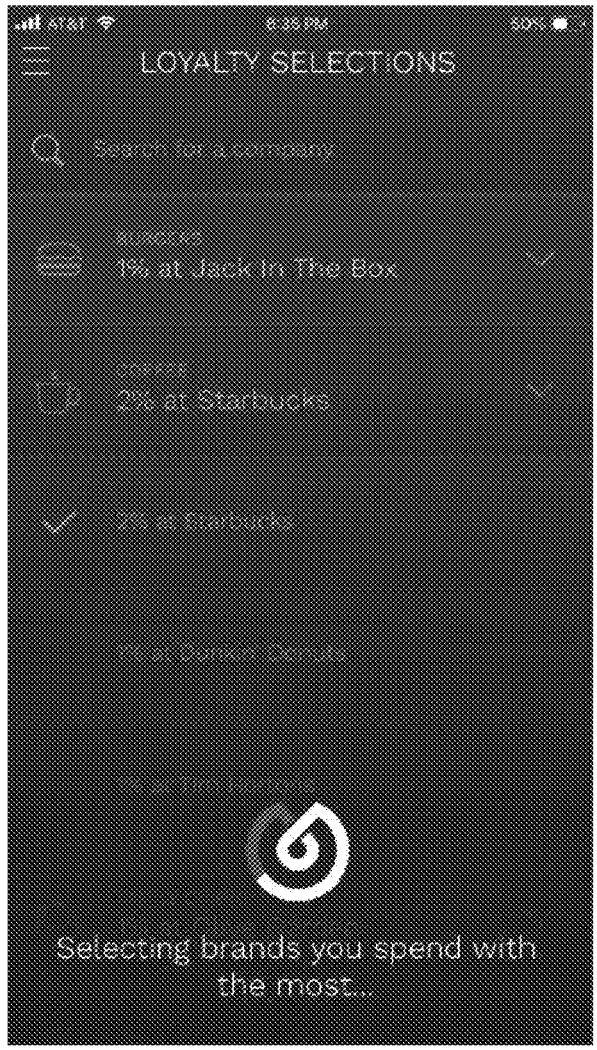
FIGS. 69-71 show example graphical user interfaces associated with generating an auto-select list of loyalty rewards programs and associated businesses.
Figure 70:
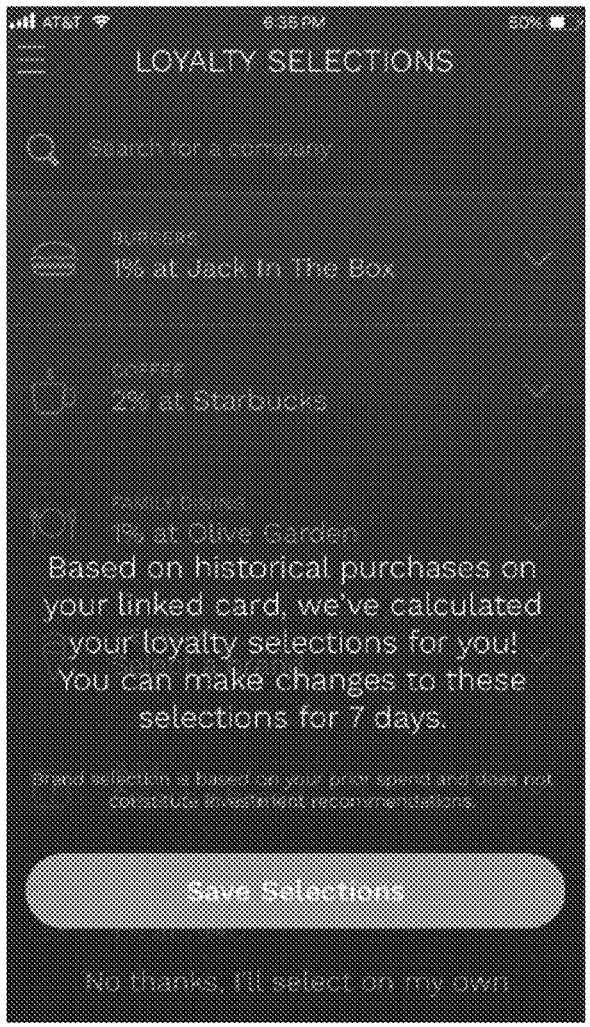
Figure 71:
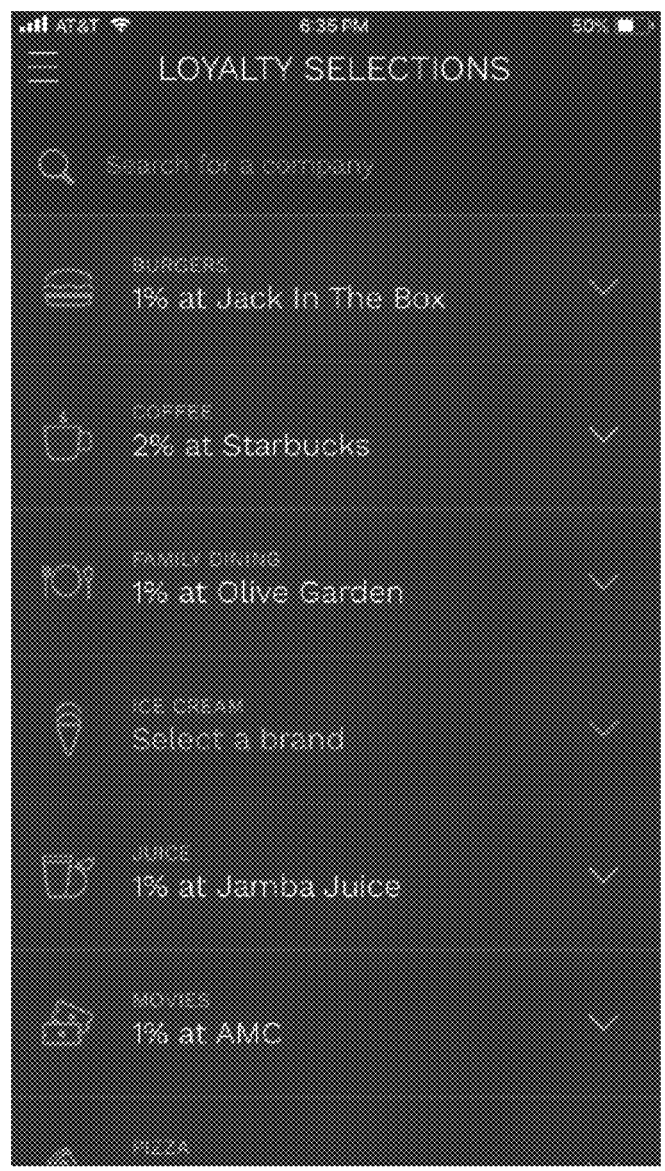

Returning to FIG. 64B, the method includes performing an auto-selection of businesses for loyalty rewards enrollment, as indicated at 4238. The auto-selection of businesses may be performed by evaluating the recent transaction history retrieved at 4226, the demographic information captured at 4230, and/or other information (e.g., correlating businesses that match a behavior set of the user based on a profile of the businesses) and determining (e.g., based on the transaction history, demographic information, and/or other information) one or more businesses having loyalty rewards programs in which the user may be interested in enrolling. Graphical user interface 4700 of FIG. 69 shows an example pending page that may be displayed while the auto-selection of businesses is performed. Graphical user interface 4800 of FIG. 70 shows an example selection confirmation page that may be shown to allow a user to save or alter the selections loyalty enrollments. Graphical user interface 4900 of FIG. 71 shows an example list of loyalty selections made for the user (e.g., via the auto-selection of businesses at performed at 4238 of method 4200 of FIG. 2B).

Figure 65:
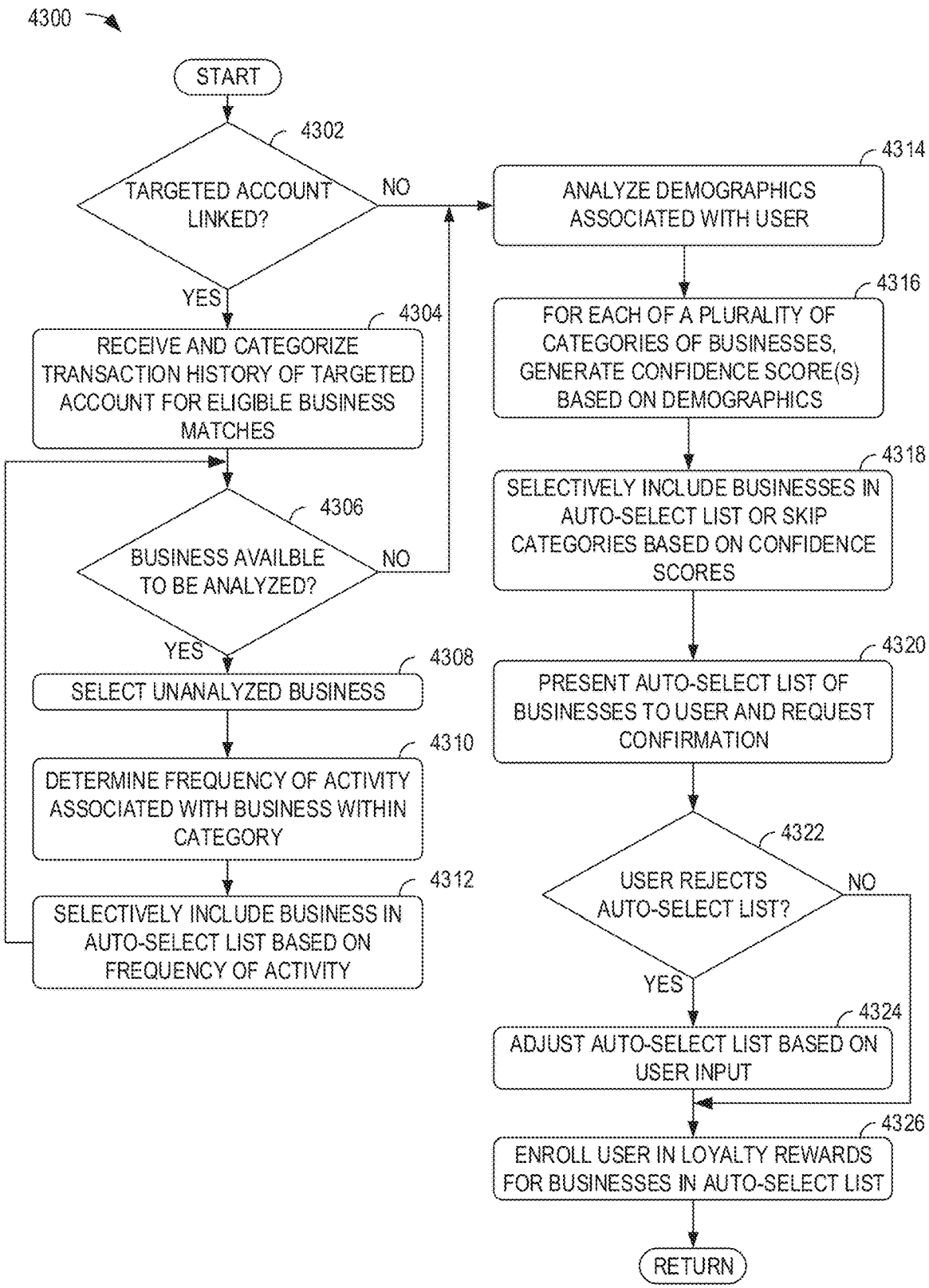
FIG. 65 shows a flowchart for an example method of generating an auto-select list of businesses having loyalty rewards programs in which a user is to be enrolled.

FIG. 65 shows a flow chart of an example method 4300 for automatically selecting businesses and/or associated loyalty rewards programs into which a user may be enrolled. For example, method 4300 may be performed to provide the auto-selection at 4238 of method 4200 of FIG. 64B. Method 4300 may be performed by executing instructions at a user device and/or a server device, each of which may include one or more of the components of computing system 3180 of FIG. 34B as described above. For example, the user device may include a display for presenting a graphical user interface that is used to perform the features of method 4300 that involve presenting information and/or presenting a request for information. In examples where method 4300 is performed using multiple devices, information relating to the actions of the method may be shared between devices.

At 4302, the method includes determining if a targeted account (e.g., a credit card account, a debit card account, a checking account, etc.) is linked to a loyalty platform. For example, the determination at 4302 may include determining if the linking process at 4214-4224 of FIG. 64B (or if the confirmation at 4224 of FIG. 64B) was performed to link one or more financial accounts to the loyalty platform account of a user. If a targeted account is linked (e.g., "YES" at 4302), the method includes receiving and categorizing a transaction history of the targeted account for eligible business matches, as indicated at 4304. At 4306, the method includes determining if there is a business available to be analyzed (e.g. a business identified in the transaction history). If at least one business is available to be analyzed (e.g., "YES" at 4306), the method includes selecting an unanalyzed business, as indicated at 4308. At 4310, the method includes determining a frequency of activity associated with the selected business within a category. For example, if the transaction history indicates that a transaction was made at a particular fast food restaurant, the method may include determining how many times a transaction was made at that particular fast food restaurant relative to other fast food restaurants (e.g., whether the user visited that particular fast food restaurant more frequently than any other fast food restaurant).

At 4312, the method includes selectively including the selected business in an auto-select list based at least on the frequency of activity. Using the non-limiting example above, if it is determined at 4310 that the user performed more transactions at the particular fast food restaurant (or a higher value of transactions) relative to all other businesses in that category (e.g., all other fast food restaurants) and/or relative to an associated transaction threshold, then the particular fast food restaurant may be selected to be included in the auto-select list. Otherwise, if it is determined at 4310 that the user performed fewer transactions (or a lower value of transactions) relative to another restaurant in the same category and/or relative to the associated transaction threshold, the particular fast food restaurant may not be selected to be included in the auto-select list. Responsive to determining if the selected business is to be included in the auto-select list, the method returns to 4306 to determine if any further businesses are available to be analyzed. In this way, the method may cycle through each business indicated in the transaction history to determine whether the indicated businesses are to be included in the auto-select list. In some examples, the analysis may be performed per category of businesses, such that businesses in each category may analyzed relative to one another. In some examples, the category of businesses may be related to a market of the business (e.g., fast food, gas stations, grocery stores, etc.).

Once all businesses indicated in the transaction history have been analyzed (e.g., "NO" at 4306) and/or if a targeted account is not linked (e.g., "NO" at 4302), the method proceeds to 4314 to analyze demographics information associated with the user. For example, the demographics captured at 4230 of method 4200 of FIG. 64B may be analyzed at 4314. At 4316, the method includes, for each of a plurality of categories of businesses, generating confidence scores based on the demographics information. For example, for each of a plurality of categories of businesses, a confidence score may be generated indicating a likelihood that a user will be interested in a selected business of the category. The confidence score may be based on interests of other users having demographic similarities to the user. For example, a business may be provided with a confidence score that is a function of a popularity of that business with users having a similar age or availability as the user, where the popularity may be based on factors such as transaction histories of the other users. At 4318, the method includes selectively including businesses in the auto-select list or skipping categories based on confidence scores. For example, businesses having a confidence score above a threshold and the highest in an associated category may be included in the auto-select list. If not businesses in a given category have a confidence score above the threshold, the given category may be skipped (e.g., no business from that category may be added to the auto-select list).

At 4320, the method includes presenting, via a graphical user interface, the auto-select equity rewards list of businesses (e.g., including the businesses selectively added at 4312 and/or at 4320, where businesses selectively added at 4312 form a first set of one or more businesses and businesses selectively added at 4320 form a second set of one or more businesses) to the user and requesting confirmation. At 4322, the method includes determining if the user rejects the auto-select list. If the user rejects the auto-select list (e.g., the user requests to manually enter businesses and/or otherwise modify the auto-select list, "YES" at 4322), the method includes adjusting the auto-select list based on user input, as indicated at 4324. For example, the user may remove one or more selected businesses, add one or more selected businesses, and/or change one or more selected businesses within the auto-select list to generate an updated auto-select list. At 4326, the method includes enrolling the user in loyalty rewards for businesses in the auto-select list. For example, if the user does not reject the list (e.g., the user accepts the list, "NO" at 4322), the auto-select list presented at 4320 may indicate all of the businesses associated with the loyalty rewards programs in which the user is enrolled at 4326. If the user adjusts the auto-select list at 4324, the user may be enrolled in loyalty rewards programs associated with the businesses in the updated auto-select list generated at 4324. It is to be understood that the user may adjust the auto-select list at 4324 to not include any businesses, which results in the user being enrolled in no loyalty rewards programs at 4326.

As described above, it is to be understood that additional or alternative information may be used to determine businesses to be included in the auto-select equity rewards list. For example, the loyalty rewards platform may determine a common behavior set including one or more of a purchase behavior of a user, demographic information of the user, and/or other information of the user. In another example, the loyalty rewards platform may understand that the linked card or account is shared with another person (e.g. husband and wife with a joint card) and propose selections that match or do not match tor each account holder. In this example, there may be a rewards maximizing algorithm utilized such that each joint card holder can maximize the rewarded amount(s). The loyalty rewards platform may further determine and display a correlation result including a group of businesses, each business in the group of businesses being selected based on a match of a respective profile of the business to the common behavior set. One or more of the businesses in the group may be included in the auto-select equity rewards list. The correlation result may take into account user behaviors that may suggest features of businesses at which the user may prefer to conduct transactions using information regarding the businesses (e.g., a behavior and/or demographics of other users that have performed transactions at the business, a location(s) of the business, a size of the business, a market share of the business, a mission statement associated with the business, types and/or numbers of products and/or services sold by the business, etc.). As a more detailed, non-limiting example, a behavior set of a user (e.g., determined based upon user input and/or data gathered from third-party sources such as social media accounts for the user) may indicate that the user prefers avoiding crowds and does not travel far from home; accordingly, a correlation result may include businesses that are close to the user and are below a threshold size. Similar features may also be used to attribute a selected transaction to a particular business.

Figure 66:
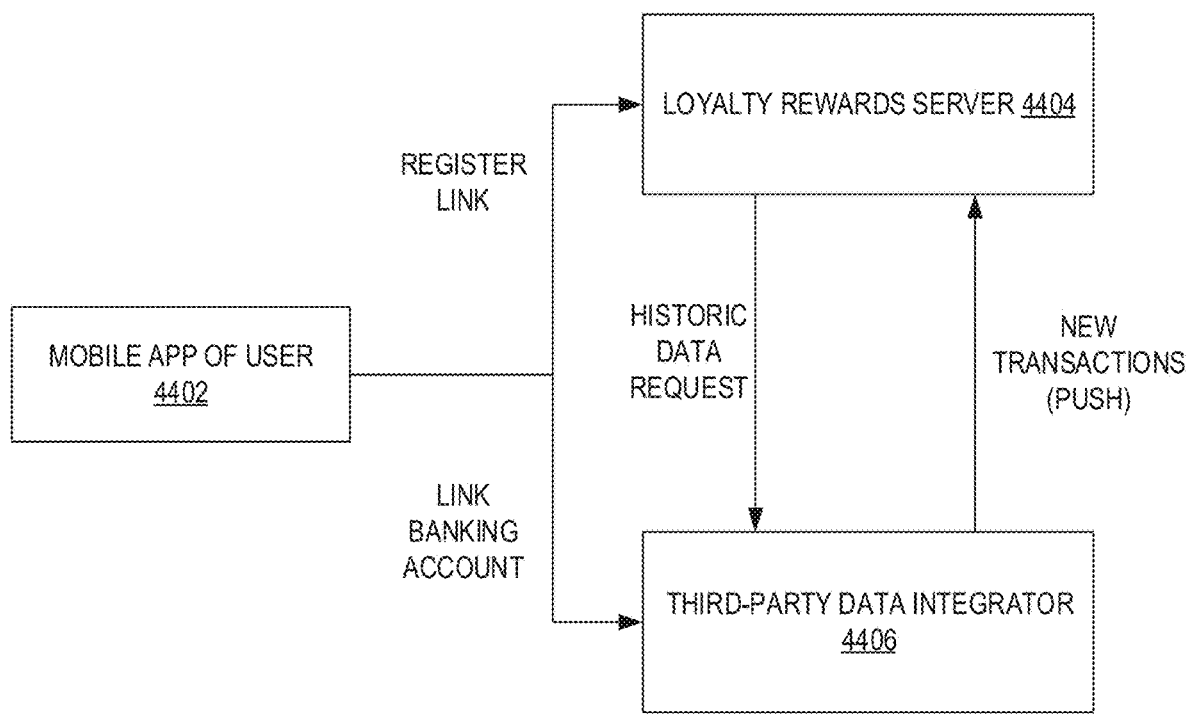
FIG. 66 schematically shows example communications between systems involved in loyalty rewards program enrollment.

FIG. 66 schematically shows example communications between entities of a loyalty rewards system 4400. The loyalty rewards system 4400 may include a mobile application 4402, which comprises a website or web app, of a user (e.g., executed on a mobile device of the user), a loyalty rewards server 4404, and a third-party data integrator 4406. As an example, the mobile application 4402 may be executed on one of user computing systems 3102, 3116, or 3118 of FIG. 34A, the loyalty rewards server 4404 may include one or more computing systems that implement (e.g., execute instructions for providing) the loyalty platform 3108 of FIG. 34A, and one or both of the mobile application 4402 and the loyalty rewards server 4404 may be used to perform the methods 4200 and 4300 of FIGS. 64A, 64B, and 65. The third-party data integrator 4406 may be executed by a computing system that is remote from the loyalty rewards server 4404 and the user device executing the mobile application 4402, and may correspond to the third-part data integrator/aggregator described above.

During set up of a new loyalty rewards platform account and/or when a user adds a new financial account to an existing loyalty rewards platform account, the user may enter details of the financial account (e.g., a credit card account, debit card account, banking account, etc.) via a user interface of the mobile application 4402. A registration of the linking of the financial account to the loyalty rewards platform account may be sent to both the loyalty rewards server 4404 and the third-party data integrator 4406. The third party integrator may be a vendor that allows a consumer to link their financial account, a merchant acquirer (e.g., a bank), a payment processor (e.g. Fisery or FIS), a payment card network (e.g. Visa or Mastercard) or an issuing bank (typically the consumer's bank). For example, the registration may include authentication information to show that the user has authorized the loyalty rewards server 4404 and the third-party data integrator to access and exchange information regarding the linked financial account.

The loyalty rewards server 4404 may send a historic data request to the third-party data integrator 4406 in order to retrieve a transaction history associated with the linked financial account. For example, the historic data request may correspond to the retrieval of transaction history at 4226 of method 4200 of FIG. 64B. In some examples, the historic data request may include a time frame of transactions requested (e.g., a last three months of transactions or a last [x] number of transactions, where x is a positive integer). The third-party data integrator 4406 may send the transaction history to the loyalty rewards server 4404 responsive to the historic data request. Additionally, the third-party data integrator 4406 may continuously send new transactions (e.g., as push data transmissions) for the linked financial account as the transactions are performed. In some examples, the third-party data integrator 4406 may send information regarding the new transactions as soon as the transactions are received by the third-party data integrator. In other examples, the third-party data integrator 4406 may send information regarding the new transactions as soon as the new transactions are considered to be cleared (e.g., where no further changes are to be made to the transaction) by both parties involved in the transaction (e.g., the financial account that provided the payment and the business that received the payment).

Figure 67:
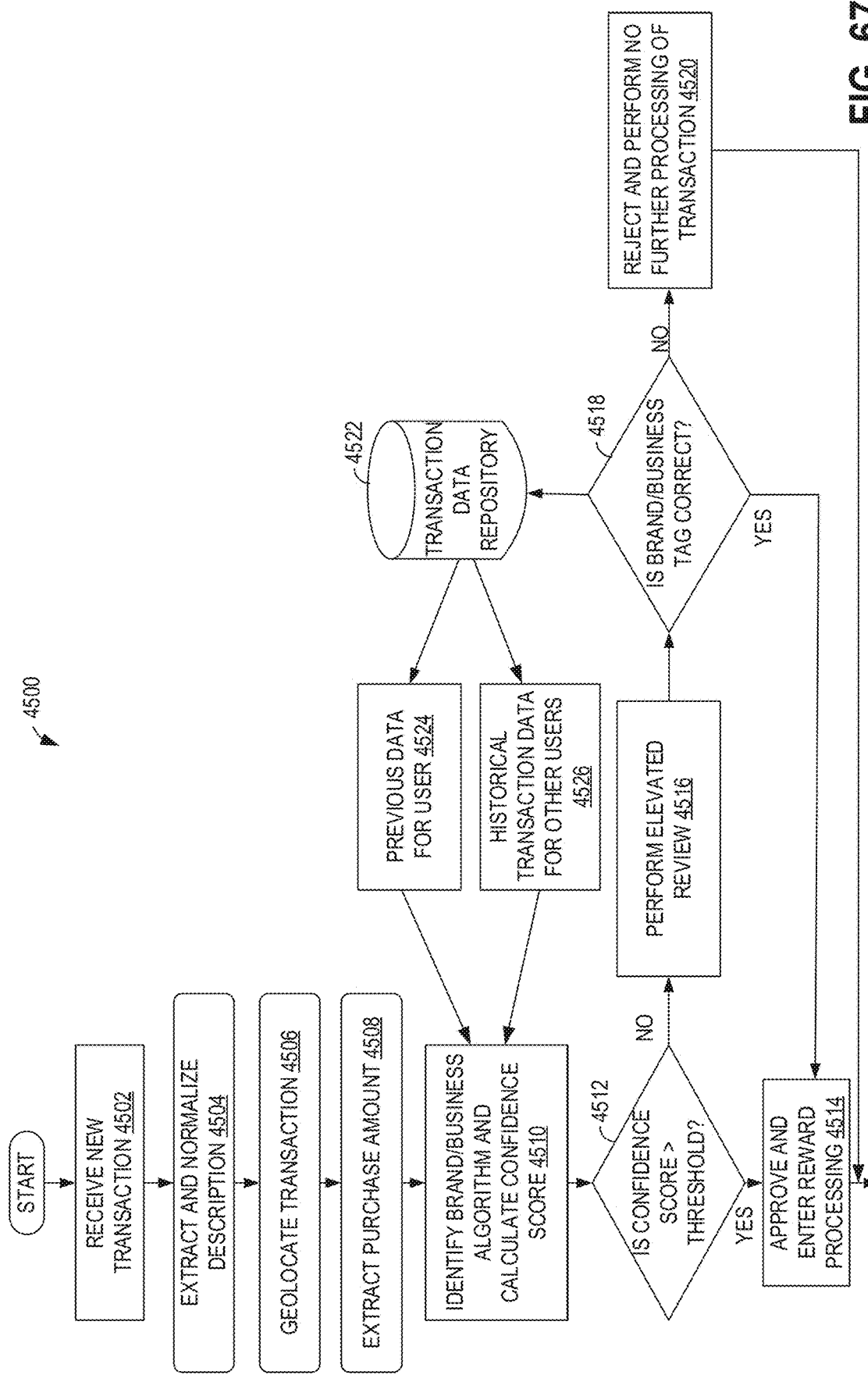
FIG. 67 shows an example diagram of a transaction tagging method.

FIG. 67 shows an example diagram of a transaction tagging method 4500 that may be performed to identify a business, merchant, and/or brand associated with a transaction. In some examples, method 4500 may be performed by a loyalty rewards platform, such as loyalty platform 3108 and/or loyalty rewards server 4404 implementing a loyalty rewards platform. In some examples, at least some portions of method 4500 may be performed by a transaction model stored on and implemented by the loyalty platform, which may be a suitable artificial intelligence or machine learning model. At 4502, the method includes receiving a new transaction. For example, as described above with respect to FIG. 66, a loyalty rewards server may receive a new transaction from a third-party data integrator/aggregator for a financial account linked to a loyalty rewards platform account. As each new transaction arrives at the loyalty rewards platform, the transaction may be automatically enriched and annotated by method 4500.

The method may further include determining information regarding the transaction based on the data received (e.g., from the third-party integrator/aggregator). At 4504, the method includes extracting and normalizing a description of the transaction. For example, during the transaction, information from the business receiving the payment may be associated with the transaction in order to identify the transaction. The information from the business is typically viewable by the user via account statements for the financial account, and such information may be provided to the loyalty rewards platform to assist with identifying features of the transaction. As some businesses may provide standard information formatting (e.g., a business identifier followed by a code representing a nature of the transaction, an identifier of a point of sale for the transaction, etc.), normalization may include parsing the transaction description based on known formatting styles and/or recognized portions of the description. At 4506, the method includes geolocating the transaction, and at 4508, the method includes extracting a purchase amount for the transaction. In this way, the loyalty rewards platform may associate a physical location and a purchase amount with the transaction. The geolocation of the transaction may be determined using information from one or more sensors of device associated with the user at the time of the transaction (e.g., a GPS sensor, an inertial measurement unit such as a gyroscope and/or accelerometer, a camera, etc.). Data from one or more sensors of devices associated with the user and/or a point of sale system involved in the transaction may be evaluated to determine a most likely location of the transaction. In other examples, the transaction history may include a notation of the geolocation of the transaction.

At 4510, the method includes identifying a business, merchant, and/or brand algorithm for the transaction and calculating a confidence score that the transaction relates to a particular business, merchant, and/or brand based on the identified algorithm. Information that may be used to determine the algorithm/business and confidence score may include the description, geolocation, and purchase amount information determined at 4504, 4506, and 4508, as well as tagging feedback information that will be discussed below. For example, the business may be narrowed down to businesses that are within a threshold distance of the geolocation associated with the transaction, and further narrowed based on a purchase amount (e.g., as discussed above, certain businesses may be associated with typical ranges of transaction amounts; as a detailed example, a $1000 transaction at a fast food restaurant would be unlikely and thus a fast food restaurant may be given a low probability of being associated with the transaction). Information in the description of the transaction may be used by comparing the description to known description formats of businesses and/or by parsing the description to determine if an identifier (e.g., a name, business ID, etc.) associated with a particular business is present. The above information may be used to determine a business that is most likely to correspond to the transaction, as well as a confidence score indicating how likely the business actually corresponds to the transaction. For example, the confidence score may be based on the amount of information used to determine the most likely business and/or the types of information that suggest the business as being the most likely business associated with the transaction. Different types of information may be given different weights for the confidence score—for example, a description that includes a name of a selected business may increase the confidence score (of that business being associated with the transaction) more than a purchase amount that falls within a typical range of transactions for the selected business (e.g., since many businesses may share similar transaction ranges).

At 4512, the method includes determining if the confidence score is above a threshold. For example, the confidence score of the business that has a highest likelihood of being associated with the transaction may be evaluated at 4512. If the confidence score is above the threshold (e.g., "YES" at 4512), the method includes approving and entering reward processing for the transaction, as indicated at 4514. For example, if the confidence score is above the threshold, rewards may be issued to the user for the business identified at 4510 and based on the purchase amount extracted at 4508.

If the confidence score is not above the threshold (e.g., "NO" at 4512), the method includes performing an elevated review of the transaction at 4516. For example, the information received at 4504, 4506, and 4508, as well as the identified business algorithm and confidence score calculated at 4510, may be provided to an enhanced processing component, such as a machine learning and/or deep learning algorithm executed by a processor and/or distributed processing system associated with the loyalty rewards platform. The elevated review may include analyzing the transaction using additional data and/or performing an audit on the transaction evaluation performed at 4510. For example, the elevated review may include issuing a request for additional transaction information from one or more parties involved in the transaction, including the user associated with the linked financial account (e.g., a request for the user to confirm a business at which the transaction occurred), the financial account manager (e.g., the bank or other financial entity that manages the funds available to the linked financial account), and/or the third-party data integrator/aggregator. In additional or alternative examples, the elevated review may include a manual review of the transaction by a human operator. For example, the information received at 4504, 4506, and 4508, as well as the identified business algorithm and confidence score calculated at 4510, may be provided to the human operator for review.

At 4518, the method includes determining if the business identified at 4510 is correct (e.g., the transaction may be tagged at 4510 with an identifier for the business determined by the loyalty platform to be most likely to be associated with the transaction). If the business is determined to be correct by the manual review (e.g., "YES" at 4518), the method includes approving and entering reward processing, as indicated at 4514 and described above. If the business is determined not to be correct (e.g., "NO" at 4518), the method includes rejecting the association of the transaction with the business and performing no further processing of the transaction, as indicated at 4520. For example, the transaction may not be processed for issuing rewards to the user. The outcome of the determination as to whether the business is correct (e.g., the outcome of 4518, whether "YES" or "NO") is provided to a transaction data repository 4522. The transaction data repository 4522 may be local to the loyalty platform and/or in communication with one or more computing systems associated with the loyalty platform. The transaction data repository 4522 may store and provide to the loyalty platform previous data for a selected user, as indicated at 4524, and historical transaction data for other users, as indicated at 4526, each of which may be used in the business identification and confidence score calculation at 4510. In this way, the system creates a feedback loop that learns from manual operator inputs so that weights may be adjusted to more accurately tag future transactions. In some example, a random percentage of transactions may be reviewed by operators (e.g., even if an associated confidence score is above the threshold) in order to keep the algorithm current.

Figure 68:
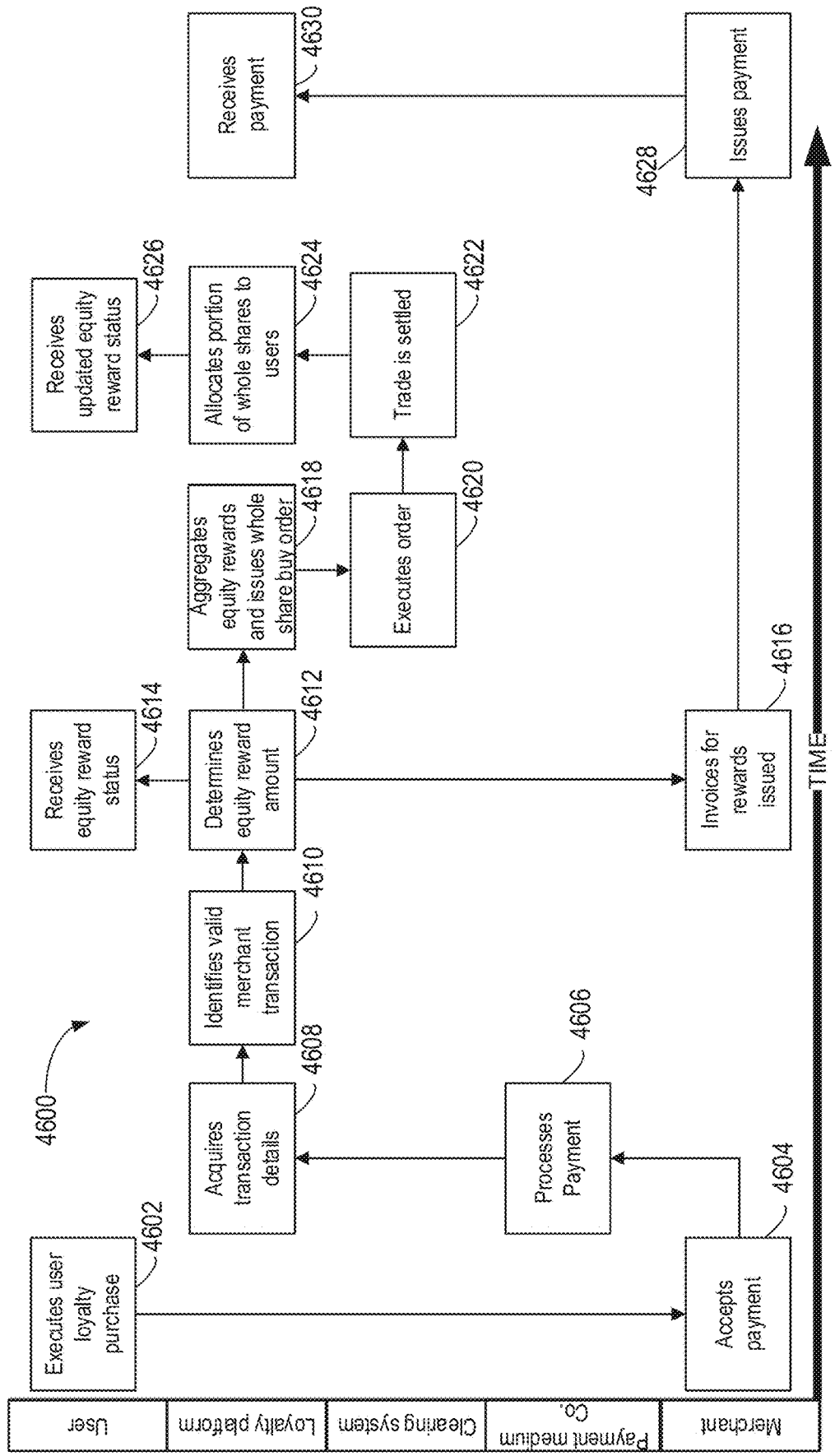
FIG. 68 shows an example timeline for distributing fractional equity rewards to users of a loyalty platform.

Turning now to FIG. 68 an example method 4600 for distributing fractional shares of stock to users of a loyalty platform based on tracked user loyalty purchases is shown. For example, method 4600 may be executed in order to distribute rewards to users that have enrolled in associated loyalty rewards programs using method 4200, 4300, and/or 4500 described above with respect to FIGS. 64A, 64B, 65, and 67. On the left side of FIG. 68, a column is displayed which indicates what agent/system performs a given step of the method. A step, indicated by a box in the flowchart, horizontally aligned (such as within a same row of a matrix) with an agent/system in the left hand column may be considered to be performed by that agent/system for purposes of example method 4600. As a specific example, step 4628 of method 4600 is horizontally aligned with "Merchant", which indicates that step 4628 is conducted by a business registered with the loyalty platform, which may herein also be referred to as a merchant. Running along the bottom of FIG. 68, is an arrow labeled "TIME", this arrow indicates the chronology of the steps of method 4600, with steps to the right occurring later, steps to the left occurring earlier, and steps vertically aligned occurring substantially concurrently, or within a threshold duration of time of one another. For example, steps aligned vertically may occur within the same 24 hour duration of time.

Method 4600 begins at 4602, wherein a user executes a user loyalty purchase using a linked payment medium. The linked payment medium may comprise a credit card, debit card, other payment card, cellphone based payment app, NFC based payment system, or other types of electronic payment systems which may provide a digital record of a transaction.

Step 4604 of method 4600 includes the payment being accepted by the merchant. The merchant in this example comprises a business registered with the loyalty platform, and to whom the user (as indicated by the "user" in the left hand column of FIG. 68), has made a loyalty selection (wherein the loyalty selection may be stored in a user account associated with the user on non-transitory memory of one or more computing systems implementing a loyalty platform). Once the user's payment is accepted by the merchant, method 4600 may proceed to step 4606.

At step 4606, method 4600 may include the payment medium company processing the payment made during the user loyalty purchase. For example, in the case that the linked payment medium comprises a credit card, step 4606 may comprise the credit card company processing the new charge made by the account (the account in this example referring to a user account within the credit card company) to which the user loyalty purchase was charged, and from which funds were obtained to complete the purchase. Processing of the payment may include recording one or more details associated with the user loyalty purchase, such as a date, time, and physical location of the purchase. Once the payment has been processed by the payment medium company, method 4600 may proceed to step 4608.

At step 4608, method 4600 includes the loyalty platform receiving transaction details associated with the user loyalty purchase. In one example, a third party data aggregator may compile and transmit purchase details from a plurality of different payment medium companies, such as various banks, credit card companies, etc. In another example, the payment medium company may provide purchase details directly to the loyalty platform.

At step 4610, method 4600 includes identifying if a valid user loyalty purchase occurred based on the tracked purchase details. In one example, purchase details may be correlated with a database associated with the loyalty platform, such as rewarding-business index 3186, to ascertain if the business at which the purchase occurred is registered with the loyalty platform, and currently offering fractional equity rewards to users. Further, step 4610 may include looking up a user's loyalty selections, such as by identifying which user account is associated with a tracked purchase (which may be accomplished by determining which account registered a payment medium used to conduct the transaction) and then determining if the user has an active loyalty selection to the business with which the purchase was executed. If at 4610 it is determined that a valid user loyalty purchase occurred, method 4600 may proceed to step 4612.

At step 4612, method 4600 includes determining/calculating a fractional share amount (a fractional equity reward) to reward the user based on the tracked user loyalty purchase. The determination may be based on a duration of user loyalty selection to the business, a transaction history of the user, a dollar amount (monetary value) of the purchase, and reward policies of the business, stored within the loyalty platform. Once a fractional share amount to reward the user has been determined, method 4600 may proceed to step 4614.

At step 4614, method 4600 includes displaying an equity reward status to the user. In one example the equity reward status may include an indication of fractional share amount to which the user is now entitled based on the recently conducted user loyalty purchase, the equity reward status may further include an indication of a timing of distribution of the fractional share amount. Method 4600 may then proceed to step 4616.

At step 4616, method 4600 includes invoicing the merchant for the dollar amount of the fractional equity reward, the invoice may further include one or more charges, such as a service fee for the loyalty platform. Method 4600 may then proceed to step 4628, which includes the merchant issuing a payment to the loyalty platform based on the invoice. At step 4630, the loyalty platform may receive the payment from the merchant, and may allocate the received funds. In one example, a portion of the funds may be allocated to a merchant deposit account to provide future rewards of the merchant with fractional equity rewards based on user loyalty purchases.

Returning to step 4612, method 4600 may also proceed to 4618, which includes the loyalty platform aggregating fractional equity rewards and issuing a whole share buy order with a clearing system based on the aggregated rewards. Fractional equity rewards aggregated together may comprise shares of stock in a given business, so that pending fractional equity rewards of stock X are aggregated together into a first aggregate amount, while pending fractional equity rewards of stock Y are aggregated together into a second aggregate amount, but the first and second amounts may not be aggregated together, and no aggregate amount of a mixed stocks may occur. The amount of the whole share buy order may be determined as discussed in more detail above. As one example, the whole share buy order may comprise a number of whole shares within one share of the amount of aggregated fractional equity rewards. As a specific example, based on pending fractional equity reward amount of 2.35 shares of stock X, a whole share buy order of 3.0 shares of stock X may be placed. The 3.0 shares is the rounded-up amount of the aggregated pending fractional equity rewards. Method 4600 may then proceed to step 4620

At step 4620, method 4600 includes a clearing system executing the whole share buy order placed in step 4618. Method 4600 may then proceed to 4622. At step 4622, method 4600 includes the whole share buy order being filled. Method 4600 may then proceed to step 4624.

At step 4624, method 4600 includes the loyalty platform receiving from the clearing system the purchased amount of whole shares. The purchased amount of whole shares my deposited within an average price account of the loyalty platform, and may subsequently be allocated to a plurality of users to satisfy pending fractional equity rewards of the plurality of users. This may include first transferring a portion, equal to the aggregated pending fractional equity rewards, from the average price account to a merchant facilitation account, before apportioning the portion in the merchant facilitation account amongst the plurality of users. A fractional remainder of shares leftover after satisfying the pending fractional equity rewards may be purchased by, and stored within, an inventory account of the loyalty platform. Method 4600 may then proceed to step 4626.

At step 4626, method 4600 includes displaying an updated equity reward status to a user via a display of a user computing device. The updated equity reward status may indicate that an amount of fractional equity has been transferred to an account associated with the user. The updated equity reward status may further include updated totals for equity held within the account of the user on the loyalty platform. Method 4600 may then end.

A technical effect of the disclosed systems and methods is an increase in efficiency and reduction of user input involved in enrolling a user in one or more loyalty rewards programs for one or more businesses by intelligently selecting relevant rewards programs and/or businesses based on information such as recent transaction history and demographic information for the user. For example, the disclosed systems and methods may economically utilize information that is already being input by the user to sign up for a loyalty platform in order to generate a list of particular loyalty rewards programs and/or associated businesses in which to enroll the user.

As an example initial setup, a loyalty platform user may create an institution link from within a loyalty platform application. The link may be stored within the loyalty platform's servers and associated with the appropriate user. The loyalty platform may (asynchronously) fetch recent and historical transactions for the aforementioned link. The loyalty platform may register with a third-party transaction aggregator to receive new transactions (e.g., associated with the institution link).

For each new transaction that is provided to the loyalty platform, the following may be performed. Based on data provided by the third-party transaction aggregator, the loyalty platform may determine the possible businesses, merchants, and/or brands to which a transaction correlates. The data may include a description of the transaction (e.g., as generated by a point-of-sale system), a geolocation of the transaction, an amount spent in the transaction (e.g., a $1000 purchase at a fast food restaurant is atypical), previous spending behavior of the user, and/or other information. A confidence score may be calculated for the transaction for businesses, merchants, and/or brands to which the transaction might be related. If the confidence score for a given business, merchant, and/or brand is high enough to not warrant elevated intervention (e.g., higher than a threshold, such as a 70% likelihood that the transaction is related to the given business, merchant, and/or brand), then the transaction is associated with that business, merchant, and/or brand. If the confidence score is below the threshold (e.g., if no business, merchant, and/or brand is given a confidence score above the threshold for that transaction) such that the system cannot accurately guarantee with which business, merchant, and/or brand the transaction is associated, elevated intervention may occur in which (in one example):

a. An operations person and/or elevated machine learning/ deep learning algorithm executed within the loyalty platform manually reviews the transaction and the current confidence scores for the transaction.

b. A determination is made as to what the true business, merchant, and/or brand is to be associated with the transaction.

c. Weights are adjusted internally within the loyalty platform so that future transaction analysis is improved automatically.

Once a transaction has been associated with one (and only one) business, merchant, and/or brand, then that information may be communicated to the end user. If the user is eligible and has opted in to receiving rewards for the associated business, merchant, and/or brand, and the transaction is in a "settled" state (indicating that the transaction will not change in the future), then a reward is allocated for transfer to the user's clearing account. In this way, the above methods and systems may also be used to categorize and attribute transactions continuously (e.g., after a user has completed loyalty platform/program signup and enrollment).

Another embodiment is shown and described below with respect to FIGS. 72A-77C. A further issue with rewards programs arises when a user changes a loyalty to and/or from different businesses. For example, when switching loyalties from a rewards program of a first business to a rewards program of a second business, the user may attempt to sell equity (e.g., fractional and/or full stocks, fractional and/or full shares, etc.) in the first business and purchase equity in the second business in order to align equity holdings to the updated loyalties. However, the above-described switching may be time intensive and involve a large amount of tedious user input, which becomes more laborious with each increase in the number of business loyalties that are changed. A further complication of aligning a user's equity holdings with the user's current loyalties is that an amount of stock accumulated in businesses to which the user was previously loyal may comprise a fractional number of shares of stock, and further, the amount of shares of stock to be purchased in the business to which the user is currently loyal may comprise a fractional number of shares, therefore in order for the user to update held equity to reflect current loyalties the user may need to sell a fractional number of shares of stock, and/or buy a fractional number of shares of stock. Buying and selling in fractional numbers of shares may result in further cost and/or delay for the user, as conventionally, shares of stock are purchased and sold in integer quantities.

Furthermore, in order to fully redistribute accumulated equity rewards to reflect updated loyalties, the user may calculate the value of the sale of equity from the old businesses (businesses associated with loyalty rewards programs in which the user was previously enrolled), calculate the amount of equity in the new businesses (businesses associated with loyalty rewards programs in which the user is newly enrolled) that can be purchased with the value of the sale of equity from the old businesses, and place a purchase order for the calculated amount of equity in the new businesses. In light of the time delays described above, the user risks not completing the purchase order if the price of equity for the new businesses changes (increases) from when the calculation was made. Further, the user risks having not completely invested available funds if the price of the equity for the new businesses changes (decreases) from when the calculation was made.

The inventors herein have developed systems and methods which may enable redistribution of a user's accumulated equity and monetary rewards based on a triggering event, such as a change in user loyalty. In one example, a user may readjust a portfolio of accumulated equity rewards based on a loyalty change by pushing a single button within an interface. For example, the disclosure describes a loyalty rewards platform that provides a one click button (e.g., via an application executed on a user device in communication with the loyalty rewards platform and/or associated loyalty rewards computing system) which, upon a triggering event (e.g., a change in one or more business loyalties), offers the user an option to automatically sell equity for a business to which the user is no longer loyal and purchase the corresponding value (e.g., dollar or fractional dollar) amount of equity in a business to which the user is newly loyal. In another example, the disclosure describes a loyalty rewards platform that provides a one click button which, upon a triggering event, offers the user an option to automatically redistribute an accumulated monetary reward amongst one or more businesses to which the user has an active loyalty selection/loyalty agreement by purchasing equity in the one or more businesses. In this way, the user is provided with an opportunity to align equity holdings to updated, or existing, loyalties with a single user input (e.g., click or other selection of an element on a graphical user interface). The single user input may trigger the loyalty rewards platform to automatically exchange data with systems governing the equity of the new and old businesses in order to reduce delays and avoid the issues described above (e.g., the issues of imbalances between sales of equity and purchases of equity that either results in the declining of the purchase of new equity due to lack of sufficient funds, or results in the incomplete investment of available funds). Further, the systems and methods disclosed herein support redistribution of fractional shares of stock, thus enabling a user to easily convert fractional holdings in a first business to fractional holdings in a second business, based on a change of loyalty from the first business to the second business, without additional input or manual calculation on the part of the user.

In a first example, the above issues are at least partly addressed by A method comprising: displaying a selectable interface element on a display of a user device, wherein the selectable interface element indicates an accumulated reward from a first business in a rewards account of a user on a loyalty platform, and a least a second business, responding to selection of the selectable interface element by purchasing a first amount of shares of stock in the second business using the accumulated reward from the first business, storing the first amount of shares of stock in the rewards account of the user on the loyalty platform and presenting a notification to the user indicating that redistribution of the accumulated reward has been performed. In this way, a user may redistribute accumulated rewards automatically in substantially a single click. In one example, the first business may comprise a business to which the user has an active loyalty selection, and the accumulated reward may comprise a reward earned via loyalty to a second business (the reward comprising either a monetary reward or an equity reward) to which the user was previously loyal. Thus, a user may redistribute accumulated rewards to reflect current loyalties, by using previously earned rewards, earned from one or more businesses to which the user is no longer loyal, to purchase equity in one or more businesses to which the user is currently loyal.

In a second example, the above issues are at least partly addressed by a computing system including a processor, a display, and a memory storing instructions executable by the processor to receive a request to change enrollment from a first equity rewards program associated with a first business to a second equity rewards program associated with a second business, remove the user from the first equity rewards program and enrolling the user in the second equity rewards program, present an interface element via a user interface displayed on a display, the interface element being selectable to request a rebalancing of equity in a loyalty rewards platform account of the user, and, responsive to receiving user input selecting the interface element, perform the rebalancing of equity by generating one or more sell orders for equity in the first business accrued by the user via the first equity rewards program, transmitting the one or more sell orders to an order management system for execution, upon execution of the one or more sell orders, determining proceeds of an associated sale of the equity in the first business, calculating an amount of equity in the second business corresponding to the proceeds of the sale of the equity in the first business, generating buy orders for the calculated amount of equity in the second business, and presenting a notification to the user that the rebalancing of equity in the loyalty rewards platform account has been performed.

The following description relates to systems and methods for a loyalty platform, such as a loyalty platform that provides equity rewards and/or fractional equity rewards to users based on tracked user loyalty purchases (the term "user" or "users" is herein used interchangeably with the terms "customer" or "customers"). Examples of loyalty platforms and related features are disclosed in U.S. Provisional Patent Application No. 62/697,284, entitled "DISTRIBUTING SUCCESS-LINKED REWARDS TO CUSTOMERS OF PRIVATELY HELD COMPANIES," filed on Jul. 12, 2018, and U.S. Provisional Patent Application No. 62/543,884, entitled "DETERMINING EQUITY REWARDS BASED UPON PURCHASE BEHAVIOR", filed on Aug. 10, 2017. The entire contents of each of the above-identified applications are hereby incorporated by reference for all purposes.

The following description provides examples of systems and methods which may enable a loyalty platform, such as loyalty platform 3108 shown in FIG. 34A, to automatically rebalance/redistribute equity, or other accumulated rewards, in different companies responsive to a user request to switch between loyalty rewards programs for different businesses. The loyalty platform may be implemented by one or more computing systems, such as computing system 3180 shown in FIG. 34B. Computing system 3180 may include non-transitory memory 3184, which may include instructions that when executed carry out one or more steps of one or more of the methods herein disclosed, such as methods 5200 and 5400 described in detail below with respect to FIGS. 72A, 72B, 72C, and 74. It will be understood that loyalty platforms, such as loyalty platform 3108 may be implemented by more than one computing system, such as in a distributed computing scheme, wherein various functionalities of the loyalty platform may be enabled by a plurality of networked computing systems working in concert. Loyalty platform 3108 may comprise an equity allocation system 3120, which may distribute fractional shares of stock to users based on tracked user loyalty purchases. It is to be understood that loyalty platform 3108 is a non-limiting example of a loyalty platform used in the methods and systems described in FIGS. 72A-74 and 76. FIGS. 75A, 75B, 77A, 77B, and 77C show example graphical user interfaces, which may be displayed by loyalty platform 3108 to a user via a display of a user device. The graphical user interfaces of FIGS. 75A, 75B, 77A, 77B, and 77C may be displayed by a loyalty platform, such as loyalty platform 3108, upon execution of one or more steps of methods 5200 and/or 5400 included herein.

The following methods give examples of one or more methods which may be executed by a computing system, such as computing system 3180, to implement a loyalty platform, such as loyalty platform 3108, which may enable one or more improvements over conventional reward programs.

Figure 72B:
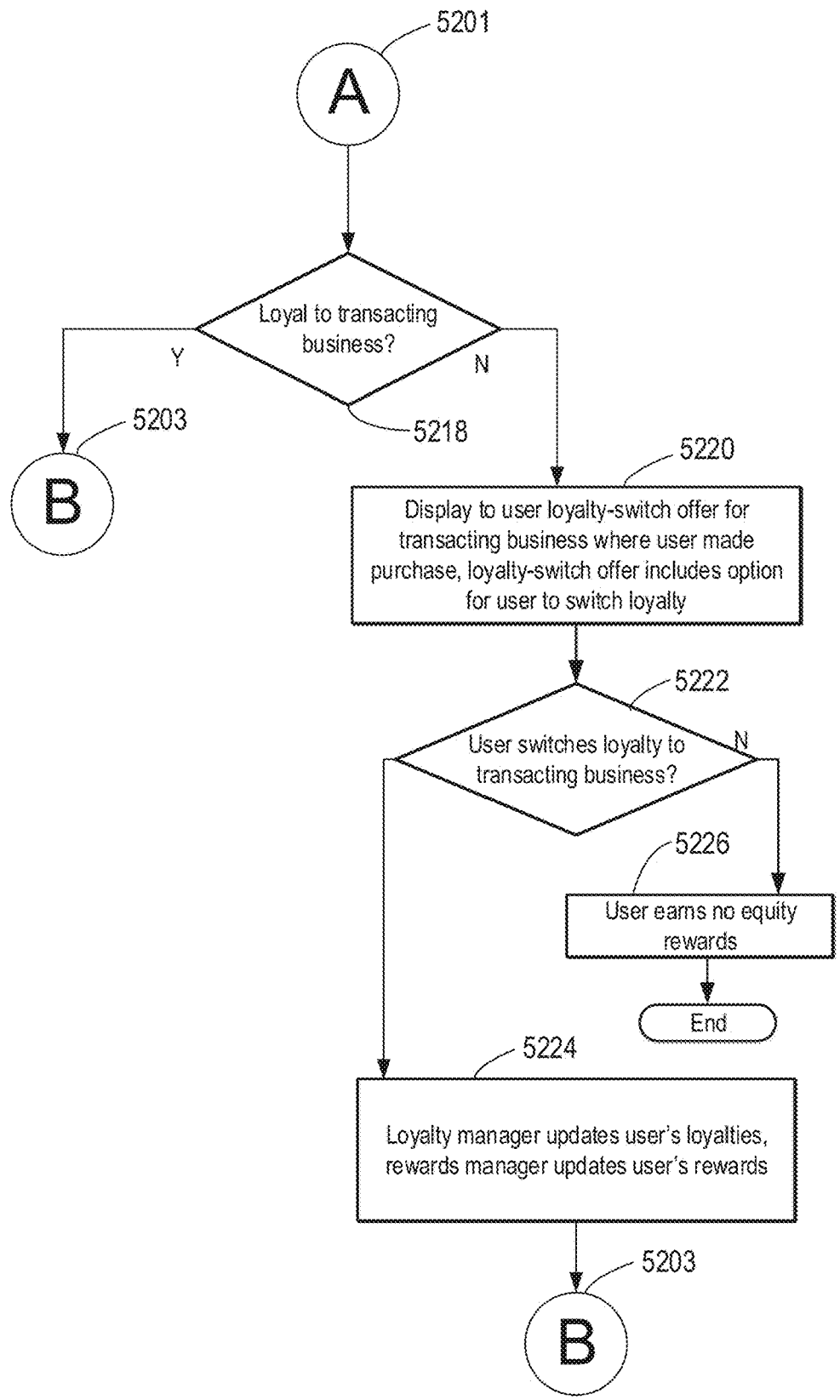
Figure 72C:
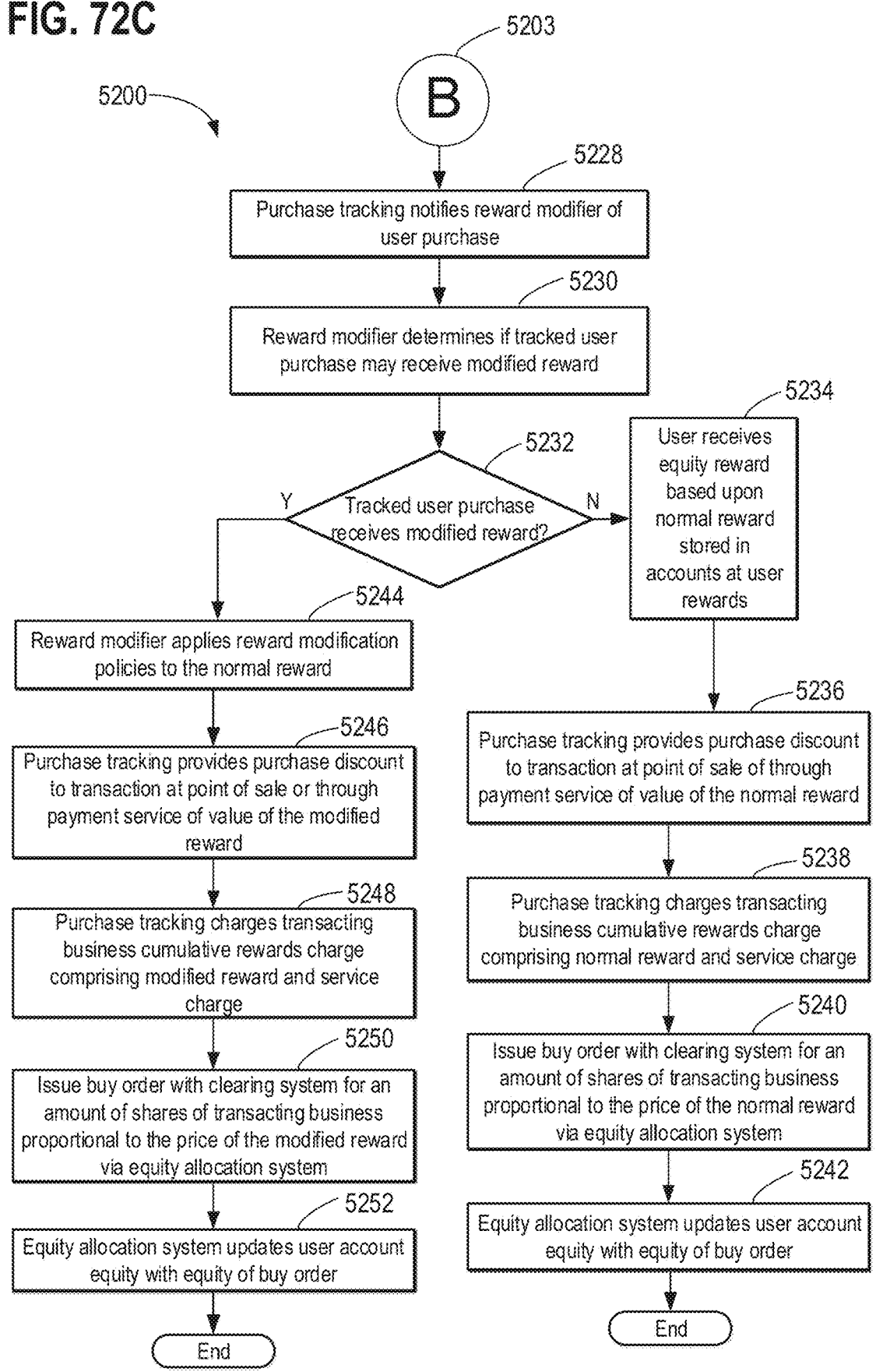

Turning now to FIGS. 72A, 72B, and 72C, a flowchart illustrating exemplary method 5200 is shown. Method 5200 is an example of a process illustrating how an online loyalty platform, such as loyalty platform 3108, may track user purchases conducted with a payment medium registered/linked to a user account of the loyalty platform, and allocate equity rewards based on the monetary value of the user purchase, a user transaction history, user loyalty selections, business rewards policies/loyalty policies. In this and other examples, "loyalty" or "loyalty selection" may be a selection of a first business in a market made by a user entitling the user to certain privileges including, but not limited to, equity rewards, discounts, special offers, promotions, and others. Making a "loyalty" selection entitles the user to the receipt of privileges from the first business of the market to which the user has made their "loyalty selection" with, but may preclude, or exclude, the user from receiving privileges from a second business, or other businesses, in the market. In some examples, a user may be presented with a "loyalty-switch offer" which may be an offer for other privileges provided by a second business in the market, based upon a forfeit of loyalty and privileges to the first business and a selection of loyalty to the second business in the market.

Beginning with 5202, purchase tracking 3122 of loyalty platform may receive an indication, or notification, that a user (for example, user 3102, 3116, 3118 of FIG. 34A) has made a purchase or executed a transaction, comprising a monetary value of the transaction, with a transacting business. Purchase tracking 3122 may further receive one or more purchase details, including information regarding the transacting business (herein referred to as a transacting business description), and to which customer account the transaction medium is associated. In one example, the transacting business description may include a title/name of the transacting business, the address of the transacting business, a time and date of the transaction, information relating to a point of sale device used to conduct the transaction, or other data associated with conduction of the user purchase which may be used to uniquely identify a transacting business. Purchase details may further comprise information identifying which user account on the loyalty platform to associate with the user purchase. As described further, herein, purchase tracking 3122 may be configured to link to credit cards, debit cards, or any other trackable payment medium, and when the link is completed, the purchase tracking 3122 may receive all purchase notifications made with that trackable payment medium. As an example relating to FIG. 72A, a user may make a purchase with the use of a credit card, tracked by purchase tracking 3122, at a business. Additionally, a spend history/transaction history associated with each payment medium, and/or associated with each user account (in the case that a user account is associated with multiple linked payment media), may be generated for linked payment media and stored in non-transitory memory of the rewards platform. In one example, the reward policies of a business stored on the loyalty platform may take into account the transaction history of a user when determining the amount of the equity reward to allocate to the user. In one example, determining the amount of the equity reward to allocate to the user comprises increasing a percentage of a monetary value of a user purchase used to reward the user based on a cumulative monetary value of user purchases from the rewarding business increasing beyond a threshold, wherein the threshold may be defined in the reward policies of the business and the cumulative monetary value of user purchases may be calculated on a rolling basis over a predetermined duration of time. In another example, based upon a cumulative transaction amount for a user with a single rewarding business within a finite duration of time increasing beyond a predetermined threshold amount, the amount of the equity reward allocated to a user as a fraction of the total transaction amount may increase. As an example, the transacting business may be listed within markets 3156.

At 5204 the loyalty platform may employ a purchase tracking system or module to identify the business and the user involved in a user purchase. The payment medium used in the user purchase may be uniquely associated with an account of a user on the loyalty platform, such as one of accounts 3114 stored in the non-transitory memory 3184 of computing system 3180. In another example, the business with which the user conducted the transaction may be identified by the computing system implementing the loyalty platform by matching/correlating a transacting business description associated with the user purchase with a description of a business stored in the rewarding-business index of the loyalty platform. In one example, a match between a transacting business description and a description of a business stored in a rewarding-business index of the non-transitory memory of the computing system implies that the transacting business is registered with the loyalty platform, and therefore, that the user may be eligible for an equity reward based on the user purchase (note that in some examples the rewarding-business index may include an indication that the reward program of the registered business is cancelled or suspended, such as may be indicated by a flag included with the listing of the business in the rewarding-business index as previously discussed). In another example, if the computing system implementing the loyalty platform is unable to match the transacting business description with a description for a business stored in the rewarding-business index, this implies that the transacting business is not registered with the loyalty platform, and thus the user may be ineligible to receive an equity reward for the user purchase. In this way, for a user purchase identified by a purchase tracking system or module of a loyalty platform, such as purchase tracking 3122, both the user and the transacting business may be rapidly identified using the system and methods of the current application, so long as the transacting business is registered with the loyalty platform. Further, it may be quickly ascertained if the tracked user purchase is eligible for an equity reward. And in some examples, in the event that the user purchase is not eligible for an equity reward, the computing system implementing the loyalty platform may transmit a notification to a user computing device, for rendering on a display or communications interface of the user computing device, a notification to the user that their purchase was not eligible for a reward, the notification may further include an offer to the user to make a loyalty selection to one or more businesses stored a rewarding-business index of the non-transitory memory of the computing system which are actively offering equity rewards to loyalty selecting users.

Moving to 5206, the computing system implementing the loyalty platform may then execute a user loyalty lookup, comprising looking up the user's active loyalties stored in the account associated with the user. In one example the user loyalties, such as may be stored at user loyalties 3126 of loyalty platform 3108, may comprise recorded loyalty selections made by a user associated with an account stored within accounts 3114, said account further associated with the linked payment medium used to conduct the purchase. In another example, a computing system implementing the loyalty platform may receive a loyalty selection from a user computing device, the loyalty selection comprising a user selection of a business listed in a rewarding-business index stored on the non-transitory memory of the computing system, the business listed in a market, and based upon the user selection of the business, the user is eligible to receive an equity reward associated with the business and is excluded from receiving equity rewards associated with unselected businesses in the market. The computing system may then conduct the process of storing the loyalty selection in a location of the non-transitory memory of the computing device associated with an account of the user, which may subsequently be accessed in order to determine if a user is loyal to a transacting business. In one example, loyalty selections may only be made to companies providing equity rewards to users through the loyalty platform, and thus listed in the rewarding-business index, as loyalty selections to other businesses would not enable the user to receive an equity reward, and thus the user would obtain no benefit from such a loyalty selection.

Proceeding to 5208, the method includes determining if the user is loyal to any business in the market. If the user loyalty lookup returns that the user is loyal to a business or merchant or brand in the market, then the method proceeds to 5201 of FIG. 72B, which will be explained in more detail below. As a further example, the user loyalty lookup may be executed by the purchase tracking 3122.

If the user loyalty lookup determines the user is not loyal to any business in the market, the method proceeds to 5210, where the purchase tracking 3122 requests, or queries, loyalty manager 3110 for available or offered user equity rewards with the transacting business. Additionally, at 5210, the loyalty manager 3110 may provide an option for the user to select loyalty in the market to the transacting business. The option provided by loyalty manager 3110 may include information regarding loyalty policies 3142 relating to the transacting business. The option provided by loyalty manager 3110 may, in an example, include notifications of the rewards available to the user if the user should select the option for the user to select loyalty in the market to the transacting business.

Proceeding to 5212, method 5200 determines if the user has switched loyalty to the transacting business. If the user does select the loyalty-switch offer, the method may proceed to 5216, wherein the user may earn the loyalty-switch offer. Additionally, as an example, the loyalty manager 3110 module may update the user's loyalties at user loyalties 3126 of accounts 3114, by overwriting the previous loyalty selection of the user in that market, and the rewards manager 3112 may update the user's current rewards at user rewards 3128 of accounts 3114. Furthermore, if the user accepts the loyalty-switch offer, the method may proceed to 5203 of FIG. 72C. If the user does not select the loyalty-switch offer, the method may proceed to 5214 wherein the user earns no equity rewards, privileges, or any other rewards which may comprise selecting the loyalty-switch offer and selecting loyalty to the transacting business. Additional operations that may occur responsive to a user request to switch loyalties is described below with respect to FIG. 74.

Continuing now with FIG. 72B, at 5218, method 5200 includes determining if the user has made a loyalty selection to the transacting business. Determining if the user made a loyalty selection to the transacting business may include looking up the user's loyalties stored in accounts 3114 at user loyalties 3126 via purchasing module 3122 executing the user loyalty lookup. If the user loyalty lookup returns that the user is loyal to the transacting business, and should therefore receive a reward according to the loyalty policies set forth, the method may proceed to 5203 of FIG. 72C, explained in more detail below. If the lookup at step 5218 determines that the user is not loyal to the transacting business, method 5200 may then proceed to 5220 where the loyalty manager 3110 may present the user with a loyalty-switch offer which may include an option for the user to select a loyalty to the transacting business and terminate their previously-selected loyalty to another business in the market. As an example, the terms and policies of a loyalty-switch offer may be stored within loyalty policies 3142. In some examples, loyalty-switch offers may include whole or fractional shares of stock. In some examples, loyalty-switch offers may include equity rewards offered on transactions and/or discounts on transactions. In an example, loyalty-switch offers may be temporary or permanent or may be based upon any user behavior as defined by the business responsible for the loyalty-switch offer and/or the platform. In an example, loyalty-switch offers may include temporarily higher or increased equity rewards for transactions executed with the transacting business.

Additionally, loyalty-switch offers may be presented, offered, or made available to the user at any time, for example, when the user is browsing through available loyalty selections, or as another example, at any desirable time when a user is interacting with the platform. In an example, a user who is conducting a transaction with a business, with which the user has not selected loyalty in a market, may receive a notification, for example via the purchase tracking 3122 or loyalty manager 3110. The purchase tracking or loyalty manager may inform the user that they are not receiving equity rewards at the business where they are conducting the transaction. In some cases if the user is merely present within, at, or near a business listed in the rewarding-business index to which the user does not have an active loyalty selection, the notification may further include a loyalty-switch offer so that the user may begin to earn rewards and/or privileges associated with the business. In one example, the user computing device may contain GPS capabilities, the computing system implementing the loyalty platform configured to receive the location of the device therefrom, and to correlate the location of the user computing device with predefined location information specified for one or more of the plurality of businesses in the rewarding-business index. Thus, the computing system implementing the loyalty platform may be enabled to ascertain when the user computing device is within a threshold distance of one or more businesses registered with the loyalty platform, and therefore listed in the rewarding-business index. In one example, based on the user computing device being less than a threshold distance from one of the plurality of businesses listed in the rewarding-business index, an offer for a loyalty selection to the said one or more businesses may be transmitted to the user computing device, for display via a display or communications interface of the user computing device. In a further example, based on a location of the user computing device, and a local time of the location of the user computing device, and the spend history of one or more payment media associated with the user, a customized loyalty-switch offer may be transmitted to the computing device of the user. In another example, the threshold distance may be a predetermined distance, such as 1 mile. In other examples, the threshold distance may be based on a rate of user travel, or an estimated travel path of the user as indicated by a derivative of the position signal being transmitted to the loyalty platform.

In another example, a user may elect to switch-loyalties after receiving a loyalty-review from the loyalty platform. In one example, a "loyalty review" may display to a user a purchase history, along with an indication of which purchases received loyalty rewards, which purchases did not receive loyalty rewards, and which purchases could have received a greater amount of loyalty rewards if a loyalty-switch was made. For example, the loyalty platform may display a "loyalty review" button within a user interface on a display of a user device, upon selection of the "loyalty review" button by the consumer, a purchase history in the grocery category (as used herein, a category of the loyalty platform is equivalent to a market of the loyalty platform) may be displayed in the user interface, wherein the purchase history may indicate that the user was spending 40% (of the total spent in the grocery category of the loyalty platform) over the last 3 months at Kroger, and 60% at Albertson's, but their loyalty is to Kroger. Based on the information displayed to the user by the loyalty review, the user may elect to switch loyalties from Kroger to Albertson's. In one example, the loyalty review may include automatically prompting a user with a loyalty-switch offer upon a determination that the user spends more with a business in a market to which the user is not currently loyal than the user spends with a business to which the user is currently loyal.

After presenting the loyalty-switch offer to the customer, at 5222, the method 5200 continues where the purchase tracking 3122 queries loyalty manager 3110 and/or user loyalties 3126 to determine if the user has switched loyalty to the transacting business. If the user does not switch loyalty to the transacting business and declines the loyalty-switch offer, the method 5200 may proceed to 5226 where the user earns no equity rewards for the transaction. Contrastingly, if the user does switch loyalty to the transacting business, the method 5200 may proceed to 5224 where the loyalty manager 3110 may update the user's loyalties at user loyalties 3126 of accounts 3114. The method may further include the rewards manager 3112 updating the user's rewards 3128 of user account 3172 to include the privileges and/or benefits of the loyalty-switch offer. After the user account (for example, user account 3172) has been updated, the method 5200 may then proceed to 5203 of FIG. 72C. As an example, if a user has selected loyalty to a first business but then selects loyalty to a second business in a same market via a loyalty-switch offer, the purchase tracking may update user loyalties 3126 to include information that the user has now canceled loyalty or loyalty selection to the first business and selected loyalty to the second business.

Turning now to FIG. 72C, the reward modifier 3154 may also provide modified rewards to the user based upon random selection, user action, or rewarding business policy/promotional event. At 5228 of method 5200, the purchase tracking 3122 may have tracked a purchase between a user and a business with which the user has made a loyalty selection. The purchase tracking 3122 may communicate with the reward modifier 3154 per each transaction tracked by loyalty platform 3108. In one example, the reward modifier 3154 may include a random selection algorithm 3162, which may be invoked to randomly provide modified rewards to the user. As an example, the random selection algorithm 3162 may be implemented within the reward modifier 3154 and the reward modifier 3154 may further include variable reward policies 3164 which include rules and/or instructions for how to provide variable rewards. In addition, reward modifier 3154 may include promotional engine 3166, which may comprise rules/instructions for modifying a user reward based upon previous user actions, such as a loyalty switch, a loyalty streak (a period of time of continuous loyalty to a brand), in conjunction with reward policies of a rewarding business. In one example, rewarding business Z may provide a 40% reward increase to users who switched loyalty from another business operating in a same market as business Z, and promotional engine 3166 may include instructions for determining if a user has executed such a loyalty switch, and may further include instructions for modifying a base reward by increasing the amount of the base reward by 40%. In another example, rewarding business Z may conduct a promotional event, wherein all purchases made by loyalty users receive a first reward amount, and wherein higher reward amounts may be given to users based on the user meeting one or more pre-determined criteria, such as the user having been loyal to business Z for greater than a threshold duration. Promotional engine 3166 may therefore comprise instructions which when executed enable query and comparison of one or more pieces of user data, such as may be obtained from user accounts 3114, which may enable determination by reward modifier 3154 if a user is eligible to receive a modified award. In one example, promotional engine 3166 may work in concert with random selection algorithm 3162. In one example, promotional engine 3166 may be configured with instructions to reward 60% of user's loyal to brand Z with an increased reward based upon tracked purchases, and promotional engine 3166 may invoke random selection algorithm 3162 to randomly select 60% of tracked loyalty purchases made with brand Z and provide the randomly selected 60% of purchases with the increased reward.

At 5230, the reward modifier 3154, as an example, may invoke the random selection algorithm 3162 to determine if a tracked transaction (made between a user and a transacting business wherein the user has selected loyalty to the transacting business) may or may not receive a modified reward, and the reward modifier 3154 may also modify the reward based upon variable reward policies 3164.

At 5232, if the tracked transaction is determined to receive a modified or variable reward, the method may proceed to 5244 wherein, the variable reward modifier may apply variable reward policies 3164 to the normal reward. At 5244, the variable reward modifier may run a user loyalty lookup to determine the reward, or normal reward, associated with selected loyalty to the business based upon reward policies 3144. At 5232, if the tracked transaction is not determined to receive a modified or variable reward, the method may proceed to 5234. Similarly, at 5234 the variable reward modifier may run a user loyalty lookup to determine the reward, or normal reward, associated with selected loyalty to the business based upon reward policies 3144.

The variable reward policies 3164 may contain instructions and/or rule sets related to the modifications of the normal reward of any tracked transaction based upon the results of the random selection algorithm 3162 having determined the tracked transaction may receive a modified reward. In an example, a variable reward policy may include a modification policy which may invoke the random selection algorithm 3162 yet again to determine, by random selection, a degree of modification from a list of possible modifications. In an example, the variable reward policy may include the modification policy comprising a list of possible modifications comprising reward multipliers, for example, 2×, 3×, and 4×. By invoking the random selection algorithm 3162 to choose, by random selection, from the list of possible reward modifications (for example, multipliers 2×, 3×, and 4×), the variable reward policy may randomly select a reward modification, and in such an example, if a 3× reward multiplier were chosen, then the reward amount, (for example, equity reward) which may be given to the user as a discount charged to the merchant, may be multiplied by 3. In an example, a user may execute a $100 tracked transaction with a business the user has selected loyalty to. With no reward modification, the user may normally receive a 1% discount via the loyalty platform 3108. However, if the user may be determined to receive a variable reward including, for example, a 3× reward multiplier (in accordance with the variable reward policies 3164), then the user would receive a 3% discount which would then be charged to the transacting business (along with the service charge, which may or may not also be modified by the reward modification). Furthermore, the user may be assigned $3 worth of fractional or whole shares of equity in the transacting business via the equity allocation system 3120.

If, the variable reward modifier 3154 applies reward modification policies to the normal reward at 5244, next, the method 5200 may then proceed to 5246 and the variable reward modifier 3154 may provide the modified and/or variable reward (the normal reward of 3128 with variable reward policies 3164 applied to it) to the user, in the form of a discount at the point of sale. In another example, the user may receive the variable reward not as a discount, but as a reimbursement of funds sent to user funds 3160 or an account with payments 3150.

At 5248, purchase tracking 3122 may charge a transacting business a cumulative rewards charge wherein the cumulative rewards charge includes the value of the modified reward and a service charge. As an example, the service charge may be a fee charged by the equity allocation system 3120 of loyalty platform 3108 for brokering the equity reward. The service charge may be a percentage of the total transaction dollar amount or it may be a flat dollar fee.

At 5250, the purchase tracking 3122 may request the equity allocation system 3120 to issue a buy order with clearing system 3104 for equity of the transacting business proportional to the amount of the modified reward. Once clearing system 3104 settles the transaction, at step 5252, assign module 3148 of equity allocation system 3120 may update user equity 3130 to include the assigned equity. In other words, at 5252, the computing system implementing the loyalty platform may perform the step of allocating an amount of the equity reward to the account of the user via an equity allocation system based on the transacting business description matching a description of the business selected by the user in the loyalty selection, the amount of the equity reward further based upon one or more of the transaction amount, a transaction history of the user, and loyalty policies of the business selected by the user and further, transmitting the amount of the equity reward to the user computing device for rendering within a user interface implemented at the user computing device the amount of the equity reward and an updated cumulative balance of the equity reward allocated to the account of the user.

Returning to 5232, if the invocation of the random selection algorithm determines that the tracked transaction may not receive a modified reward, then the user may receive a normal reward (without modification) based upon the user rewards 3128 of the user account 3172, and steps 5234-5242 are the same as 5244-5252, where only a normal reward is provided instead.

In an example, a reward which may be given in equity may be stored at user equity 3130. In a further example, if a tracked transaction is determined to not receive a modified reward the user may receive the normal reward stored at user rewards 3128. The example set forth above and herein may provide incentive for users to repeatedly shop (or increase number of transactions) and spend more money at businesses which they have selected loyalty to as they may unexpectedly receive modified (greater) rewards, in some cases equity rewards. In such an example, users may exhibit increased loyalty to stores where they are occasionally rewarded with greater rewards.

As an example, a reward may comprise at least a purchase discount on a transaction executed with a business the user has selected a loyalty to. As an example, the purchase discount may comprise a dollar amount or a percentage discount on purchases with the transacting business. In a further example, the reward may also include an equity reward. As an example, the reward may further comprise an equity reward which may comprise a percentage of the transaction dollar amount, or in some examples, a set, established dollar amount. In some examples, the equity reward may further comprise a variable percentage of the transaction dollar amount or a variable dollar amount. As an example, a service charge may be a fee charged by loyalty platform 3108 for brokering the equity reward, and the service charge may be a percentage of the total transaction dollar amount or it may be a flat dollar fee.

In some examples, the method may include determining a reward based upon any one or any combination of: the loyalty selection, a transaction history of the user, and a variable reward modifier 3154. As an example, if the user has not made a loyalty selection to the transacting business, then the user may not receive any reward. If the user has made a loyalty selection to the transacting business, then the user may receive a reward. Furthermore, based upon the loyalty policy (stored in loyalty policies 3142) of the transacting business, the reward may be modified based upon a transaction history of the user 3132 and/or the reward may be modified based upon a user payment method 3134 and/or the reward may be modified based upon the variable reward modifier 3154. For example, if a user meets certain criteria based upon past transaction history with the transacting business, then the user may receive a modified award. Furthermore, as an example if a user increases their spending, e.g., the frequency of transactions and/or amount of money spent per transaction, the user may receive a greater reward. Furthermore, as an example, if a user decreases his or her spending, the user may receive a lesser reward. In some examples, a modified reward may comprise a modified equity reward percentage wherein the percentage of the transaction monetary value put towards equity rewards is modified based upon transaction history and/or loyalty history. In some examples, a modified reward may comprise an equity reward percentage, as disclosed above, as well as a set amount of equity (either fractional or whole shares). As an example, rules and/or instructions for modifying rewards based upon transaction history or user behavior or user history, as mentioned above, may be included in variable reward policies, and these modifications may not depend upon the invocation of the random selection algorithm 3162.

As a further example, if a user uses a particular credit card or particular payment method, which may be promoted or preferred with respect to the transacting business, then the user may receive a modified reward based upon a modification policy applying, wherein the modification policy applies a reward modifier to the reward based upon the payment method used for the transaction. In some examples, this may include only applying the reward when the particular credit card or payment method is utilized. Furthermore, the reward may be further modified by the variable reward modifier 3154, then the reward may be provided to the user and added to one or more of user equity 3130 and user funds 3160.

FIG. 73 shows another example of equity allocation system 3120, which represents one exemplary embodiment of a system for acquiring, aggregating, distributing, liquidating, and otherwise managing fractional equity rewards on a loyalty platform, such as loyalty platform 3108. The equity allocation system 3120 shown in FIG. 73 may be similar to the equity allocation system 3120 shown in FIG. 35. Elements of FIG. 73 which were previously illustrated and described above with respect to FIGS. 34A and 34B shall retain their numbering in FIG. 73. Although the accounts within equity allocation system 3120, as discussed herein, are included within loyalty platform 3108, it will be appreciated that such accounts may be held or maintained by a third party without departing from the scope of the current disclosure. In one example, the accounts discussed with reference to FIG. 73 may be maintained by a brokerage firm on behalf of a loyalty platform. In another example, the loyalty platform may operate and/or maintain the accounts discussed with reference to FIG. 73. In the case that the accounts within equity allocation system 3120 are operated by a third party brokerage firm, equity allocation system 3120 may electronically communicate with one or more of the accounts via a network to enable one or more of the steps or actions described herein with reference to said accounts.

The accounts discussed with reference to FIG. 73 may comprise instructions stored in non-transitory memory of a computing system, such as a computing system implementing loyalty platform 3108, wherein the instructions enable the accounts to hold, trade, buy, and sell securities. In one example the securities may comprise shares of stock in a business. In another example the securities may comprise other kinds of securities, such as one or more of government bonds, municipal bonds, mutual funds, futures options, and stock options. In another example, the accounts discussed with reference to FIG. 73 may be configured to buy, sell, trade, hold, or otherwise interact with, crypto assets, such as cryptocurrency, tokens, smart contracts, etc. In one example, the accounts discussed with reference to FIG. 73, such as average price account 5360 may be configured to hold, trade, buy, and sell shares of stock in publicly traded businesses. The accounts discussed with reference to FIG. 73 may also be configured to send and receive funds (fiat currency, such as USD) to one or more other accounts, such as, but not limited to, other accounts discussed with reference to FIG. 73. In one example, merchant facilitation account 5332 may send an amount of USD to the average price account 5360 in exchange for an amount of a security, such as a share of stock. Equity allocation system 3120 is shown accompanied by various interacting systems, such as user computing systems 3102, 3116, and 3118, businesses 3106, 3138, and 3140, clearing system 3104, and payments system 3150. Equity allocation system 3120 may alone, or in conjunction with other systems herein described, perform one or more steps of methods 5200 and/or 5400 herein disclosed with respect to FIGS. 72A-72C and 74. Equity allocation system 3120 comprises merchant deposit accounts 5310, merchant facilitation accounts 5330, inventory account 5350, and average price account 5360.

Merchant deposit accounts 5310 may comprise a plurality of merchant deposit accounts, each corresponding to a unique business. As depicted in FIG. 73, merchant deposit accounts 5310 comprise merchant deposit account 5312, merchant deposit account 5314, and merchant deposit account 5316, which are associated with business 3106, business 3138, and business 3140, respectively. Although FIG. 73 depicts three merchant deposit accounts, the disclosure will be understood to provide for any number of merchant deposit accounts, each associated uniquely with a business, to facilitate the distribution of fractional equity rewards on behalf of the business. As part of a Merchant Agreement between the loyalty platform and a business seeking to provide fractional equity rewards to loyalty customers via the loyalty platform, a business may agree to maintain a minimum balance of funds within the merchant deposit account associated with that business. The funds within a merchant deposit account may comprise fiat currency, such as USD, or other stable, and highly liquid currencies which may be used to purchase shares of stock. It will be appreciated that the minimum amount of funds to be maintained in each of the plurality of merchant deposit accounts 5310 may be determined on a business by business basis and, as such, may be different for each merchant deposit account.

In one example, the minimum balance of funds for a merchant deposit account associated with a business may increase as a running average rate of fractional equity reward distribution for that business increases. For example, if the total amount of fractional equity rewards earned per day by loyalty customers of business A doubles, the minimum amount of funds to be maintained in the merchant deposit account associated with business A may also double. In another example, the minimum amount of funds to be maintained in a merchant deposit account of a business may be based on a predetermined threshold, wherein the threshold is equal to the minimum amount of funds. As another example, a threshold defining the minimum amount of funds to be maintained by a business in an associated merchant deposit account may be determined as a total monetary value of all fractional equity rewards distributed to users on behalf of that business over the previous 10 days. As another example, the methods for determining the minimum amount of funds to be maintained in a merchant deposit account associated with a business and used to provide fractional equity rewards to users on behalf of that business may be adjusted based on an upcoming event, such as a sale, a promotional offer, a holiday (such as black Friday, Christmas, etc.), or other foreseeable future events which may influence the amount of fractional equity rewards earned by users.

By maintaining a minimum amount of funds within each of the plurality of merchant deposit accounts 5310, a probability of interruption/delay in the distribution of fractional equity rewards to users, such as may occur if the balance of a merchant deposit account reaches zero, is reduced. Further, by basing the minimum amount of funds to be maintained in each of the merchant deposit accounts on an individual business basis and on a running average rate of fractional equity reward distribution for each business, a balance may be struck between minimizing the amount of capital a business needs to commit for a reward program and reducing the probability that a fractional equity reward earned by a user may be delayed.

Each of the plurality of merchant deposit accounts in merchant deposit accounts 5310 may be uniquely associated with a merchant facilitation account stored in merchant facilitation accounts 5330. Said another way, there may be a one-to-one correspondence between each business using the loyalty platform, each merchant deposit account, and each merchant facilitation account. For example, merchant deposit account 5312, associated with business 3106, may also be associated with merchant facilitation account 5332, and may transfer funds to merchant facilitation account 5332 to enable the purchase of shares of stock for use as fractional equity rewards for loyalty customers of business 3106. Merchant facilitation accounts 5330 comprise merchant facilitation account 5332, merchant facilitation account 5334 (associated with merchant deposit account 5314 and business 3138), and merchant facilitation account 5336 (associated with merchant deposit account 5316 and business 3140).

Although FIG. 73 shows three merchant facilitation accounts within merchant facilitation accounts 5330, it will be appreciated that there may be any number of merchant facilitation accounts stored within merchant facilitation accounts 5330. Merchant facilitation accounts 5330 may comprise brokerage accounts and thus may be configured to hold both fiat currency and equity. Each of the merchant facilitation accounts stored within merchant facilitation accounts 5330 may be configured to communicate with other modules, systems, or components of loyalty platform 3108. For example, merchant facilitation accounts 5330 may have access to each of the user accounts stored within user accounts 3114, which may enable merchant facilitation account to calculate aggregate pending fractional equity rewards owed to these user accounts by one or more of the plurality of merchant facilitation accounts within merchant facilitation accounts 5330. In another example, the calculation of pending fractional equity rewards associated with each of the plurality of merchant facilitation accounts may be determined on a per account basis; that is, each of the merchant facilitation accounts may perform an independent calculation of the amount of pending fractional equity rewards it may satisfy. Merchant facilitation accounts 5330 may also communicate, that is send and receive data, with merchant deposit accounts 5310. In one example, based upon a determination by a merchant facilitation account within merchant facilitation accounts 5330, an amount of aggregate pending fractional equity rewards owed by that account to one or more of a plurality of users is greater than a threshold amount, a request may be sent by the merchant facilitation account to an associated merchant deposit account, requesting a transfer of an amount of funds to meet, or reduce below the threshold, the amount of aggregate pending fractional equity rewards.

Each of the merchant facilitation accounts within merchant facilitation accounts 5330 may be configured to send and receive funds and shares of stock. For example, each account within merchant facilitation accounts 5330 may be configured to receive funds from merchant deposit accounts 5310, transfer funds to the average price account 5360, receive shares of stock from the average price account 5360, and distribute the received shares of stock amongst a plurality of user accounts. As a specific example, $500 may be transferred from merchant deposit account 5314 to merchant facilitation account 5334 (by loyalty platform 3108 on behalf of business 3138), which may then be transferred to the average price account 5360 in exchange for $500 worth of equity (purchased by the average price account 5360 from an exchange, such as the NYSE). Once the $500 worth of equity is received by merchant facilitation account 5334, it may be distributed by merchant facilitation account 5334 to a plurality of user accounts stored within user accounts 3114, to satisfy pending fractional equity rewards. The $500 worth of equity may comprise an amount of fractional shares of stock or may be a number of whole shares of stock. In the case that the $500 worth of equity comprises a fractional amount of shares of stock, the average price account 5360 may round-up the fractional amount of shares of stock to the nearest whole share to enable the buy-order to be executed by a conventional exchange. For example, if the $500 equates to 9.6 shares of stock, the average price account may round-up the 9.6 shares to 10.0 shares, with the 9.6 shares being transferred to merchant facilitation account 5334 and the fractional remainder share of 0.4 being transferred from the average price account 5360 to inventory account 5350. The 9.6 shares (the portion of the whole shares purchased by the average price account 5360 using funds received from merchant facilitation account 5334) may then be distributed to a plurality of user accounts, such as user account 3172, user account 3174, and user account 3176, to satisfy pending fractional equity rewards associated with those accounts.

Average price account 5360 may be configured to conduct whole share buys and sells via clearing system 3104. In one example, clearing system 3104 may comprise a computing system with instructions for executing buy and sell orders for securities on an open market, such as the NYSE. Average price account 5360 may be configured to send and receive both funds and securities to/from one or more of the other accounts discussed with reference to FIG. 73. Average price account 5360 may comprise instructions stored in non-transitory memory of a computing system to perform one or more of the functions/steps/methods discussed herein. In one example, average price account 5360 may comprise instructions to allocate purchased whole shares of stock within a duration of time from the time of purchase, thereby reducing the balance for a given equity to zero by a pre-determined duration from the time of purchase. In one example the duration of time may be 24 hours. In another example, the duration of time may be 6 hours. In another example, the average price account may comprise instructions to allocate the entirety of acquired/purchased whole shares of stock by a pre-determined time. For example, average price account 5360 may be configured with instructions to allocate the entirety of its securities to other accounts of the loyalty platform and/or equity allocation system 3120 by market close each day, such that securities are not held by average price account 5360 overnight.

Inventory account 5350 may purchase fractional remainders of shares from average price account 5360 leftover after a first portion of whole shares purchased by the average price account is used to satisfy pending fractional equity rewards, such that the average price account does not hold positions in a security for longer than a duration, wherein the duration may be based on regulatory rules or may actively adjusted to reduce penalties or risk associated with holding securities such as stock. In one example, within a 24 hour period of the average price account 5360 executing a whole share purchase via clearing system 3104, a first portion of the purchased whole shares (which may comprise a fractional amount of shares) may be transferred to one of the accounts within merchant facilitation accounts 3114 (for distribution to users) and a fractional remainder of shares, equal to the difference between the purchased whole shares and the transferred portion of shares may be purchased by the inventory account. In this way, all shares purchased by the average price account 5360 may be transferred to other accounts within a duration of time, such that after the duration, the balance of the average price account 5360 for the purchased whole shares is zero.

A monetary expense of the fractional remainder of shares purchased by inventory account 5350 may be debited from inventory account 5350 and credited to average price account 5360 in exchange for the fractional remainder of shares. The fractional remainder of shares transferred to the inventory account may generally be less than a single share of stock, which may not be easily sold on conventional markets. The inventors herein have recognized this and have provided approaches which may enable rapid and efficient liquidation/exchange of fractional shares of stock. As an example, the inventory account 5350 may aggregate fractional remainders of shares from multiple cycles of fractional equity reward distribution, such that over time, the amount of fractional remainders of shares may exceed a liquidation threshold and a whole number of shares may be sold by inventory account 5350. The liquidation threshold may in one example comprise a single share, such that upon exceeding the liquidation threshold a single whole share of equity may be sold via clearing system 3104. The liquidation threshold may comprise any positive non-zero amount of equity and may comprise fractional or whole numbers of shares. For example, a liquidation threshold for a stock may comprise 1.0 shares, but may alternatively comprise 5.23 shares, 100.1 shares, 3 shares, etc. As a plurality of different stocks may be used for fractional equity rewards, inventory account 5360 may accumulate a plurality of different types of stock and each may have an associated liquidation threshold, wherein each liquidation threshold may be determined for the individual stock, such that a plurality of liquidation thresholds corresponding to the plurality of different stock types may be used.

Upon exceeding the liquidation threshold, the loyalty platform 3108 may determine an amount of whole shares of stock for which to place a sell order. The amount of whole shares to be sold may be unique for each stock and may depend on the liquidation threshold. For example, upon an aggregated amount of fractional remainders of stock, for a given stock, in the inventory account 5350 exceeding a liquidation threshold of 1.0 shares, a whole share sell order in the amount of 1.0 shares of stock may be placed, either by inventory account 5350, or by the average price account 5360 on behalf of the inventory account 5350. In another example, upon the aggregated fractional remainders of shares of stock, for a given stock, exceeding a liquidation threshold of 10.5 shares of stock, a whole share sell order in the amount of 2.0 shares of stock may be placed. The whole share sell order of the aggregated fractional remainders of shares may be executed via the average price account 5360, such that the amount of whole shares aggregated by the inventory account 5350 are transferred to average price account 5350 and then sold via clearing system 3104 on the open market. Alternatively, the whole share sell order may be executed directly by inventory account 5350. Upon fulfillment of the sell order for the amount of whole shares, funds in exchange for the whole shares may be transferred to inventory account 5350 and used in subsequent cycles of reward distribution to purchase additional fractional remainders of shares of stock. In this way, funds in the inventory account 5350 may change slowly over time, such that an initial amount of funds placed in the inventory account 5350 for purchasing fractional remainders of shares may require replenishment with reduced frequency compared to alternative approaches.

In order to enroll in one or more of the loyalty rewards programs described above, a user may first sign up for the loyalty platform, then select businesses (hereinafter, a "business" is to be understood to refer to a business, a merchant, a brand, and/or any other entity that may be associated with a loyalty rewards program) and/or associated loyalty rewards programs for enrollment. A similar process may be used to switch enrollment from one loyalty rewards program to another (e.g., to switch between loyalty rewards programs for different businesses). In some examples, switching loyalty from one business/merchant/brand to a second business/merchant/brand may trigger the loyalty platform to prompt the user to redistribute accumulated rewards from the first business to the second business, according to a method such as method 5400 discussed below.

Figure 74:
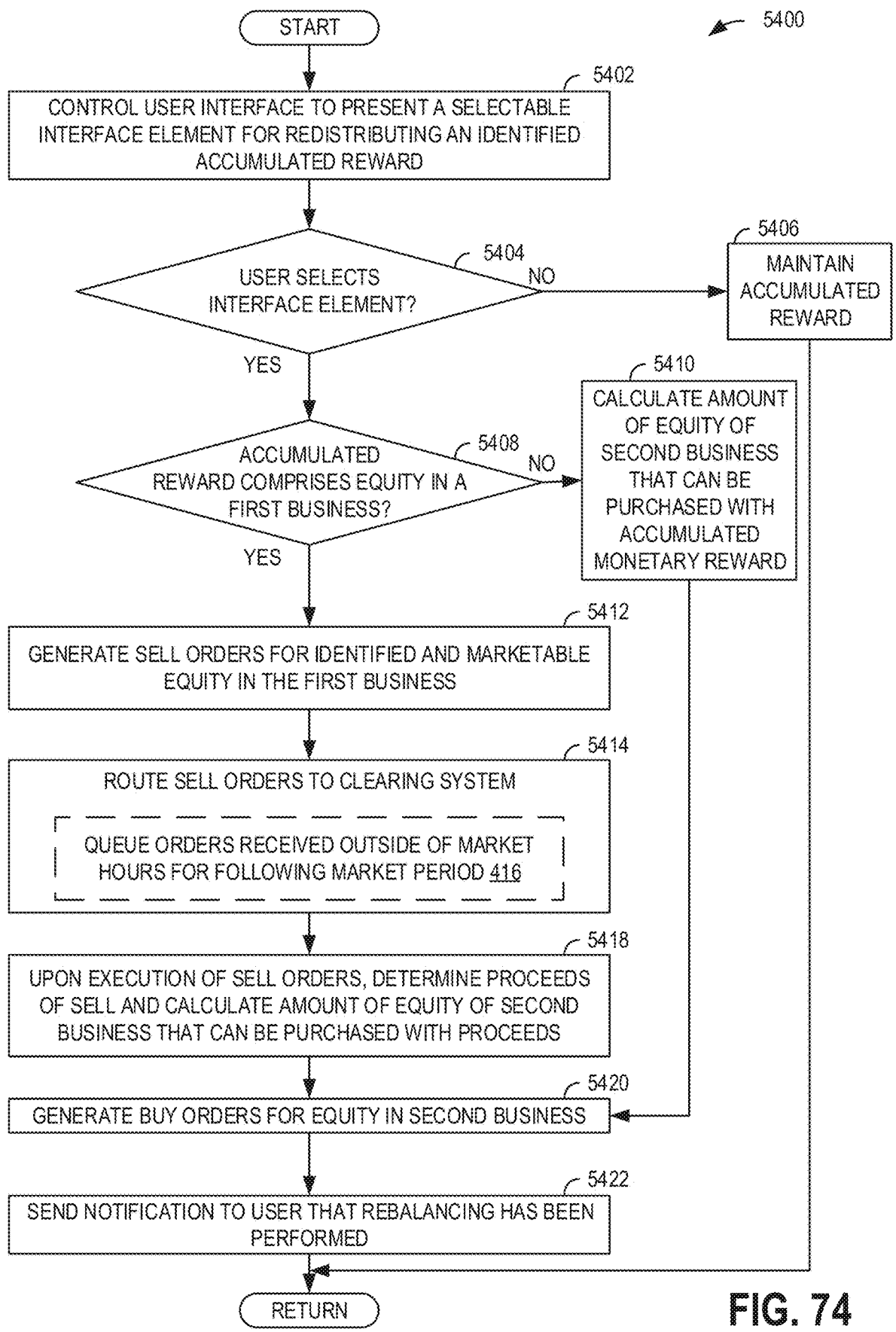
FIG. 74 shows a flowchart of an example method for switching loyalty in order to receive equity rewards from different businesses.

Turning to FIG. 74, a method 5400 for redistributing rewards accumulated by a user of a loyalty platform is shown. Method 5400 may be implemented by one or more of the above discussed systems, such as computing system 3180 shown in FIG. 34B by executing machine readable instructions. Method 5400 may enable a user to redistribute an accumulated reward stored in a user reward account of a loyalty platform in substantially a single click, thereby saving the user time and energy, and enabling the user to more easily rebalance a portfolio of accumulated rewards to reflect the user's current values and brand loyalties. In one example, method 5400 may enable a user to redistribute an accumulated reward of equity in a first business, to an equivalent cash value of equity in a second business, in response to the user switching loyalty from the first business to the second business and upon indication that the user has selected a selectable interface element (the selectable interface may also be referred to as a redistribution button). In another example, method 5400 may enable a user to automatically invest an accumulated monetary award, which may comprise an amount of fiat currency obtained from the sale of other equity held by the user, or which may have been awarded to the user from a merchant as part of a loyalty rewards program. As used herein, the terms rebalance and redistribute may be used interchangeably. Although method 5400 may be discussed in terms of a single accumulated reward, and in terms of redistributing the single accumulated reward to equity in a single business, it will be appreciated that method 5400 may be used to redistribute a plurality of accumulated rewards to a plurality of shares of stock in a plurality of businesses, or to redistribute a plurality of accumulated rewards to shares of stock in a single business, or to redistribute a single accumulate reward to a plurality of stocks in a plurality of businesses, without departing from the scope of the current disclosure.

In one example, method 5400 may be executed by a loyalty platform, such as loyalty platform 3108, in response to a user selecting a loyalty-switch offer from a first business's loyalty rewards program to a second business's loyalty rewards program, wherein both the first and the second business provide their respective loyalty rewards programs through the loyalty platform. Upon switching loyalties, the user may wish to redistribute an accumulated reward earned from the first business to one or more other areas/investment vehicles.

Figure 75A:
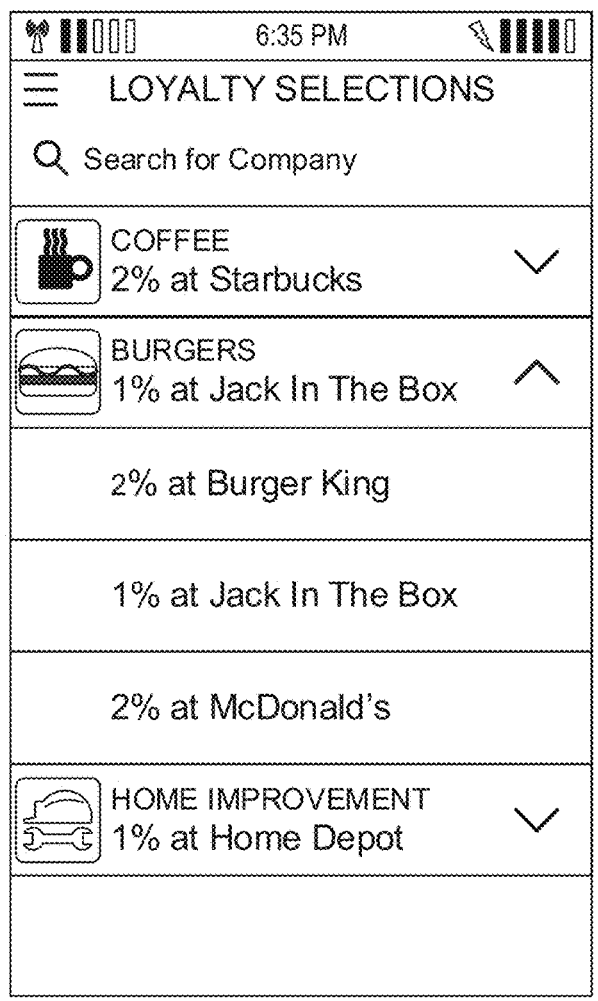
FIGS. 75A and 75B show example graphical user interfaces for presenting options to switch loyalty and receive equity rewards from different businesses.
Figure 75B:
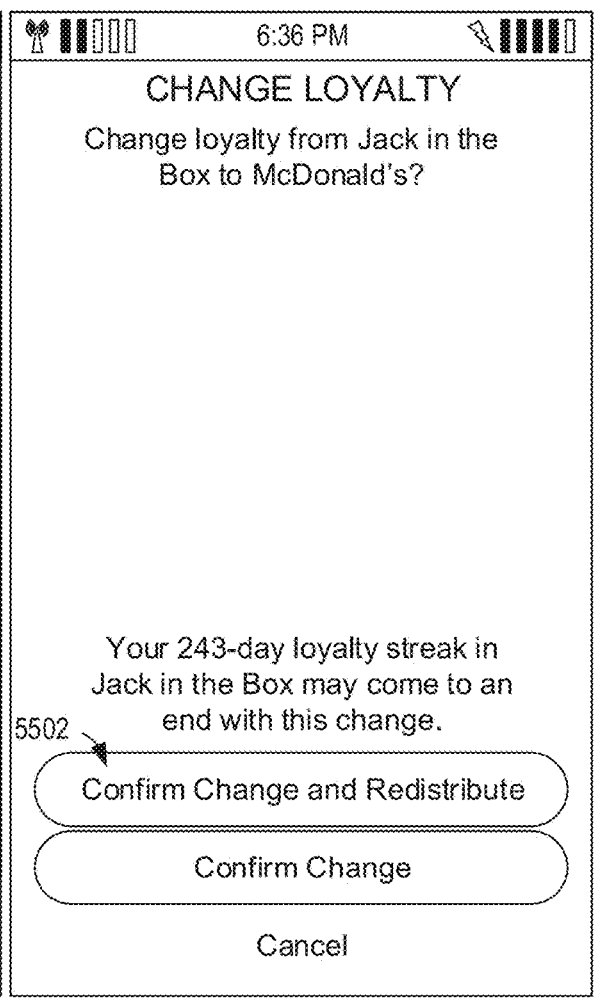

For example, a user may be enrolled in a loyalty rewards program for the first business and may have accrued rewards for the first business over time. However, responsive to a change in preferences (e.g., the user has decreased transactions at the first business, increased transactions at the second business, moved to a different location, etc.) and/or responsive to an offer from the second business, the user may request to begin receiving equity rewards based on purchases made at the second business instead of based on purchases made at the first business. Example user interface pages for providing such an option to the user are shown at 5500a and 5500b of FIGS. 75A and 75B, respectively. For example, as shown in FIG. 75A, the user interface 5500a presents a list of current loyalty rewards program enrollments, as well as an indication of other loyalty rewards programs that are available for enrollment (e.g., for a given category of business/market). User interface 5500b of FIG. 75B may be presented responsive to a selection to change the loyalty rewards program in the "BURGERS" category from a rewards program of a first business (e.g., "JACK IN THE BOX") to a rewards program of a second business (e.g., "MCDONALD'S"). User interface 5500b includes a confirmation of the requested change (e.g., the requested change may be completed responsive to the user selecting "CONFIRM CHANGE").

In another example, a user may have accumulated 2.5 shares of stock in business X and upon switching loyalty from business X to business Y, wherein business X and business Y operate in a same market (as defined by the loyalty platform), the user may wish to convert their 2.5 shares of accumulated stock in business X to an equivalent amount of stock in business Y, wherein "an equivalent amount" will be understood to represent an equivalent monetary amount at the time of execution of trading/execution of the buy and/or sell orders. For example, if the 2.5 shares of stock X are priced at $1.0 at the time of execution of a sell order for the 2.5 shares, and the price of stock Y is $2.0 at the time of execution of a buy order for the shares of stock Y, then it would be said that the 2.5 shares of stock X are equivalent to the 1.25 shares of stock Y at a specific point in time (the point in time at which the price of stock Y is $2.0 per share and the price of stock X is $1.0 per share).

In another example, method 5400 may be executed by a loyalty platform in response to completion of an equity sell order manually initiated by the user. As a more specific example, a user may select to sell a whole or fractional number of shares of stock A, and in response the loyalty platform may place a sell order of the whole or fractional number of shares of stock A via a clearing system. Upon completion of the sale, proceeds of the sale of the whole or fractional number of shares of stock A may be deposited in a user account of the loyalty platform, wherein the proceeds may be referred to herein as a monetary reward. The loyalty platform may then execute method 5400 in order to redistribute the accumulated monetary reward by re-investing the monetary reward in one or more businesses to which the user has made a loyalty selection.

In another example, method 5400 may be executed by a loyalty platform in response to one or more business events or corporate actions, such as a merger, acquisition, public offering, removal of the brand from the loyalty program to prevent future rewards, etc. In one example, a user may have a loyalty selection to business Z, and upon acquisition of business Z by business Y, the user may wish to redistribute an accumulated reward obtained via tracked loyalty purchases made with business Z to one or more other equities.

Method 5400 begins at 5402, where a loyalty platform may control a user interface to present a selectable interface element for redistributing an identified accumulated reward. The user interface may be displayed on a display of a user device, which in some examples may comprise a smartphone, tablet, laptop, desktop computer, gaming device, TV, vehicle entertainment system, etc. The accumulated reward may comprise a reward accumulated by a user through participation in one or more loyalty programs offered by one or more businesses, provided through a loyalty platform, such as those loyalty programs described herein. In one example, the accumulated reward may comprise equity in a first business, accumulated based on purchases made with the first business, wherein the equity may comprise whole or fractional shares of stock in the first business. In another example, the accumulated reward may comprise a monetary reward, which may comprise an amount of fiat currency. In one example, the first business may reward a user with an active loyalty selection to the first business with cash-back rewards based on tracked user purchases. In another example, a user may sell an accumulated amount of equity in the first business and obtain an equivalent amount of currency corresponding to the sale of the equity. Therefore, the identified accumulated reward may comprise equity or a monetary reward.

Figure 77A:
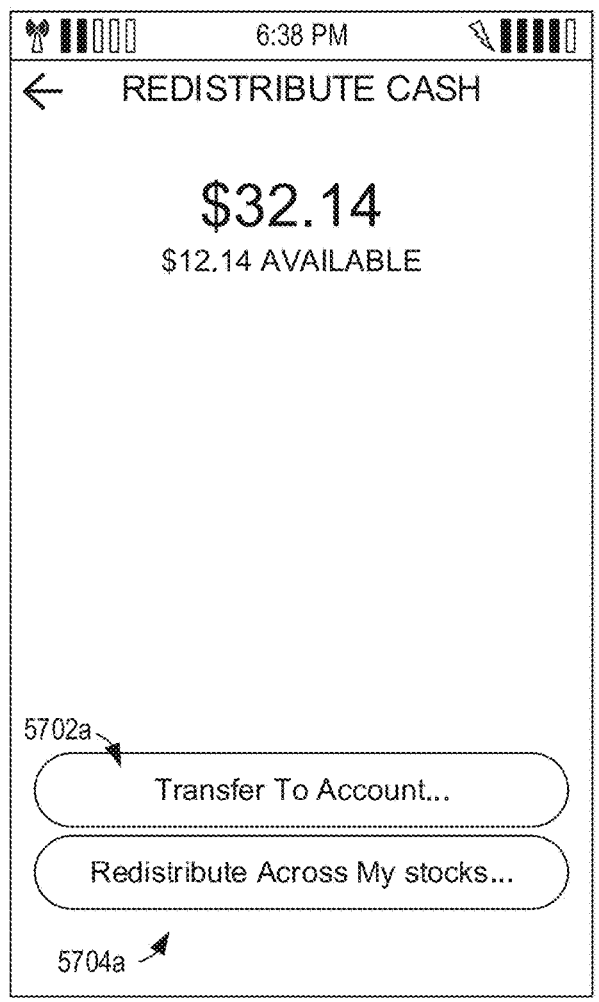
FIGS. 77A, 77B, and 77C show example graphical user interfaces for presenting options to redistribute accumulated cash rewards.
Figure 77B:
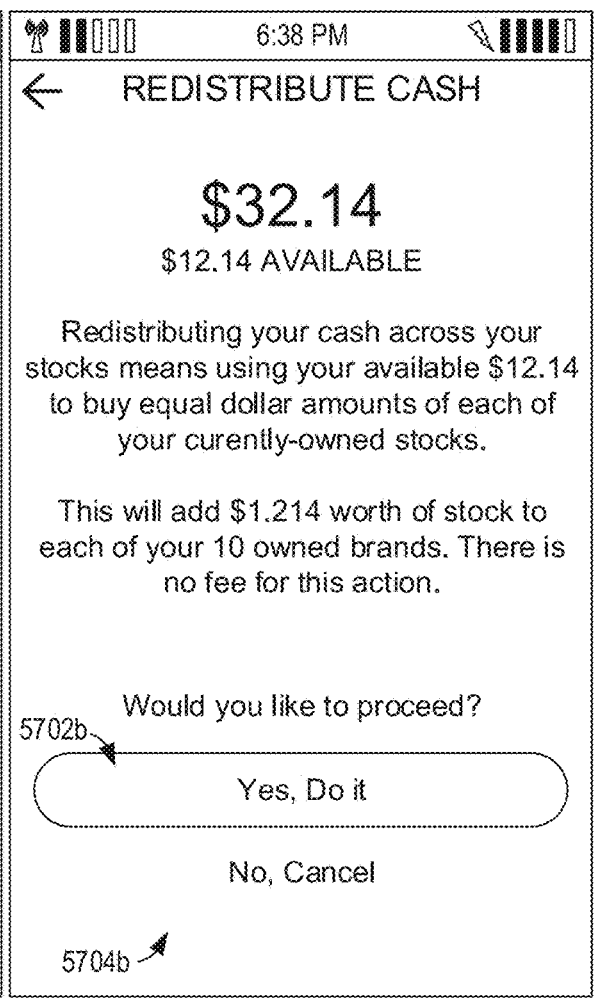

In one example, at 5402, method 5400 includes the loyalty platform displaying a current cash balance (the accumulated monetary reward) stored in a user account, such as is shown in FIG. 77A. Turning briefly to FIG. 77A a user interface 5700a is shown, which is an exemplary user interface for displaying an accumulated monetary reward to a user, such as may be accumulated directly from a business via a cash-back rewards program, an offer the consumer has elected to accept, or after execution of a sell order for an amount of equity acquired from a business as part of an equity based rewards program. User interface 5700a includes transfer button 5702a, which upon selection by the user may initiate a transfer of the monetary reward to an account outside of the loyalty platform. In one example, selection of transfer button 5702a by a user may initiate transfer of an accumulated monetary reward to a bank account of the user. Interface 5700a further includes selectable interface element 5704a, which may also be referred to as redistribution button 5704a. Selection of redistribution button 5704a may cause the loyalty platform to display user interface 5700b via a user device, as shown in FIG. 77B.

Figure 77C:
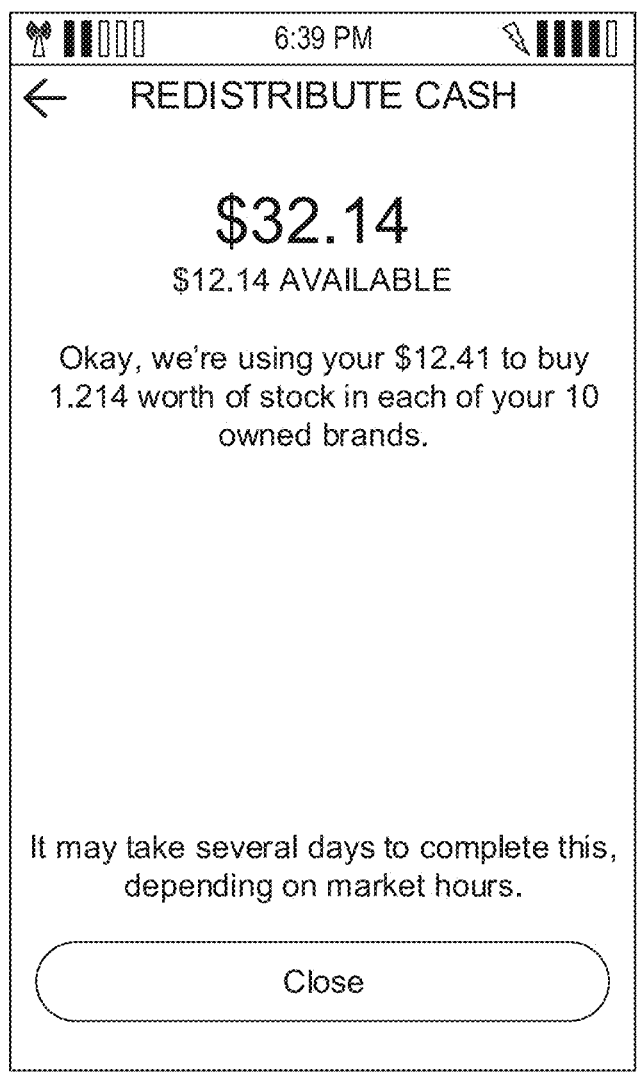
Figure 78:
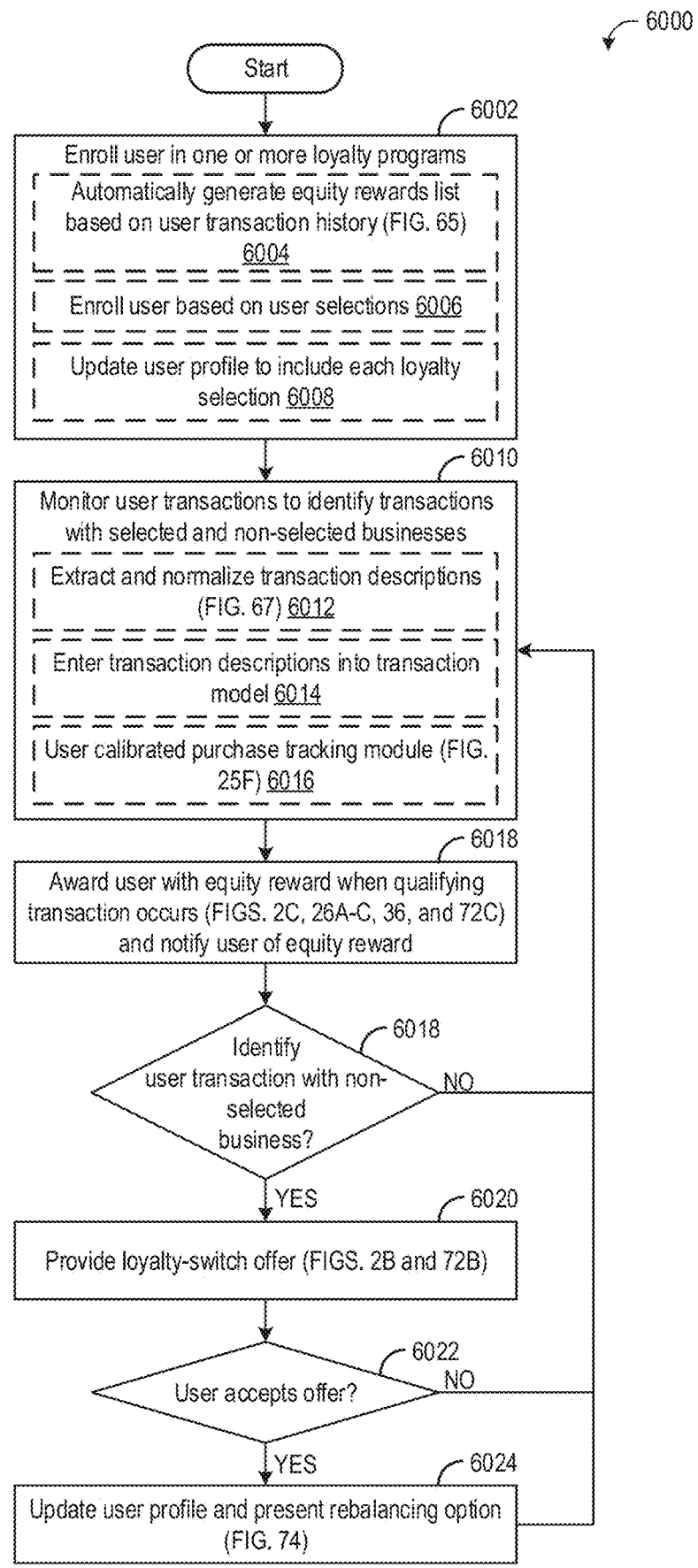
FIG. 78 is a flow chart illustrating a method for enrolling a user in loyalty programs and distributing equity rewards to the user according to embodiments of the present disclosure.

User interface 5700b may include information regarding the redistribution of the monetary reward, such as an indication of how/where the monetary reward will be redistributed, as well as how much of the monetary reward will be allocated to each of the one or more businesses/investments into which the monetary reward is to be redistributed. User interface 5700b includes confirmation button 5702b, which comprises a selectable interface element for confirming a user's choice to redistribute the indicated monetary reward amongst the one or more indicated businesses/investments/locations listed. In one example, the one or more businesses into which the monetary reward is to be redistributed may have been pre-selected by a user, or may be selected automatically by the loyalty platform based on one or more criteria, such as user's current loyalty selections. In one example, a user may select to redistribute accumulated rewards to a subset of the brands/businesses to which the user is loyal, and user interface 5700b may indicate the previously selected subset of brands/businesses as the destination of the accumulated monetary reward. In one example, a user may pre-select a preference to distribute accumulated rewards to a top 10 most frequented brands, wherein the top 10 most frequented brands may be the 10 brands to which the user has an active loyalty selection, and with which the user makes the most purchases (quantified either in terms of purchase frequency, or in terms of dollar amount). User interface 5700b also includes cancellation button 5704b, which may be configured to return a user to a home screen or other pre-determined interface, without initiating redistribution of the accumulated monetary reward. In other words, selection of cancellation button 5704b by a user may cause the loyalty platform to maintain the accumulated monetary reward in an account of the user on the loyalty platform. If the loyalty platform receives an indication that the user has selected confirmation button 5702b, the loyalty platform may proceed to display user interface 5700c, as shown in FIG. 77C, via the user device.

User interface 5700c provides visual confirmation to the user that the redistribution process of the accumulated monetary reward has been initiated, and further, user interface 5700c may indicate one or more details of the redistribution process. In the example shown in FIG. 77C, user interface 5700c indicates that the accumulated monetary reward is being evenly apportioned amongst the plurality of indicated brands/businesses and used to purchase equal dollar amounts of stock in each of the indicated businesses.

In another example, at 5402, method 5400 may include controlling a user interface of a user application to present a selectable interface element for rebalancing a loyalty rewards platform account for the user. For example, the selectable interface element may be presented on the confirmation screen of user interface 5500b of FIG. 75B, as shown at 5502. In other examples, the selectable interface element may be presented after a user confirms the request to change loyalty (e.g., the interface element at 5502 may be removed from the user interface 5500b, and a pop-up window or other interface page may be shown with a similar interface element after the user selects the "Confirm" option).

At 5404, the method includes determining whether the user selects the redistribution button/rebalancing interface element. If the user does not select the rebalancing interface element (e.g., "NO" at 5404), the method includes maintaining the user's accumulated reward (e.g., the accumulated equity in the first business or the accumulated monetary reward), as indicated at 5406. For example, the user's accrued equity in the first business may not be sold unless further input specifically requesting such a sale is received. In another example, a user's accumulated monetary reward may be maintained within an account of the loyalty platform until a user takes further action. The method may then return to wait for further input.

If the user does select the redistribution button/rebalancing interface element (e.g., "YES" at 5404), method 5400 may proceed to step 5408, where the type of accumulated reward is determined. If the accumulated reward does not comprise an equity based reward, such as fractional and/or whole shares of stock in a first business, and instead comprises a monetary reward (e.g., "NO" at 5408), method 5400 may proceed to calculate an amount of equity in at least a second business that can be purchased with the accumulated monetary reward, as at 5410. Method 5400 may then proceed to bypass steps 5412, 5414, and 5418 (which are directed to liquidating equity rewards) and proceed directly to step 5420, which includes generating buy orders for the calculated amount of equity in the second business.

If the accumulated reward does comprise equity in a first business, (e.g., "YES" at 5408), the method includes generating sell orders for identified and marketable equity in the first business, as indicated at 5412. For example, marketable equity may refer to equity that is eligible to be sold. For example, where the equity includes shares of stock, marketable equity may include shares which have not been previously sold, but not yet settled, shares which are not in a pending or unsettle status, and/or shares which are not subject to restrictions such as corporate actions that may place a hold on the stock/shares. The generated sell orders may include sell orders for all or a subset of identified and marketable equity in the first business (e.g., all equity in the first business that the user has accrued and that is eligible to be sold), based on user preferences. At 5414, the method includes routing the sell orders to an order management process for execution during market hours. For example, as indicated at 5416, the method may include queueing orders received outside market hours so that the orders may be executing during a following market period (e.g., at a start of the immediately following market period).

At 5418, the method includes, upon execution of the sell orders, determining proceeds of the sale of equity and calculating an amount of equity of the second business that can be purchased with the proceeds. For example, a monetary value of the sale of equity in the first business may be converted to an equivalent amount of equity (e.g., including full and/or partial shares) in the second business based on a current market value of the equity in the first business.

At 5420, the method includes generating buy orders for the calculated amount of equity in the second business. As the buy orders may be generated and executed as soon as the sell orders are executed at 5418, the buy orders may not be queued for market hours (e.g., since the sell orders are executed during market hours, the buy orders should already be generated during market hours). In this way, the buy orders may be executed as soon as the sell orders are executed, reducing or removing the opportunity for market price changes between selling and buying equity, and avoiding the incomplete or rejected equity investments. In another example, the buy orders may be placed substantially immediately after calculation of the amount of equity of the second business that can be purchased with the accumulated monetary reward, as at 5410. After 5420, method 5400 may proceed to 5422.

At 5422, the method includes sending a notification to a user that rebalancing has been performed. For example, the notification may be sent upon execution of the buy orders generated at 5420. In other examples, notifications may be provided to the user (e.g., via a graphical user interface of a loyalty rewards platform application executed on a user device) throughout the rebalancing process to update the user on the status of the rebalancing.

The above method may also be performed to rebalance the loyalty rewards platform account of a user when the user requests multiple loyalty changes at once (e.g., simultaneously or nearly simultaneously). When multiple loyalty changes are received, the method may provide even further time and user input savings, as one or more portions of the method may be performed simultaneously for multiple loyalty changes. In order to illustrate a multiple loyalty change scenario, the following non-limiting example is provided.

In a first state, a user may have accrued equity in Old Businesses A, B, and C. For example, the user may have accrued 1 share of Business A, valued at $100, 1.5 shares of Business B, valued at $235.50, and 0.5 shares of Business C, valued at $26.30. In a second state, the user may decide to change loyalty from the Old Businesses to respective New Businesses 1, 2, and 3. For example, the user may request to change loyalty (e.g., change enrollment in associated loyalty equity rewards programs) from Business A to Business 1, from Business B to Business 2, and from Business C to Business 3. For example, Businesses A and 1 may be in a first category/market (e.g., home improvement stores), Businesses B and 2 may be in a second category/market (e.g., fast food restaurants), and Businesses C and 3 may be in a third category/market (e.g., coffee shops). The user may indicate the requested loyalty changes via user input to a loyalty rewards platform application.

In a third state, at a "confirm loyalty selections" screen of a user interface in the application and/or responsive to another triggering event, a user interface element (e.g., button) may be presented to offer the choice to automatically sell the full position (e.g., all equity) in each of the Old Businesses A, B, and C and use the complete proceeds of those sales to purchase equity (e.g., full and/or partial shares) in each of the New Businesses 1, 2, and 3. Disclosure language may be presented noting that loyalty rebalancing is done at the request of the user and is not an investment recommendation. If the user selects not to take the offer (e.g., does not press the button, or presses a "NO" or rejection option related to the button), then no action may be taken with regard to current positions/equity for the Old Businesses. In this way, the user may keep the accrued equity in the Old Businesses, but may not accrue any further equity unless the user switches back to being enrolled in respective loyalty programs for the Old Businesses.

If the user selects to take the offer (e.g., presses the button, or presses a "YES" or affirmation option related to the button), then the following actions may be taken:

Sell orders are generated for all identified and marketable Old Business equity (e.g., stock positions).

The autogenerated sell orders are routed to an order management system for execution during market hours (instructions received outside of market hours will be queued for execution during the following market period).

For example, orders are autogenerated to sell 1 share of Business A, market value at $100, 1.5 shares of Business B, market value at $235.50, and 0.5 shares of Business C, market value at $26.30.

Upon execution (e.g., trade date) of the autogenerated sell order, the loyalty rewards platform may recognize the proceeds of the sell and calculate the amount of shares of the New Businesses 1, 2, and 3 that can be purchased at the current market prices.

Buy orders are generated for equity in New Businesses 1, 2, and 3 (e.g., stock positions).

For example, orders are autogenerated to buy: 0.50632 shares of Business 1, market valued at $100, 14.1187 shares of Business 2, market valued at $235.50, and 0.37771 shares of Business 3, market valued at $26.30.

Upon execution of the autogenerated buy order, an electronic notification is sent to the user informing the user that the rebalancing has been performed.

The settling of all equity may take time to complete. Accordingly, a fourth state may be entered after loyalty rebalancing, in which orders have been entered and executed to sell the above equity of the Old Businesses and to buy the above equity of the New Businesses (e.g., at time T). Trade confirmations may be made available in the loyalty rewards platform application document center (e.g., at a time T+1). Trades may settle at a time T+2. A fifth state may correspond to the completion of the loyalty rebalancing (e.g., at time T+3). In the fifth state, the equity of the Old Businesses may no longer be in the user's loyalty rewards platform account, and the equity of the New Businesses may be in the user's loyalty rewards platform account and meet the above-described definition of "marketable" (e.g., eligible to be sold).

In the above example, the rebalancing ensures that the same market value of equity is provided for a given pair of Old/New Businesses (e.g., $100 worth of equity in Old Business A is sold, and $100 worth of equity in associated new Business 1 is bought). In other examples, different distributions of equity may be purchased after selling equity in the Old Businesses. For example, $100 worth of equity in Old Business A may be sold, and $50 worth of equity in New Business 1 may be bought, whereby the remaining $50 is used to buy equity in one or both of New Businesses 2 and 3, or cashed out to a linked bank account associated with the user. In some examples, equity may only be purchased for a subset of the New Businesses and not purchased for remaining New Business(es). The distribution of the proceeds from selling equity in Old Businesses (e.g., businesses to which a user is loyal to before changing loyalty/rebalancing; businesses corresponding to rewards programs in which the user is enrolled before changing loyalty/rebalancing) may be selected by a user, predefined according to previously-entered user preferences, selected based on historical market performance of the New Businesses (e.g., businesses to which the user switches loyalty; businesses corresponding to rewards programs in which the user is enrolled after changing loyalty/rebalancing), selected based on prior transactions of the user, and/or based on any other criteria. For example, a percentage of the proceeds from selling the equity of the Old Businesses may be based on a frequency and/or monetary value of transactions performed at each of the associated New Businesses. As a more detailed example, a largest portion of the proceeds may be used to purchase equity in a New Business at which the user has spent the most money within a recent timeframe. Any combination of the above factors may be used to determine an amount of equity to purchase for one or more New Businesses.

Figure 76:
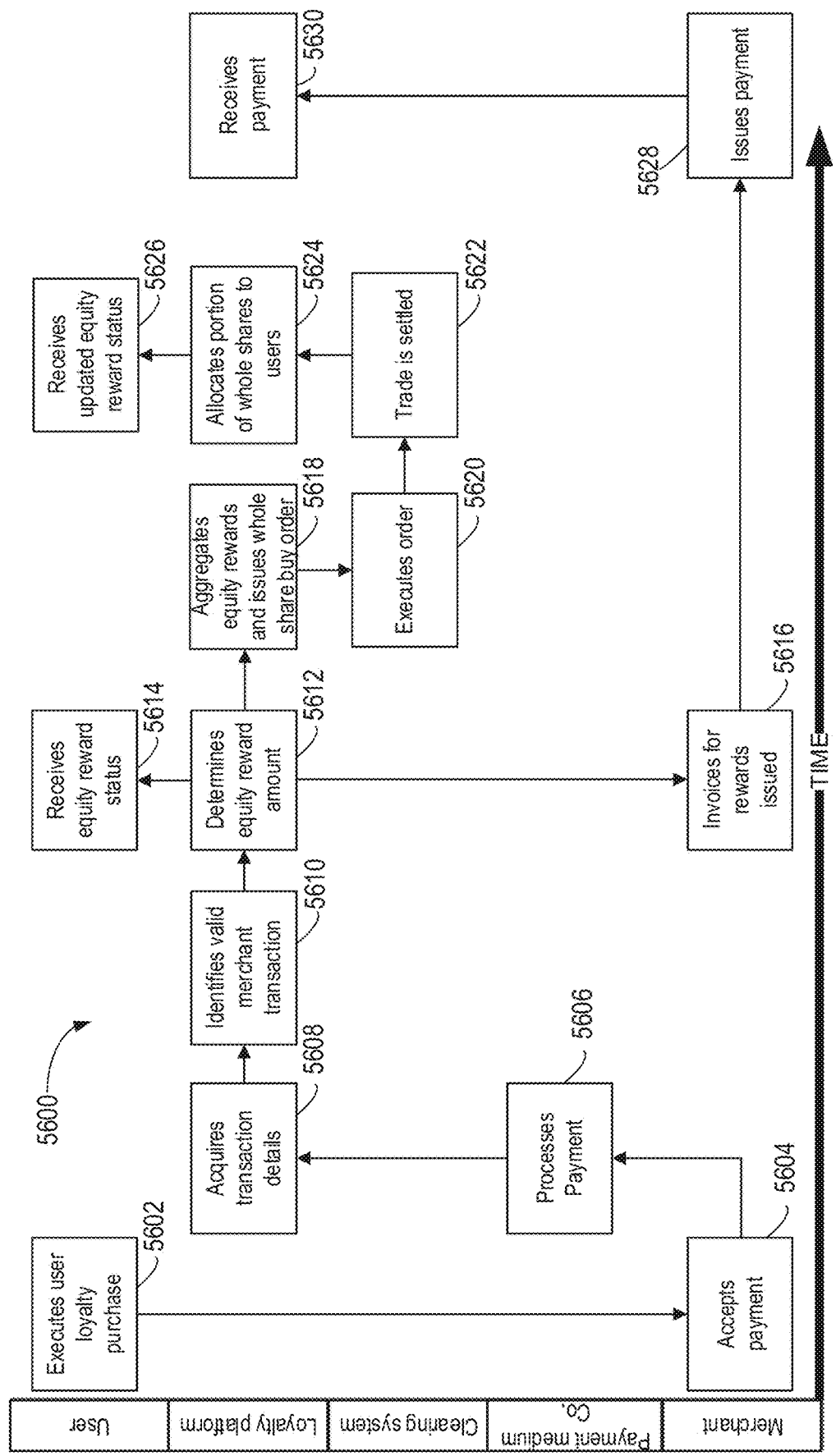
FIG. 76 shows an example timeline for distributing fractional equity rewards to users of the loyalty platform.

Turning now to FIG. 76 an example method 5600 for distributing fractional shares of stock to users of a loyalty platform based on tracked user loyalty purchases is shown. For example, method 5600 may be executed in order to distribute rewards to users that have enrolled in associated loyalty rewards programs using method 5400 described above with respect to FIG. 74. On the left side of FIG. 76, a column is displayed which indicates what agent/system performs a given step of the method. A step, indicated by a box in the flowchart, horizontally aligned (such as within a same row of a matrix) with an agent/system in the left hand column may be considered to be performed by that agent/system for purposes of example method 5600. As a specific example, step 5628 of method 5600 is horizontally aligned with "Merchant", which indicates that step 5628 is conducted by a business registered with the loyalty platform, which may herein also be referred to as a merchant. Running along the bottom of FIG. 76, is an arrow labeled "TIME", this arrow indicates the chronology of the steps of method 5600, with steps to the right occurring later, steps to the left occurring earlier, and steps vertically aligned occurring substantially concurrently, or within a threshold duration of time of one another. For example, steps aligned vertically may occur within the same 24 hour duration of time.

Method 5600 begins at 5602, wherein a user executes a user loyalty purchase using a linked payment medium. The linked payment medium may comprise a credit card, debit card, other payment card, cellphone based payment app, NFC based payment system, or other types of electronic payment systems which may provide a digital record of a transaction.

Step 5604 of method 5600 includes the payment being accepted by the merchant. The merchant in this example comprises a business registered with the loyalty platform, and to whom the user (as indicated by the "user" in the left hand column of FIG. 76), has made a loyalty selection (wherein the loyalty selection may be stored in a user account associated with the user on non-transitory memory of one or more computing systems implementing a loyalty platform). Once the user's payment is accepted by the merchant, method 5600 may proceed to step 5606.

At step 5606, method 5600 may include the payment medium company processing the payment made during the user loyalty purchase. For example, in the case that the linked payment medium comprises a credit card, step 5606 may comprise the credit card company processing the new charge made by the account (the account in this example referring to a user account within the credit card company) to which the user loyalty purchase was charged, and from which funds were obtained to complete the purchase. Processing of the payment may include recording one or more details associated with the user loyalty purchase, such as a date, time, and physical location of the purchase. Once the payment has been processed by the payment medium company, method 5600 may proceed to step 5608.

At step 5608, method 5600 includes the loyalty platform receiving transaction details associated with the user loyalty purchase. In one example, a third party data aggregator may compile and transmit purchase details from a plurality of different payment medium companies, such as various banks, credit card companies, etc. In another example, the payment medium company may provide purchase details directly to the loyalty platform. Method 5600 may then proceed to step 5610.

At step 5610, method 5600 includes identifying if a valid user loyalty purchase occurred based on the tracked purchase details. In one example, purchase details may be correlated with a database associated with the loyalty platform, such as rewarding-business index 3186, to ascertain if the business at which the purchase occurred is registered with the loyalty platform, and currently offering fractional equity rewards to users. Further, step 5610 may include looking up a user's loyalty selections, such as by identifying which user account is associated with a tracked purchase (which may be accomplished by determining which account registered a payment medium used to conduct the transaction) and then determining if the user has an active loyalty selection to the business with which the purchase was executed. If at 5610 it is determined that a valid user loyalty purchase occurred, method 5600 may proceed to step 5612.

At step 5612, method 5600 includes determining/calculating a fractional share amount (a fractional equity reward) to reward the user based on the tracked user loyalty purchase. The determination may be based on a duration of user loyalty selection to the business, a transaction history of the user, a dollar amount (monetary value) of the purchase, and reward policies of the business, stored within the loyalty platform. Once a fractional share amount to reward the user has been determined, method 5600 may proceed to step 5614.

At step 5614, method 5600 includes displaying an equity reward status to the user. In one example the equity reward status may include an indication of fractional share amount to which the user is now entitled based on the recently conducted user loyalty purchase, the equity reward status may further include an indication of a timing of distribution of the fractional share amount. Method 5600 may then proceed to step 5616.

At step 5616, method 5600 includes invoicing the merchant for the dollar amount of the fractional equity reward, the invoice may further include one or more charges, such as a service fee for the loyalty platform. Method 5600 may then proceed to step 5628, which includes the merchant issuing a payment to the loyalty platform based on the invoice. At step 5630, the loyalty platform may receive the payment from the merchant, and may allocate the received funds. In one example, a portion of the funds may be allocated to a merchant deposit account to provide future rewards of the merchant with fractional equity rewards based on user loyalty purchases.

Returning to step 5612, method 5600 may also proceed to 5618, which includes the loyalty platform aggregating fractional equity rewards and issuing a whole share buy order with a clearing system based on the aggregated rewards. Fractional equity rewards aggregated together may comprise shares of stock in a given business, so that pending fractional equity rewards of stock X are aggregated together into a first aggregate amount, while pending fractional equity rewards of stock Y are aggregated together into a second aggregate amount, but the first and second amounts may not be aggregated together, and no aggregate amount of a mixed stocks may occur. The amount of the whole share buy order may be determined as discussed in more detail above. As one example, the whole share buy order may comprise a number of whole shares within one share of the amount of aggregated fractional equity rewards. As a specific example, based on pending fractional equity reward amount of 2.35 shares of stock X, a whole share buy order of 3.0 shares of stock X may be placed. The 3.0 shares is the rounded-up amount of the aggregated pending fractional equity rewards. Method 5600 may then proceed to step 5620

At step 5620, method 5600 includes a clearing system executing the whole share buy order placed in step 5618. Method 5600 may then proceed to 5622. At step 5622, method 5600 includes the whole share buy order being filled. Method 5600 may then proceed to step 5624.

At step 5624, method 5600 includes the loyalty platform receiving from the clearing system the purchased amount of whole shares. The purchased amount of whole shares my deposited within an average price account of the loyalty platform, and may subsequently be allocated to a plurality of users to satisfy pending fractional equity rewards of the plurality of users. This may include first transferring a portion, equal to the aggregated pending fractional equity rewards, from the average price account to a merchant facilitation account, before apportioning the portion in the merchant facilitation account amongst the plurality of users. A fractional remainder of shares leftover after satisfying the pending fractional equity rewards may be purchased by, and stored within, an inventory account of the loyalty platform. Method 5600 may then proceed to step 5626.

At step 5626, method 5600 includes displaying an updated equity reward status to a user via a display of a user computing device. The updated equity reward status may indicate that an amount of fractional equity has been transferred to an account associated with the user. The updated equity reward status may further include updated totals for equity held within the account of the user on the loyalty platform. Method 5600 may then end.

A technical effect of the disclosed systems and methods is an increase in efficiency and reduction of user input involved in switching one or more loyalty rewards programs for one or more businesses in which a user is enrolled. For example, the disclosed systems and methods may simultaneously coordinate the buying and selling of equity in one or more businesses responsive to the user requesting the switch between loyalty rewards programs.

FIG. 77 shows a flow chart illustrating a method 6000 for enrolling a user in one or more loyalty programs and awarding the user with equity rewards. Method 6000 may be stored in non-transitory memory of a computing system implementing a loyalty platform, such as computing system 180 (executing loyalty platform 108), system 2170 (executing loyalty platform 2108), and/or computing system 3180 (executing loyalty platform 3108), and one or more, or all, of the steps of method 6000 may be automatically executed by the loyalty platform, or by one or more subcomponents, modules, databases, or subsystems of the loyalty platform.

At 6002, a user is enrolled in one or more loyalty programs via the loyalty platform. The user may be enrolled according to a suitable process as described in the previous embodiments. In one example, upon registering with the loyalty platform, the user may be presented with an equity rewards list that comprises one or more businesses with which the user has previously frequented or otherwise made transactions. Thus, as indicated at 6004, enrolling the user may include automatically generating an equity rewards list based on a user transaction history. The generation of the equity rewards list may be performed as described above with respect to FIG. 65. When the user is presented with the equity rewards list, the user may select one or more or each of the businesses on the equity rewards list, and the loyalty platform may enroll the user in a respective loyalty program for each selected business. Thus, as indicated at 6006, enrolling the user may include enrolling the user based on user loyalty selections, such as the user selections of the businesses in the equity rewards list. In some examples, the user may make loyalty selections to businesses by searching for desired businesses via the loyalty platform or via other mechanisms. Once the user has selected one or more businesses, the user's profile or account (stored as part of the loyalty platform) is updated to include each loyalty selection, as indicated at 6008. It is to be appreciated that the user may select from among businesses listed in the rewarding-business index of the loyalty platform. Further, the user may select only certain businesses based on the market(s) that each business belongs to. For example, if the user selects a first business that is included in a first market of the rewarding-business index, the selection of the first business may exclude the user from being enrolled in a loyalty program of a second business in the first market, as explained above with respect to FIGS. 2A-2C and 4, among other disclosure herein.

At 6010, user transactions are monitored to identify transactions with selected businesses and non-selected businesses of the loyalty platform. The selected businesses may include the businesses listed in the rewarding-business index to which the user has made a loyalty selection (e.g., and thus the user is enrolled in the loyalty programs administered by the loyalty platform for those businesses). The non-selected businesses may include businesses listed in the rewarding-business index to which the user has not made a loyalty selection. The user transactions may include financial transactions made by the user with one or more linked payment media. The monitoring of the user transactions may be performed automatically on transaction data that, in some examples, is provided to the loyalty platform via a third-party aggregator, as described previously. In some examples, additionally or alternatively, the transaction data may include data from financial institutions, data from point of sales units at the businesses, data from payment processing services, or other sources of transaction data. Thus, the loyalty platform may receive transaction data, for the user and all other users registered with the loyalty platforms, in different formats, formatting styles, and the like, due to the transaction data being received from third-party aggregators, financial institutions, point of sale units, etc., which may use different hardware and/or software to track and then report the transaction data. To facilitate faster and more efficient processing of the transaction data, the loyalty platform may extract select information from the transaction data and use the extracted data to identify which transactions of the transaction data occurred with which businesses. Accordingly, monitoring the user transactions may include, as indicated at 6012, extracting and normalizing transaction descriptions from the transaction data, which may be performed as described above with respect to FIG. 67. For example, each transaction description may be extracted from the transaction data, each transaction description may be normalized by parsing each transaction description based on known formatting styles and recognized portions of each transaction description, and, based on the extracted and normalized transaction descriptions, each business (listed in the rewarding-business index) that is associated with a transaction listed in the transaction data may be identified.

In some examples, additionally or alternatively, monitoring the user transactions may include entering the transaction descriptions into a transaction model, as indicated at 6014. The transaction model may be trained to produce as an output, for each transaction description, a probability rank for one or more or each of the businesses stored within the rewarding business index of the loyalty platform based on the transaction data or extracted transaction descriptions. The business with the highest probability rank may be identified as the business listed in the transaction description, e.g., the business with which the transaction occurred. In some examples, the transaction model includes a feature extractor to extract one or more features from the transaction data and use the one or more features as input to produce the output. The one or more features that are extracted may include a description of the transaction, a geolocation of the transaction, and/or the purchase amount for the transaction. The transaction model may be trained with previous transaction data for the user and/or historical transaction data for other users, and may be a neural network or another suitable machine learning or artificial intelligence model. To generate the probability rank, the transaction model may be trained to associate each business with a confidence score that reflects the level of confidence the transaction model has that the transaction was between the user and that business, and then rank the businesses based on each confidence score. In some examples, if each confidence score is below a threshold (e.g., below 50% confidence or other suitable threshold), the transaction model may submit the financial transaction for an elevated review, which may be performed by a different AI/machine learning model or may be performed manually by an expert. In either example, the transaction model may be updated based on results of the elevated review, e.g., the weights or biases of the transaction model may be updated so that the model may more accurately identify the business in the future. The transaction model may be trained and perform as described above with respect to FIG. 67.

Additionally, as described previously, the purchase tracking module of the loyalty platform may perform the monitoring of the user transactions. In some examples, the purchase tracking module may be calibrated on a per-business basis in order to increase the accuracy of the monitoring of the user transactions and identifications of the businesses represented in the transaction data. Thus, the user transaction monitoring described herein may be performed by a calibrated purchase tracking module, as indicated at 6016. The purchase tracking module may be calibrated for each business according to the method described above with respect to FIG. 25F, for example. As explained above, the calibrating may include, for each business, providing that business with a list of transactions made with a selected payment medium associated with that business, associating one or more transactions from the list of transactions with that business based on feedback from that business, and mapping a transaction description of the one or more transactions to that business. The mapping may be stored and used in subsequent transaction monitoring.

At 6018, the user is awarded with an equity reward when a qualifying transaction occurs and the user is notified (e.g., via a notification or status update displayed on a display of a computing device associated with the user) of the equity reward. The qualifying transaction may be a transaction that is identified by the purchase tracking module (e.g., as described at 6010) as occurring between the user and a selected business (e.g., a business to which the user has made a loyalty selection and thus the user is enrolled in that business's loyalty program administered by the loyalty platform). The equity reward that is awarded to the user may be based on the amount of the qualifying transaction and the specific reward policies of the selected business/the selected business's loyalty program. The equity reward may include stock in the business, a success-linked crypto asset, a discount, a cash reward, or other suitable reward. The equity reward may be administered/awarded to the user according to the processes described above with respect to FIGS. 2C, 26A-C, 36, and/or 72C.

At 6018, the loyalty platform determines if any user transactions with non-selected businesses (listed in the rewarding-business index) have been identified. For example, the purchase tracking module may identify a transaction between the user and the second business described above (where the user does not currently have a loyalty selection to the second business and thus is not currently enrolled in a loyalty program for the second business). If the loyalty platform/purchase tracking module does not identify a transaction between the user and a non-selected business, method 6000 continues back to 6010 to monitor the user transactions and award the user with equity rewards when qualifying transactions are identified. If the loyalty platform does identify a user transaction with a non-selected business, method 6000 proceeds to 6020 to provide a loyalty-switch offer to the user. As explained previously, if the user is loyal to a particular business in a market (e.g., the first business described above), transactions occurring between the user and other, non-selected businesses in that same market (e.g., the second business) may not qualify the user for an equity reward. This approach may foster loyalty to the selected business. However, a user may decide that the non-selected business offers better rewards or that the user is more likely to frequent the non-selected business than the selected business. Thus, the loyalty platform may offer the user the opportunity to switch loyalty to the non-selected business via the loyalty-switch offer. The loyalty-switch offer may be provided to the user according to the methods described above with respect to FIGS. 2B and 72B, at least in some examples. Further, in some examples, when the loyalty platform identifies a transaction between the user and a non-selected business, the loyalty platform may offer the user the opportunity to enroll in the loyalty program for the non-selected business without causing the user to switch loyalty from another, selected business. For example, the user may have a loyalty selection to the first business in the first market (which may be coffee, as a non-limiting example), and the second business may be in a different market (e.g., pizza) to which the user currently has no loyalty selections. Thus, in such examples, a loyalty selection (rather than a loyalty switch) may be provided.

At 6022, the loyalty platform determines if the user has accepted the loyalty-switch offer (or alternatively, the loyalty offer). If the user does not accept the loyalty-switch offer (e.g., the loyalty platform receives an indication that the user has turned down the loyalty-switch offer), method 6000 continues back to 6010 to monitor the user transactions and award the user with equity rewards when qualifying transactions are identified, without making any changes to the user's selected loyalties. If the user does accept the loyalty-switch offer (or loyalty offer), method 6000 proceeds to 6024 to update the user profile or account on the loyalty platform to reflect the updated loyalty. For example, the user may be removed from the loyalty program of a selected business (e.g., the first business) and enrolled in the loyalty program of the unselected business (e.g., the second business), or the user may be enrolled in the loyalty program of the unselected business without affecting existing loyalty selections/enrolled loyalty programs. In some examples, when the user accepts the loyalty-switch offer, the user may be provided with an option to rebalance equity from the original selected business to the newly-selected business, and thus 6024 may include presenting a rebalancing option, which may be performed as explained above with respect to FIG. 74. For example, the rebalancing may include generating one or more sell orders for equity in the selected business accrued by the user via the loyalty program of the selected business; transmitting the one or more sell orders to a clearing system for execution; upon execution of the one or more sell orders, determining proceeds of an associated sale of the equity in the selected business; calculating an amount of equity in the non-selected business corresponding to the proceeds of the sale of the equity in the selected business; generating buy orders for the calculated amount of equity in the non-selected business; and presenting a notification to the user that the rebalancing of equity in the loyalty rewards platform account has been performed. In some examples, placing the one or more sell orders may include aggregating a fractional share of stock in the selected business (accrued by the user) with one or more additional fractional shares of stock in the selected business to form an aggregate amount of shares of stock; and placing the one or more sell orders to sell the aggregate amount of shares of stock in the selected business using the clearing system. In some examples, the calculated amount of equity in the non-selected business may be a fractional share of stock associated with the non-selected business. When the user does not request the rebalancing of equity in the loyalty rewards platform account, the equity in the original selected business accrued by the user via the loyalty program of the selected business may be maintained. In some examples, providing the rebalancing offer may include displaying an interface element on a display of the user's computing device. The interface element may be a single button that is selectable to perform the rebalancing.

Method 6000 continues back to 6010 to monitor the user transactions and award the user with equity rewards when qualifying transactions are identified. In this way, user transactions may be continuously monitored as the transaction data is received.

Disclosed herein are systems and methods which may enable enhanced efficiency of distribution of fractional equity rewards to users with a reduced probability of reward delay, a more efficient method of controlling the supply of equity within an inventory account, and reduced user frustration owing to uncertainty regarding when earned rewards will be distributed. In a first example, a method comprising: aggregating a plurality of dollar reward amounts, wherein the plurality of dollar reward amounts are based on a plurality of tracked user loyalty purchases; displaying an equity reward status to one or more user computing devices associated with one or more of the plurality of tracked user loyalty purchases; executing a whole share purchase based on the aggregated dollar reward amounts exceeding a pending reward threshold; determining a plurality of fractional share amounts based on an execution price of the whole share purchase and the plurality of dollar reward amounts; distributing the plurality of fractional share amounts to a plurality of user accounts from a pre-purchased supply of shares in an inventory account of a loyalty platform; and displaying an updated equity reward status to the one or more user computing devices.

In this way, fractional shares of stock may be distributed to users in a timely manner based on tracked user loyalty purchases using a loyalty platform, while reducing risk associated with maintaining a large inventory of stock (wherein the risk may include a financial risk associated with holding equity), and while informing users of the status of their pending fractional equity rewards, thereby reducing user frustrations associated with potential reward delays. As an example, by distributing the plurality of fractional share amounts to a plurality of user accounts from a pre-purchased supply of shares in an inventory account, of a loyalty platform, a reward may be rapidly distributed to a user based on an automatically tracked user loyalty purchase. In another example, by providing the user with an equity reward status, which may comprise a graphical user interface displaying an amount of fractional shares earned as a reward for a user loyalty purchase, along with an estimated reward fulfillment time for the reward, user behavior may be more effectively incentivized via the fractional equity reward.

In a second example, the pre-purchased supply of shares in the inventory account of the loyalty platform may be maintained based on an upper supply threshold and a lower supply threshold, wherein the upper supply threshold and the lower supply threshold are determined based on a running average rate of fractional equity rewards distributed to user accounts from the inventory account, and the upper supply threshold and the lower supply threshold are adjusted based on a predicted event, such as an upcoming holiday, sale, promotional event, or other event which may influence the rate of accrual of pending fractional equity rewards by users of the loyalty platform. In this way, the pre-purchased supply of shares in the inventory account may be dynamically adjusted such that a sufficient amount of pre-purchased shares of stock are available to satisfy pending fractional equity rewards, while reducing the probability of an unnecessarily large supply of equity being held within the inventory account, which may result in added financial risk, or regulatory burden.

Figure 80:
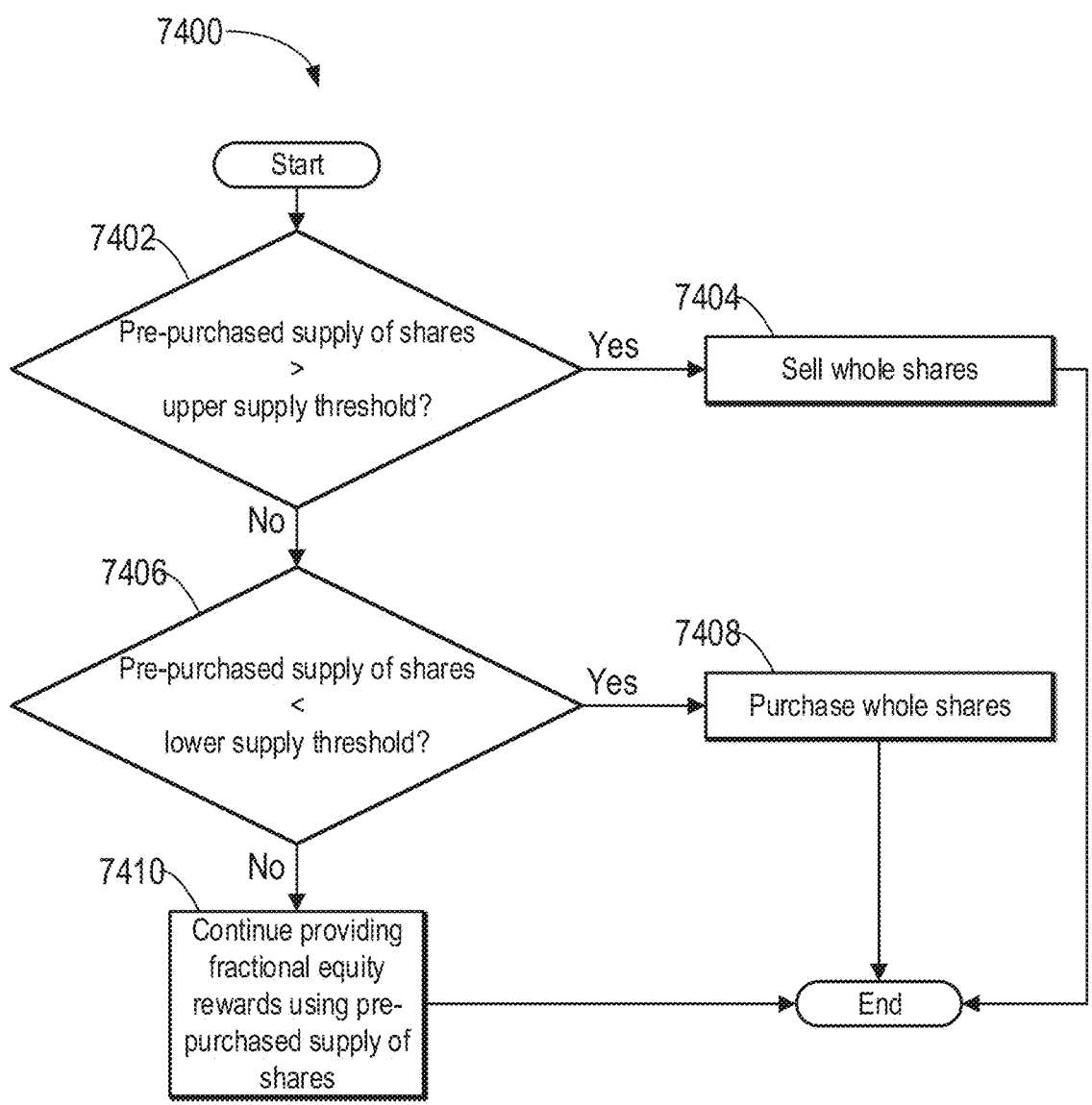
FIG. 80 shows a high level flowchart of a method for dynamically controlling the pre-purchased supply of shares within an inventory account of the loyalty platform.
Figure 81:
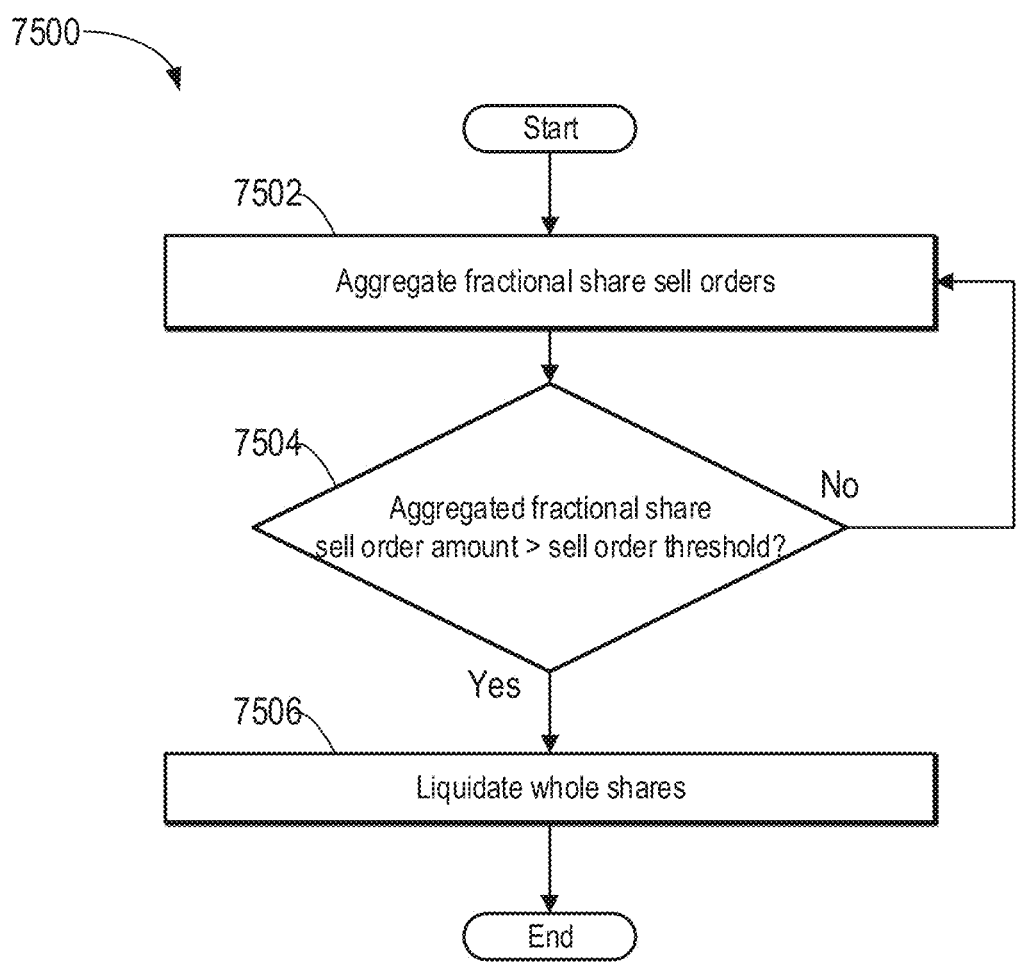
FIG. 81 shows a high level flowchart of a method for aggregating and executing user fractional equity sell orders.
Figure 82:
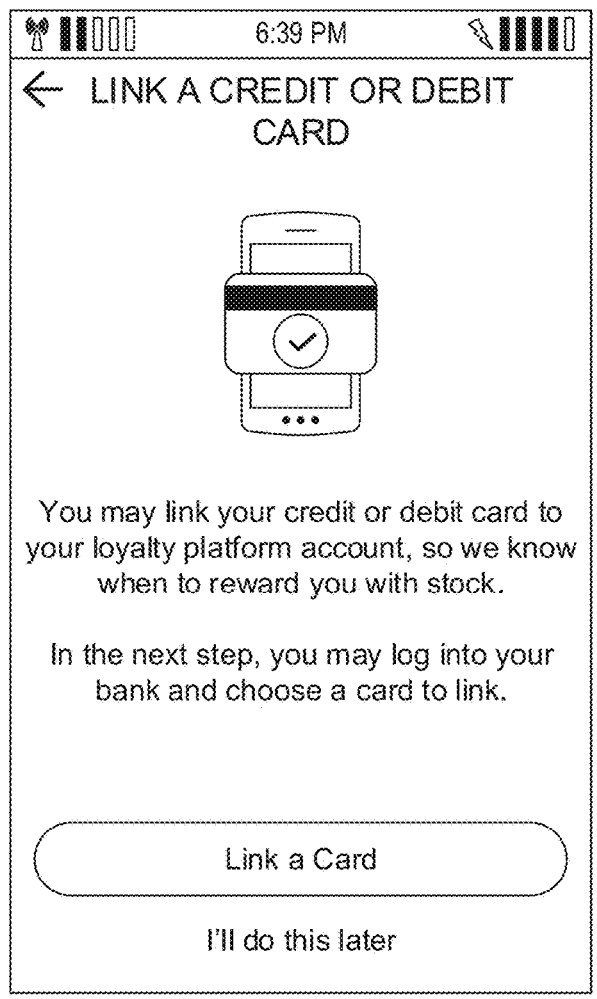
FIG. 82 shows an example graphical user interfaces for linking payment media.
Figure 83:
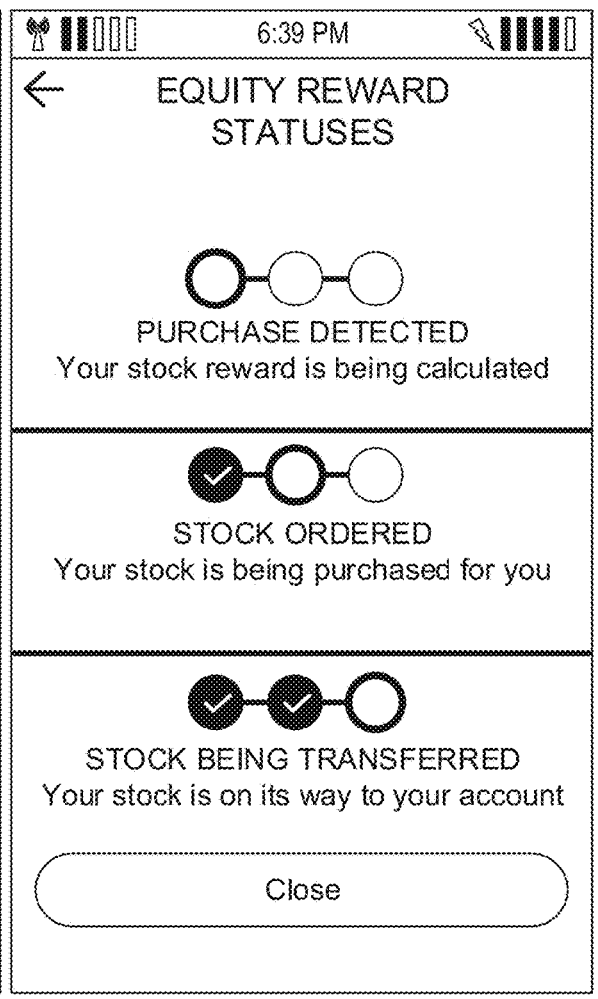
FIG. 83 shows a graphical user interface displaying exemplary equity reward statuses for tracked user loyalty purchases.

The following description provides examples of systems and methods which may enable a loyalty platform, such as loyalty platform 3108 shown in FIG. 34A, to distribute fractional equity rewards to users while reducing a probability of reward distribution delay, reducing a probability of an inventory having either an excess or paucity of shares of stock for user rewards, and reducing user frustration by providing equity reward statuses and estimated reward fulfilment times for fractional equity rewards. The loyalty platform may be implemented by one or more computing systems, such as computing system 3180 shown in FIG. 34B. Computing system 3180 may include non-transitory memory, which may include instructions that when executed carry out one or more steps of one or more of the methods herein disclosed, such as methods 7300, 7400, and 7500 discussed in detail below. It will be understood that loyalty platforms, such as loyalty platform 3108, may be implemented by more than one computing system, such as in a distributed computing scheme, wherein various functionalities of the loyalty platform may be enabled by a plurality of networked computing systems working in concert. Loyalty platform 3108 may comprise an equity allocation system, such as equity allocation system 3120 shown in FIGS. 35 and 84, which may distribute fractional shares of stock to users based on tracked user loyalty purchases according to a method, such as method 7300 shown in FIG. 79. FIG. 80 shows one example of a method by which an inventory account of a loyalty platform, such as inventory accounts within inventory accounts 7250, may dynamically adjust a pre-purchased supply of shares held therein, by liquidating/selling whole shares of the pre-purchased supply, or by purchasing whole shares of stock from the open market to be added to the pre-purchased supply, based on an upper supply threshold and a lower supply threshold. By dynamically adjusting the pre-purchased supply of shares held within an inventory account, such as by implementing method 7400, a probability of reward distribution delay may be reduced, while maintaining a relatively small amount of pre-purchased shares of stock. FIG. 81 shows one example method by which an equity allocation system of a loyalty platform may enable users to place sell orders for part, or all, of their accumulated fractional equity rewards. FIG. 82 illustrates an example graphical user interfaces which may be rendered by a display of a user computing device as part of a process of linking a payment medium to a user account on a loyalty platform, while FIG. 83 illustrates an example of an equity reward status, which may be displayed to a user via a display of a user computing device, as part of one or more methods for distributing fractional equity rewards.

In one example of a method for distributing fractional shares of stock to a user according to the current disclosure, a user of the loyalty platform may make a purchase at a participating business to which the user has made a loyalty selection (such as a business listed in rewarding-business index 3186) using a linked payment medium (such as a linked payment card). Once the payment settles between a payment card company and the participating business, a dollar reward amount is determined by the loyalty platform (for example, based on a 1% reward rate, a $100 purchase made by a user to a participating business may be eligible for a $1 reward of stock in the participating business, thus the dollar reward amount is $1 and the fractional equity reward will be a function of the dollar reward amount and a current market price of the stock to be purchased). Once a dollar reward amount is determined for a given purchase, an equity reward status may be displayed to a user, indicating the current status of the pending fractional equity reward, which may comprise the dollar reward amount, a stock to be purchased in an amount proportional to the dollar reward amount (the fractional equity reward), and an estimated reward fulfillment time for the fractional equity reward. The dollar reward amount to be rewarded to the user may be aggregated with other pending dollar reward amounts accrued by other users of the loyalty platform to form an aggregated dollar reward amount. As an example, pending dollar reward amounts from a plurality of users may be aggregated until the aggregated pending dollar reward amount exceeds a pending reward threshold. A whole share buy order may then be entered in an average price account of the loyalty platform based on the aggregated pending dollar reward amount. For example, if the aggregated pending dollar reward amount is equivalent to 0.8 shares of stock X at the current market price for stock X (specifically, if the aggregated pending dollar reward amount equals $8, and the current market price for stock X is $10), a whole share buy order of the closest whole share amount which is greater than the fractional share equivalent of the aggregated pending dollar reward amount may be executed, in this case, a buy order for 1.0 shares of stock X may be placed, at an execution price of $10/share. The buy order may be executed via an average price account. Once the buy order is fulfilled/executed through a whole share transaction on the open market through a clearing system (such as through the NYSE), the execution price (that is, the price at which the buy order was filled), may be used to convert the aggregated dollar reward amounts into an aggregated fractional equity reward amounts. For example, if in the above example, a user had a pending dollar reward amount of $2 worth of stock X, and a whole share purchase (as given in the example above) for 1.0 shares of stock X at an execution price of $10/share, that user's pending dollar reward amount may entitle the user in this case to a 0.20 shares of stock X.

The 0.20 shares of stock X in this example represents the pending fractional equity reward for the user based on the pending dollar reward amount previously discussed. Correspondingly, according to the above example, an aggregated pending dollar reward amount equal to $8, may be equivalent to a pending fractional equity reward of 0.80 shares of stock X.

Upon execution of the whole share purchase, and based on the aggregated dollar reward amounts, fractional shares of stock from a pre-purchased supply of stock within an inventory account of the loyalty platform may be apportioned to a plurality of user accounts to satisfy the aggregated pending dollar reward amount. For example, the inventory account may distribute 0.8 shares of stock X from a pre-purchased supply of shares of stock X by allocating 0.6 shares of stock X to user A, and 0.2 shares of stock X to user B, based on user A having a pending fractional equity reward of 0.6 shares of stock X and user B having a pending fractional equity reward of 0.2 shares of stock X. Upon distribution of the fractional equity rewards to the plurality of user accounts associated with the plurality of users, an updated equity reward status may be displayed to the plurality of users, indicating that the pending fractional equity reward has been distributed. The updated equity reward status may be unique to each user, and may indicate the specific fractional equity reward received by an account of each user. The purchased number of whole shares may arrive later, to replenish the amount of shares used to satisfy the pending fractional equity rewards, that is, the 1.0 whole shares of stock X purchased may be transferred to the inventory account to replenish the 0.8 shares of stock X used to satisfy the aggregated pending fractional equity rewards. In this way, user reward distribution may occur before settlement of a whole share purchase, which may increase speed of fractional equity reward distribution.

Although in the above example the users receive two equity reward statuses, it is within the scope of the disclosure to send any number of equity reward statuses, which may be sent at any time during the process of aggregating, acquiring, and distributing, rewards. For example, equity reward statuses may be displayed to a user via a display of a user computing device upon determination of a dollar reward amount, upon determination of the fractional equity reward based on the dollar reward amount, upon aggregation of the pending dollar reward amount with other pending dollar reward amounts, and upon crediting of the user account with the fractional equity reward corresponding to the dollar reward amount. Each of the fractional equity reward statuses may comprise different information and each equity reward status may further contain an updated estimated reward fulfillment time.

The funds used the average price account to buy the number of whole shares may be transferred to the average price account from a merchant bank account, or other payment account. Equity acquired by the average price account may be allocated to other accounts, such as an inventory account, within a threshold duration of time, such that the balance of equity within the average price account after a duration may be zero. For example, the process of allocating the portion of the whole shares of stock to the inventory account may be completed within 24 hours, such that the average price account does not hold positions in equity for more than a 24 hour period.

The inventory account may comprise a plurality of accounts, each associated with a unique business providing rewards to users via a loyalty platform. Alternatively, the inventory account may comprise a single account which may be configured to hold shares of stock for a plurality of businesses providing rewards to users via the loyalty platform. Each business may have an associated pre-purchased supply of shares for providing fractional equity rewards to users based on tracked user loyalty purchases. Each pre-purchased supply of shares may be dynamically adjusted, that is the amount of the pre-purchased supply of shares may be dynamically controlled, by buying and selling/liquidating whole shares of stock on the open market, to add or subtract from the pre-purchased supply. Funds for acquiring the shares of stock comprising the pre-purchased supply of shares may originate from a business associated with the inventory account. The upper supply threshold and lower supply threshold for a given inventory account associated with a business, may be based on historical data, as well as on extrapolations of data. For example, the upper supply threshold and lower supply threshold may be based on a running average rate of reward accrual. For example, based on a rate of reward accrual for stock X, of 10 shares/day, an upper supply threshold and lower supply threshold may be determined. The upper and lower supply thresholds may be adjusted as the running average rate of reward accrual changes. Further, the upper and lower supply threshold may be adjusted based on predicted events which may impact a rate of reward accrual, such as a holiday, a sale, or other promotional offer or foreseeable event which may influence a rate of purchases made with a business, and therefore which may influence a rate of reward accrual and distribution.

The loyalty platform may provide a notice to a participating business indicating an amount of funds needed to replenish a pre-purchased supply of shares in an inventory account associated with the business. "Replenish", as used herein with reference to a pre-purchased supply of shares within an inventory may refer to maintaining the pre-purchased supply of shares above a lower supply threshold of the inventory account. In one example, a lower supply threshold be determined as an amount of shares of stock corresponding to three days worth of fractional equity rewards for that business, such as may be determined using a rolling average rate of fractional equity reward distribution for a given business. The participating business may, based on the provided notice, direct its bank to transfer via ACH this dollar amount to the loyalty platform.

Figure 79:
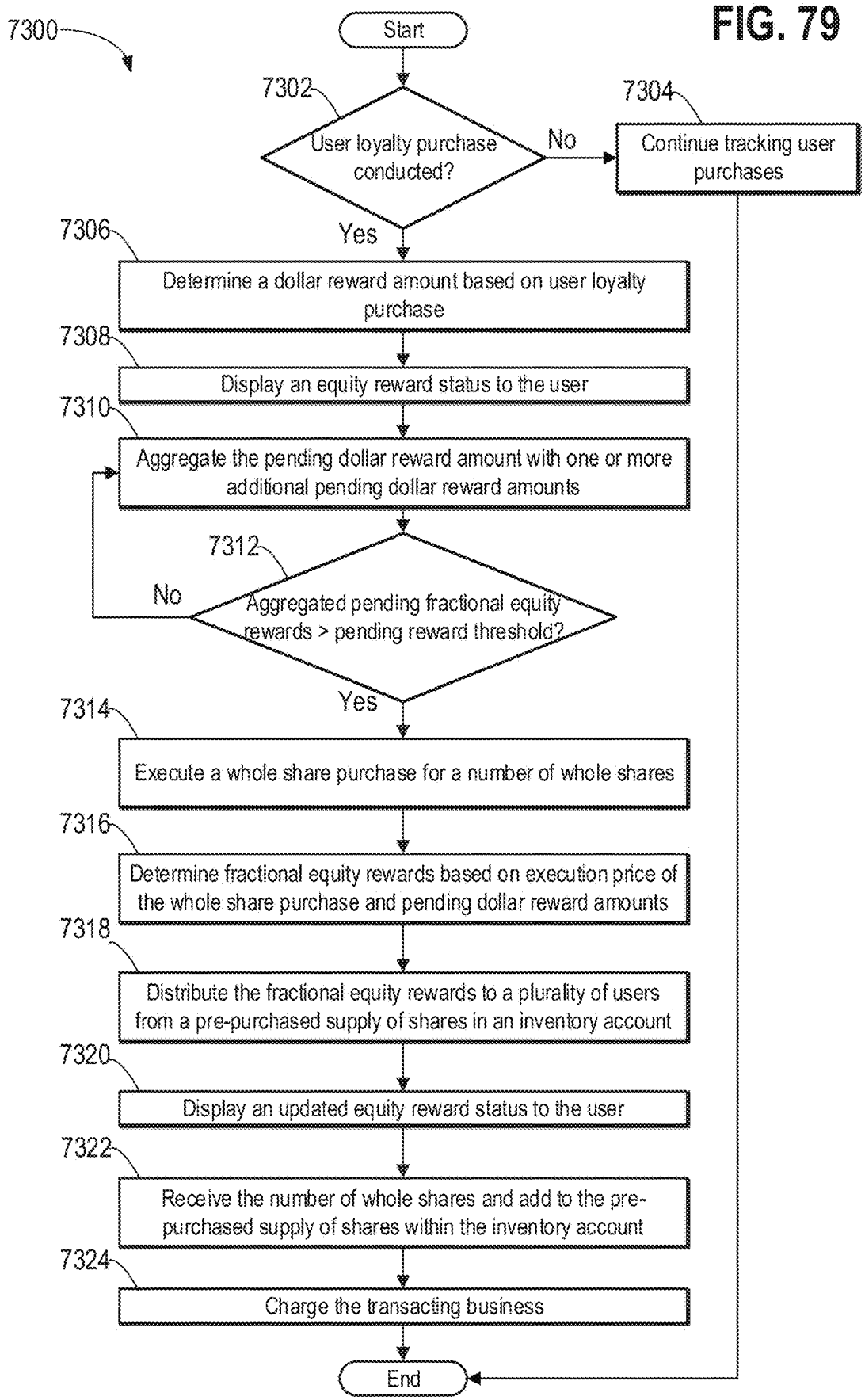
FIG. 79 shows a high level flowchart of a method for acquiring and distributing fractional shares of stock to users of the loyalty platform.

Turning to FIG. 79, an example method 7300 for distributing fractional equity rewards is shown. Method 7300 may enable faster distribution of fractional equity rewards to users compared to conventional methods. For example, by maintaining a pre-purchased supply of shares in an inventory account of the loyalty platform for providing fractional equity rewards to users of a loyalty platform, and by dynamically adjusting the pre-purchased supply of shares based on an upper supply threshold and a lower supply threshold, a probability of reward distribution delay may be reduced, and efficiency of automatic fractional equity reward distribution may be enabled. In another example, by aggregating pending dollar reward amounts of a plurality of users, and executing a whole share purchase based on the aggregated pending dollar reward amounts surpassing/exceeding a pending reward threshold, a pre-purchased supply of shares may be more efficiently maintained, and a reduction in the number of whole share purchases made on the open market may be enabled. Additionally, by indicating to users the progress/current stage of their pending fractional equity rewards, such as by indicating to a user when a purchase entitles that user to a reward, indicating that the process of reward distribution has been initiated, and indicating when the reward has actually been distributed/credited to their account, user impatience may be reduced. In one example, method 7300 may be stored in non-transitory memory of a computing system implementing a loyalty platform, such as computing system 3180, and one or more, or all, of the steps of method 7300 may be automatically executed by the loyalty platform, or by one or more sub-components, modules, databases, or subsystems of the loyalty platform.

Method 7300 begins at 7302, wherein a loyalty platform, such as loyalty platform 3108, may determine if a user loyalty purchase has been conducted. A user loyalty purchase may comprise a transaction in which a user, with an account on a loyalty platform and a loyalty selection to a first business, exchanges currency with the first business in exchange for goods or services, wherein the first business is registered with the loyalty platform and provides fractional equity rewards to loyalty customers therethrough (loyalty customers, as used herein with reference to a business, may refer to users of a loyalty platform, such as loyalty platform 3108, which have a loyalty selection to the business). The first business may be included in a database of the loyalty platform, such as rewarding-business index 3186, and this database may be used to correlate information obtained regarding a user purchase with a business registered with the loyalty platform and actively offering equity rewards therethrough.

In one example, the loyalty platform may obtain details of a user purchase through a third party data aggregator, from the merchant acquirer, from a bank, a payment card network, or alternatively the loyalty platform itself may aggregate details of a user loyalty purchase via payment media account information provided to the loyalty platform by the user. The loyalty platform may then correlate purchase details with a database of registered businesses to ascertain if the user purchase was conducted with a business offering fractional equity rewards through the loyalty platform. In one example, the process of correlation may comprise inputting purchase details acquired for a given purchase into a neural network trained to match a set of purchase details with a unique business within a database of the loyalty platform (such as rewarding-business index 3186). In another example, the neural network may output a confidence score based on the correlation, such that for a given purchase, a confidence score associated with the most likely business may be output. A confidence score threshold for business matching may be employed, such that a confidence score greater than a confidence score threshold may trigger the automatic reward distribution process, while a confidence score below the confidence score threshold may not trigger the automatic reward distribution process. In another example, a confidence score below a confidence score threshold may trigger an enhanced review process for a given purchase, wherein the details of the tracked purchase may be subjected to one or more enhanced review procedures, such as by displaying purchase details to an operator for evaluation. The enhanced review process may include determining if a user loyalty purchase occurred based on the purchase details.

The loyalty platform may further ascertain which customer account is associated with the tracked user purchase and may subsequently determine if said user account has a current loyalty selection to the business with which the user conducted their purchase. If the business is registered with the loyalty platform and the user account associated with the purchase includes a loyalty selection to the business, the tracked user purchase may be determined to be a tracked user loyalty purchase, and may therefore be eligible to receive a fractional equity reward. However, if at 7302 it is determined that no user loyalty purchase has been conducted, method 7300 may proceed to 7304, which includes the loyalty platform continuing to track/monitor user purchases. Method 7300 may then end. However, if at 7302 it was determined that a user loyalty purchase has occurred, method 7300 may proceed to 7306.

At 7306, method 7300 includes determining a dollar reward amount based on the user loyalty purchase. The determination of a dollar reward amount may be based on a monetary value of the user loyalty purchase, reward policies of the business with which the purchase was conducted, and may further be based on a transaction history or loyalty history of the user who conducted the loyalty purchase. As an example, based on a user loyalty purchase with a monetary value of $150 and further based on the reward policies of the business with which said purchase was conducted comprising a reward rate of 2%, a dollar reward amount of $3 worth of a fractional share of stock Y (the USD equivalent of a reward to be distributed in the form of equity may be herein be referred to as a dollar reward amount). The dollar reward amount and corresponding fractional equity reward may be rounded up or down to the prescribed number of decimal places. For example, a $3.24 purchase at a 2% reward yields $0.0648. That may be rounded up to $0.07 or rounded down $0.06, at the discretion of the loyalty platform. Alternatively, at 7306, the business with which the user loyalty purchase was conducted may transmit a dollar amount to the loyalty platform to reward a user. The business may further transmit an indication of one or businesses/brands for which the dollar amount is to be used to purchase equity in.

At 7308, method 7300 includes displaying an equity reward status to the user. In one example, the equity reward status may be rendered on a display of a computing device associated with the user account to receive the pending fractional equity reward. In one example, the equity reward status may comprise one or more of a push notification, email, or other electronic communications. In another example, the equity reward status may indicate the pending dollar reward amount, or the pending amount of fractional shares of stock to be distributed to a user, the title of the purchase for which the reward was earned, and an estimated reward fulfillment time of the reward. The dollar reward amount may be determined as indicated above, with reference to step 7306, while the estimated reward fulfillment time may be based on one or more parameters associated with the fractional equity reward distribution process. As an example, the estimated reward fulfillment time may be based on one or more of the current amount of pending fractional equity rewards, a rolling average reward fulfillment time for previously distributed rewards, a current rate of pending fractional equity reward aggregation, and an amount of funds held within the merchant deposit account associated with the current pending fractional equity reward. For example, an estimated reward fulfillment time may be fine-tuned by adjusting a rolling average reward fulfillment time with a current rate of aggregation for pending fractional equity rewards in the same stock as the current reward. In the case that the rate of aggregation is above a baseline level, such as when a current rate of aggregation is above a running average rate of aggregation, the estimated reward fulfillment time may be calculated by multiplying the running average rate of reward fulfillment time by a factor (such as a non-zero factor less than 1 in the case of rate of reward fulfillment faster than a running average rate, or a factor greater than 1 in the case of a reward fulfillment time slower than a running average). It will be appreciated that although method 7300 includes displaying a first equity reward status and an updated equity reward status, any positive integer number of equity reward statuses may be displayed to a user computing device to enable updates regarding the pending fractional equity reward based on any number of steps or events occurring during the fractional equity reward distribution process. Upon displaying the equity reward status method 7300 may then proceed to 7310.

At 7310, method 7300 includes aggregating a plurality of pending dollar reward amounts for a plurality of users. In one example, the pending dollar reward amounts may be aggregated by an inventory account associated with a business, for which the dollar reward amounts are to be distributed. Aggregation may comprise a numerical addition of a new pending dollar reward amounts to a previously aggregated pending dollar reward amount. The aggregated pending dollar reward amounts may be stored in non-transitory memory of a computing system associated with the loyalty platform and may be accessed by one or more of the accounts within an equity allocation system of the loyalty platform, such as equity allocation system 3120. Method 7300 may then proceed to 7312.

At 7312, method 7300 includes evaluating if aggregated pending fractional equity rewards, equivalent to the dollar reward amounts, exceed a pending reward threshold. An equivalent aggregated pending fractional equity reward may be calculated based on an aggregated pending dollar reward amount by dividing the aggregated pending dollar reward amount by the current market price of the stock to be rewarded/purchased. The pending reward threshold may be chosen to limit or reduce the number of whole share purchases conducted by the loyalty platform, and further, to more tightly and efficiently control a pre-purchased supply of shares within an inventory account, by ensuring the number of whole shares purchased is within a threshold amount of the aggregated pending fractional equity reward corresponding to the aggregated pending dollar reward amount. Each cycle of pending reward aggregation, reward purchase, and reward distribution may be herein referred to as a reward distribution cycle. For example, the pending reward threshold may be chosen such that the amount of aggregated pending fractional equity rewards equivalent to the aggregated pending dollar reward amount is within a threshold of a nearest whole number of shares. In a specific example, a pending reward threshold of 0.8 shares of stock X may be chosen in order to reduce the fractional remainder of shares left over after 1.0 shares of stock X is purchased, and a 0.80 shares of stock X is taken from the purchased 1.0 shares to satisfy pending fractional equity rewards, thereby limiting the amount of fractional remainders of shares to 0.20 shares of stock X or less. If the loyalty platform determines that the aggregated pending fractional equity rewards equivalent to the aggregated pending dollar reward amount does not exceed a pending reward threshold, method 7300 may return to 7310 and continue aggregating pending fractional equity rewards until the amount of aggregated rewards exceeds the pending reward threshold. The pending reward threshold enables more efficient control over the pre-purchased supply of shares within inventory accounts of the loyalty platform and may thereby reduce inefficiencies associated with accruing fractional remainders of shares left over from reward distribution. However, if at 7312 the loyalty platform determines that the aggregated pending fractional equity rewards equivalent to the aggregated pending reward amounts exceed the pending reward threshold, method 7300 may proceed to 7314.

At 7314, method 7300 includes executing a whole share purchase based on the amount of aggregated pending fractional equity rewards. For example, based on the amount of aggregated pending fractional equity rewards surpassing a pending reward threshold, an indication may be sent to the average price account to execute a whole share purchase based on the aggregated pending fractional equity rewards. If the amount of aggregated pending fractional equity rewards does not equal a whole number of shares, the aggregated pending fractional equity rewards may be rounded-up to the nearest whole number of shares and the average price account may place a buy order for this rounded-up number of whole shares. For example, if the amount of aggregated pending fractional equity rewards is 0.4 shares of stock Y, this amount may be rounded-up to 1.00 shares of stock Y, which is the nearest whole number of shares greater than the pending fractional equity reward, and a buy order, or a whole share purchase, for this amount may be placed on a clearing system by the average price account. Once the whole share purchase order/buy order has been filled, the average price account may be debited a monetary value corresponding to the purchased whole shares of stock and the average price account may be credited with the purchased amount of whole shares of stock. Method 7300 may then proceed to 7316.

At 7316, method 7300 may include calculating a plurality of pending fractional equity rewards based the execution price for whole share purchase, and further based on the plurality of pending dollar reward amounts. In one example, fractional equity reward to distribute to a user may be determined by dividing a pending dollar reward amount for the user by the execution price for the number of whole shares acquired in the whole share purchase of step 7314. As a specific example, based on a pending dollar reward amount of $4.50 to user A, and an execution price of $10.00/share of stock X, a fractional equity reward of 4.5 shares of stock X may be determined for user A. Method 7300 may then proceed to 7318.

At 7318, method 7300 includes distributing fractional equity rewards from an inventory account to a plurality of users, based on pending fractional equity rewards owed to the plurality of users. For example, a portion of pre-purchased supply of shares within the inventory account may be distributed amongst the plurality of users in amounts equal to the pending fractional equity reward amounts owed to each user, such as were determined in step 7316. For example, 0.8 shares of stock from a pre-purchased supply of stock in an inventory account corresponding to business Z may be distributed to a user account of user A and a user account of user B, to satisfy pending fractional equity rewards of 0.2 shares of stock in business Z and 0.60 shares of stock in business Z, owed to user A and user B respectively, wherein 0.20 shares of the 0.80 shares are transferred to the account of user A and 0.60 shares of the 0.80 shares are transferred to the account of user B. An order of distribution of the portion of equity in the merchant facilitation account may be determined by the loyalty platform. In one example, the order of fractional equity reward distribution may be based on a timing of when the user loyalty purchases associated with each fractional equity reward occurred, such that users with rewards pending for longer durations may have an associated fractional equity reward distributed to an associated user account before a user with a reward pending for a shorter duration. Method 7300 may then proceed to 7320.

At 7320, method 7300 may include displaying an updated equity reward status to one or more of the plurality of users to whom a fractional equity reward was distributed in step 7318. In one example, updated equity reward status may comprise one or more of a push notification, email, SMS message, or other electronic communications. In one example, the updated equity reward status may include a visual representation of the amount of fractional equity reward distributed to a user account on the loyalty platform, along with updated totals of equity held by the user account in a reward portfolio. The equity reward status may be rendered within a graphical user interface implemented by a display of a user computing device used to connect with the loyalty platform over a network, such as the Internet. Upon distribution of an amount of fractional shares of stock from a pre-purchased supply of shares within an inventory account to a plurality of user accounts, each of the users associated with the plurality of user accounts may receive an updated equity reward status. An order of sending the updated equity reward statuses may be staggered to reduce consumption of bandwidth by the loyalty platform at any given instant to below a threshold level of bandwidth. Alternatively, each updated equity reward status may be sent out without staggering, and as such a plurality, or all, of the updated equity reward statuses may be sent out simultaneously. Each of the updated equity reward statuses may contain unique information, specifically pertaining to the associated user and user account. Method 7300 may then proceed to 7322.

At 7322, method 7300 includes receiving the number of whole shares purchased at step 7314, and adding the number of whole shares to the pre-purchased supply of shares within the inventory account. The loyalty platform may at this time determine if a whole share sell order, or a whole share purchase order, is to be placed with the average price account, to adjust in substantially real time the pre-purchased supply of shares based on the upper supply threshold and the lower supply threshold, as discussed in more detail below with reference to FIG. 80. Method 7300 may then proceed to 7324.

At 7324, method 7300 may include charging the business (on whose behalf fractional equity rewards were distributed to the plurality of users) based on the number of whole shares purchased at step 7314, and further based on administrative or service fees associated with the reward distribution. In one example, the loyalty platform may charge a participating business after completion of a reward distribution cycle. A bank account, or other payment account of the business, may transfer funds to the loyalty platform via a payment system, such as payment system 3150. Method 7300 may then end.

In this way, method 7300 may enable fractional shares of stock to be distributed to a plurality of users more rapidly than conventional methods, while reducing the amount of equity needed to be maintained within an inventory account and reducing user frustration associated with lack of feedback regarding equity reward statuses.

Turning now to FIG. 80, an example method 7400 for managing an inventory account is shown. Specifically, FIG. 80 gives one example of a method for dynamically adjusting in substantially real time a pre-purchased supply of shares within an inventory account which may be used to provide fractional equity rewards to users. One or more of the steps of method 7400 may be automatically executed by a loyalty platform, such as loyalty platform 3108, configured with an equity allocation system, such as equity allocation system 3120. As discussed previously with reference to FIG. 84, an inventory account within inventory accounts 7250, may be included within a loyalty platform, and may perform functions related to managing a pre-purchased supply of shares for providing fractional equity rewards to users. Method 7400 gives one example of a method by which an inventory account of a loyalty platform may determine when and how to conduct whole share purchases or whole share sells to control the amount of equity stored therein (comprising the pre-purchased supply of shares) based on an upper supply threshold and a lower supply threshold. Although the example of method 7400 is given with reference to a single inventory account, it will be appreciated that the similar, or the same, method of inventory account management may be employed on a plurality of inventory accounts. In one example, there may be a plurality of inventory accounts, each managing separate pre-purchased supplies of shares, wherein each pre-purchased supply of shares comprises shares of a single type of stock. Therefore, there may be a one-to-one correspondence between a plurality of stocks used to reward users on a loyalty platform, and the plurality of inventory accounts. In another example, a single inventory account may be used, which is configured to hold a plurality of stocks, and may execute management methods, such as method 7400, on each of the plurality of stocks separately.

Method 7400 begins at 7402, which may include the loyalty platform evaluating if a pre-purchased supply of shares is greater than an upper supply threshold. If at 7402 it is determined that the pre-purchased supply of shares is greater than the upper supply threshold, method 7400 may proceed to 7404. The upper supply threshold for a given inventory account associated with a business, may be based on historical data associated with distribution of rewards for the business, as well as on extrapolations of this, or other data. For example, the upper supply threshold may be based on a running average rate of reward accrual. For example, based on a rate of reward accrual for stock X, of 10 shares/day, an upper supply threshold may be determined. As an example, a pre-purchased supply of shares of stock may be controlled to be greater than 2 days' worth of rewards (20 shares of stock according to the above example) based on the current rate of reward accrual and less than 5 days' worth of rewards (50 shares of stock according to the above example) based on the current rate of reward accrual. The upper supply threshold may be adjusted as the running average rate of reward accrual changes. Further, the upper supply threshold may be adjusted based on predicted events which may impact a rate of reward accrual, such as a holiday, a sale, or other promotional offer or foreseeable event which may influence a rate of purchases made with a business, and therefore which may influence a rate of reward accrual and distribution.

At step 7404, method 7400 includes liquidating/selling a number of whole shares by placing a sell order for a number of whole shares within the inventory, via an average price account (alternatively the sell order may be placed directly on the open market from the inventory account). The number of whole shares to be sold may be determined based on the extent to which the pre-purchased supply of shares exceeds the upper supply threshold, and may include placing a sell order for the minimum number of whole shares to bring the pre-purchased supply of shares below the upper supply threshold. As another example, the number of whole shares to be sold via the sell order may comprise the maximum number of whole shares which may reduce the pre-purchased supply of shares below the upper supply threshold, while not reducing the pre-purchased supply of shares below the lower supply threshold. As a specific example, based on an upper supply threshold of 10 shares of stock X, a lower supply threshold of 5 shares of stock X, and based on a pre-purchased supply of shares of 11.5 shares of stock X, the maximum number of whole shares to be sold may be 6.0 shares of stock X (resulting in the after sale pre-purchased supply of shares equaling 5.5 shares of stock X) while the minimum number of whole shares of stock X which may be sold may be 2.0 shares of stock X (resulting in the after sale pre-purchased supply of shares equaling 9.5 shares of stock X). It will be understood that the number of whole shares of stock sold based on a pre-purchased supply of shares within an inventory account may comprise any number of whole shares which would result in an after sale pre-purchased supply of shares between the upper supply threshold and the lower supply threshold. Upon completion of the whole share sale at 7404, and allocation of the funds obtained thereby in the associated inventory account for later use in purchasing whole shares, method 7400 may then end. However, if 7402 it is determined that pre-purchased supply of shares is below the upper supply threshold, method 7400 may proceed to 7406.

At 7406, method 7400 includes evaluating if the pre-purchased supply of shares is less than a lower supply threshold. If at 7406 it is determined that the pre-purchased supply of shares is greater than the lower supply threshold, method 7400 may proceed to 7410, which includes continuing to provide fractional equity rewards to users from the pre-purchased supply of shares within the inventory account without conducting dynamic adjustment of the pre-purchased supply of shares. Method 7400 may then end. However, if at 7406 it is determined that the pre-purchased supply of shares is less than the lower supply threshold, method 7400 may proceed to 7408. The lower supply threshold for a given inventory account associated with a business, may be based on historical data associated with distribution of rewards for the business, as well as on extrapolations of this, or other data. For example, the lower supply threshold may be based on a running average rate of reward accrual. For example, based on a rate of reward accrual for stock X, of 10 shares/day, a lower supply threshold may be determined. As an example, a pre-purchased supply of shares of stock may be controlled to be greater than 1 days' worth of rewards (10 shares of stock according to the above example) based on the current rate of reward accrual and less than 3.5 days' worth of rewards (35 shares of stock according to the above example) based on the current rate of reward accrual. The lower supply threshold may be adjusted as the running average rate of reward accrual changes. Further, the lower supply threshold may be adjusted based on predicted events which may impact a rate of reward accrual, such as a holiday, a sale, or other promotional offer or foreseeable event which may influence a rate of purchases made with a business, and therefore which may influence a rate of reward accrual and distribution.

At step 7408, method 7400 includes purchasing a number of whole shares by placing a buy order for a number of whole shares via an average price account (alternatively the buy order may be placed directly on the open market from the inventory account). The number of whole shares to be bought may be determined based on the extent to which the pre-purchased supply of shares is below the lower supply threshold, and may include placing a buy order for the minimum number of whole shares to bring the pre-purchased supply of shares above the lower supply threshold. As another example, the number of whole shares to be bought via the buy order may comprise the maximum number of whole shares, which may increase the pre-purchased supply of shares above the lower supply threshold, while not increasing the pre-purchased supply of shares above the upper supply threshold. As a specific example, based on an upper supply threshold of 10 shares of stock X, a lower supply threshold of 5 shares of stock X, and based on a supply of shares of 4.5 shares of stock X, the maximum number of whole shares to be bought may be 5.0 shares of stock X (resulting in the after buy pre-purchased supply of shares equaling 9.5 shares of stock X) while the minimum number of whole shares of stock X which may be bought may be 1.0 share of stock X (resulting in an after buy pre-purchased supply of shares equaling 5.5 shares of stock X). It will be understood that the number of whole shares of stock bought based on a pre-purchased supply of shares within an inventory account may comprise any number of whole shares which would result in an after buy pre-purchased supply of shares between the upper supply threshold and the lower supply threshold. Upon completion of the whole share buy at 7406, method 7400 may then end.

In this way, a method such as method 7400 may enable substantially real time adjustment of pre-purchased supply of shares within an inventory account, to reduce a probability of fractional equity reward distribution delay, by incorporating both current reward distribution data, as well as predicted event data, when determining an upper supply threshold and a lower supply threshold.

Turning now to FIG. 81, an example method 7500 for aggregating and executing user sell orders, which may comprise sell orders for fractional shares of stock. One or more of the steps of method 7500 may be automatically executed by a loyalty platform, such as loyalty platform 3108, configured with an equity allocation system, such as equity allocation system 3120. Method 7500 may enable user sell orders for fractional shares of stock to be rapidly executed, without the loyalty platform directly buying back fractional shares of stock from users. Conventionally, a difficulty of dealing in fractional shares of stock is that securities markets generally do not deal in fractional shares of stock, and therefore a user wishing to execute a sell order for an amount of fractional shares may be required to pay additional fees for such an order, or may simply be unable to complete such an order. Method 7500 may mitigate this issue, without requiring the loyalty platform to directly purchase fractional shares of stock from its users.

Method 7500 begins at 7502, which includes aggregating user fractional sell orders. In one example, fractional sell orders may be computationally aggregated, such as by summing all pending user sell orders. Alternatively, user sell orders may be aggregated by transferring user equity to be sold to an account, such as the average price account, and pooling/aggregating the equity to be sold with the account. Upon placing a sell order, a user may receive a sell order status displayed via a display of a computing device associated with the user. The sell order status may indicate to the user the amount of equity to be sold, such as by rendering the amount within a graphical user interface, which may comprise an amount of fractional shares of stock, as well as an indication of what stage of the sell process the sell order is currently in. Method 7500 may then proceed to 7504.

At 7504, method 7500 includes evaluating if the aggregated fractional share sell order amount is greater than a sell order threshold. This evaluation may occur upon each new user sell order for a given stock. Alternatively, the evaluation may occur at regular, pre-determined intervals of time. The sell order threshold may be based on a rate of sell order aggregation, a time since placement of the oldest sell order in the aggregated sell order, and liquidity of the stock comprising the sell order (such as may be indicated by evaluating volume of trade on the open market for the stock). Alternatively, the sell order threshold may be a pre-determined value. The sell order threshold may be unique for each of the plurality of stocks used to reward users on the loyalty platform. As an example, the sell order threshold may comprise a whole number of shares, or alternatively the sell order threshold may comprise a fractional amount of shares. In one example, a default sell order threshold may be adjusted based on a duration of time since the oldest sell order in the aggregated sell order being evaluated was placed. In a specific example, a default threshold of 5.0 shares of stock may be decremented to 4.0 shares of stock based on the length of elapsed time since the first sell order within the aggregated sell order was placed surpassing a threshold. For example, a based on the oldest sell order within an aggregated sell order exceeding a threshold wait time of 1 day, a sell order threshold may be decreased. In this way, a duration of wait for execution of a user sell order may be reduced. In another example, a sell order threshold may comprise a predetermined whole number of shares, such as 1.0 shares. If at 7504 the loyalty platform determines that the aggregated fractional share sell order amount is not greater than the sell order threshold, method 7500 may return to 7502, and continue to aggregate fractional share sell orders from the plurality of users. However, if at 7504 it is determined that the aggregated fractional share sell order is greater than a sell order threshold, method 7500 may proceed to 7506.

At 7506, method 7500 includes liquidating a number of whole shares of the aggregated fractional share sell order. The number of whole shares liquidated from the aggregated fractional share sell order may be based on the amount of the aggregated fractional share sell order. In one example, the maximum number of whole shares within the aggregated fractional share sell order may be sold. As a specific example, based on an aggregated fractional share sell order amounting to 2.566 shares of stock X, a whole share sell order for 3.0 shares of stock X may be placed with a clearing system. Funds obtained from liquidating whole shares of stock comprised of a plurality of aggregated user fractional share sell orders may be allocated to the plurality of user accounts associated with the plurality of aggregated user fractional share sell orders. As an example, if user A placed a sell order for 0.5 shares of stock X, and user B placed a sell order for 0.5 shares of stock X, based on a liquidation threshold of 1.0 shares of stock X, a whole share sell order may be placed, and executed, for the 1.0 shares. Funds from the whole share sell for the 1.0 shares of stock X may be distributed to user accounts associated with user A and user B in proportion to the amount of the executed sell order comprising stock owned by that user, so in this case 50% of the funds go to an account belonging to user A, and 50% of the funds go to an account belonging to user B. Upon execution of the whole share sell order based on the aggregated fractional share sell orders, method 7500 may then end.

In this way, sell orders for fractional shares of equity, which may conventionally require additional fees or time to sell, may be efficiently and timely sold, by aggregating fractional share sell orders from a plurality of users, and executing a whole share sell order based on the amount of the aggregated fractional share sell orders exceeding a sell order threshold.

Turning now to FIG. 82, an illustration of an example graphical user interface 7600. Graphical user interface 7600 may be displayed by the loyalty platform to a user via a display of a user computing device as part of one or more methods herein disclosed. In particular, graphical user interface 7600 comprises an interface which may enable a user to initiate a process for linking a payment medium, such as a debit card or credit card, with a user account.

FIG. 83 shows one example of graphical user interface 7700 comprising one or more equity reward statuses. The equity reward status may include an indication of a current step of a reward distribution process a pending fractional equity reward is currently in, and may be displayed to a user via a display of a computing system at any time, and any number of times. Equity reward statuses may be updated as the stage of reward distribution for a given fractional equity reward changes, such as when a tracked user loyalty purchase is first detected, when a buy order for a whole number of shares of stock based on the tracked user loyalty purchase is placed, and when a fractional share of stock based on the tracked user loyalty purchase is being transferred, such as from a pre-purchased supply of inventor to a user account. By providing equity reward statuses, such as those illustrated in graphical user interface 7700, a user may be better informed regarding the progress of a reward distribution, and may therefore feel included within the distribution process, and less prone to frustration.

Thus, the loyalty platform as described herein provides a technology-based solution to address multiple issues associated with the administration of purchase-based customer rewards, including inefficient and delayed reward administration, time-consuming and redundant user integration with rewards programs, lack of promotion of brand or company loyalty, and other issues. The loyalty platform may include a particular combination of elements executing specific rules or steps in order to address these issues, including a purchase tracking module, user accounts, loyalty manager, rewards manager, an equity allocation system, and a rewarding-business index. The loyalty platform may execute a sequence of events/steps that address these problems associated with traditional rewards programs. For example, as described above, the loyalty platform may store a single user account/profile for each registered user, where each account includes that user's loyalties (which may include loyalty selections for multiple businesses). In doing so, the functioning of the loyalty platform may be improved by reducing storage (e.g., relative to other platforms that may maintain separate accounts or profiles for each user and each business of each user, thereby resulting in multiple accounts for each user) and/or reducing the processing demands of the loyalty platform and the loyalty platform's contribution to network traffic (e.g., because the loyalty platform can assess each user's selected loyalties without having to query individual businesses or external reward administrators). This may provide an improvement over typical reward administration systems that do consolidate multiple different reward programs/different businesses for a given user, which may still maintain/interface with separate business-specific rewards programs and accounts, and thus make the systems onerous and expensive to administer.

The loyalty platform as described herein may receive multiple sources of transaction data that it may monitor to identify qualifying transactions (e.g., between registered users and businesses that the registered users have selected to receive rewards from). This transaction data may in different formats, formatting styles, etc., and thus accurately identifying the business associated with each transaction as defined in the transaction data may be challenging. The loyalty platform as described herein may implement one or more automated techniques to increase the speed at which the transactions may be monitored and the accuracy of the monitoring, such as the extractions and normalization described above, the transaction model, and/or the calibrating of the purchase tracking module. In doing so, the efficiency of the loyalty platform may be improved by reducing reliance on multiple rounds of review to identify a transacting business and lowering instances of inaccurate transacting business identification.

Thus, the loyalty platform as disclosed herein may include multiple merchant's programs on it at once. This allows the merchants a single place to utilize the single brokerage/user accounts (e.g., one account per user). The loyalty platform may be configured to offer the highest reward possible to consumers, meaning that if program A is offering a 1% reward for purchases at merchant Z, and program B is offering a 5% reward, the loyalty platform will only offer the 5% reward to prevent "stacking" of rewards, which may save merchants money if they are contributing to multiple programs. The loyalty platform provides rewards in a secure way that improvise efficiency via scale and aggregation. For example, rewards (whether stocks or crypto assets) can be purchased in aggregate by bunching rewards for multiple users, buying a single asset or stock, and then divvying it up to the various users. Aggregation, standards, and scale are very beneficial, particularly when trading stocks. Given the ability to operate at scale and at aggregation levels (multiple programs) means lower processing demands, reduced network traffic, and increased efficiency.

Thus, the systems and methods described herein may provide a loyalty platform that includes a processor and a memory storing instructions executable by the processor to: receive, from a third-party aggregator, a transaction history for one or more financial accounts associated with a user; automatically determine a set of businesses associated with transactions in the transaction history; generate an equity rewards list including at least a first business selected from the set of businesses, the first business included in a first market of a rewarding-business index stored in the memory of the loyalty platform; display, via a display operably coupled to the computing system (e.g., a display of a computing device of the user), the equity rewards list; responsive to receiving an indication the user has confirmed the equity rewards list, update a profile of the user stored in the memory of the loyalty platform to enroll the user in a first rewards program for the first business; automatically award the user with an equity reward in response to identifying that a subsequent first user purchase at the first business has occurred; automatically determine that a second user purchase at a second business has occurred, the second business included in the first market, and in response displaying, via the display, a loyalty-switch offer including an option for the user to switch loyalty from the first business to the second business; responsive to the user accepting the loyalty-switch offer, update the profile of the user to remove the user from the first rewards program and enroll the user in a second rewards program for the second business; present an interface element via a user interface on the display, the interface element being selectable to request a rebalancing of equity in a loyalty rewards platform account of the user; and responsive to receiving user input selecting the interface element, automatically perform the rebalancing of equity to move equity in the first business to the second business.

In another example, a method for automatically identifying and rewarding equity rewards includes receiving, at a loyalty platform comprising one or more computing systems, aggregated transaction data regarding a plurality of transactions for one or more financial accounts associated with one or more users, wherein the transaction data is received from a third-party aggregator, and wherein the transaction data includes a transaction description for each transaction; extracting, with the loyalty platform, each transaction description from the transaction data; normalizing, with the loyalty platform, each transaction description, wherein normalization includes parsing each transaction description based on known formatting styles and recognized portions of each transaction description; identifying, with a calibrated purchase tracking module of the loyalty platform and based on the extracted and normalized transaction descriptions, a first business associated with a first transaction of the plurality of transactions; identifying, with the loyalty platform, that the first transaction was between the first business and a first user enrolled in a first loyalty program of the first business; determining, through a rewards manager in communication with the calibrated purchase tracking module and an equity allocation system of the loyalty platform, an equity reward for the first user based upon a purchase amount of the first transaction and the identity of the first business; providing, via the equity allocation system, the equity reward to the first user; and displaying the equity reward to the first user via a display.

In a still further example, a method for a loyalty platform including one or more computing systems includes receiving, at a purchase tracking module of the loyalty platform, information defining a financial transaction made by a user; automatically determining an identity of a business with which the financial transaction is associated based on output from a transaction model, the transaction model trained to produce as the output a probability rank for one or more or each of a plurality of businesses stored within a rewarding business index of the loyalty platform; determining, through a rewards manager in communication with the purchase tracking module and an equity allocation system of the loyalty platform, an equity reward for the user based upon a purchase amount of the financial transaction and the identity of the business; providing, via the equity allocation system, the equity reward to the user; and displaying the equity reward to the user via a display.

In another representation, a method for automatically identifying and rewarding equity rewards includes receiving, at a loyalty platform comprising one or more computing systems, aggregated transaction data regarding a plurality of transactions for one or more financial accounts associated with one or more users, wherein the transaction data is received from a third-party aggregator, and wherein the transaction data includes a transaction description for each transaction; extracting, with the loyalty platform, each transaction description from the transaction data; normalizing, with the loyalty platform, each transaction description, wherein normalization includes parsing each transaction description based on known formatting styles and recognized portions of each transaction description; identifying, with a calibrated purchase tracking module of the loyalty platform and based on the extracted and normalized transaction descriptions, a first business associated with a first transaction of the plurality of transactions; identifying, with the loyalty platform, that the first transaction was between the first business and a first user enrolled in a first loyalty program of the first business; determining, through a rewards manager in communication with the calibrated purchase tracking module and an equity allocation system of the loyalty platform, an equity reward for the first user based upon a purchase amount of the first transaction and the identity of the first business; providing, via the equity allocation system, the equity reward to the first user; and displaying the equity reward to the first user via a display. In a first example of the method, the transaction data includes transaction descriptions in more than one formatting style. In a second example, optionally including the first example, the method further includes: identifying, with the calibrated purchase tracking module of the loyalty platform and based on the extracted and normalized transaction descriptions, a second business associated with a second transaction of the plurality of transactions; identifying, with the loyalty platform, that the second transaction was between the second business and the first user, wherein the first user is not enrolled in a second loyalty program of the second business; displaying, via the display, a loyalty-switch offer including an option for the first user to switch loyalty from the first business to the second business; responsive to the user accepting the loyalty-switch offer, enrolling the first user in the second rewards program for the second business; determining, through the rewards manager in communication with the calibrated purchase tracking module and the equity allocation system of the loyalty platform, a second equity reward for the first user based upon a purchase amount of the second transaction and the identity of the second business; providing, via the equity allocation system, the second equity reward to the first user; and displaying the second equity reward to the first user via the display. In a third example of the method, optionally including one or both of the first and second examples, the calibrated purchase tracking module is calibrated to identify the first business associated with the first transaction, the calibrating including providing the first business with a list of transactions made with a selected payment medium associated with the first business, associating one or more transactions from the list of transactions with the first business based on feedback from the first business, and mapping a transaction description of the one or more transactions to the first business.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method comprising:
aggregating, with an equity allocation system of a loyalty platform comprising one or more computing systems, a plurality of dollar reward amounts corresponding to a business, wherein the plurality of dollar reward amounts is based on a plurality of tracked user loyalty purchases from the business tracked automatically by the loyalty platform, and wherein the equity allocation system comprises instructions executable by one or more processors to direct an inventory account to aggregate the plurality of dollar reward amounts;
displaying, via the loyalty platform, an equity reward status to one or more user computing devices associated with one or more of the plurality of tracked user loyalty purchases;
executing, with the equity allocation system, a whole share purchase of stock in the business based on the aggregated dollar reward amounts exceeding a pending reward threshold, wherein the equity allocation system directs an average price account to perform the whole share purchase from a clearing house, wherein the whole share purchase is executed using funds in a merchant deposit account of the loyalty platform, the merchant deposit account associated with the business;
automatically adding, with the equity allocation system, a number of whole shares purchased in the whole share purchase to the inventory account to form a pre purchased supply of shares of stock, wherein the equity allocation system directs the average price account to transfer to the number of whole shares to the inventory account;
determining, with the equity allocation system, a plurality of fractional share amounts based on an execution price of the whole share purchase and the plurality of dollar reward amounts;
automatically distributing, with the equity allocation system, the plurality of fractional share amounts to a plurality of user accounts from the pre-purchased supply of shares of stock in the inventory account, wherein the equity allocation system directs the inventory account to transfer each fractional share amount of the plurality of fractional share amounts to a corresponding user account of the plurality of user accounts;
responsive to distributing the plurality of fractional share amounts, automatically displaying, via the loyalty platform, an updated equity reward status via the one or more user computing devices; and
dynamically adjusting, automatically with the equity allocation system and in real time, the pre-purchased supply of shares of stock to maintain the pre-purchased supply between an upper supply threshold and a lower supply threshold that are each dynamically adjusted based at least on a running average rate of fractional equity reward distribution, where the plurality of tracked user loyalty purchases is tracked automatically by the loyalty platform based on output from a transaction model.

2. The method of claim 1, wherein the transaction model is trained to produce as the output, for a tracked user loyalty purchase of the plurality of tracked user loyalty purchases, a probability rank for one or more or each of a plurality of businesses stored within a rewarding business index of the loyalty platform, the plurality of businesses including the business.

3. The method of claim 1, wherein the running average rate of fractional equity reward distribution is a running average rate of fractional equity reward distribution to user accounts from the pre-purchased supply of shares in the inventory.

4. The method of claim 3, wherein the upper supply threshold and lower supply threshold are adjusted based on a predicted event.

5. A computing system, comprising:
a processor; and
a memory storing instructions executable by the processor to:
receive, from a third-party aggregator, a transaction history for one or more financial accounts associated with a user;
automatically determine a set of businesses associated with transactions in the transaction history;
generate an equity rewards list comprising a plurality of businesses including a first business selected from the set of businesses, the first business included in a first market of a rewarding-business index stored in the memory;
display, via a display operably coupled to the computing system, the equity rewards list;
responsive to receiving an indication the user has confirmed the equity rewards list, update a profile of the user stored in the memory to enroll the user in a first rewards program for the first business and one or more additional rewards programs for remaining businesses of the plurality of businesses;
automatically award the user with an equity reward in response to identifying that a subsequent first user purchase at the first business has occurred;
automatically determine that a second user purchase at a second business has occurred, the second business included in the first market, and in response displaying, via the display, a loyalty-switch offer including an option for the user to switch loyalty from the first business to the second business;
responsive to the user accepting the loyalty-switch offer, update the profile of the user to remove the user from the first rewards program and enroll the user in a second rewards program for the second business;
present an interface element via a user interface on the display, the interface element being selectable to request a rebalancing of equity in a loyalty rewards platform account of the user; and
responsive to receiving user input selecting the interface element, automatically perform the rebalancing of equity to move equity in the first business to the second business.

6. The computing system of claim 5, wherein performing the rebalancing of equity includes:
generating one or more sell orders for equity in the first business accrued by the user via the first rewards program;

transmitting the one or more sell orders to a clearing system for execution;

upon execution of the one or more sell orders, determining proceeds of an associated sale of the equity in the first business;

calculating an amount of equity in the second business corresponding to the proceeds of the sale of the equity in the first business;

generating buy orders for the calculated amount of equity in the second business; and presenting a notification to the user that the rebalancing of equity in the loyalty rewards platform account has been performed.

7. The computing system of claim 6, wherein the equity in the first business accrued by the user comprises a fractional share of stock in the first business.

8. The computing system of claim 7, wherein placing the one or more sell orders comprises:

aggregating the fractional share of stock in the first business with one or more additional fractional shares of stock in the first business to form an aggregate amount of shares of stock;

placing the one or more sell orders to sell the aggregate amount of shares of stock in the first business using the clearing system.

9. The computing system of claim 8, wherein the calculated amount of equity in the second business is a fractional share of stock associated with the second business.

10. The computing system of claim 5, wherein the instructions are further executable to, responsive to receiving an indication that the user does not request the rebalancing of equity in the loyalty rewards platform account, maintain the equity in the first business accrued via the first equity rewards program.

11. The computing system of claim 5, wherein the interface element is a single button that is selectable to perform the rebalancing of equity in the loyalty rewards platform account of the user.

12. A method for a loyalty platform including one or more computing systems, the method comprising:

receiving, at a purchase tracking module of the loyalty platform, information defining a financial transaction made by a user, wherein the information defining the financial transaction is provided to the loyalty platform from a third-party aggregator, a financial institution, a point of sales unit, or a payment processing service;

automatically determining an identity of a business with which the financial transaction is associated based on output from a transaction model, the transaction model trained to produce as the output a probability rank for one or more or each of a plurality of businesses stored within a rewarding business index of the loyalty platform, a transaction description extracted from the information defining the financial transaction entered as input to the transaction model;

determining, through a rewards manager in communication with the purchase tracking module and an equity allocation system of the loyalty platform, an equity reward for the user based upon a purchase amount of the financial transaction and the identity of the business;

providing, via the equity allocation system, the equity reward to the user; and displaying the equity reward to the user via a display.

13. The method of claim 12, wherein the transaction model includes a feature extractor to extract one or more features from the information defining the financial transaction and use the one or more features as the input to produce the output.

14. The method of claim 13, wherein the one or more features include the transaction description.

15. The method of claim 12, wherein the model is trained with previous transaction data for the user and/or historical transaction data for other users.

16. The method of claim 12, wherein the model is neural network.

17. The method of claim 12, wherein to generate the probability rank, the model is trained to associate each business with a confidence score.

18. The method of claim 17, wherein if each confidence score is below a threshold, the model is configured to submit the financial transaction for an elevated review.

19. The method of claim 18, wherein the model is configured to be updated based on results of the elevated review.

20. The method of claim 14, wherein the one or more features further include a geolocation of the transaction and/or the purchase amount for the transaction.

* * * * *